US012056664B2

(12) United States Patent
Zionpour et al.

(10) Patent No.: US 12,056,664 B2
(45) Date of Patent: Aug. 6, 2024

(54) DIGITAL PROCESSING SYSTEMS AND METHODS FOR EXTERNAL EVENTS TRIGGER AUTOMATIC TEXT-BASED DOCUMENT ALTERATIONS IN COLLABORATIVE WORK SYSTEMS

(71) Applicant: MONDAY.COM LTD., Tel Aviv (IL)

(72) Inventors: Ron Zionpour, Kfar Sirkin (IL); Tal Haramati, Tel Aviv (IL); Roy Mann, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/564,745

(22) Filed: Dec. 29, 2021

(65) Prior Publication Data

US 2023/0055241 A1 Feb. 23, 2023

Related U.S. Application Data

(60) Provisional application No. 63/273,453, filed on Oct. 29, 2021, provisional application No. 63/273,448,
(Continued)

(51) Int. Cl.
*G06F 40/166* (2020.01)
*G06F 16/958* (2019.01)
(Continued)

(52) U.S. Cl.
CPC ......... *G06Q 10/101* (2013.01); *G06F 16/958* (2019.01); *G06F 40/14* (2020.01); *G06F 40/186* (2020.01)

(58) Field of Classification Search
CPC ...... G06F 40/174; G06F 16/93; G06F 40/103; G06F 40/143; G06F 16/9562;
(Continued)

(56) References Cited

U.S. PATENT DOCUMENTS

| | | | |
|---|---|---|---|
| 4,972,314 | A | 11/1990 | Getzinger et al. |
| 5,220,657 | A | 6/1993 | Bly et al. |

(Continued)

FOREIGN PATENT DOCUMENTS

| | | | |
|---|---|---|---|
| CA | 2 828 011 | A1 | 9/2012 |
| CN | 103064833 | A | 4/2013 |

(Continued)

OTHER PUBLICATIONS

Alessio et al., Monday.com Walkthrough 2018\All Features, Platforms & Thoughts, Mar. 1, 2018, pp. 1-55, 2018.

(Continued)

*Primary Examiner* — Olujimi A Adesanya
(74) *Attorney, Agent, or Firm* — FINNEGAN, HENDERSON, FARABOW, GARRETT & DUNNER LLP

(57) ABSTRACT

Systems, methods, and computer-readable media for automatically altering information within an electronic document based on an externally detected occurrence are disclosed. The systems and methods may involve accessing an electronic word processing document; displaying an interface presenting at least one tool for enabling an author of the electronic word processing document to define an electronic rule triggered by an external network-based occurrence; receiving, in association with the electronic rule, a conditional instruction to edit the electronic word processing document in response to the network-based occurrence; detecting the external network-based occurrence; and in response to the detection of the external network-based occurrence, implementing the conditional instruction and thereby automatically edit the electronic word processing document.

41 Claims, 86 Drawing Sheets

Related U.S. Application Data filed on Oct. 29, 2021, provisional application No. 63/233,925, filed on Aug. 17, 2021.

(51) Int. Cl.
*G06F 40/14* (2020.01)
*G06F 40/186* (2020.01)
*G06Q 10/101* (2023.01)

(58) Field of Classification Search
CPC ...... G06F 9/451; G06F 40/134; G06F 16/434; G06F 16/958
See application file for complete search history.

(56) References Cited

U.S. PATENT DOCUMENTS 5,479,602 A 12/1995 Baecker et al.
5,517,663 A 5/1996 Kahn
5,632,009 A 5/1997 Rao et al.
5,682,469 A 10/1997 Linnett
5,696,702 A 12/1997 Skinner et al.
5,726,701 A 3/1998 Needham
5,787,411 A 7/1998 Groff et al.
5,880,742 A 3/1999 Rao et al.
5,933,145 A 8/1999 Meek
6,016,438 A 1/2000 Wakayama
6,016,553 A 1/2000 Schneider et al.
6,023,695 A 2/2000 Osborn et al.
6,034,681 A 3/2000 Miller et al.
6,049,622 A 4/2000 Robb et al.
6,088,707 A 7/2000 Bates et al.
6,108,573 A 8/2000 Debbins et al.
6,111,573 A 8/2000 McComb et al.
6,167,405 A 12/2000 Rosensteel, Jr. et al.
6,169,534 B1 1/2001 Raffel et al.
6,182,127 B1 1/2001 Cronin, III et al.
6,185,582 B1 2/2001 Zellweger et al.
6,195,794 B1 2/2001 Buxton
6,266,067 B1 7/2001 Owen et al.
6,275,809 B1 8/2001 Tamaki et al.
6,330,022 B1 12/2001 Seligmann
6,377,965 B1 4/2002 Hachamovitch et al.
6,385,617 B1 5/2002 Malik
6,460,043 B1 10/2002 Tabbara et al.
6,496,832 B2 12/2002 Chi et al.
6,509,912 B1 1/2003 Moran et al.
6,510,459 B2 1/2003 Cronin, III et al.
6,522,347 B1 2/2003 Tsuji et al.
6,527,556 B1 3/2003 Koskinen
6,567,830 B1 5/2003 Madduri
6,606,740 B1 8/2003 Lynn et al.
6,636,242 B2 10/2003 Bowman-Amuah
6,647,370 B1 11/2003 Fu et al.
6,661,431 B1 12/2003 Stuart et al.
6,988,248 B1 1/2006 Tang et al.
7,027,997 B1 4/2006 Robinson et al.
7,034,860 B2 4/2006 Lia et al.
7,043,529 B1 5/2006 Simonoff
7,054,891 B2 5/2006 Cole
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,383,320 B1 6/2008 Silberstein et al.
7,389,473 B1 * 6/2008 Sawicki ................ G06F 40/123 715/255
7,415,664 B2 8/2008 Aureglia et al.
7,417,644 B2 8/2008 Cooper et al.
7,461,077 B1 12/2008 Greenwood
7,489,976 B2 2/2009 Adra
7,617,443 B2 11/2009 Mills et al.
7,685,152 B2 3/2010 Chivukula et al.
7,707,514 B2 4/2010 Forstall et al.
7,710,290 B2 5/2010 Johnson
7,770,100 B2 8/2010 Chamberlain et al.
7,827,476 B1 11/2010 Roberts et al.
7,827,615 B1 11/2010 Allababidi et al.
7,916,157 B1 3/2011 Kelley et al.
7,921,360 B1 4/2011 Sundermeyer et al.
7,933,952 B2 * 4/2011 Parker .................. G06F 40/166 709/204
7,954,064 B2 5/2011 Forstall et al.
8,046,703 B2 10/2011 Busch et al.
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,407,217 B1 3/2013 Zhang
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater, Jr.
8,635,520 B2 1/2014 Christiansen et al.
8,677,448 B1 3/2014 Kauffman et al.
8,738,414 B1 5/2014 Nagar et al.
8,812,471 B2 8/2014 Akita
8,819,042 B2 8/2014 Samudrala et al.
8,825,758 B2 9/2014 Bailor et al.
8,838,533 B2 9/2014 Kwiatkowski et al.
8,862,979 B2 10/2014 Hawking
8,863,022 B2 10/2014 Rhodes et al.
8,869,027 B2 10/2014 Louch et al.
8,937,627 B1 1/2015 Otero et al.
8,938,465 B2 1/2015 Messer
8,954,871 B2 2/2015 Louch et al.
9,007,405 B1 4/2015 Eldar et al.
9,015,716 B2 4/2015 Fletcher et al.
9,026,897 B2 5/2015 Zarras
9,043,362 B2 5/2015 Weissman et al.
9,063,958 B2 6/2015 Müller et al.
9,129,234 B2 9/2015 Campbell et al.
9,159,246 B2 10/2015 Rodriguez et al.
9,172,738 B1 10/2015 daCosta
9,183,303 B1 11/2015 Goel et al.
9,223,770 B1 12/2015 Ledet
9,239,719 B1 1/2016 Feinstein et al.
9,244,917 B1 1/2016 Sharma et al.
9,253,130 B2 2/2016 Zaveri
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,390,059 B1 7/2016 Gur et al.
9,424,287 B2 8/2016 Schroth
9,424,333 B1 8/2016 Bisignani et al.
9,424,545 B1 8/2016 Lee
9,430,458 B2 8/2016 Rhee et al.
9,449,031 B2 9/2016 Barrus et al.
9,495,386 B2 11/2016 Tapley et al.
9,519,699 B1 12/2016 Kulkarni et al.
9,558,172 B2 1/2017 Rampson et al.
9,613,086 B1 4/2017 Sherman
9,635,091 B1 4/2017 Laukkanen et al.
9,679,456 B2 6/2017 East
9,720,602 B1 8/2017 Chen et al.
9,727,376 B1 8/2017 Bills et al.
9,760,271 B2 9/2017 Persaud
9,794,256 B2 10/2017 Kiang et al.

(56) References Cited

U.S. PATENT DOCUMENTS 9,798,829 B1 10/2017 Baisley
9,811,676 B1 11/2017 Gauvin
9,866,561 B2 1/2018 Psenka et al.
9,870,136 B2 1/2018 Pourshahid
10,043,296 B2 8/2018 Li
10,067,928 B1 9/2018 Krappe
10,078,668 B1 9/2018 Woodrow et al.
10,169,306 B2* 1/2019 O'Shaughnessy ...... H04L 67/02
10,176,154 B2 1/2019 Ben-Aharon et al.
10,235,441 B1 3/2019 Makhlin et al.
10,255,609 B2 4/2019 Kinkead et al.
10,282,405 B1 5/2019 Silk et al.
10,282,406 B2 5/2019 Bissantz
10,311,080 B2 6/2019 Folting et al.
10,318,624 B1 6/2019 Rosner et al.
10,327,712 B2 6/2019 Beymer et al.
10,347,017 B2 7/2019 Ruble et al.
10,372,706 B2 8/2019 Chavan et al.
10,380,140 B2 8/2019 Sherman
10,423,758 B2 9/2019 Kido et al.
10,445,702 B1 10/2019 Hunt
10,452,360 B1 10/2019 Burman et al.
10,453,118 B2 10/2019 Smith et al.
10,474,317 B2 11/2019 Ramanathan et al.
10,489,391 B1 11/2019 Tomlin
10,489,462 B1 11/2019 Rogynskyy et al.
10,496,737 B1 12/2019 Sayre et al.
10,505,825 B1 12/2019 Bettaiah et al.
10,528,599 B1 1/2020 Pandis et al.
10,534,507 B1 1/2020 Laukkanen et al.
10,540,152 B1 1/2020 Krishnaswamy et al.
10,540,434 B2 1/2020 Migeon et al.
10,546,001 B1 1/2020 Nguyen et al.
10,564,622 B1 2/2020 Dean et al.
10,573,407 B2 2/2020 Ginsburg
10,579,724 B2 3/2020 Campbell et al.
10,587,714 B1 3/2020 Kulkarni et al.
10,628,002 B1 4/2020 Kang et al.
10,698,594 B2 6/2020 Sanches et al.
10,706,061 B2 7/2020 Sherman et al.
10,719,220 B2 7/2020 Ouellet et al.
10,733,256 B2 8/2020 Fickenscher et al.
10,740,117 B2 8/2020 Ording et al.
10,747,764 B1 8/2020 Plenderleith
10,747,950 B2 8/2020 Dang et al.
10,748,312 B2 8/2020 Ruble et al.
10,754,688 B2 8/2020 Powell
10,761,691 B2 9/2020 Anzures et al.
10,795,555 B2 10/2020 Burke et al.
10,817,660 B2 10/2020 Rampson et al.
D910,077 S 2/2021 Naroshevitch et al.
10,963,578 B2 3/2021 More et al.
11,010,371 B1 5/2021 Slomka et al.
11,030,259 B2 6/2021 Mullins et al.
11,042,363 B1 6/2021 Krishnaswamy et al.
11,042,699 B1 6/2021 Sayre et al.
11,048,714 B2 6/2021 Sherman et al.
11,086,894 B1 8/2021 Srivastava et al.
11,222,167 B2 1/2022 Gehrmann et al.
11,243,688 B1 2/2022 Remy et al.
11,429,384 B1 8/2022 Navert et al.
11,620,615 B2 4/2023 Jiang et al.
2001/0008998 A1 7/2001 Tamaki et al.
2001/0032248 A1 10/2001 Krafchin
2001/0039551 A1 11/2001 Saito et al.
2002/0002459 A1 1/2002 Lewis et al.
2002/0065848 A1* 5/2002 Walker ................ G06F 21/6209 715/255
2002/0065849 A1* 5/2002 Ferguson .................. H04L 9/40 715/227
2002/0065880 A1 5/2002 Hasegawa et al.
2002/0069207 A1 6/2002 Alexander et al.
2002/0075309 A1 6/2002 Michelman et al.
2002/0082892 A1 6/2002 Raffel et al.
2002/0138528 A1 9/2002 Gong et al.
2003/0033196 A1 2/2003 Tomlin
2003/0041113 A1 2/2003 Larsen
2003/0051377 A1 3/2003 Chirafesi, Jr.
2003/0058277 A1 3/2003 Bowman-Amuah
2003/0065662 A1 4/2003 Cosic
2003/0093408 A1 5/2003 Brown et al.
2003/0101416 A1 5/2003 McInnes et al.
2003/0135558 A1 7/2003 Bellotti et al.
2003/0137536 A1 7/2003 Hugh
2003/0187864 A1 10/2003 McGoveran
2003/0200215 A1 10/2003 Chen et al.
2003/0204490 A1 10/2003 Kasriel
2004/0032432 A1 2/2004 Baynger
2004/0098284 A1 5/2004 Petito et al.
2004/0133441 A1 7/2004 Brady et al.
2004/0138939 A1 7/2004 Theiler
2004/0139400 A1 7/2004 Allam et al.
2004/0162833 A1* 8/2004 Jones .................... G06F 40/137
2004/0172592 A1 9/2004 Collie et al.
2004/0212615 A1 10/2004 Uthe
2004/0215443 A1 10/2004 Hatton
2004/0230940 A1 11/2004 Cooper et al.
2004/0268227 A1 12/2004 Brid
2005/0034058 A1 2/2005 Mills et al.
2005/0034064 A1 2/2005 Meyers et al.
2005/0039001 A1 2/2005 Hudis et al.
2005/0039033 A1 2/2005 Meyers et al.
2005/0044486 A1 2/2005 Kotler et al.
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0091596 A1 4/2005 Anthony et al.
2005/0096973 A1 5/2005 Heyse et al.
2005/0114305 A1 5/2005 Haynes et al.
2005/0125395 A1 6/2005 Boettiger
2005/0165600 A1 7/2005 Kasravi et al.
2005/0171881 A1 8/2005 Ghassemieh et al.
2005/0216830 A1 9/2005 Turner et al.
2005/0228250 A1 10/2005 Bitter et al.
2005/0251021 A1 11/2005 Kaufman et al.
2005/0257204 A1 11/2005 Bryant et al.
2005/0278297 A1 12/2005 Nelson
2005/0289170 A1 12/2005 Brown et al.
2005/0289342 A1 12/2005 Needham et al.
2005/0289453 A1 12/2005 Segal et al.
2006/0009960 A1 1/2006 Valencot et al.
2006/0013462 A1 1/2006 Sadikali
2006/0015499 A1* 1/2006 Clissold .................. G06F 16/10 707/999.009
2006/0015806 A1 1/2006 Wallace
2006/0031148 A1 2/2006 O'Dell et al.
2006/0031764 A1 2/2006 Keyser et al.
2006/0036568 A1 2/2006 Moore et al.
2006/0047811 A1 3/2006 Lau et al.
2006/0053096 A1 3/2006 Subramanian et al.
2006/0053194 A1 3/2006 Schneider et al.
2006/0069604 A1 3/2006 Leukart et al.
2006/0069635 A1 3/2006 Ram et al.
2006/0080594 A1 4/2006 Chavoustie et al.
2006/0090169 A1 4/2006 Daniels et al.
2006/0106642 A1 5/2006 Reicher et al.
2006/0107196 A1 5/2006 Thanu et al.
2006/0111953 A1 5/2006 Setya
2006/0129415 A1 6/2006 Thukral et al.
2006/0136828 A1 6/2006 Asano
2006/0150090 A1 7/2006 Swamidass
2006/0173908 A1 8/2006 Browning et al.
2006/0190313 A1 8/2006 Lu
2006/0212299 A1 9/2006 Law
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0287998 A1 12/2006 Folting et al.
2006/0294451 A1 12/2006 Kelkar et al.

(56) References Cited

U.S. PATENT DOCUMENTS

| | | | |
|---|---|---|---|
| 2007/0027932 | A1* | 2/2007 | Thibeault .............. G06F 16/958 |
| 2007/0033531 | A1 | 2/2007 | Marsh |
| 2007/0050322 | A1 | 3/2007 | Vigesaa et al. |
| 2007/0050379 | A1 | 3/2007 | Day et al. |
| 2007/0073899 | A1 | 3/2007 | Judge et al. |
| 2007/0092048 | A1 | 4/2007 | Chelstrom et al. |
| 2007/0094607 | A1 | 4/2007 | Morgan et al. |
| 2007/0101291 | A1 | 5/2007 | Forstall et al. |
| 2007/0106754 | A1 | 5/2007 | Moore |
| 2007/0118527 | A1 | 5/2007 | Winje et al. |
| 2007/0118813 | A1 | 5/2007 | Forstall et al. |
| 2007/0143169 | A1 | 6/2007 | Grant et al. |
| 2007/0168861 | A1 | 7/2007 | Bell et al. |
| 2007/0174228 | A1 | 7/2007 | Folting et al. |
| 2007/0174760 | A1 | 7/2007 | Chamberlain et al. |
| 2007/0186173 | A1 | 8/2007 | Both et al. |
| 2007/0220119 | A1 | 9/2007 | Himmelstein |
| 2007/0233647 | A1 | 10/2007 | Rawat et al. |
| 2007/0239746 | A1 | 10/2007 | Masselle et al. |
| 2007/0256043 | A1 | 11/2007 | Peters et al. |
| 2007/0282522 | A1 | 12/2007 | Geelen |
| 2007/0282627 | A1 | 12/2007 | Greenstein et al. |
| 2007/0283259 | A1 | 12/2007 | Barry et al. |
| 2007/0294235 | A1 | 12/2007 | Millett |
| 2007/0299795 | A1 | 12/2007 | Macbeth et al. |
| 2007/0300174 | A1 | 12/2007 | Macbeth et al. |
| 2007/0300185 | A1 | 12/2007 | Macbeth et al. |
| 2008/0004929 | A9 | 1/2008 | Raffel et al. |
| 2008/0005235 | A1 | 1/2008 | Hegde et al. |
| 2008/0033777 | A1 | 2/2008 | Shukoor |
| 2008/0034307 | A1 | 2/2008 | Cisler et al. |
| 2008/0034314 | A1 | 2/2008 | Louch et al. |
| 2008/0052291 | A1 | 2/2008 | Bender |
| 2008/0059312 | A1 | 3/2008 | Gern et al. |
| 2008/0059539 | A1 | 3/2008 | Chin et al. |
| 2008/0065460 | A1 | 3/2008 | Raynor |
| 2008/0077530 | A1 | 3/2008 | Banas et al. |
| 2008/0097748 | A1 | 4/2008 | Haley et al. |
| 2008/0104091 | A1 | 5/2008 | Chin |
| 2008/0126389 | A1 | 5/2008 | Mush et al. |
| 2008/0133736 | A1 | 6/2008 | Wensley et al. |
| 2008/0148140 | A1 | 6/2008 | Nakano |
| 2008/0155547 | A1 | 6/2008 | Weber et al. |
| 2008/0163075 | A1 | 7/2008 | Beck et al. |
| 2008/0183593 | A1 | 7/2008 | Dierks |
| 2008/0195948 | A1 | 8/2008 | Bauer |
| 2008/0209318 | A1 | 8/2008 | Allsop et al. |
| 2008/0216022 | A1 | 9/2008 | Lorch et al. |
| 2008/0222192 | A1 | 9/2008 | Hughes |
| 2008/0256014 | A1 | 10/2008 | Gould et al. |
| 2008/0256429 | A1 | 10/2008 | Penner et al. |
| 2008/0270597 | A1 | 10/2008 | Tenenti |
| 2008/0282189 | A1 | 11/2008 | Hofmann et al. |
| 2008/0295038 | A1 | 11/2008 | Helfman et al. |
| 2008/0301237 | A1 | 12/2008 | Parsons |
| 2009/0006171 | A1 | 1/2009 | Blatchley et al. |
| 2009/0006283 | A1 | 1/2009 | Labrie et al. |
| 2009/0013244 | A1 | 1/2009 | Cudich et al. |
| 2009/0019383 | A1 | 1/2009 | Riley et al. |
| 2009/0024944 | A1 | 1/2009 | Louch et al. |
| 2009/0044090 | A1 | 2/2009 | Gur et al. |
| 2009/0048896 | A1 | 2/2009 | Anandan |
| 2009/0049372 | A1 | 2/2009 | Goldberg |
| 2009/0077164 | A1 | 3/2009 | Phillips et al. |
| 2009/0077217 | A1 | 3/2009 | McFarland et al. |
| 2009/0083140 | A1 | 3/2009 | Phan |
| 2009/0094514 | A1 | 4/2009 | Dargahi et al. |
| 2009/0113310 | A1 | 4/2009 | Appleyard et al. |
| 2009/0132470 | A1 | 5/2009 | Vignet |
| 2009/0150813 | A1 | 6/2009 | Chang et al. |
| 2009/0174680 | A1 | 7/2009 | Anzures et al. |
| 2009/0192787 | A1 | 7/2009 | Roon |
| 2009/0198715 | A1 | 8/2009 | Barbarek |
| 2009/0222760 | A1 | 9/2009 | Halverson et al. |
| 2009/0248710 | A1 | 10/2009 | McCormack et al. |
| 2009/0271696 | A1 | 10/2009 | Bailor et al. |
| 2009/0276692 | A1 | 11/2009 | Rosner |
| 2009/0313201 | A1 | 12/2009 | Huelsman et al. |
| 2009/0313537 | A1 | 12/2009 | Fu et al. |
| 2009/0313570 | A1 | 12/2009 | Po et al. |
| 2009/0319623 | A1 | 12/2009 | Srinivasan et al. |
| 2009/0319882 | A1 | 12/2009 | Morrison et al. |
| 2009/0327240 | A1 | 12/2009 | Meehan et al. |
| 2009/0327301 | A1* | 12/2009 | Lees ....................... G06F 16/93 |
| 2009/0327851 | A1 | 12/2009 | Raposo |
| 2009/0327875 | A1 | 12/2009 | Kinkoh |
| 2010/0017699 | A1 | 1/2010 | Farrell et al. |
| 2010/0031135 | A1 | 2/2010 | Naghshin et al. |
| 2010/0070845 | A1 | 3/2010 | Facemire et al. |
| 2010/0070895 | A1 | 3/2010 | Messer |
| 2010/0083164 | A1 | 4/2010 | Martin et al. |
| 2010/0088636 | A1 | 4/2010 | Yerkes et al. |
| 2010/0095219 | A1 | 4/2010 | Stachowiak et al. |
| 2010/0095298 | A1 | 4/2010 | Seshadrinathan et al. |
| 2010/0100427 | A1 | 4/2010 | McKeown et al. |
| 2010/0100463 | A1 | 4/2010 | Molotsi et al. |
| 2010/0114926 | A1 | 5/2010 | Agrawal et al. |
| 2010/0149005 | A1 | 6/2010 | Yoon et al. |
| 2010/0174678 | A1 | 7/2010 | Massand |
| 2010/0205521 | A1 | 8/2010 | Folting |
| 2010/0228752 | A1 | 9/2010 | Folting et al. |
| 2010/0241477 | A1 | 9/2010 | Nylander et al. |
| 2010/0241948 | A1 | 9/2010 | Andeen et al. |
| 2010/0241972 | A1 | 9/2010 | Spataro et al. |
| 2010/0241990 | A1 | 9/2010 | Gabriel et al. |
| 2010/0251090 | A1 | 9/2010 | Chamberlain et al. |
| 2010/0251386 | A1 | 9/2010 | Gilzean et al. |
| 2010/0257015 | A1 | 10/2010 | Molander |
| 2010/0262625 | A1 | 10/2010 | Pittenger |
| 2010/0287163 | A1 | 11/2010 | Sridhar et al. |
| 2010/0287221 | A1 | 11/2010 | Battepati et al. |
| 2010/0313119 | A1 | 12/2010 | Baldwin et al. |
| 2010/0324964 | A1 | 12/2010 | Callanan et al. |
| 2010/0332973 | A1* | 12/2010 | Kloiber ................. G06F 16/958 715/255 |
| 2011/0010340 | A1 | 1/2011 | Hung et al. |
| 2011/0016432 | A1 | 1/2011 | Helfman |
| 2011/0028138 | A1 | 2/2011 | Davies-Moore et al. |
| 2011/0047484 | A1 | 2/2011 | Mount et al. |
| 2011/0055177 | A1 | 3/2011 | Chakra et al. |
| 2011/0066933 | A1 | 3/2011 | Ludwig |
| 2011/0071869 | A1 | 3/2011 | O'Brien et al. |
| 2011/0106636 | A1 | 5/2011 | Spear et al. |
| 2011/0119352 | A1 | 5/2011 | Perov et al. |
| 2011/0179371 | A1 | 7/2011 | Kopycinski et al. |
| 2011/0205231 | A1 | 8/2011 | Hartley et al. |
| 2011/0208324 | A1 | 8/2011 | Fukatsu |
| 2011/0208732 | A1 | 8/2011 | Melton et al. |
| 2011/0209150 | A1 | 8/2011 | Hammond et al. |
| 2011/0219321 | A1 | 9/2011 | Gonzalez et al. |
| 2011/0225525 | A1 | 9/2011 | Chasman et al. |
| 2011/0231273 | A1 | 9/2011 | Buchheit |
| 2011/0289397 | A1 | 11/2011 | Eastmond et al. |
| 2011/0289439 | A1 | 11/2011 | Jugel |
| 2011/0298618 | A1 | 12/2011 | Stahl et al. |
| 2011/0302003 | A1 | 12/2011 | Shirish et al. |
| 2012/0029962 | A1 | 2/2012 | Podgurny et al. |
| 2012/0035974 | A1 | 2/2012 | Seybold |
| 2012/0036462 | A1 | 2/2012 | Schwartz et al. |
| 2012/0066587 | A1 | 3/2012 | Zhou et al. |
| 2012/0072821 | A1 | 3/2012 | Bowling |
| 2012/0079408 | A1 | 3/2012 | Rohwer |
| 2012/0081762 | A1 | 4/2012 | Yamada |
| 2012/0084798 | A1 | 4/2012 | Reeves et al. |
| 2012/0086716 | A1 | 4/2012 | Reeves et al. |
| 2012/0086717 | A1 | 4/2012 | Liu |
| 2012/0089610 | A1 | 4/2012 | Agrawal et al. |
| 2012/0089914 | A1 | 4/2012 | Holt et al. |
| 2012/0089992 | A1 | 4/2012 | Reeves et al. |
| 2012/0096389 | A1 | 4/2012 | Flam et al. |
| 2012/0096392 | A1 | 4/2012 | Ording et al. |
| 2012/0102432 | A1 | 4/2012 | Breedvelt-Schouten et al. |
| 2012/0102543 | A1 | 4/2012 | Kohli et al. |
| 2012/0110515 | A1 | 5/2012 | Abramoff et al. |

(56) References Cited

U.S. PATENT DOCUMENTS

2012/0116834 A1 5/2012 Pope et al.
2012/0116835 A1 5/2012 Pope et al.
2012/0124749 A1 5/2012 Suzuki et al.
2012/0131445 A1 5/2012 Oyarzabal et al.
2012/0151173 A1 6/2012 Shirley et al.
2012/0158744 A1 6/2012 Tseng et al.
2012/0192050 A1 7/2012 Campbell et al.
2012/0198322 A1 8/2012 Gulwani et al.
2012/0210252 A1 8/2012 Fedoseyeva et al.
2012/0215574 A1 8/2012 Driessnack et al.
2012/0215578 A1 8/2012 Swierz, III et al.
2012/0233150 A1 9/2012 Naim et al.
2012/0233533 A1 9/2012 Yücel et al.
2012/0246170 A1 9/2012 Iantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Strick et al.
2012/0297307 A1 11/2012 Rider et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2013/0018952 A1 1/2013 McConnell et al.
2013/0018953 A1 1/2013 McConnell et al.
2013/0018960 A1 1/2013 Knysz et al.
2013/0024418 A1 1/2013 Strick et al.
2013/0024760 A1 1/2013 Vogel et al.
2013/0036369 A1 2/2013 Mitchell et al.
2013/0041958 A1 2/2013 Post et al.
2013/0054514 A1 2/2013 Barrett-Kahn et al.
2013/0055113 A1 2/2013 Chazin et al.
2013/0063490 A1 3/2013 Zaman et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.
2013/0104035 A1 4/2013 Wagner et al.
2013/0111320 A1 5/2013 Campbell et al.
2013/0117268 A1 5/2013 Smith et al.
2013/0159832 A1 6/2013 Ingargiola et al.
2013/0159907 A1 6/2013 Brosche et al.
2013/0179209 A1 7/2013 Milosevich
2013/0211866 A1 8/2013 Gordon et al.
2013/0212197 A1* 8/2013 Karlson .............. G06F 16/2455 709/206
2013/0212234 A1 8/2013 Bartlett et al.
2013/0238363 A1 9/2013 Ohta et al.
2013/0238968 A1 9/2013 Barrus
2013/0246384 A1 9/2013 Victor
2013/0262527 A1 10/2013 Hunter
2013/0268331 A1 10/2013 Bitz et al.
2013/0297468 A1 11/2013 Hirsch et al.
2013/0318424 A1 11/2013 Boyd
2013/0339051 A1 12/2013 Dobrean
2014/0006326 A1 1/2014 Bazanov
2014/0019842 A1 1/2014 Montagna et al.
2014/0033307 A1 1/2014 Schmidtler
2014/0043331 A1 2/2014 Makinen et al.
2014/0046638 A1 2/2014 Peloski
2014/0052749 A1 2/2014 Rissanen
2014/0058801 A1 2/2014 Deodhar et al.
2014/0068403 A1 3/2014 Bhargav et al.
2014/0074545 A1 3/2014 Minder et al.
2014/0075301 A1 3/2014 Mihara
2014/0082525 A1* 3/2014 Kass ...................... G06Q 50/01 715/753
2014/0101527 A1 4/2014 Suciu
2014/0108985 A1 4/2014 Scott et al.
2014/0109012 A1 4/2014 Choudhary et al.
2014/0111516 A1 4/2014 Hall et al.
2014/0115515 A1 4/2014 Adams et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Järvenpääet al.
2014/0172475 A1 6/2014 Olliphant et al.
2014/0173401 A1 6/2014 Oshlag et al.
2014/0181155 A1 6/2014 Homsany
2014/0188748 A1 7/2014 Cavoue et al.
2014/0195933 A1 7/2014 Rao DV
2014/0214404 A1 7/2014 Kalia et al.
2014/0215303 A1 7/2014 Grigorovitch et al.
2014/0249877 A1 9/2014 Hull et al.
2014/0278638 A1 9/2014 Kreuzkamp et al.
2014/0278720 A1 9/2014 Taguchi
2014/0280287 A1 9/2014 Ganti
2014/0280377 A1* 9/2014 Frew ..................... G06F 40/169 707/805
2014/0281868 A1 9/2014 Vogel et al.
2014/0281869 A1 9/2014 Yob
2014/0289223 A1 9/2014 Colwell et al.
2014/0304174 A1 10/2014 Scott et al.
2014/0306837 A1 10/2014 Hauck, III
2014/0310345 A1 10/2014 Megiddo et al.
2014/0324497 A1 10/2014 Verma et al.
2014/0324501 A1 10/2014 Davidow et al.
2014/0365938 A1 12/2014 Black et al.
2014/0372856 A1 12/2014 Radakovitz et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0035918 A1 2/2015 Matsumoto et al.
2015/0067556 A1 3/2015 Tibrewal et al.
2015/0074721 A1 3/2015 Fishman et al.
2015/0074728 A1 3/2015 Chai et al.
2015/0088822 A1 3/2015 Raja et al.
2015/0095752 A1 4/2015 Studer et al.
2015/0106736 A1 4/2015 Torman et al.
2015/0125834 A1 5/2015 Mendoza
2015/0142676 A1 5/2015 McGinnis et al.
2015/0142829 A1 5/2015 Lee et al.
2015/0153943 A1 6/2015 Wang
2015/0154660 A1 6/2015 Weald et al.
2015/0169514 A1 6/2015 Sah et al.
2015/0169531 A1 6/2015 Campbell et al.
2015/0188964 A1 7/2015 Sharma et al.
2015/0212717 A1 7/2015 Nair et al.
2015/0220491 A1 8/2015 Cochrane et al.
2015/0242091 A1 8/2015 Lu et al.
2015/0249864 A1 9/2015 Tang et al.
2015/0261796 A1 9/2015 Gould et al.
2015/0262121 A1 9/2015 Riel-Dalpe et al.
2015/0278699 A1 10/2015 Danielsson
2015/0281292 A1 10/2015 Murayama
2015/0295877 A1 10/2015 Roman
2015/0310126 A1 10/2015 Steiner et al.
2015/0317590 A1 11/2015 Karlson
2015/0324453 A1 11/2015 Werner
2015/0331846 A1 11/2015 Guggilla et al.
2015/0363478 A1 12/2015 Haynes
2015/0370540 A1 12/2015 Coslovi et al.
2015/0370904 A1 12/2015 Joshi et al.
2015/0378542 A1 12/2015 Saito et al.
2015/0378711 A1 12/2015 Cameron et al.
2015/0378979 A1 12/2015 Hirzel et al.
2015/0379472 A1 12/2015 Gilmour et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0035546 A1* 2/2016 Platt ................. H01J 37/32669 204/192.12
2016/0055134 A1 2/2016 Sathish et al.
2016/0055374 A1 2/2016 Zhang et al.
2016/0063435 A1 3/2016 Shah et al.
2016/0068960 A1 3/2016 Jung et al.
2016/0078368 A1 3/2016 Kakhandiki et al.
2016/0088480 A1 3/2016 Chen et al.
2016/0092557 A1 3/2016 Stojanovic et al.
2016/0117308 A1 4/2016 Haider et al.

(56) References Cited

U.S. PATENT DOCUMENTS

2016/0170586 A1 6/2016 Gallo
2016/0173122 A1 6/2016 Akitomi et al.
2016/0210572 A1 7/2016 Shaaban et al.
2016/0224532 A1 8/2016 Miller et al.
2016/0224939 A1 8/2016 Chen et al.
2016/0231915 A1 8/2016 Nhan et al.
2016/0232489 A1 8/2016 Skaaksrud
2016/0246490 A1 8/2016 Cabral
2016/0253982 A1 9/2016 Cheung et al.
2016/0259856 A1 9/2016 Ananthapur et al.
2016/0275150 A1 9/2016 Bournonnais et al.
2016/0299655 A1 10/2016 Migos et al.
2016/0308963 A1 10/2016 Kung
2016/0321235 A1 11/2016 He et al.
2016/0321604 A1 11/2016 Imaeda et al.
2016/0335302 A1 11/2016 Teodorescu
2016/0335303 A1 11/2016 Madhalam et al.
2016/0335731 A1 11/2016 Hall
2016/0335903 A1 11/2016 Mendoza
2016/0344828 A1 11/2016 Häusler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0041296 A1 2/2017 Ford et al.
2017/0052937 A1 2/2017 Sirven et al.
2017/0061342 A1 3/2017 LoRe et al.
2017/0061360 A1 3/2017 Rucker et al.
2017/0061820 A1 3/2017 Firoozbakhsh
2017/0063722 A1 3/2017 Cropper et al.
2017/0075557 A1 3/2017 Noble et al.
2017/0076101 A1 3/2017 Kochhar et al.
2017/0090734 A1 3/2017 Fitzpatrick
2017/0090736 A1 3/2017 King et al.
2017/0091337 A1 3/2017 Patterson
2017/0093876 A1 3/2017 Feng et al.
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0124740 A1 5/2017 Campbell et al.
2017/0126772 A1 5/2017 Campbell et al.
2017/0132296 A1 5/2017 Ding
2017/0132652 A1 5/2017 Kedzlie et al.
2017/0139874 A1 5/2017 Chin
2017/0139884 A1 5/2017 Bendig et al.
2017/0139891 A1 5/2017 Ah-Soon et al.
2017/0140047 A1 5/2017 Bendig et al.
2017/0140219 A1 5/2017 King et al.
2017/0153771 A1 6/2017 Chu
2017/0161246 A1 6/2017 Klima
2017/0177888 A1 6/2017 Arora et al.
2017/0185668 A1 6/2017 Convertino et al.
2017/0200122 A1* 7/2017 Edson .................. H04L 63/104
2017/0206366 A1 7/2017 Fay et al.
2017/0212924 A1 7/2017 Semlani et al.
2017/0220813 A1 8/2017 Mullins et al.
2017/0221072 A1 8/2017 AthuluruTlrumala et al.
2017/0228445 A1 8/2017 Chiu et al.
2017/0228460 A1 8/2017 Amel
2017/0236081 A1 8/2017 Grady Smith et al.
2017/0242921 A1 8/2017 Rota
2017/0262786 A1 9/2017 Khasis
2017/0270970 A1 9/2017 Ho et al.
2017/0272316 A1 9/2017 Johnson et al.
2017/0272331 A1 9/2017 Lissack
2017/0277669 A1 9/2017 Sekharan
2017/0285879 A1 10/2017 Pilkington et al.
2017/0285890 A1 10/2017 Dolman
2017/0301039 A1 10/2017 Dyer et al.
2017/0315683 A1 11/2017 Boucher et al.
2017/0315974 A1 11/2017 Kong et al.
2017/0315979 A1 11/2017 Boucher et al.
2017/0324692 A1 11/2017 Zhou
2017/0329479 A1 11/2017 Rauschenbach et al.
2017/0351252 A1 12/2017 Kleifges et al.
2017/0372442 A1 12/2017 Mejias
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0039651 A1 2/2018 Tobin et al.
2018/0055434 A1 3/2018 Cheung et al.
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0081863 A1 3/2018 Bathla
2018/0081868 A1 3/2018 Willcock et al.
2018/0088753 A1 3/2018 Viégas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121994 A1 5/2018 Matsunaga et al.
2018/0128636 A1 5/2018 Zhou
2018/0129651 A1 5/2018 Latvala et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0181650 A1 6/2018 Komatsuda et al.
2018/0181716 A1 6/2018 Mander et al.
2018/0189734 A1 7/2018 Newhouse et al.
2018/0210936 A1 7/2018 Reynolds et al.
2018/0225270 A1 8/2018 Bhide et al.
2018/0260371 A1 9/2018 Theodore et al.
2018/0276417 A1 9/2018 Cerezo
2018/0293217 A1 10/2018 Callaghan
2018/0293669 A1 10/2018 Jackson et al.
2018/0329930 A1 11/2018 Eberlein et al.
2018/0330320 A1 11/2018 Kohli
2018/0357305 A1 12/2018 Kinast et al.
2018/0365429 A1* 12/2018 Segal .................... H04L 67/535
2018/0367484 A1 12/2018 Rodriguez et al.
2018/0373434 A1 12/2018 Switzer et al.
2018/0373757 A1 12/2018 Schukovets et al.
2019/0005094 A1 1/2019 Yi
2019/0012306 A1* 1/2019 Dvorak ................. G06F 40/186
2019/0012342 A1 1/2019 Cohn
2019/0036989 A1 1/2019 Eirinberg et al.
2019/0042628 A1 2/2019 Rajpara
2019/0050445 A1 2/2019 Griffith et al.
2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0095413 A1 3/2019 Davis et al.
2019/0108046 A1 4/2019 Spencer-Harper et al.
2019/0113935 A1 4/2019 Kuo et al.
2019/0114308 A1 4/2019 Hancock
2019/0123924 A1 4/2019 Embiricos et al.
2019/0130611 A1 5/2019 Black et al.
2019/0138588 A1* 5/2019 Silk ......................... G06F 40/18
2019/0138653 A1 5/2019 Roller et al.
2019/0147030 A1 5/2019 Stein et al.
2019/0155821 A1 5/2019 Dirisala
2019/0179501 A1 6/2019 Seeley et al.
2019/0208058 A1 7/2019 Dvorkin et al.
2019/0220161 A1 7/2019 Loftus et al.
2019/0236188 A1 8/2019 McKenna
2019/0243879 A1* 8/2019 Harley .................. G06F 40/134
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0324840 A1 10/2019 Malamut et al.

(56) References Cited

U.S. PATENT DOCUMENTS

| | | | |
|---|---|---|---|
| 2019/0325012 | A1 | 10/2019 | Delaney et al. |
| 2019/0347077 | A1 | 11/2019 | Huebra |
| 2019/0361879 | A1 | 11/2019 | Rogynskyy et al. |
| 2019/0361971 | A1 | 11/2019 | Zenger et al. |
| 2019/0364009 | A1 | 11/2019 | Joseph et al. |
| 2019/0371442 | A1 | 12/2019 | Schoenberg |
| 2019/0377791 | A1* | 12/2019 | Abou Mahmoud .. G06F 40/226 |
| 2019/0391707 | A1 | 12/2019 | Ristow et al. |
| 2020/0005248 | A1 | 1/2020 | Gerzi et al. |
| 2020/0005295 | A1 | 1/2020 | Murphy |
| 2020/0012629 | A1 | 1/2020 | Lereya et al. |
| 2020/0019548 | A1 | 1/2020 | Agnew et al. |
| 2020/0019595 | A1 | 1/2020 | Azua |
| 2020/0026397 | A1 | 1/2020 | Wohlstadter et al. |
| 2020/0042648 | A1 | 2/2020 | Rao |
| 2020/0050696 | A1* | 2/2020 | Mowatt ................. G06F 16/176 |
| 2020/0053176 | A1* | 2/2020 | Jimenez Salgado .... G06F 9/543 |
| 2020/0125574 | A1 | 4/2020 | Ghoshal et al. |
| 2020/0134002 | A1 | 4/2020 | Tung et al. |
| 2020/0142546 | A1 | 5/2020 | Breedvelt-Schouten et al. |
| 2020/0151630 | A1 | 5/2020 | Shakhnovich |
| 2020/0159558 | A1 | 5/2020 | Bak et al. |
| 2020/0175094 | A1 | 6/2020 | Palmer |
| 2020/0192785 | A1 | 6/2020 | Chen |
| 2020/0247661 | A1 | 8/2020 | Rao et al. |
| 2020/0265112 | A1 | 8/2020 | Fox et al. |
| 2020/0279315 | A1 | 9/2020 | Manggala |
| 2020/0293616 | A1 | 9/2020 | Nelson et al. |
| 2020/0301678 | A1 | 9/2020 | Burman et al. |
| 2020/0301902 | A1 | 9/2020 | Maloy et al. |
| 2020/0310835 | A1 | 10/2020 | Momchilov |
| 2020/0327244 | A1 | 10/2020 | Blass et al. |
| 2020/0334019 | A1 | 10/2020 | Bosworth et al. |
| 2020/0348809 | A1 | 11/2020 | Drescher |
| 2020/0349320 | A1 | 11/2020 | Owens |
| 2020/0356740 | A1 | 11/2020 | Principato |
| 2020/0356873 | A1 | 11/2020 | Nawrocke et al. |
| 2020/0380212 | A1 | 12/2020 | Butler et al. |
| 2020/0380449 | A1 | 12/2020 | Choi |
| 2020/0387664 | A1 | 12/2020 | Kusumura et al. |
| 2020/0401581 | A1 | 12/2020 | Eubank et al. |
| 2021/0014136 | A1 | 1/2021 | Rath |
| 2021/0019287 | A1 | 1/2021 | Prasad et al. |
| 2021/0021603 | A1 | 1/2021 | Gibbons |
| 2021/0034058 | A1 | 2/2021 | Subramanian et al. |
| 2021/0035069 | A1 | 2/2021 | Parikh |
| 2021/0042796 | A1 | 2/2021 | Khoury et al. |
| 2021/0049524 | A1 | 2/2021 | Nachum et al. |
| 2021/0049555 | A1 | 2/2021 | Shor |
| 2021/0055955 | A1 | 2/2021 | Yankelevich et al. |
| 2021/0056509 | A1 | 2/2021 | Lindy |
| 2021/0072883 | A1 | 3/2021 | Migunova et al. |
| 2021/0073526 | A1 | 3/2021 | Zeng et al. |
| 2021/0084120 | A1 | 3/2021 | Fisher et al. |
| 2021/0124749 | A1 | 4/2021 | Suzuki et al. |
| 2021/0124872 | A1 | 4/2021 | Lereya |
| 2021/0136027 | A1 | 5/2021 | Barbitta et al. |
| 2021/0149553 | A1 | 5/2021 | Lereya et al. |
| 2021/0150489 | A1 | 5/2021 | Haramati et al. |
| 2021/0165782 | A1 | 6/2021 | Deshpande et al. |
| 2021/0166196 | A1 | 6/2021 | Lereya et al. |
| 2021/0166339 | A1 | 6/2021 | Mann et al. |
| 2021/0173682 | A1 | 6/2021 | Chakraborti et al. |
| 2021/0174006 | A1 | 6/2021 | Stokes |
| 2021/0192126 | A1 | 6/2021 | Gehrmann et al. |
| 2021/0264220 | A1 | 8/2021 | Wei et al. |
| 2021/0326519 | A1 | 10/2021 | Lin et al. |
| 2022/0221591 | A1 | 7/2022 | Smith et al. |
| 2022/0222427 | A1* | 7/2022 | Mann .................. G06F 3/04847 |

FOREIGN PATENT DOCUMENTS

| | | | |
|---|---|---|---|
| CN | 107123424 | A | 9/2017 |
| CN | 107422666 | A | 12/2017 |
| CN | 107623596 | A | 1/2018 |
| CN | 107885656 | A | 4/2018 |
| CN | 112929172 | A | 6/2021 |
| EP | 3 443 466 | B1 | 12/2021 |
| KR | 20150100760 | | 9/2015 |
| WO | WO 2004/100015 | A2 | 11/2004 |
| WO | WO 2006/116580 | A2 | 11/2006 |
| WO | WO 2008109541 | A1 | 9/2008 |
| WO | WO 2017/202159 | A1 | 11/2017 |
| WO | WO 2020/187408 | A1 | 9/2020 |
| WO | WO 2021096944 | A1 | 5/2021 |
| WO | WO 2021144656 | A1 | 7/2021 |
| WO | WO 2021161104 | A1 | 8/2021 |
| WO | WO 2021220058 | A1 | 11/2021 |

OTHER PUBLICATIONS

Rodrigo et al., Project Management with Monday.com: a 101 Introduction; Jul. 22, 2019, pp. 1-21, 2019.

International Search Report and Written Opinion of the International Searching Authority in PCT/IB2020/000658, mailed Nov. 11, 2020 (12 pages).

International Search Report in PCT/IB2020/000974, mailed May 3, 2021 (19 pages).

International Search Report in PCT/1B2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/1B2020/000024, mailed May 3, 2021 (13 pages).

"Pivot table—Wikipedia"; URL: https://en.wikipedia .org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/1B2021/000297, mailed Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

U.S. Appl. No. 17/243,725, filed Apr. 29, 2021.

Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.

Beate List, "An Evaluation of Conceptual Business Process Modelling Languages", 2006, SAC'06, Apr. 23-27, pp. 1532-1539 (Year: 2006).

"demonstracion en espanol de Monday.com", published Feb. 20, 2019. https://www.youtube.com/watch?v=z0qydTgof1A (Year: 2019).

Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).

Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).

(56) References Cited

OTHER PUBLICATIONS

Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked Column and Bar Charts", Aug. 2011, Peltier Technical Services, Inc., pp. 1-128; (Year: 2011).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Monday.com et. al. "https://www.youtube.com/watch?v=VpbgWyPf74g" Aug. 9, 2019. (Year: 2019).
B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).
Barai, S., et al., "Image Annotation System Using Visual and Textual Features", In: Proceedings of the 16th International Conference on Distributed Multi-media Systems, pp. 289-296 (2010).
Gutwin, C. et al., "Supporting Informal Collaboration in Shared-Workspace Groupware", J. Univers. Comput. Sci., 14(9), 1411-1434 (2008).
Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.
U.S. Appl. No. 17/565,880, filed Dec. 30, 2021.
U.S. Appl. No. 17/565,534, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.

* cited by examiner

1710

| Vacation ~ March 2022 | | | | | | |
|---|---|---|---|---|---|---|
| Sunday | Monday | Tuesday | Wednesday | Thursday | Friday | Saturday |
| | | 1 | 2<br>Leave DC on Flight 1234 to LAX | 3<br>Explore Los Angeles, Dodger game at 7:00 PM | 4<br>Rent car and drive to Las Vegas, NV | 5<br>Explore Las Vegas |
| 6<br>Drive to Vail, CO | 7<br>Arrive in Vail, CO for a day of skiing | 8<br>Skiing and reservation at spa | 9<br>Flight 5678 to DCA | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | | |

2022 New Hire Orientation Schedule

| Date | Task | Speaker | Location & Time |
|---|---|---|---|
| January 2, 2022 | Welcome! | Michelle Jones, CEO | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| January 3, 2022 | IT Training | Carl Howard, Head of IT | Conf. Room 3B<br>9:00 A.M.- 12:00 P.M. |
| January 3, 2022 | Benefits Overview | Sam Miller, Benefits Coordinator | Conf. Room 4C<br>9:00 A.M. - 12:00 P.M. |

2022 New Hire Orientation Plan Version 2.0
(Internal Human Resources Only)

| Date | Speaker | Task | Time | Location | Talking Points |
|---|---|---|---|---|---|
| 1/2/2022 | Michelle Jones, CEO | Welcome Speech | 9:00 A.M. - 9:30 A.M. | Conf. Room 5A | Welcome<br>Company History<br>Company Values |
| 1/2/2022 | Tom Harding, Head of HR | Review Workplace Policies | 9:30 A.M. - 10:30 A.M | Conf. Room 5A | Introduction<br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/3/2022 | Carl Howard, Head of IT | IT Training | 9:00 A.M.- 12:00 P.M. | Conf. Room 3B | Security<br>Login Information<br>Available Programs |
| 1/4/2022 | Sam Miller, Benefits Coordinator | Benefits Overview | 9:00 A.M. - 12:00 P.M. | Conf. Room 4C | Deadlines<br>Medical & Dental<br>Retirement Account |

2022 New Hire Orientation Schedule

| Date | Task | Speaker | Location & Time |
|---|---|---|---|
| January 2, 2022 | Welcome! | ***Michelle Jones, CEO*** | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| ***January 3, 2022*** | IT Training | Carl Howard, Head of IT | Conf. Room 3B<br>9:00 A.M.- 12:00 P.M. |
| ***January 4, 2022*** | Benefits Overview | Sam Miller, Benefits Coordinator | Conf. Room 4C<br>9:00 A.M. - 12:00 P.M. |

2022 New Hire Orientation Plan Version 2.0
(Internal Human Resources Only)

| Date | Speaker | Task | Time | Location | Talking Points |
|---|---|---|---|---|---|
| 1/2/2022 | Randall James, CTO | Welcome Speech | 9:00 A.M. - 9:30 A.M. | Conf. Room 5A | Welcome<br>Company History<br>Company Values |
| 1/2/2022 | Tom Harding, Head of HR | Review Workplace Policies | 9:30 A.M. - 10:30 A.M | Conf. Room 5A | Introduction<br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/3/2022 | Carl Howard, Head of IT | IT Training | 9:00 A.M.- 12:00 P.M. | Conf. Room 3B | Security<br>Login Information<br>Available Programs |
| 1/4/2022 | Sam Miller, Benefits Coordinator | Benefits Overview | 9:00 A.M. - 12:00 P.M. | Conf. Room 4C | Deadlines<br>Medical & Dental<br>Retirement Account |

2022 New Hire Orientation Schedule

| Date | Task | Speaker | Location & Time |
|---|---|---|---|
| January 2, 2022 | Welcome! | ***Randall James, CTO*** | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| ***January 3, 2022*** | IT Training | Carl Howard, Head of IT | Conf. Room 3B<br>9:00 A.M.- 12:00 P.M. |
| ***January 4, 2022*** | Benefits Overview | Sam Miller, Benefits Coordinator | Conf. Room 4C<br>9:00 A.M. - 12:00 P.M. |

2022 New Hire Orientation Schedule

| Date | Task | Speaker | Location & Time |
|---|---|---|---|
| January 2, 2022 | Welcome! | ***Randall James, CTO*** | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| ***January 3, 2022*** | Benefits Overview | Sam Miller, Benefits Coordinator | Conf. Room 4C<br>9:00 A.M. - 12:00 P.M. |
| ***January 4, 2022*** | IT Training | Carl Howard, Head of IT | Conf. Room 3B<br>9:00 A.M.- 12:00 P.M. |

2022 New Hire Orientation Plan Version 2.0
(Internal Human Resources Only)

| Date | Speaker | Task | Time | Location | Talking Points |
|---|---|---|---|---|---|
| 1/2/2022 | Randall James, CTO | Welcome Speech | 9:00 A.M. - 9:30 A.M. | Conf. Room 5A | Welcome<br>Company History<br>Company Values |
| 1/2/2022 | Tom Harding, Head of HR | Review Workplace Policies | 9:30 A.M. - 10:30 A.M | Conf. Room 5A | Introduction<br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/4/2022 | Carl Howard, Head of IT | IT Training | 9:00 A.M.- 12:00 P.M. | Conf. Room 3B | Security<br>Login Information<br>Available Programs |
| 1/3/2022 | Sam Miller, Benefits Coordinator | Benefits Overview | 9:00 A.M. - 12:00 P.M. | Conf. Room 4C | Deadlines<br>Medical & Dental<br>Retirement Account |

2022 New Hire Orientation Schedule

| Date | Task | Speaker | Location & Time |
|---|---|---|---|
| January 2, 2022 | Welcome! | ***Randall James, CTO*** | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| ***January 3, 2022*** | Benefits Overview | Sam Miller, Benefits Coordinator | Conf. Room 4C<br>9:00 A.M. - 12:00 P.M. |
| ***January 4, 2022*** | IT Training | Carl Howard, Head of IT | Conf. Room 3B<br>9:00 A.M.- 12:00 P.M. |

Study 1 - Create a new item

This is our new time slider and we are so excited to share it with our users.

Tasks

Before we begin, can you briefly tell us about your company and job role?
This is a board that was created for your team to use. Review it and then move on to the next task.
Think of an actual task you have to take care of at work today, tell us about it.
Who in your company is involved with this task? What information would you need to complete this task?
Launch design/prototype url
Let's say you wanted to create this task you just described to us within an application and assign it to someone on your team. You click the button "New item" and receive this screen.
Explain how you would add all the information for the task you describe. [Verbal Response]
Go through each tab being shown to you. Explain what each section provides. What kind of task info would you add here? (Description, Updates, Activity Log)
Let's say, for this task to get done, you need to provide an image/design. Within this page, tell us where you would add this.

FIG. 45

DIGITAL PROCESSING SYSTEMS AND METHODS FOR EXTERNAL EVENTS TRIGGER AUTOMATIC TEXT-BASED DOCUMENT ALTERATIONS IN COLLABORATIVE WORK SYSTEMS

CROSS-REFERENCE TO RELATED APPLICATIONS

This application is based on and claims benefit of priority to U.S. Provisional Patent Application No. 63/233,925, filed Aug. 17, 2021, U.S. Provisional Patent Application No. 63/273,448, filed Oct. 29, 2021, and U.S. Provisional Patent Application No. 63/273,453, filed Oct. 29, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure is directed to systems, methods, and computer readable media for embedding and running an electronic non-word processing application within an electronic word processing document. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with disclosed embodiments, systems, methods, and computer readable media for embedding and running an electronic non-word processing application within an electronic word processing document are disclosed. Systems, methods, devices, and non-transitory computer readable media may involve at least one processor configured to: access the electronic word processing document; open the electronic word processing document within an electronic word processing application; access the electronic non-word processing application; embed the electronic non-word processing application within the electronic word processing application in a manner enabling non-word processing functionality to occur from within the electronic word processing application; while the electronic non-word processing application is displayed within the electronic word processing application, receive at least one of the inputs; and in response to receiving at least one of the inputs, cause functionality of the electronic non-word processing application to be displayed within the electronic word processing document presented by the electronic word processing application.

One aspect of the present disclosure is directed to systems, methods, and computer readable media for automatically altering information within an electronic document based on an externally detected occurrence. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for automatically altering information within an electronic document based on an externally detected occurrence. Systems, methods, devices, and non-transitory computer readable media may involve at least one processor configured to: access an electronic word processing document; display an interface presenting at least one tool for enabling an author of the electronic word processing document to define an electronic rule triggered by an external network-based occurrence; receive, in association with the electronic rule, a conditional instruction to edit the electronic word processing document in response to the network-based occurrence; detect the external network-based occurrence; and in response to the detection of the external network-based occurrence, implement the conditional instruction and thereby automatically edit the electronic word processing document.

One aspect of the present disclosure is directed to systems, methods, and computer readable media for embedding within an electronic word processing document, data derived from a source external to the electronic word processing document. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for embedding within an electronic word processing document, data derived from a source external to the electronic word processing document. Systems, methods, devices, and non-transitory computer readable media may involve at least one processor configured to: access the electronic word processing document, wherein the electronic word processing document contains text; detect an in-line object inserted into the text at a particular location, the in-line object including a URL-based rule linked to a portion of the text; execute the URL-based rule to retrieve internet located data corresponding to the URL-based rule; and insert the retrieved internet-located data into the text at the particular location.

One aspect of the present disclosure may be directed to systems, methods, and computer readable media for causing dynamic activity in an electronic word processing document. The system may include at least one processor configured to: access an electronic word processing document; present an interface enabling selection of a live application, outside the electronic word processing document, for embedding in the electronic word processing document; embed, in-line with text of the electronic word processing document, a live active icon representative of the live application; present, in a first viewing mode, the live active icon wherein during the first viewing mode, the live active icon may be displayed embedded in-line with the text, and the live active icon dynamically changes based on occurrences outside the electronic word processing document; receive a selection of the live active icon; in response to the selection, present in a second viewing mode, an expanded view of the live application; receive a collapse instruction; and in response to the collapse instruction, revert from the second viewing mode to the first viewing mode.

One aspect of the present disclosure may be directed to systems, methods, and computer readable media for automatically updating an electronic word processing document based on a change in a linked file and vice versa. The system may include at least one processor configured to: access the electronic word processing document; identify in the electronic word processing document a variable data element, wherein the variable data element may include current data presented in the electronic word processing document and a link to a file external to the electronic word processing document; access the external file identified in the link; pull, from the external file, first replacement data corresponding to the current data; replace the current data in the electronic word processing document with the first replacement data; identify a change to the variable data element in the electronic word processing document; upon identification of the change, access the external file via the link; and update the external file to reflect the change to the variable data element in the electronic word processing document.

One aspect of the present disclosure may be directed to a systems, methods, and computer readable media for enabling simultaneous group editing of electronically stored documents. Systems, methods, devices, and non-transitory computer readable mediums may include at least one processor that is configured to: access a collaborative electronic document; link a first entity and a second entity to form a first collaborative group; link a third entity and a fourth entity to form a second collaborative group; receive a first alteration by the first entity to the collaborative electronic document; tag the first alteration by the first entity with a first collaborative group indicator; receive a second alteration to the collaborative electronic document by the second entity; tag the second alteration by the second entity with the first collaborative group indicator; receive a third alteration to the collaborative electronic document by the third entity; tag the third alteration by the third entity with a second collaborative group indicator; receive a fourth alteration from the fourth entity to the collaborative electronic document; tag the fourth alteration by the fourth entity with the second collaborative group indicator; and render a display of the collaborative electronic document, wherein the rendered display includes presenting the first collaborative group indicator in association with the first alteration and the second alteration, and wherein the rendered display includes the second collaborative group indicator displayed in association with the third alteration and the fourth alteration.

One aspect of the present disclosure may be directed to systems, methods, and computer readable media for enabling granular rollback of historical edits in an electronic document. Systems, methods, devices, and non-transitory computer readable mediums may include at least one processor that is configured to: access the electronic document, having an original form; record at a first time, first edits to a specific portion of the electronic document; record at a second time, second edits to the specific portion of the electronic document; record at a third time, third edits to the specific portion of the electronic document; receive at a fourth time, a selection of the specific portion; in response to the selection, render a historical interface enabling viewing of an original form of the selection, the first edits, the second edits, and the third edits; receive an election of one of the original form of the electronic document, the first edits, the second edits, and the third edits; and upon receipt of the election, present a rolled-back display reflecting edits made to the specific portion of the electronic document, the rolled-back display corresponding to a past time associated with the election.

One aspect of the present disclosure may be directed to systems, methods, and computer readable media for tracking on a slide-by-slide basis, edits to presentation slides. Systems, methods, devices, and non-transitory computer readable mediums may include at least one processor that is configured to: present a first window defining a slide pane for displaying a slide subject to editing; present in a second window a current graphical slide sequence pane, for graphically displaying a current sequence of slides in the deck; present in a third window an historical graphical slide sequence pane for graphically presenting a former sequence of slides in the deck; access a stored deck of presentation slides; populate the first window, the second window, and the third window with slides of the deck; receive a selection of a particular slide having a current version displayed in the second window and a former version displayed in the third window; receiving a first selection of the particular slide in the second window; upon receipt of the first selection, cause a rendition of the particular slide to appear in the first window; receive a second selection of the particular slide in the third window; and upon receipt of the second selection, cause a rendition of the particular slide to appear in the first window.

One aspect of the present disclosure is directed to systems, methods, and computer readable media for managing display interference in an electronic collaborative word processing document. The system may include at least one processor configured to: access the electronic collaborative word processing document; present a first instance of the electronic collaborative word processing document via a first hardware device running a first editor; present a second instance of the electronic collaborative word processing document via a second hardware device running a second editor; receive from the first editor during a common editing period, first edits to the electronic collaborative word processing document, wherein the first edits occur on a first earlier page of the electronic collaborative word processing document and result in a pagination change; receive from the second editor during the common editing period, second edits to the electronic collaborative word processing document, wherein the second edits occur on a second page of the electronic collaborative word processing document later than the first page; during the common editing period, lock a display associated with the second hardware device to suppress the pagination change caused by the first edits received by the second hardware device; and upon receipt of a scroll-up command via the second editor during the common editing period, cause the display associated with the second hardware device to reflect the pagination change caused by the first edits.

One aspect of the present disclosure is directed to systems, methods, and computer readable media for enabling dual mode editing in collaborative documents to enable private changes. The system may include at least one processor configured to access an electronic collaborative document in which a first editor and at least one second editor are enabled to simultaneously edit and view each other's edits to the electronic collaborative document; output first display signals for presenting an interface on a display of the first editor, the interface including a toggle enabling the first editor to switch between a collaborative mode and a private mode; receive from the first editor operating in the collaborative mode, first edits to the electronic collaborative document; output second display signals to the first editor and the at least one second editor, the second display signals reflecting the first edits made by the first editor; receive from the first editor interacting with the interface, a private mode change signal reflecting a request to change from the collaborative mode to the private mode; in response to the first mode change signal, initiate in connection with the electronic collaborative document the private mode for the first editor; in the private mode, receive from the first editor, second edits to the electronic collaborative document; and in response to the second edits, output third display signals to the first editor while withholding the third display signals from the at least one second editor, such that the second edits are enabled to appear on a display of the first editor and are prevented from appearing on at least one display of the at least one second editor.

One aspect of the present disclosure is directed to systems, methods, and computer readable media for setting granular permissions for shared electronic documents. Systems, methods, and non-transitory computer readable media may involve at least one processor configured to enable access to an electronic word processing document including blocks of text that may each have an associated address. The at least one processor may be further configured to access at least one data structure containing block-based permissions for each block of text. The block-based permissions may include at least one permission to view an associated block of text. The at least one processor may be further configured to receive from an entity a request to access the electronic word processing document. In addition, the at least one processor may be configured to perform a lookup in the at least one data structure to determine that the entity lacks permission to view at least one specific block within the word processing document. The at least one processor may be further configured to cause to be rendered on a display associated with the entity, the word processing document with the at least one specific block omitted from the display.

One aspect of the present disclosure is directed to systems, methods, and computer readable media for tagging, extracting, and consolidating information from electronically stored files. Systems, methods, and non-transitory computer readable media may involve at least one processor configured to present to an entity viewing at least one source document a tag interface for enabling selection and tagging of document segments with at least one characteristic associated with each document segment. The at least one processor may be further configured to identify tagged segments within the at least one source document. In addition, the at least one processor may be configured to access a consolidation rule containing instructions for combining the tagged segments. The at least one processor may be further configured to implement the consolidation rule to associate document segments sharing common tags. The at least one processor may be further configured to output for display at least one tagged-based consolidation document grouping together commonly tagged document segments.

One aspect of the present disclosure is directed to systems, methods, and computer readable media for enabling a plurality of mobile communications devices to be used in parallel to comment on presentation slides within a deck. Systems, methods, and non-transitory computer readable media may involve at least one processor configured to receive from a first of the plurality of mobile communications devices, a first instance of a first graphical code captured from a first slide during a presentation, or a decryption of the first instance of the first graphical code, and an associated first common on the first slide. The at least one processor may be further configured to receive from a second of the plurality of mobile communications devices, a second instance of the first graphical code captured from the first slide during the presentation or a decryption of the second instance of the first graphical code, and an associated second comment on the first slide. In addition, the at least one processor may be configured to receive from a third of the plurality of mobile communications devices, a first instance of a second graphical code captured from a second slide during the presentation or a decryption of the first instance of the second graphical code, and an associated third comment on the second slide. The at least one processor may be further configured to receive from a fourth of the plurality of mobile communications devices, a second instance of the second graphical code captured from the second slide during the presentation or a decryption of the second instance of the second graphical code, and an associated fourth comment on the second slide. In addition, the at least one processor may be further configured to perform a lookup associated with the first graphical code, to identify a first repository associated with the first slide of the presentation. The at least one processor may be further configured to aggregate the first comment and the second comment in the first repository. In addition, the at least one processor may be further configured to perform a lookup associated with the second graphical code, to identify a second repository associated with the second slide of the presentation. In addition, the at least one processor may be further configured to aggregate the third comment and the fourth comment in the second repository. The at least one processor may be further configured to display to a presenter of the deck the first comment and the second comment in association with the first slide. In addition, the at least one processor may be further configured to display to the presenter of the deck, the third and the fourth comment in association with the second slide.

BRIEF DESCRIPTION OF THE DRAWINGS

FIG. 17 illustrates an example of an electronic word processing document, consistent with some embodiments of the present disclosure.

FIG. 27 illustrates an example of an electronic word processing document, consistent with some embodiments of the present disclosure.

FIG. 28 illustrates an example of a file external to an electronic word processing document, consistent with some embodiments of the present disclosure.

FIG. 30 illustrates an example of an electronic word processing document possessing variable data elements, consistent with some embodiments of the present disclosure.

FIG. 31 illustrates an example of replacement data present in a file external to the electronic word processing document corresponding to current data of a variable data element in the electronic word processing document, consistent with some embodiments of the present disclosure.

FIG. 32 illustrates an example of current data of a variable data element in an electronic word processing document being replaced by replacement data from an external file, consistent with some embodiments of the present disclosure.

FIG. 33 illustrates an example of a change to a variable data element in the electronic word processing document, consistent with some embodiments of the present disclosure.

FIG. 34 illustrates an example of a file external to the electronic word processing document being updated to reflect a change to a variable data element in the electronic word processing document, consistent with some embodiments of the present disclosure.

FIG. 35 illustrates an example of a variable data element being selected, consistent with some embodiments of the present disclosure.

FIG. 45 illustrates an example of a rolled-back display reflecting edits made to a specific portion of an electronic document, consistent with some embodiments of the present disclosure.

DETAILED DESCRIPTION

Figure 1:
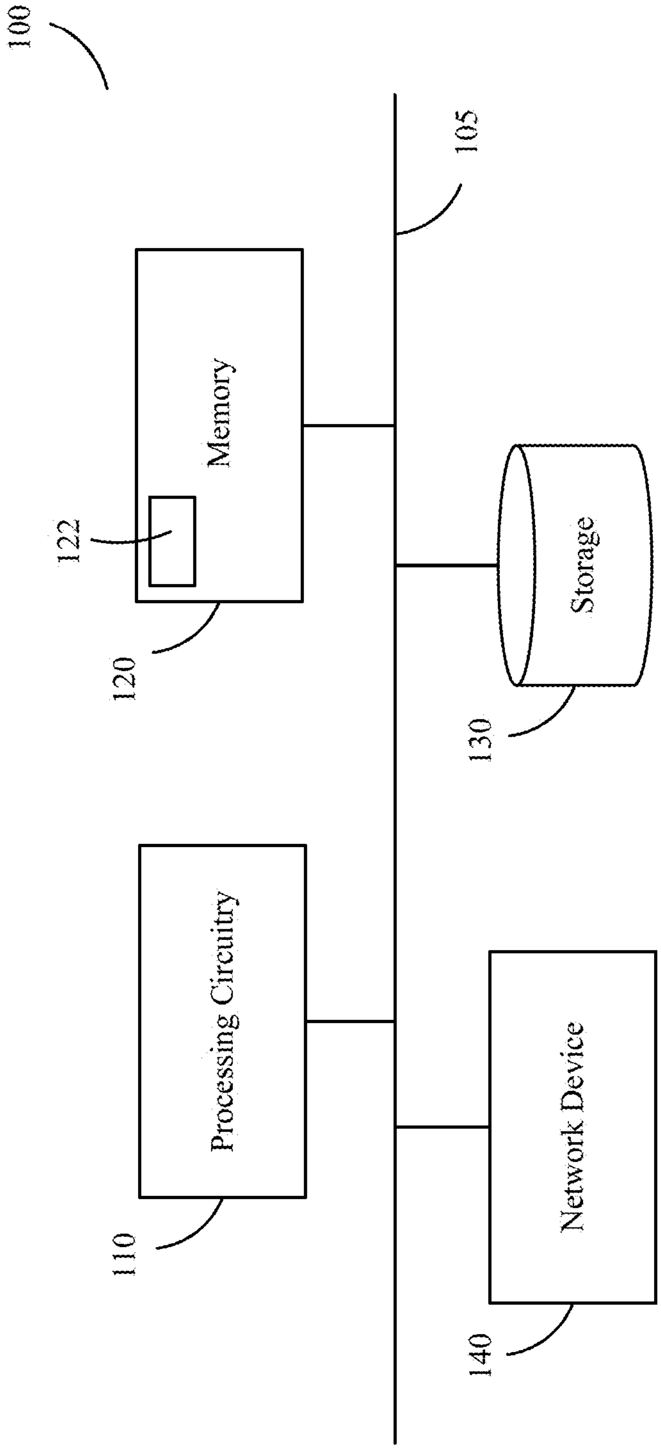
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
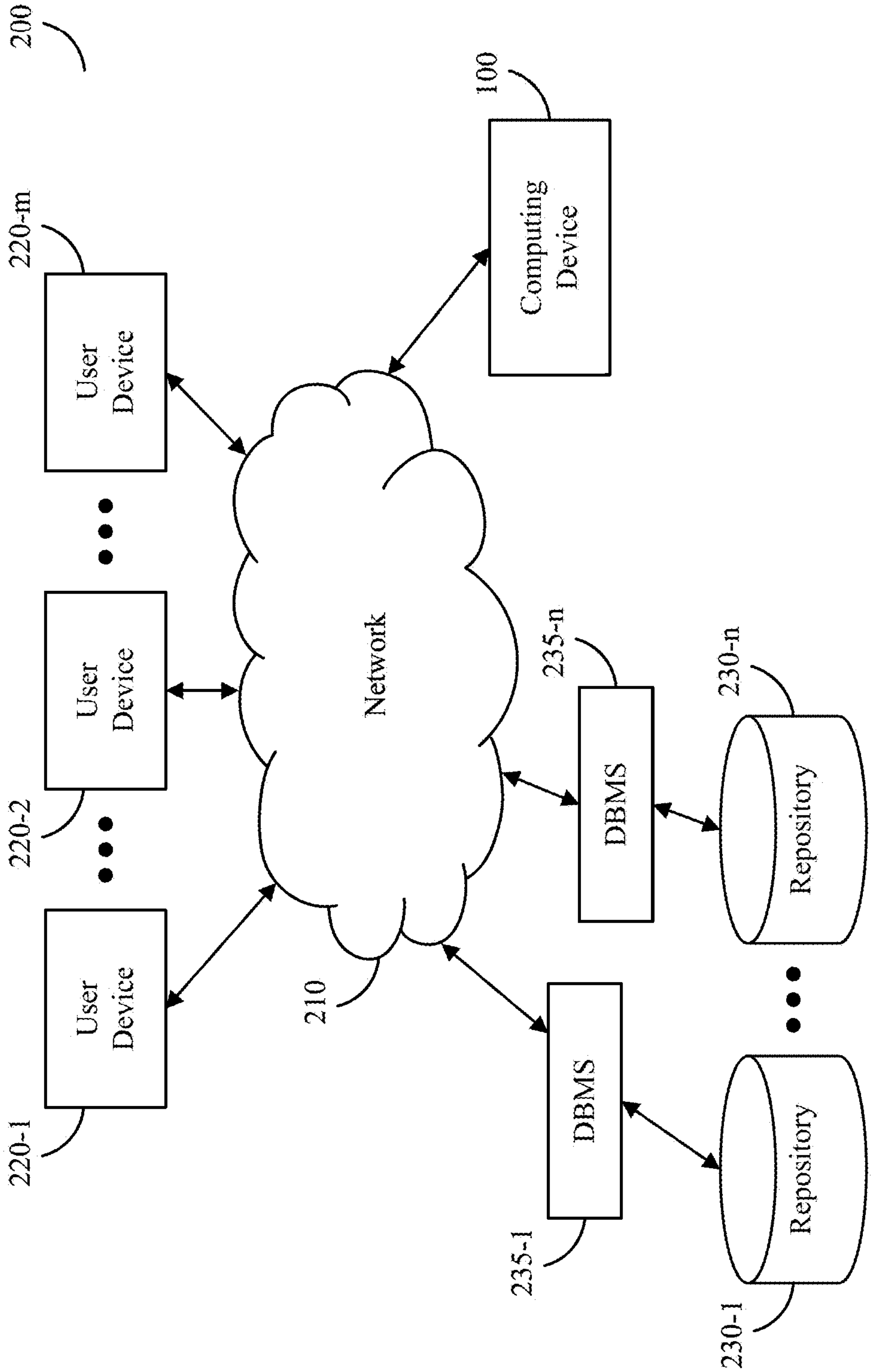
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device **220-*m*, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100** data and/or metadata associated with a variety of elements associated with single data type column-oriented data structures, such as columns, rows, cells, schemas, and the like.

One or more data repositories 230-1 through data repository **230-*n*, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-*n*. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100**.

Figure 3:
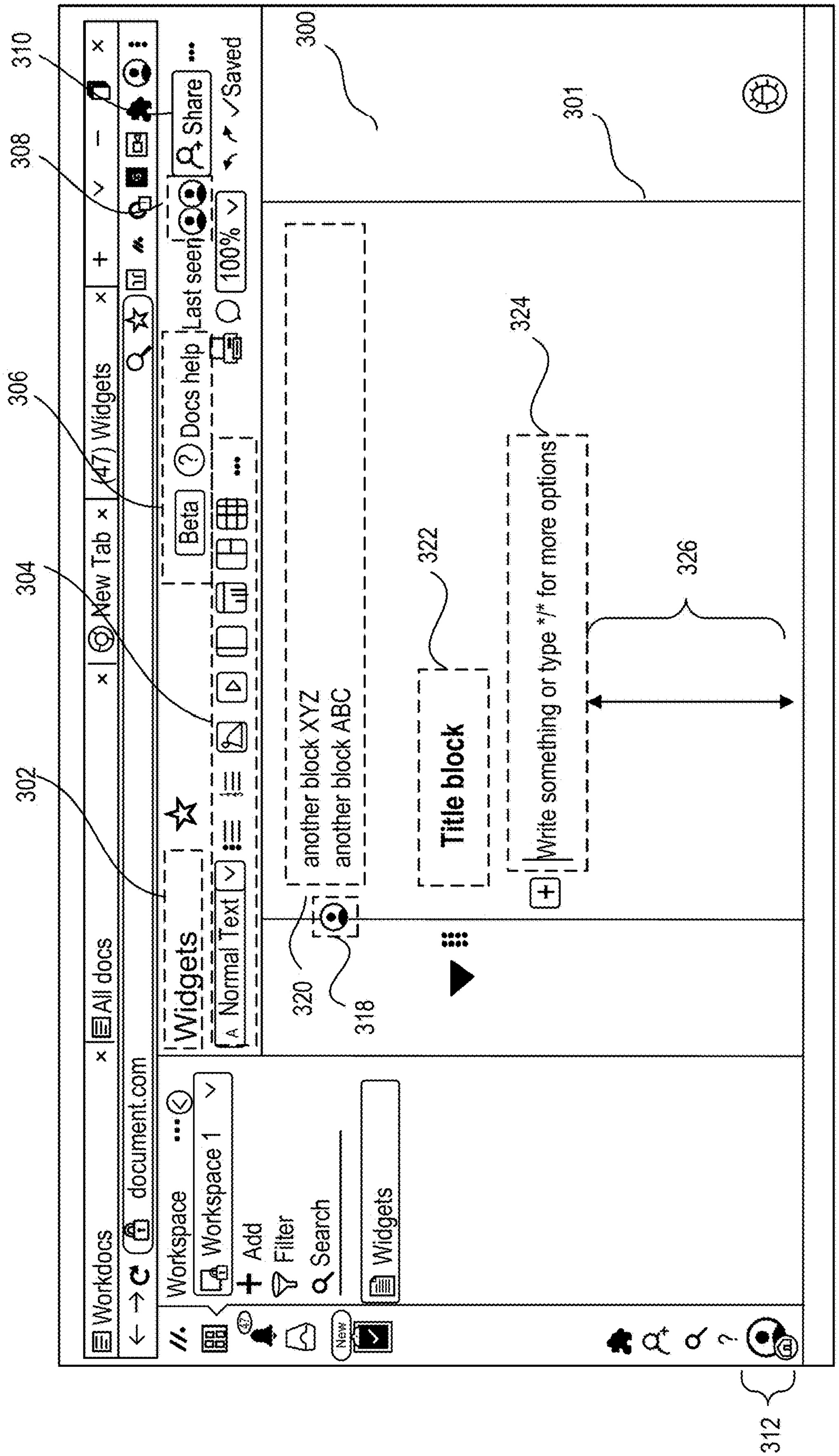
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

In electronic word processing systems, it may be beneficial to employ various word processing application configurations and non-word processing application configurations. In many instances, synthesizing information across multiple applications can be difficult due to dispersion of data and rigidness of electronic word processing applications. Therefore, there is a need for unconventional innovations for helping to seamlessly integrate non-word processing functionality into word processing applications.

Such unconventional approaches may enable computer systems to embed electronic non-word processing functionality directly into an electronic word processing document. By embedding non-word processing functionality directly into an electronic word processing document, this may synthesize multiple pieces and/or types of information, features, applications, and/or functionalities into a single electronic word processing document. This may, for example, be beneficial in situations where a user's screen space is limited, or where limited computing resources make it difficult to run many applications simultaneously. Moreover, embedding non-word processing functionality directly into an electronic word processing document may cause structured data to appear as unstructured data. In addition, such embedding may streamline communications, review and/or understandings by enabling non-word processing functionality to be stored, retrieved, and/or transmitted with an electronic word processing document. In some disclosed embodiments, dynamic data structures may be embedded into an electronic word processing document without sacrificing functionality of an electronic word processing application. Such dynamic data structures may present "live" features from any of a number of non-word processing applications. In some disclosed embodiments, a user may interact directly with one or more electronic non-word processing applications embedded within an electronic word processing document, rather than having to access and/or view these capabilities elsewhere. Moreover, in some disclosed embodiments, multiple users may interact with an electronic word processing document and an electronic non-word application embedded therein, without sacrificing functionality of either an electronic word processing application or the embedded electronic non-word processing application. In some embodiments, bringing electronic non-word processing application functionality into an electronic word processing document may increase the efficiency and operations of workflow management functionality.

Thus, the various embodiments the present disclosure describe at least a technological solution, based on improvement to operations of computer systems and platforms, to the technical challenge of integrating electronic non-word processing application functionality into electronic word processing documents.

Disclosed embodiments may involve systems, methods, and computer-readable media for embedding and running an electronic non-word processing application within an electronic word processing document. The systems and methods described herein may be implemented with the aid of at least one processor or non-transitory computer readable medium, such as a CPU, FPGA, ASIC, and/or any other processing structure(s) or storage medium, as described herein. For ease of discussion, when a method is described below, it is to be understood that aspects of the method apply equally to systems, devices, and computer-readable media. For example, some aspects of such a method may occur electronically on a device and/or over a network that is wired, wireless, or both. The method is not limited to a particular physical and/or electronic instrumentality, but rather may be accomplished using one or more differing instrumentalities.

An electronic non-word processing application, as used herein, may include a program, script, module, widget, instruction set, graphical interface, and/or any other computerized functionality different from word processing. In some embodiments, an electronic non-word processing application may be configured to perform functionality in response to inputs. Performing a functionality may include at least one processor carrying out commands, operations, or instructions stored in a repository or in any other storage medium. Performing the functionality may be triggered in response to receiving inputs. These inputs may include any signals or indications that meet a threshold for carrying out instructions to perform functionalities. For example, inputs may include information or instructions received manually from a computing device associated with a user, a signal associated with a change of information (e.g., a status change), or any other information that may be detected, received, or transmitted. For example, an electronic non-word processing application may, in response to receiving an input from a computing device associated with a user, perform functionalities such as changing stored data, changing or re-rendering displayed data (e.g., a visualization), constructing an API call (or other type of software call), transmitting a change to make to data (e.g., dynamically displayed data), or performing another operation associated with the electronic non-word processing application.

For example, a non-word processing document may include an application or a program, offered by an entity other than the provider of the word processing platform. At a user's discretion for example, such an application or program may be embedded or otherwise linked to the word processing document.

In some embodiments, an electronic non-word processing application may be configured to perform at least one non-word processing operation (e.g., an operation that an electronic word processing application may not be configured to perform), such as sending and/or receiving data using an API. Additionally or alternatively, an electronic non-word processing application may include at least one of a communications interface, a graphics presentation editor, a graphing application, a portal to a third-party application, and/or any other type of interface or application functionality. A communication interface may include display areas that display received or transmitted information and/or input areas for entering information to be transmitted to another entity (e.g., system, device, network). For example, a communication interface may include a chat window, chat service, email application, and/or a live dynamic visualization configurable by multiple devices and/or user accounts. A graphics presentation editor may include a visualization configuration utility program, one or more input areas configurable to receive commands to change a visualization, or any other tool configurable to change displayed visualizations, such as images, graphics, videos, colors, shapes, charts, graphs, widgets, or any other displayable indicator. A graphing application may include an application configurable to display at least one chart, graph, table, or other organizational layout of information. Such organizational layouts may include static or dynamic data structures. A portal may include a web-based platform, interface, credential authenticator, and/or code to establish a connection with another device. A third-party application may include any of the above-mentioned functionalities, a data-hosting service, and/or any program, script, module, widget, instruction set, graphical interface, or computer functionality defined by, hosted by, maintained by, or otherwise influenced by a party distinct from a party associated with an electronic word processing application, discussed in further detail below.

As used herein, an electronic word processing application may include a program, a script, a module, widget, instruction set, and/or any other computerized functionality different from word processing. In some embodiments, an electronic word processing application may be configured to perform at least one word processing operation, such as adding text, removing text, modifying text, moving or rearranging text, and/or any other operation to change a visual aspect of an electronic word processing document. An electronic word processing application may be associated with (e.g., cause display of, detect an input at) one or more interfaces. An electronic word processing application may also be associated with (e.g., cause display of, maintain, store data associated with) an electronic word processing document. An electronic non-word processing application and/or an electronic word processing application may run within a web browser, standalone application, widget, and/or any other software entity capable of execution by a processing device (e.g., processing circuitry 110). An electronic word processing document may include a file that is configurable to store text, a character, an image, a table, a graph, and/or any other displayable visualization or combination thereof. An electronic word processing document may be configurable to be displayed (e.g., by an electronic word processing application) in a visual form, for example within an interface.

Embedding an electronic non-word processing application within an electronic word processing document may, in some embodiments, include inserting data or a link within an electronic word processing document. Such embedding may be visible at the user interface level or may occur at the code level. In some embodiments, embedding may involve generating a data structure, storing information in a data structure, inserting a data structure into a file or application code, and/or rendering a display of information in the data structure within an interface (e.g., an interface hosted by the electronic non-word processing application) and/or electronic word processing document. In some embodiments, embedding an electronic non-word processing application within an electronic word processing document may include generating, receiving, and/or accessing code associated with the electronic non-word processing application (e.g., associated with a third party) and/or inserting instructions into the electronic word processing document, a file, an HTML code set, or other code set associated with the electronic word processing application. For example, embedding the electronic non-word processing application within an electronic word processing document may include retrieving a link and inserting the link into a set of code associated with the electronic word processing document, which may cause the embedding of data associated with the link within the electronic word processing document. In some embodiments, embedding an electronic non-word processing application within an electronic word processing document may include determining a position within the electronic word processing document at which to embed the electronic non-word processing application. For example, the electronic word processing application may determine a location within the electronic word processing document selected by a user input (e.g., mouse click, gesture, cursor movement, or any other action by a user that results in a selection), and may determine a corresponding location within an electronic word processing document file or code, such as a location between portions of structured and/or structured data. The electronic word processing application may insert code, such as information from a data structure (e.g., with or without content data) at the determined location. Embedding the electronic non-word processing application within the electronic word processing application may include ignoring and/or removing a user interface element or other data structure associated with (e.g., generated by, maintained by) the electronic word processing application via an interface associated with the electronic word processing application or via a display of an electronic word processing document that may be opened by the electronic word processing application. Additionally or alternatively, embedding the electronic non-word processing application within the electronic word processing application may include configuring the embedded electronic non-word processing application to carry out its functionality without a user interface element or other data structure associated with the electronic word processing application. Running the electronic non-word processing application within the electronic word processing application and/or document may include executing instructions associated with both the electronic non-word processing application and the electronic word processing application. For example, at least one processor, which may operate a web browser, may execute instructions to carry out operations associated with the electronic non-word processing application and the electronic word processing application, such as simultaneously or near simultaneously.

Figure 4:
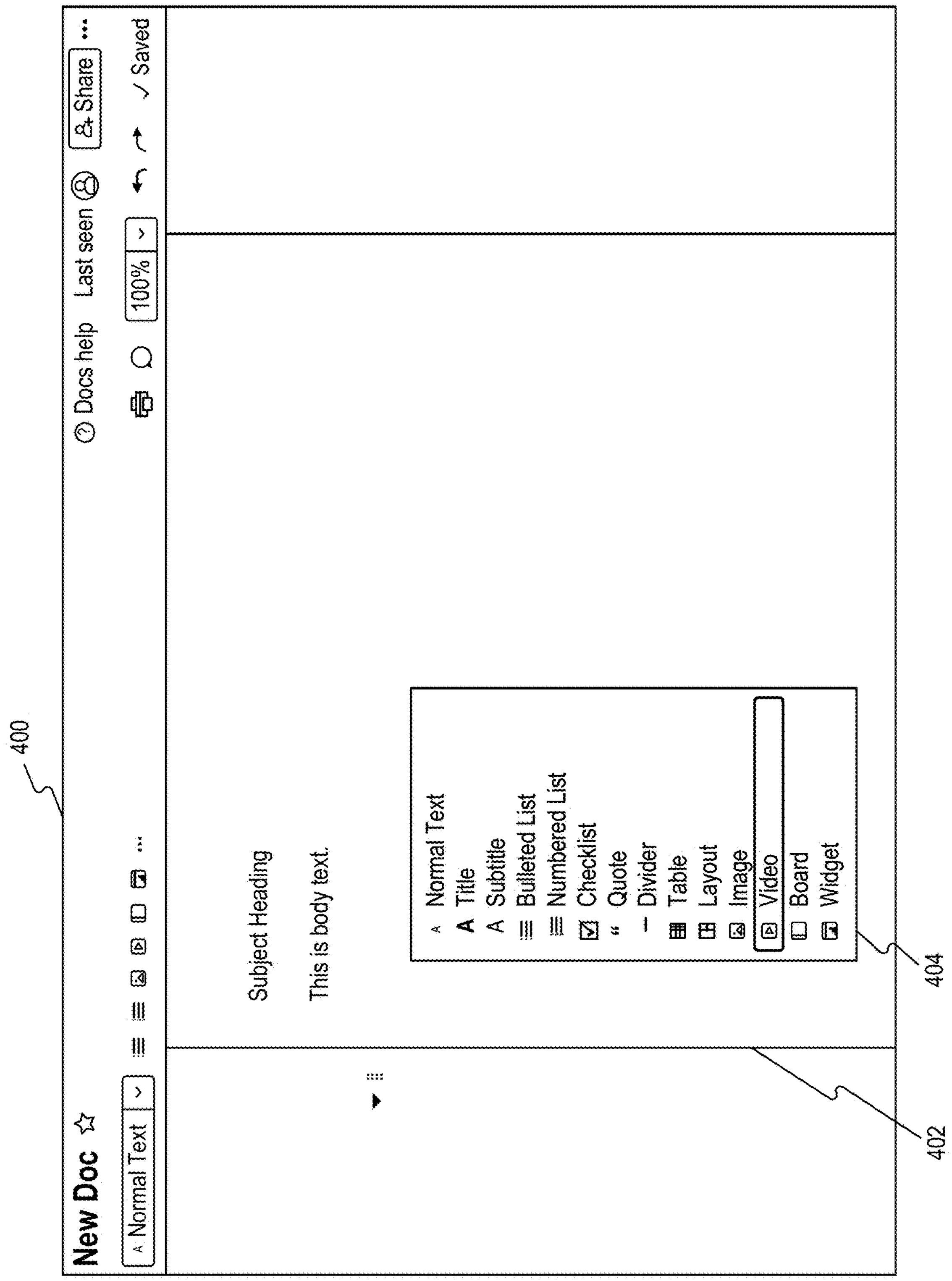
FIG. 4 illustrates an example of an electronic non-word processing application selection interface in a word processing document, consistent with some embodiments of the present disclosure.
Figure 5:
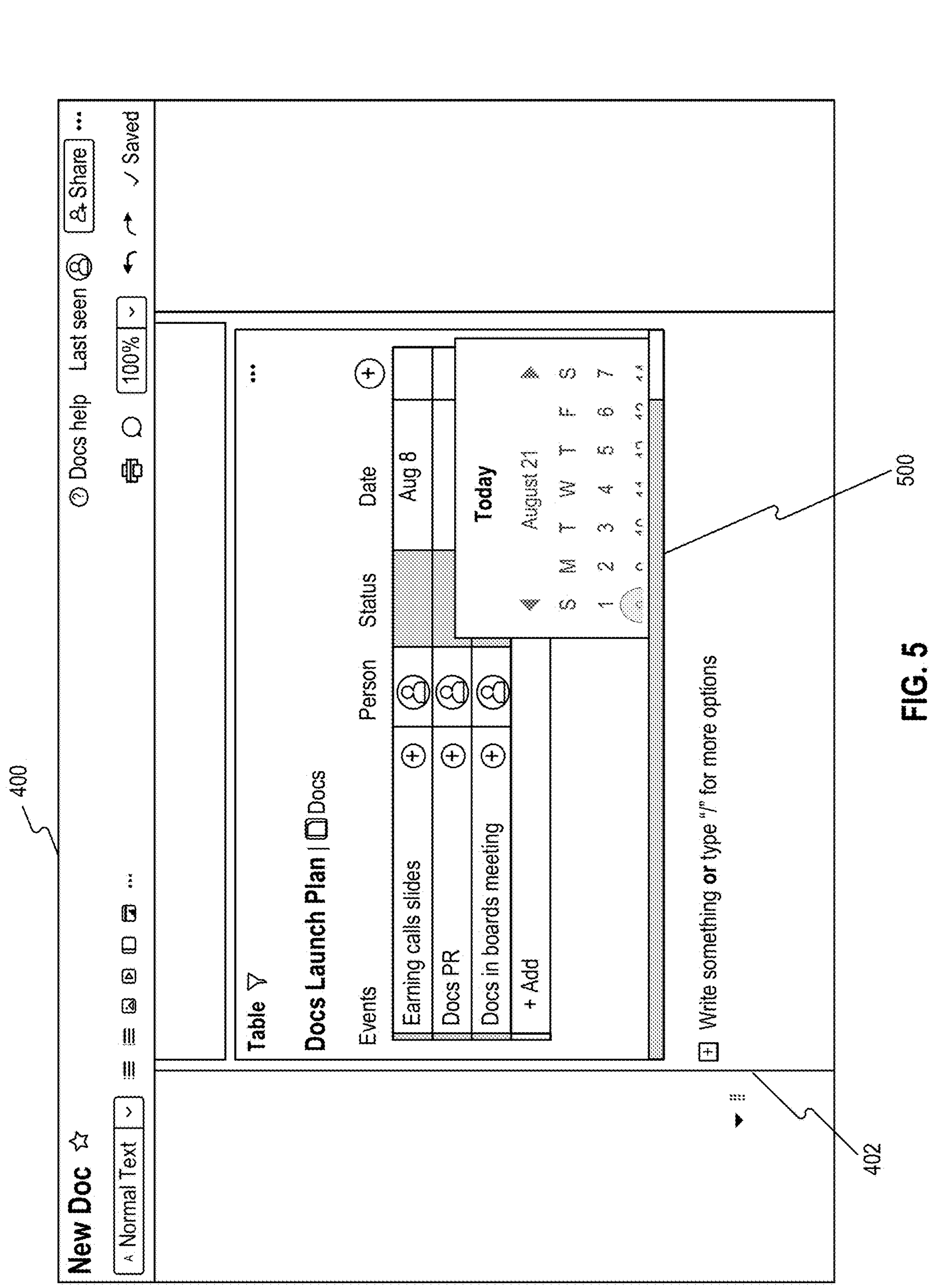
FIG. 5 illustrates an example of an electronic non-word processing application within a word processing document, consistent with some embodiments of the present disclosure.

For example, FIGS. 4 and 5 illustrate exemplary electronic word processing application interface 400. Electronic word processing application interface 400 may include presenting (e.g., render, display, encapsulate) an electronic word processing document 402. In the illustrated example of FIG. 4, electronic word processing document 402 includes exemplary text, though any text, character, image, table, graph, and/or any other visualization may exist within electronic word processing document 402. Consistent with some disclosed embodiments, electronic word processing document 402 may be configurable to include an embedded non-word processing application. In FIG. 5 for example, electronic non-word processing application 500 may be embedded within an electronic word processing application, operating the electronic word processing document 402. Electronic non-word processing application 500 may be configurable to perform non-word processing functionality (discussed further below), such as receiving inputs, transmitting data, and/or displaying data, which may be static or dynamic. For example, electronic non-word processing application 500 may include a dynamic graph, calendar, location tracker, or other live visualization. For example, electronic non-word processing application 500 may receive input (e.g., a click on an icon) from one or more user devices, as the electronic word processing document 402 is displayed at one or more devices, with electronic non-word processing application 500 embedded.

Consistent with some disclosed embodiments, the at least one processor may be configured to access an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

Some embodiments may involve instances where the at least one processor may be configured to open an electronic word processing document within an electronic word processing application. Opening the electronic word processing document within an electronic word processing application may include initializing or displaying the electronic word processing document (e.g., the accessed electronic word processing document) within a program run by the electronic word processing application, and/or otherwise populating data from the electronic word processing document into an interface or program run by the electronic word processing application. For example, the electronic word processing application may retrieve the electronic word processing document from a storage medium and/or display the electronic word processing document within an interface. As previously discussed above, retrieving the electronic word processing document may be caused by instructions received from a computing device associated with a user for accessing a particular document. In some embodiments, the electronic word processing application may display the retrieved electronic word processing document according to one or more permissions associated with an entity (e.g., user, account, device, group, system, network) accessing the electronic word processing document. In some embodiments, the electronic word processing document may include one or more pieces of structured and/or unstructured data. In some embodiments, an interface, such as those described above, may be configured to receive at least one input from a user, such as within a distinct user interface element, or within the electronic word processing document. For example, an interface displaying the electronic word processing document may include one or more interactable interface elements, such as buttons, sliders, dials, or other visual interactable graphics. Additionally or alternatively, an interface displaying the electronic word processing document may be configured to permit a user to provide an input directly to the electronic word processing document itself. For example, the electronic word processing application may be configured to detect a user input to the electronic word processing document, such as text (e.g., based on an input from keyboard, touchscreen, mouse, or other input device), a table (e.g., based on a dragging motion input from a mouse), a request to cause display of selectable options (e.g., based on a mouse click or any other interaction that may cause the sending of the request), and/or any other detectable electronic signal. In some embodiments, the electronic word processing application may perform an operation in response to a detected input. For example, electronic word processing application may detect a mouse click on the electronic word processing document, and may cause display of a menu of options, such as options for selecting an electronic non-word processing application.

For example, as shown in FIG. 4, electronic word processing application interface 400 may display an electronic word processing document 402 (e.g., opened using an electronic word processing application) and render a display of the information contained in the electronic word processing document 402 (or lack of information if the document is empty or unpopulated). The electronic word processing application interface 400 may cause display of option menu 404, which may include one or more selectable graphical elements corresponding to respective electronic non-word processing applications. In some embodiments, option menu 404 may include one or more selectable graphical elements corresponding to configuration options which, when selected, may cause the display of one or more additional interfaces, which in turn may correspond to respective electronic non-word processing applications. The selected non-word processing applications may then be embedded at a particular location in the electronic word processing document 402. This particular location may be selected before causing the display of option menu 404 (e.g., according to a mouse click or other input within the electronic word processing document), or may be determined after the selection of an electronic non-word processing application to provide more efficient placement of electronic non-word processing applications.

Consistent with some disclosed embodiments, at least one processor may be configured to access an electronic non-word processing application. Accessing the electronic non-word processing application may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), and/or any other suitable communication method that provide a medium for exchanging data. Accessing the electronic non-word processing application may also involve constructing an API call, establishing a connection with a source of non-word processing application data (e.g., using an API or other application interface), authenticating a recipient of application data, transmitting an API call, receiving application data (e.g., dynamic data), and/or any other electronic operation that facilitates use of information associated with the electronic non-word processing application. Some embodiments may involve at least one processor configured to embed an electronic non-word processing application within an electronic word processing application in a manner enabling non-word processing functionality to occur from within the electronic word processing application. Embedding the electronic non-word processing application within the electronic word processing application may, in some embodiments, include inserting data or a link within an electronic word processing document. Such embedding may be visible at the user interface level or may occur at the code level. In some embodiments, embedding may involve generating a data structure, storing information in the data structure, and rendering a display of information in the data structure within an electronic word processing document at a particular location of the electronic word processing document or in association with the electronic word processing document, as discussed previously. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

A repository may store data such as an array, linked list, object, data field, chart, graph, graphical user interface, video, animation, iframe, HTML element (or element in any other markup language), and/or any other representation of data conveying information from an application. In some embodiments, the data structure may include metadata related to the data structure, which may assign a particular type or other identifier to the data structure, which may enable non-word processing functionality to occur within the embedded electronic non-word processing application, such as discussed further below. In some embodiments, embedding the electronic non-word processing application within the electronic word processing application may include inserting lines of code (e.g., HTML data) into a file or other software instance representing the electronic word processing document. For example, HTML text may represent the electronic word processing document, and embedding the electronic non-word processing application within the electronic word processing application may include inserting lines of code into the HTML text to cause the electronic word processing document to source data (e.g., for rendering within the embedded electronic non-word processing application), which may be content data for an associated data structure. Non-word processing functionality may include a video playback operation, dynamic data generation, remote non-processing application data access, an interactable widget, an API operation, and/or any other display of data (e.g., through an interactable widget or interface) facilitated at least in part by an electronic non-word processing application. In some embodiments, embedding the electronic non-word processing application within the electronic word processing application may include inserting code associated with an API or software development toolkit (SDK) into the electronic word processing application and/or electronic word processing document.

Additionally or alternatively, an electronic word processing document may be divided into a plurality of blocks. As discussed herein, a block may include any organizational unit of information in a digital file, such as a single text character, word, sentence, paragraph, page, graphic, or any combination thereof. In some embodiments, an electronic word processing document may include one or more blocks and/or one or more non-block instances of data, which may include unstructured data (e.g., raw text). One or more of the blocks may have at least one separately adjustable permission setting. A separately adjustable permission setting may be set with respect to one block independent from (e.g., without influencing) a separately adjustable permission setting for another block. For example, a permission setting may include a parameter that may control the ability of a user, user account, device, system, or combination thereof to access a block, view a block, use a function associated with a block, edit a block, delete a block, move a block, re-size a block, influence a block, or perform any other operation relative to a block. Permission settings for a particular block in a document may be independent from the permission settings for other blocks located in the same document. For example, a first block may have restrictive permission settings that enable only the author of the document to edit the first block while a second block may have public permission settings that enable any user to edit the second block. As a result, an author of the document may edit both the first block and the second block while a second user (e.g., not an author of the document) would be prevented from making any edits or alterations to the first block and would only be able to do so for the second block. Blocks may be considered "divided" if they are differentiable in some way. For example, blocks may be differentiated by color, font, data type, presentation type or may be presented in differing areas of a display and/or in differing windows.

In some embodiments, an electronic non-word processing application may be embedded within a particular block. The electronic non-word processing application may be embedded within the particular block consistent with the embedding techniques described previously. For example, a block, described earlier herein, may be associated with a type identifier, which may indicate type of content data for the block and/or connect or associate the block with a particular non-word processing application (or other instance of software). The block may also include a set of metadata associated with the type, which may cause certain information to be displayed within the electronic non-word processing application embedded within the block. As a non-limiting example, a block may be of a video type, and may include metadata of a URL, which may cause a video (e.g., a type of electronic non-word processing application) associated with the URL to be embedded within, or otherwise associated with, the block. In some embodiments, when the electronic non-word processing application is embedded with a particular block, access to the electronic non-word processing application may be restricted to entities possessing permission for access to the particular block. Restricting access to entities possessing permission for access to a particular block may include performing a lookup of authorized entities in a repository with respect to the particular block and enabling the authorized entities to view and/or interact with the information contained in the particular block. In response to determining that an entity lacks authorization to access the particular block, the system may omit display of information in the particular block from the unauthorized entity or otherwise prevent the unauthorized entity from interacting with the information in the particular block. For example, the particular block may be associated with (e.g., may include metadata relating to) at least one account identifier, device identifier, network identifier, group identifier, user identifier, or other information delineating at least one criterion, which, when satisfied, causes access to information within the particular block (e.g., an instance of the electronic non-word processing application).

Figure 6:
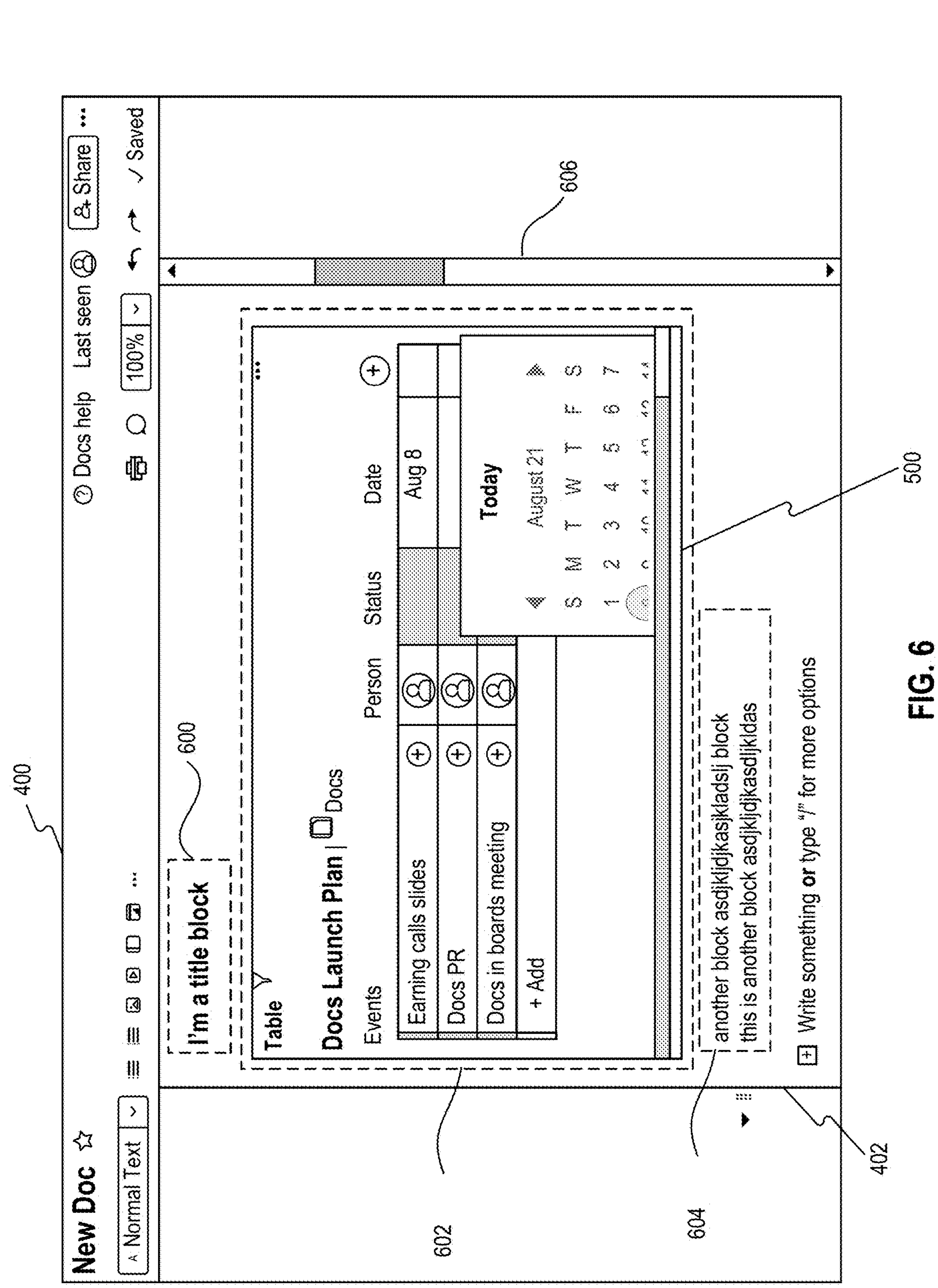
FIG. 6 illustrates an example of an electronic non-word processing application within a word processing document, consistent with some embodiments of the present disclosure.

For example, as shown in FIG. 6, electronic word processing application interface 400 may render one or more blocks within electronic word processing document 602. For example, electronic word processing application interface 400 may render, in a display, a first block 600, a second block 602, and a third block 604. Of course, any number of blocks (including zero blocks) may be rendered. In the example shown, electronic non-word processing application 500 may be rendered within second block 602. Of course, a first block 600, a second block 602, and/or a third block 604, as well as any other rendered blocks, may have an electronic non-word processing application (e.g., electronic non-word processing application 500) or any other type of digital information embedded, consistent with disclosed embodiments.

In some embodiments, embedding an electronic non-word processing application may include displaying a functional instance of the electronic non-word processing application interlineated between text of the electronic word processing document. A functional instance of the electronic non-word processing application may include the electronic non-word processing application itself, a program, routine, command, encapsulation, computer programming method, module, script, and/or any other operation of functionality of the electronic non-word processing application. For example, the electronic non-word processing application embedded in the electronic word processing application may be a widget capable of performing at least a subset of functions of an associated non-word processing application or entity (e.g., non-word processing functionality, discussed above). For example, the embedded electronic non-word processing application may include a data structure holding data content, which may be sourced from an external source using an API call, SDK command, subroutine, and/or any other communication that facilitates populating data content to a data structure associated with the electronic non-word processing application. To further illustrate this example without limitation, a geographical location tracking widget may be embedded in a word processing application, and may track a location of an object or entity (e.g., using data received in response to a communication), and may also be associated with a product or service management application. Additionally or alternatively, displaying the functional instance of the electronic non-word processing application may involve displaying the functional instance of the electronic non-word processing application interlineated between word processing elements other than text (e.g., a page break, a section break, a horizontal line, or other visual element displayed by the electronic word processing application) of the electronic word processing document. A display of a functional instance of the electronic non-word processing application interlineated between text may include rendering a display of an output from the electronic non-word processing application in-line with text in a manner that renders the display of the functional instance as part of the display of text. In this way, the display of the functional instance of the electronic non-word processing application may be rendered in a single line with text, between multiple lines or text, or a combination thereof. For example, at least one processor (e.g., processing circuitry 110) may render a display of information from a data structure (e.g., display a functional instance of the electronic non-word processing application) embedded within a portion of an electronic word processing document, such as between word processing elements (e.g., lines of text). For example, a functional instance of the electronic non-word processing application may be displayed and associated with a default size (e.g., height and width) within the electronic word processing document. Additionally or alternatively, a functional instance of the electronic non-word processing application may be resizable according to a user input (e.g., a click-and-drag action with a mouse). In some embodiments, different default sizes may be associated with different types of functional instances of electronic non-word processing applications. For example, a functional instance corresponding to video playback may have a larger default size than a functional instance corresponding to a dynamic calendar. As another example, if the display of the functional instance of the electronic non-word processing application is embedded in a single line of text, the system may be configured to render a size of that display to match the font size of the surrounding text. If the display of the word processing elements (lines of text) is sized to be size 12 font, the system may render the display of the functional instance of the electronic non-word processing application to be the same height of the size 12 font text. In another example, regardless of the display of the size of the functional instance of the electronic non-word processing application, the display thereof may be embedded in a position in the electronic word processing document such that when a scrolling action occurs, the display may stay in the same position relative to the surrounding text in which the display has been embedded. In this way, the display of the functional instance of the electronic non-word processing application may be displayed in an interlineated manner between text. The electronic non-word processing application data structure may accept an input (e.g., from an input device, from a remote device, from an event listener, or any other electrical and/or mechanical input device), retrieve data, change data, and/or present data (e.g., dynamic data).

For example, and as discussed above with respect to FIG. 6, electronic word processing application interface 400 may render one or more blocks within electronic word processing document 602. In the example shown in FIG. 6, second block 602, which includes a display of an electronic non-word processing application 500 embedded within it, may be rendered interlineated between a title, text block 600 and general text block 604.

In some embodiments, an electronic non-word processing functionality that occurs within the electronic word processing document may include at least one of sending or receiving data over a network. Sending or receiving data over a network may include transmitting, detecting, encoding, decoding, and/or parsing signals associated with information or instructions stored by local or remote repositories. For example, at least one processor (e.g., processing circuitry) may cause one device (e.g., user device) to transmit data, which may be associated with the electronic non-word processing application, to another device (e.g., a data repository). For example, the transmitted data may include an instruction to add data, to change data, to reformat data, to refresh data, to update data, to remove data, and/or to alter displayed information (e.g., remove displayed data, add data to a displayed visualization, mask displayed data, present a notification, transition between interfaces, or otherwise change an appearance of a displayed visualization). The transmitted data may also include data to be used to carry out an instruction. For example, the transmitted data may include a link (e.g., a hyperlink) to add to a list of links according to a transmitted instruction. As another example, at least one processor (e.g., processing circuitry) may cause one device (e.g., a user device) to receive data, which may be associated with the electronic non-word processing application, from another device (e.g., a data repository). For example, the received data may include information related to an individual, group of persons, project, task, product, service, location, event, object, program, device, software, or other information related to the electronic non-word processing application. In some embodiments, the received data may be stored in a storage medium accessible by using the electronic non-word processing application, such as through an API. For example, a developer of a calendar widget may store data associated with calendar widgets in a storage medium. An entity may access, retrieve, and/or transmit stored data (e.g., stored within a data repository) in response to received data (e.g., data transmitted by the electronic non-word processing application and/or electronic word processing application).

Consistent with some disclosed embodiments, including those disclosed above, a network may include network 210, across which devices may send or receive data, such as user device 220-1 and repository 230-1 in FIG. 2. In some embodiments, a device may transmit or receive data according to instructions executed by a processing device, such as processing circuitry 110 as shown in FIG. 1. In some embodiments, signal transmissions may be sent or received using network device 140, and may travel through bus 105.

The electronic non-word processing application may present (e.g., within a data structure) data sourced (e.g., using a non-word processing application) from a server, database, or other storage medium, which may be associated with an entity (e.g., application, device, network, service, programming language, and/or any other software distinct from the electronic word processing document) that may be unassociated with and/or cannot access a word processing document. For example, the electronic non-word processing application may present data received from an entity (e.g., data repository 230-1) over a network. As an illustrative and non-limiting example, an embedded non-word processing application may be a calendar widget that detects a change to an event time zone and automatically updates a time zone shown within the calendar widget (e.g., non-word processing functionality).

In some embodiments, embedding an electronic non-word processing application may include presenting the electronic non-word processing application in a module window. A module window may include a defined area within a word processing document dedicated to display of a particular data structure and/or content data. For example, a module window may be associated with a width, height, aspect ratio, position indicator, and/or any other information delineating the module window's size or position within an electronic word processing document (e.g., represented in metadata associated with the module window). In some embodiments, a module window (or any other representation of the electronic non-word processing application within an electronic word document) may be positioned and/or sized according to one or more inputs initiated by a user (e.g., dragging an outline of the module window within the electronic word document using a mouse). The module window may be a defined area that is displayed over a word processing document or may be a defined area that is displayed within a word processing document.

Referring to FIGS. 5 and 6 as examples, a module window may exist (e.g., be generated and placed within) electronic word processing document 500. In some embodiments, electronic non-word processing application 500 may be displayed with a module window. A module window may be rendered between blocks, such as block 600 and block 604 in FIG. 6.

In some embodiments, a module window may be linked to a location within an electronic word processing document, such that during scrolling through the electronic word processing document, the module window scrolls with text of the electronic word processing document. Linking to a location within an electronic word processing document may include establishing a position within the electronic word processing document and associating (e.g., through a data structure, such as a table) the position with a module window (or other instance of an electronic non-word processing application), such as by associating an start point, end point, or other position indicator, which may be relative to a size or position within the document itself, relative to a coordinate system, relative to lines of text, relative to blocks, or relative to other information contained in the electronic word processing document. As mentioned above, a module window may have at least one position indicator delineating a position of the module window between word processing elements (e.g., text) within a word processing document. To further detail this example without limitation, a module window may be associated with metadata that delineates a start point and an end point for the module window within an electronic word processing document. Scrolling with text of the electronic word processing document may include moving a displayed version of the electronic word processing document (which may include text and a module window) upward, downward, to the left, to the right, or in any other direction. Scrolling may be initiated and/or terminated by a user input (e.g., scroll wheel action, mouse click on a displayed scroll bar).

In some embodiments, at least one processor may be configured to scroll within an electronic word processing document such that a functional instance of the electronic non-word processing application scrolls together with text within the electronic word processing document. For example, at least one processor may be configured to cause a displayed electronic word processing document, which may contain text and a module window (or other electronic non-word processing application functionality), to move along a display, with both the text and module window moving concurrently and maintain their relative positions to one another, as described in detail above. The electronic word processing application may cause the electronic word processing document to scroll in a direction (e.g., upward, downward, to the left, to the right), to cause different portions of the electronic word processing document to be displayed. In some embodiments, the electronic word processing application may cause the electronic word processing document to scroll in a direction indicated by an input device (e.g., keyboard, mouse, touchscreen, or other electrical and/or mechanical sensing device). In some embodiments, dynamic aspects of the electronic non-word processing application may be updated as the electronic word processing document is scrolled. For example, in situations where a data-tracking widget (e.g., a functional instance of the electronic non-word processing application) is embedded within the electronic word processing application, the widget's data may be updated, such as in response to a data change detected by an event listener, an API call, received new data, and/or any other data input to the electronic non-word processing application. In some embodiments, when data associated with an embedded electronic non-word processing application changes, the information displayed within the embedded electronic non-word processing application may change as well. In other words, a functional instance of an electronic non-word processing application embedded in an electronic word processing application may remain "live" or "dynamic" even as an electronic word document including the functional instance of an electronic non-word processing application is scrolled. Additionally or alternatively, dynamic aspects of the electronic non-word processing application may be updated while the electronic word processing application receives one or more inputs to the electronic word processing document (e.g., a user input of text). In some embodiments, scrolling within the electronic word processing document such that a functional instance of the electronic non-word processing application scrolls together with text within the electronic word processing document may occur in response to a scrolling command. A scrolling command may include an instruction to move a displayed electronic word processing document, non-word processing application displayed functionality, interface, or any other instruction associated with an intent to scroll and display addition information that may not have been displayed previously. A scrolling command may be received via a device such a mouse, keyboard, or other signal input device, and may be detected by the system, which may in turn cause a re-rendering of the display to render additional information in the document. For example, the electronic word processing application may receive a command to scroll through at least a portion of an electronic word document in response to an input received by a mouse (e.g., a scroll wheel motion, a click, a click-and-drag motion) or other input device.

FIG. 5 illustrates an example of an electronic non-word processing application 500 embedded within electronic word processing document 402. Electronic word processing application interface 400 may display both electronic word processing document 402 and electronic non-word processing application 500, while permitting inputs to both. Electronic non-word processing application 500 may include a buttons, slider, field, graphic, or other visualization, which may accept an input, as discussed above. Electronic non-word processing application 500 may perform a non-word processing operation based on the input. FIG. 6 illustrates an exemplary scrollbar region 606, which may include clickable arrows and/or a draggable scrollbar, which may cause electronic word processing document 402 to move in response to inputs at the scrollbar region 606. For example, when the electronic word processing document 402 is scrolled, electronic non-word processing application 500 and text, such as text displayed within blocks 600 and 604, may move synchronously, such that their relative positions with one another are maintained.

Consistent with some disclosed embodiments, at least one processor may be configured to receive at least one of the inputs. An input may involve an input from a user input device (e.g., a mouse, a keyboard, touchpad, VR/AR device, or any other electrical or electromechanical device from which signals may be provided) or non-user input (e.g., a sensor reading, an event listener detection, or other automatic computerized sensing of changed circumstances). In some embodiments, receiving at least one of the inputs may occur while the electronic non-word processing application is displayed within the electronic word processing application. The electronic non-word processing application being displayed within the electronic word processing application may include the electronic non-word processing application being displayed in-line (e.g., within an electronic word processing document), displayed in a hover display, displayed in an overlay, or otherwise presented within an interface associated with a word processing application. For example, a web browser or other form of software may display the electronic non-word processing application within the electronic word processing application while the electronic non-word processing application identifies an input (e.g., a mouse click within the electronic non-word processing application displayed within the electronic word processing application).

Some embodiments may involve at least one processor configured to cause functionality of an electronic non-word processing application to be displayed within an electronic word processing document presented by the electronic word processing application, which may include aspects discussed above with respect to embedding an electronic non-word processing application within an electronic word processing application in a manner enabling non-word processing functionality to occur from within the electronic word processing application. Causing functionality of an electronic non-word processing application to be displayed within an electronic word processing document presented by the electronic word processing application may include displaying a figure, graph, chart, diagram, map, table, icon, image, video, animation, text, or any other visual representation associated with functionality of the electronic non-word processing application. In some embodiments, causing functionality of the electronic non-word processing application to be displayed within the electronic word processing document presented by the electronic word processing application may occur in response to receiving at least one of the inputs, as discussed previously above. For example, the electronic non-word processing application may receive at least one of the inputs, such as a mouse click input commanding removal of a data element (e.g., a graphical depiction, an icon, a permission, a data linkage, an animation, and/or any other piece of information associated with the electronic non-word processing application), and may display removal of the data element within the electronic non-word processing application as it is displayed within the electronic word processing document. In some embodiments, functionality of the electronic non-word processing application to be displayed within the electronic word processing document presented by the electronic word processing application such that the functionality appears the same as if it had been displayed within the electronic non-word processing application separate from the electronic word processing document.

Consistent with some disclosed embodiments, the at least one processor may be further configured to store an electronic word processing document with an electronic non-word processing application embedded therein. Storing the electronic word processing document with the electronic non-word processing application embedded therein may include compiling the electronic non-word processing application and/or merging code, instructions, and/or data associated with the electronic word processing document and the electronic non-word processing application. Storing the electronic word processing document with the electronic non-word processing application embedded therein may also include storing the data and information associated thereof with the electronic word processing document such that the electronic non-word processing application may be accessed by any computing device that views, edits, retrieves, or otherwise accesses the electronic word processing document. Storing may also include storing data and information associated with the electronic non-word processing application in a repository such that it is linked (e.g., through code contained in one or more files, through a single data structure, according to data associations defined within a data structure) to the electronic word processing document such that when a computing device accesses the electronic word processing document, the data and information associated with the electronic non-word processing application may be automatically retrieved as well. For example, storing the electronic word processing document with the electronic non-word processing application embedded therein may involve adding a data structure (e.g., a block, discussed above) to the electronic word processing document. The data structure, or other functional instance of the electronic non-word processing application, may have metadata, content data, or other associated information used to determine its structure, content, size, position, layout, linkage to an external source, and/or any other information that informs the appearance of the embedded instance of the electronic non-word processing application within the electronic word processing document. Data associated with the electronic non-word processing application embedded within the electronic word processing document may be stored within one or more storage media, which may be associated with different entities. For example, a first storage medium may be associated with a developer, host, or other organization associated with the electronic word processing application. As another example, a second storage medium may be associated with a developer, host, or other organization associated with the electronic non-word processing application. In some embodiments, the first storage medium may store metadata or other structural-related data associated with the embedded instance of the electronic non-word processing application. Additionally or alternatively, the second storage medium may store content data associated with the embedded instance of the electronic non-word processing application. Of course, other storage arrangements are possible.

Consistent with some disclosed embodiments, including those disclosed above, the electronic word processing document (e.g., with the electronic non-word processing application embedded therein) and/or other digital information may be stored in a storage medium, such as storage 130 and/or repository 230-1 of FIG. 2. The electronic word processing document (e.g., with the electronic non-word processing application embedded therein) and/or other digital information may be retrieved (e.g., according to instructions executed by processing circuitry 110 of FIG. 1) and transmitted between and/or within devices (e.g., across network 210 or bus 105), such as between user device 220-1 and computing device 100 or between memory 120 and storage 130 within computing device 100.

In some embodiments, storing the electronic word processing document with the electronic non-word processing application embedded therein may thereby enable multiple entities accessing the electronic word processing document to achieve the functionality of the electronic non-word processing application from within the electronic word processing document. Enabling multiple entities accessing the electronic word processing document to achieve the functionality of the electronic non-word processing application from within the electronic word processing document may include permitting multiple entities (e.g., users, accounts, user groups, devices, systems, networks, organizations) to retrieve, view, edit, or otherwise interact with the electronic word processing document having the electronic non-word processing application embedded therein. Enabling multiple entities accessing the electronic word processing document to achieve the functionality of the electronic non-word processing application from within the electronic word processing document may also include displaying an interactable visualization associated with the electronic non-word processing application to the multiple entities and permitting the multiple entities to interact with the electronic non-word processing application (e.g., through the visualization). In some embodiments, interactions with the embedded electronic non-word processing application may cause a change to digital information associated with the electronic non-word processing application, which may in turn cause a change in a visualization displayed by the electronic non-word processing application embedded within the electronic word processing document, which may be displayed simultaneously at multiple devices, user accounts, web browsers, systems, or other entities. For example, a device may retrieve the electronic word processing document and present it (e.g., display, permit interaction with) to multiple other devices, accounts, and/or users (e.g., in response to validating requests to access the electronic word processing document). Presenting the electronic word processing document may include displaying the electronic word processing document, permitting interaction with the electronic word processing document (e.g., according to one or more permissions), determining an appearance of the electronic word processing document, determining one or more interfaces associated with the electronic word processing application (e.g., associated with respective functionalities of the electronic word processing application), determining one or more interfaces associated with the electronic non-word processing application (e.g., associated with respective functionalities of the electronic non-word processing application), or otherwise indicating information associated with the electronic word processing document. Each version of the electronic word processing document presented may include an instance of the electronic non-word processing application embedded in the electronic word processing document. For example, each instance of the embedded non-word processing application may permit one or more inputs, as discussed above, that cause one or more functionalities of the electronic non-word processing application to occur. In some embodiments, each instance of the embedded non-word processing application may be live, interactable, and/or dynamic, such that multiple users may interact with their respective instances simultaneously (e.g., users using user devices). Additionally or alternatively, each instance of the embedded non-word processing application may perform one or more functionalities associated with the electronic non-word processing application (discussed above).

Consistent with some disclosed embodiments, including those disclosed above, a computing device 100 of FIG. 1 may access an electronic word processing document and cause display of electronic word processing document and/or an electronic non-word processing application embedded therein (e.g., according to instructions stored at memory 120 and executed by processing circuitry 110). An electronic word processing document may be stored in memory 120 and/or storage 130. In some embodiments, an electronic word processing document may be accessed by and/or displayed at multiple devices, such as user device 220-1 and user device 220-2 as shown in FIG. 2.

Figure 7:
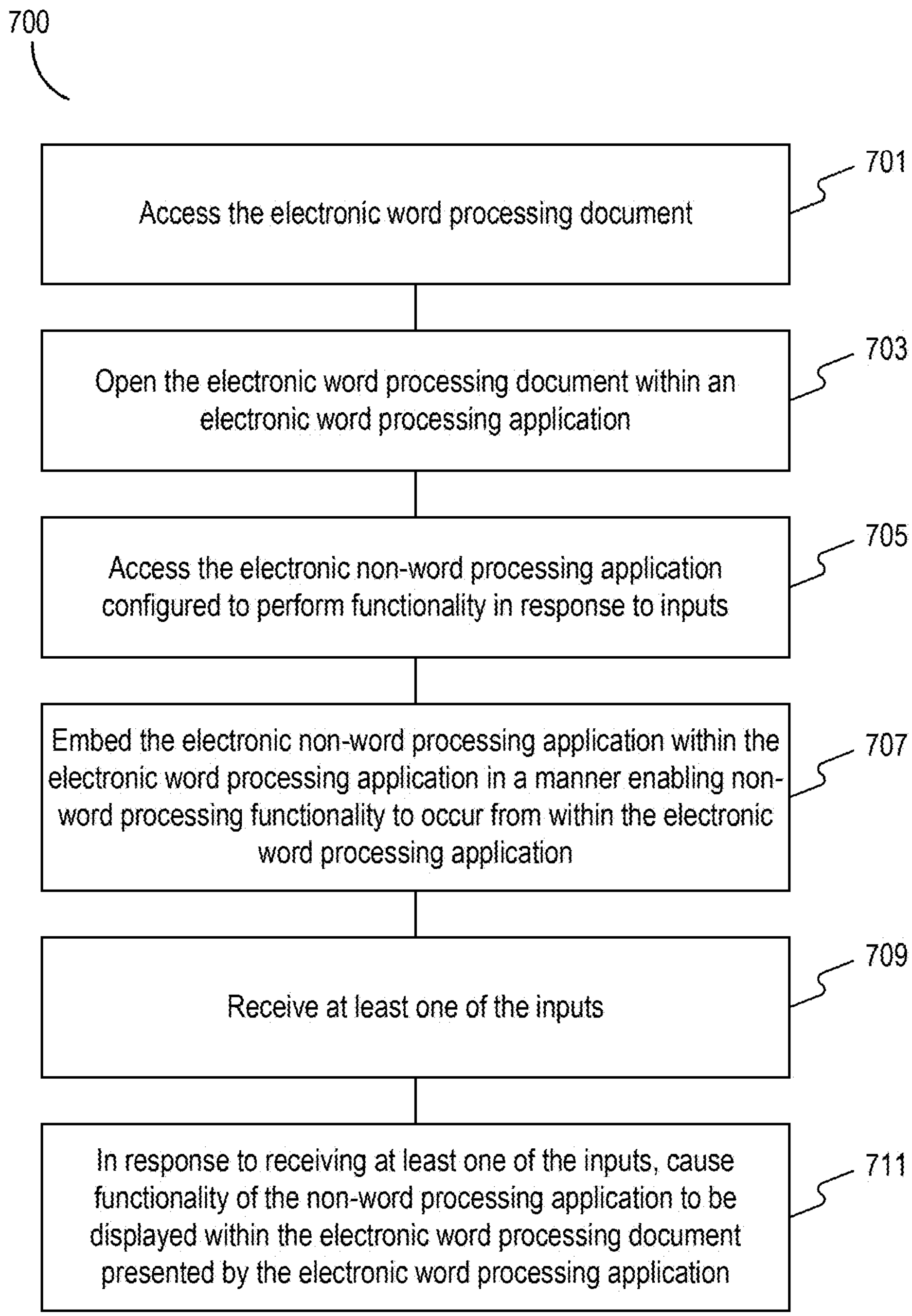
FIG. 7 is a block diagram of an example process for embedding and running an electronic non-word processing application within an electronic word processing document, consistent with some embodiments of the present disclosure.

FIG. 7 illustrates a block diagram of an example process 700 for embedding and running an electronic non-word processing application within an electronic word processing document, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 7. In some embodiments, the process 700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 4, 5, and/or 6, by way of example. In some embodiments, some aspects of the process 700 may be implemented as software (e.g., program codes or instructions) that are stored in a memory (e.g., the memory portion 122 in FIG. 1) or a non-transitory computer-readable medium. In some embodiments, some aspects of the process 700 may be implemented as hardware (e.g., a specific-purpose circuit). In some embodiments, the process 700 may be implemented as a combination of software and hardware.

FIG. 7 includes process blocks 701 to 701. At block 701, a processing means (e.g., the processing circuitry 110 in FIG. 1) may access an electronic word processing document (e.g., electronic word processing document 402 in FIGS. 4 and 5). At block 703, the processing means may open the electronic word processing document within an electronic word processing application (e.g., causing electronic word processing document 402 to be within electronic word processing application interface 400, which may be run by an electronic word processing application). An electronic word processing document 402 (e.g., electronic word processing document 402) may be associated with various electronic word processing functionalities, which may be interactable through an interface (e.g., electronic word processing application interface 400), such as a print function, a formatting function (e.g., a margin setting, a line spacing setting, a font setting, and/or any other setting configured to determine an appearance aspect of an electronic word processing document), a sharing function, a zoom function, and/or any other operation performable by an electronic word processing application to change data associated with an electronic word processing document.

At block 705, the processing means may access the electronic non-word processing application, which may be configured to perform functionality in response to inputs. As discussed above, the electronic non-word processing application may also include at least one of a communications interface, a graphics presentation editor, a graphing application, or a portal to a third-party application. In some embodiments, access the electronic non-word processing application may include accessing data (e.g., over a network) that may be used to populate at least a portion of an embedded electronic non-word processing application (e.g., electronic non-word processing application 500). In some embodiments, the processing means may select and/or access the electronic non-word processing application in response to an input received at an application identification interface (e.g., option menu 404).

At block 707, the processing means may embed the electronic non-word processing application (e.g., electronic non-word processing application 500) within the electronic word processing application (e.g., as shown within electronic word processing application interface 400) in a manner enabling non-word processing functionality to occur from within the electronic word processing application. Consistent with disclosed embodiments, the processing means may embed the electronic non-word processing application (e.g., electronic non-word processing application 500) within the electronic word processing application by embedding the electronic non-word processing application within an electronic word processing document hosted by the electronic word processing application. In some embodiments, the processing means may embed the electronic non-word processing application the electronic word processing application in response to an input received at an application identification interface (e.g., option menu 404). In some embodiments, the processing means may embed the electronic non-word processing application the electronic word processing application within a particular block (e.g., block 602).

At block 709, the processing means may receive at least one of the inputs, which may be received while the electronic non-word processing application (e.g., electronic non-word processing application 500) is displayed within the electronic word processing application. For example, and consistent with disclosed embodiments, the processing means may receive an input within an electronic non-word processing application (e.g., electronic non-word processing application 500).

At block 711, the processing means may cause functionality of the electronic non-word processing application (e.g., electronic non-word processing application 500) to be displayed within the electronic word processing document (e.g., electronic word processing document 402) presented by the electronic word processing application (e.g., within electronic word processing application interface 400). In some embodiments, the processing means may cause functionality of the electronic non-word processing application to be displayed within the electronic word processing document in response to receiving at least one of the inputs (such as an input received at block 609).

In electronic word processing systems, it may be beneficial to employ automatic changes to electronic word documents based on externally detected occurrences. In many instances, synthesizing information across multiple applications and/or efficiently editing electronic word processing documents can be difficult due to dispersion of data and rigidness of electronic word processing applications. Therefore, there is a need for unconventional innovations for helping to seamlessly change word processing documents based on externally detected occurrences.

Such unconventional approaches may enable computer systems to automatically change an electronic word processing document based on occurrences occurring outside of or within the electronic word processing document. By using automatic logic to edit an electronic word processing document, the electronic word processing document may be edited more rapidly and accurately compared to using tedious manual techniques. In some disclosed embodiments, an electronic word processing application may be communicably linked to electronic non-word processing applications, enabling detection of occurrences with respect to those electronic non-word processing applications and automatic editing of the electronic word processing document; features not achieved in conventional systems. In some disclosed embodiments, occurrences specific to a particular portion of an electronic word processing document may be detected and automatic actions may be taken in response, allowing for pinpoint and rapid tailoring of electronic word processing document editing, occurrence detection, and responsive actions. This may, for example, reduce unnecessary responsive actions related to an electronic word processing document. Automatic edits to an electronic word processing document may not only enhance the content of the electronic word processing document itself, but also related information, such as by automatically updating permission settings, changing a display configuration, transmitting information, or other automatic changes to stored information associated with the electronic word processing document. In some embodiments, using automatic changes to electronic word documents or automatic data transmissions based on detected occurrences may increase the efficiency and operations of workflow management functionality.

Thus, the various embodiments the present disclosure describe at least a technological solution, based on improvement to operations of computer systems and platforms, to the technical challenge of changing an electronic word document based on detected occurrences.

Disclosed embodiments may involve systems, methods, and computer-readable media for automatically altering information within an electronic document based on an externally detected occurrence. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities.

An electronic document may include a file or other data structure configured to store information and/or present the information in a visual manner. For example, an electronic document may include a file that is configurable or configured to store text, a character, an image, a table, a graph, and/or any other displayable visualization or combination thereof. An electronic document may be configurable to be displayed (e.g., by an electronic word processing application) in a visual form, for example within an interface, which may be displayed, such as at user device 220-1, using a processing device (e.g., processing circuitry 110). In some embodiments, an electronic document may be associated with (e.g., displayable by, configurable by, accessible through) an electronic document application, such as an electronic word processing application. An electronic document application may include a program, command, script, module, widget, instruction set, and/or any code configured to carry out an operation associated with an electronic document.

Automatically altering information within an electronic document may include inserting, removing, changing the content of, re-positioning, re-formatting, or otherwise changing the visual appearance of at least one of: text, a graphic, a background, a link, a data structure, a video, metadata, block, a margin, or any other information displayable by the electronic document. In some embodiments, altering information within the electronic document may be implemented by at least one processor without manual intervention. For example, at least one processor may determine that one or more parameters are satisfied and may automatically cause the altering of information within the electronic document. Additionally or alternatively, automatically altering information within the electronic document may include altering information embedded in the electronic document that influences information displayed within the electronic document. For example, a web-accessible video displayed within an electronic document may have an associated web address embedded in a portion of the electronic document, and when the embedded web address is changed, a different web-accessible video may be displayed.

An externally detected occurrence may include a change in information stored and/or displayed by a source external to the electronic document, such as a status of a user account, a status of a file, an occurrence of a time (e.g., a calendar date, time of day, day of the week, atomic clock time, or any other indication of a point or period in time), a computerized action taken by a device, and/or any other event detectable by a computing device, or any combination thereof. For example, an externally detected occurrence may include a change made by a user and/or device through a third-party application. A third-party application may include a data-hosting service, a project management service, a tracking program, and/or any program, script, command, module, widget, instruction set, graphical interface, or computer functionality defined by, hosted by, maintained by, or otherwise influenced by a party distinct from a party associated with an application associated with the electronic document (e.g., an electronic word processing application). In some embodiments, a third-party application may be communicably connected to an application associated with the electronic document (e.g., an electronic word processing application). For example, one or more APIs may communicably link a third-party application to an application associated with the electronic document. For instance, an API hosted by the third-party application, or the application associated with the electronic document, may transmit an API call to a service hosted by the other application, and may receive data in response (e.g., data indicating a change in information). In some embodiments, an externally detected occurrence may include addition, deletion, or alteration of particular content. For example, an externally detected occurrence may include an addition of a particular word or phrase to a document, such as an addition of the word "urgent," "important," the name of a particular product or service, the name of a particular project, the name of a particular individual, the name of a particular entity, or any other string of text defined as an input condition for an electronic rule. As another example, an externally detected occurrence may include a change made to a particular subset of an electronic word processing document, such as a particular block, a particular group of lines of text, a particular image, a particular page, a particular portion of content between two blocks, a particular embedded application, metadata associated with any thereof, or any amount of content or space within the electronic word document that can be changed. In some embodiments, an externally detected occurrence may be associated with a condition of an electronic rule, discussed further below.

Some embodiments may involve instances where at least one processor is configured to access an electronic word processing document. An electronic word processing document may include a file that is configurable to store text, a character, an image, a table, a graph, and/or any other displayable visualization or combination thereof. An electronic word processing document may be configurable to be displayed (e.g., by an electronic word processing application) in a visual form, for example within an interface, consistent with disclosed embodiments. An electronic word processing document may also include any characteristic of an electronic document, discussed above. Consistent with some disclosed embodiments, the at least one processor may be configured to access an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by detecting an interaction with (e.g., a mouse click, keyboard input, touchscreen touch, or other input in response to which a signal may be produced) an indicator associated with the electronic word processing document, such as an icon or file name, which may cause the system to retrieve (e.g., from a storage medium) a particular electronic word processing document associated with the indication. In some embodiments, accessing the electronic word processing document may include displaying the electronic word processing document. For example, the electronic word processing document may be displayed by an electronic word processing application, such as within an interface rendered by a web browser.

Figure 11:
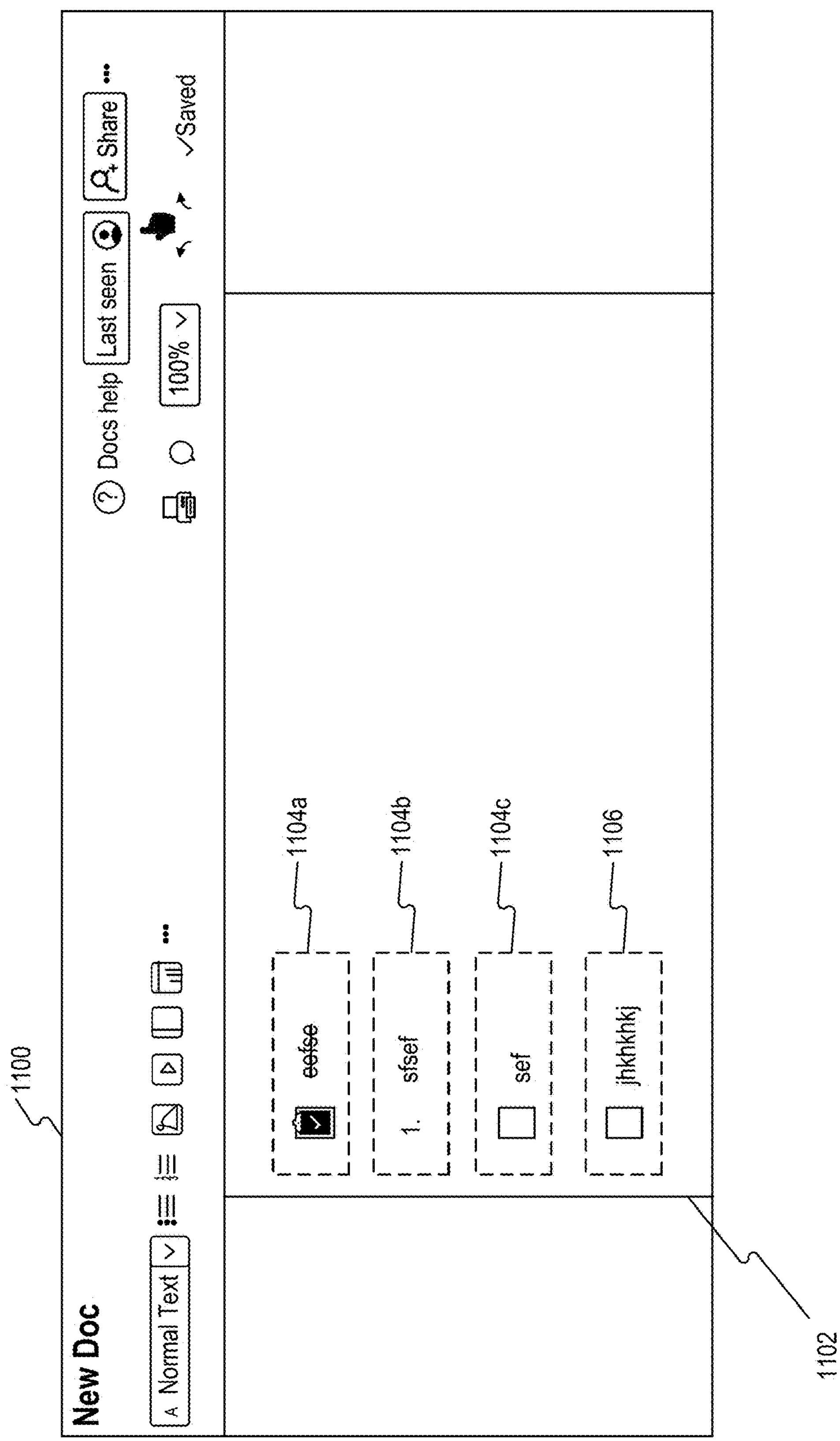
FIG. 11 illustrates an example of an electronic word processing application interface having an electronic word processing document, consistent with some embodiments of the present disclosure.

In FIG. 2, a computing device 220-1 may send a request to access an electronic word processing document that may be stored in, for example, repository 230-1. For example, as shown in FIG. 11, electronic word processing application interface 1100 may render electronic word processing document 1102, which may include text, a character, an image, a table, a graph, a data structure, and/or any other displayable visualization, including an electronic non-word processing application, discussed earlier above. Electronic word processing application interface 1100 may be shown on a display, such as a display communicably connected to processing circuitry 110 (as shown in FIG. 1). Electronic word processing document 1102 may include one or more blocks, discussed further herein.

Consistent with some disclosed embodiments, the at least one processor may be configured to display an interface presenting at least one tool for enabling an author of an electronic word processing document to define an electronic rule triggered by an external network-based occurrence. Displaying an interface may include configuring and causing the visual presentation of one or more interactable visual elements, which may be configured to detect an input (e.g., a user input) and cause the execution of an operation in response, which may be executed by a processing device (e.g., processing circuitry 110). For example, an interface may include a rendering of at least one virtual button, menu, slider, scroll bar, field, search bar, graphic, animation (e.g., a GIF file), and/or any other visual element with which a user may generate input to an application. In some embodiments, an interface may be displayed and re-rendered based on a received input, as will be discussed further herein. For example, an input received on a menu option indicating a template for configuring a particular electronic rule may cause the display of an interface having configuration options for the particular electronic rule. A tool may include a program, a rule, an interactable visual element (e.g., graphic), a script, a module, a widget, an instruction set, and/or any code configured to determine information for an electronic rule, or combination thereof. In some embodiments, a tool may include an interactable visual element, such as a button or a field, which, when interacted with by a user (e.g., through a mouse and/or keyboard input), may cause the execution of a command associated with configuring an electronic rule. The displayed interface as discussed above may present one or more tools as options for selection. An electronic rule may include an if-then statement, a condition, an information source identifier (e.g., URL, IP address, API identifier, client identifier, identifier of a portion of a web page), event listener initialization information, a user identifier, an account identifier, a device identifier, a system identifier, a program, a script, a call, a method (e.g., a Java or other computer programming language method), a conditional instruction, a command, an operation, an input variable, an output variables, an automation associated with an underlying logical rule as described herein, or any other relationship between at least one variable and a computerized action. In some embodiments, an electronic rule may include one or more input conditions, which, if satisfied, cause a particular output. For example, if a processing device detects that a condition for an electronic rule is satisfied, the processing device may perform an operation to change data (e.g., a particular output), such as content data or structure data associated with an electronic word processing document. Additionally or alternatively, an electronic rule may include multiple alternate condition sets, such that if one of the condition sets (which may each include one or more conditions) is satisfied, the electronic rule may produce an output, even if another one of the condition sets is not satisfied (e.g., its conditions are not met). Enabling an author of the electronic word processing document to define an electronic rule may include generating an interactable interface element, detecting an input (e.g., to an interactable interface element), configuring an interface, configuring a set of code (e.g., an electronic rule framework, electronic rule, application), opening a document (e.g., within a web browser), retrieving data (e.g., associated with a user, a user account, a document, a system, a device, an application, an information source), and/or any other operation to facilitate determination or preservation of a parameter for an electronic rule. An author of the electronic word processing document may include an originator of, owner of, editor of, or other entity with access permission to, the electronic word processing document.

An external network-based occurrence may include a change in data associated with an application (e.g., an object tracking application, such as a flight tracking application, a weather source, a sensor reading, or any other data accessible through an application), a change in data associated with a web page, a change in data associated with a website, a change in a file (e.g., a change in file content, a change in file structure, a change in file appearance, a change in file size), a change to a setting (e.g., a permission setting, an account setting, a group setting, a device setting), a set time and/or date being reached (e.g., a due date, a set time prior to a due date), an externally detected occurrence (described above), or any other informational change detectable by a directly or indirectly network-connected device. For example, data displayed by and/or stored by an entity associated with a news web page may change (e.g., text related to a news story may change). As another example, text, graphics, or other information indicating a location of a shipping package may be changed at an application or a web page. As yet an additional example, a label associated with a project or task (e.g., completion of a stage of development, a message sent or received, a transaction, a product or service sent or received, a sale) may be updated within a third-party application. The network-based occurrence may be said to be external when the occurrence occurs independently or separately from the electronic word processing document and/or the information contained within it. In some embodiments, an external network-based occurrence may occur at a database management service (e.g., DBMS 235-1) and/or a repository (e.g., repository 230-1), which may be remote from a device detecting an external network-based occurrence and/or implementing an electronic rule (e.g., user device 220-2).

An electronic rule being triggered by an external network-based occurrence may include executing (e.g., by a processing device) an operation (e.g., a conditional instruction) in response to a condition meeting a threshold. An operation of an electronic rule may include any functionality such as transmitting a communication (e.g., an API call), receiving a communication (e.g., data to use for updating an electronic file), constructing an API call, translating data (e.g., translating data from one API format to another API format, such as according to a data mapping), parsing data, pulling data, re-arranging data, changing data (e.g., data associated with an electronic word processing document), displaying data (e.g., an alert notification), or any other function that can influence data displayable at a device. For example, an electronic rule being triggered by an external network-based occurrence may include receiving a communication from an API indicating that data at a source has changed, and implementing a change to an electronic word processing document in response. In some embodiments, an electronic rule may be triggered, or attempted to be triggered (e.g., determining if electronic rule conditions are met, and triggering the electronic rule if they are) periodically at a defined frequency. Additionally or alternatively, an electronic rule may be triggered based on a request created in response to a user input. For example, a user may select an interactable graphical element associated with an electronic rule, and a processing device may cause an output associated with the electronic rule in response to the user selection. Additionally or alternatively, an electronic rule may be triggered based on an event listener. For example, an event listener may detect a change to data (e.g., an HTML object), which may satisfy a condition for the electronic rule and cause an output to be produced, such as by prompting a processing device (e.g., processing circuitry 110) to execute a conditional instruction.

In some embodiments, an external network-based occurrence may include a change to a locally-stored or a cloud-stored file. A change to a file may include a modification in file content text, file formatting, or file metadata, file type, file location, a combination of locations of the file, one or more users associated with the file, a user permission associated with the file, a file data structure within or otherwise associated with a file, or any other difference between two points in time between attributes of the file, or any combination thereof. For example, at one point or points in time a file may include a first combination of material or information (e.g., text, lines, paragraphs, blocks, embedded non-word processing applications, or any other word processing displayable feature) and at a second point or points in time may include a second combination of material or information, which may differ from the first combination. A locally-stored file may include a file accessible to a device across a LAN, a file stored at a database on a LAN, a file stored in a cache (e.g., a web browser cache), a file stored on a storage device of a device (e.g., a device at which a conditional instruction associated with the file is executed), or any other material stored on a storage device that is accessible to a connected component or a device on a particular machine or through the use of a LAN connection (e.g., without transmission of the file across the internet). A cloud-stored file may include a file stored at a storage medium accessible to other devices across an internet connection, cellular network connection, satellite connection, or any other WAN communication connection. For example, a cloud-stored file may be stored at a storage medium associated with an entity that hosts (e.g., stores, displays, implements) one or more electronic rules, which may be associated with one or more files, documents, accounts, users, groups, networks, projects, or combination thereof. Additionally or alternatively, a cloud-stored file may be stored at a repository located remotely. In some embodiments, cloud-stored files may be indexed according to a file identifier, document identifier, permission identifier, account identifier, user identifier, group identifier, network identifier, project identifier, date of creation, date of last edit, or combination thereof. A file or portion of a file (e.g., one or more blocks), whether locally-stored, cloud-stored, or otherwise, may be encrypted prior to, during, or after storage. A file or portion of a file (e.g., one or more blocks) may also be decrypted to permit access, editing, or other operations, by a particular device, user, account, group, network, or any other entity. Additionally or alternatively, a file or portion of a file (e.g., one or more blocks) may be decrypted to permit implementation of an electronic rule, such as performing an edit to the file, or other conditional instruction, consistent with disclosed embodiments.

In FIG. 1 for example, a locally-stored file may be stored at a memory 120 of user device 220-1. A cloud-stored file may additionally or alternatively be stored at repository 230-1 as shown in FIG. 2.

Aspects of this disclosure may include, in displaying at least one interface, at least one processor being configured to present a logical template for constructing an electronic rule. Presenting a logical template for constructing the electronic rule may include causing the system to visually display a logical sentence structure (e.g., automation) for further configuration of an underlying logical rule, consistent with the description herein. For example, the logical template may include at least one configuration of electronic rule parameters, electronic rule parameter (e.g., a condition, a conditional instruction, output action), electronic rule parameter constraint (e.g., a time window or other condition), relationship between electronic rule parameters, chart, expandable tree (e.g., of electronic rule parameters), interactable (e.g., clickable) user interface area (e.g., a button), menu (e.g., drop-down menu) search bar, field, graph (e.g., graphical depiction of an electronic rule), text, graphic, animation, line, web, cluster, any other visual representation of at least a portion of an electronic rule, or any combination thereof. In some embodiments, a logical template may include a data structure representing and/or configured to implement an electronic rule. Additionally or alternatively, a logical template may include a visual representation of an electronic rule and/or at least one tool for constructing an electronic rule. For example, a logical template may include a layout of at least one condition, at least one computerized action, and at least one relationship between the two. In some embodiments, a logical template may include a button, which, upon receiving an input (e.g., mouse click), may add a field to the logical template (e.g., a field to associate with a particular electronic rule parameter). Additionally or alternatively, a logical template may include a drop-down menu, search bar, other input area, or combination thereof, which may use one or more inputs (e.g., keyboard entries) to search and/or display options for an electronic rule template. For example, based on one or more characters entered to an interface (e.g., a displayed representation of a field), a drop-down menu may display electronic rule parameters (e.g., conditions, conditional instructions) associated with (e.g., including overlapping characters with) the one or more characters. A selection of (e.g., mouse click on) one of the electronic rule parameters may cause the electronic rule parameter to be added to an electronic rule (e.g., adding segment of logic to an electronic rule being constructed). Based on at least one interaction with the logical template, an electronic rule (discussed above) may be constructed. For example, an electronic rule may be constructed to include one or more parameters (e.g., conditions and conditional instructions, discussed further below) corresponding to inputs made within an interface, consistent with disclosed embodiments.

Consistent with some disclosed embodiments, the logical template may include at least one field for designating an external source. A field may include a label, a segment of a data record, a data structure, or any other organizational representation that may indicate the content or value of a variable within a logical template. For example, a field may designate an external source, such as a source of information (e.g., information related to an input condition of an electronic rule) that can potentially trigger execution of a conditional instruction, such as by a processing device (e.g., processing circuitry 110). For instance, a field may hold, represent, or otherwise indicate a website, web page, document, URL, file, user account, application, widget, block, entity, any other displayer of information, or any portion and/or combination thereof. As one example, a field may indicate a web page URL as an external source of information. In another example, an automation may be presented as a template with empty fields for further configuration by a user to link the automation and its underlying logical rule to different sets of information, such as a column of data. Designating the external source may include any selection of information and linking it to the logical template for the underlying logical rule to act on the selection of information. Designating the external source may involve placing a definition of a variable within a field, placing an identifier of a displayer of information within a field, logically connecting an identifier of the external source with a condition of an electronic rule, storing an identifier of an external source (e.g., as part of a logical template and/or electronic rule), or any other action to associate the external source with an electronic rule or portion thereof. For example, a data structure may include a variable definition of a condition for an electronic rule and an external source identifier, and may logically connect the variable definition with the external source identifier. An external source may include a web page, website, file, data storage medium, network, organization, application, or other entity that may display or otherwise provide access to information relevant to an electronic rule (e.g., information associated with at least one condition for an electronic rule).

Figure 8:
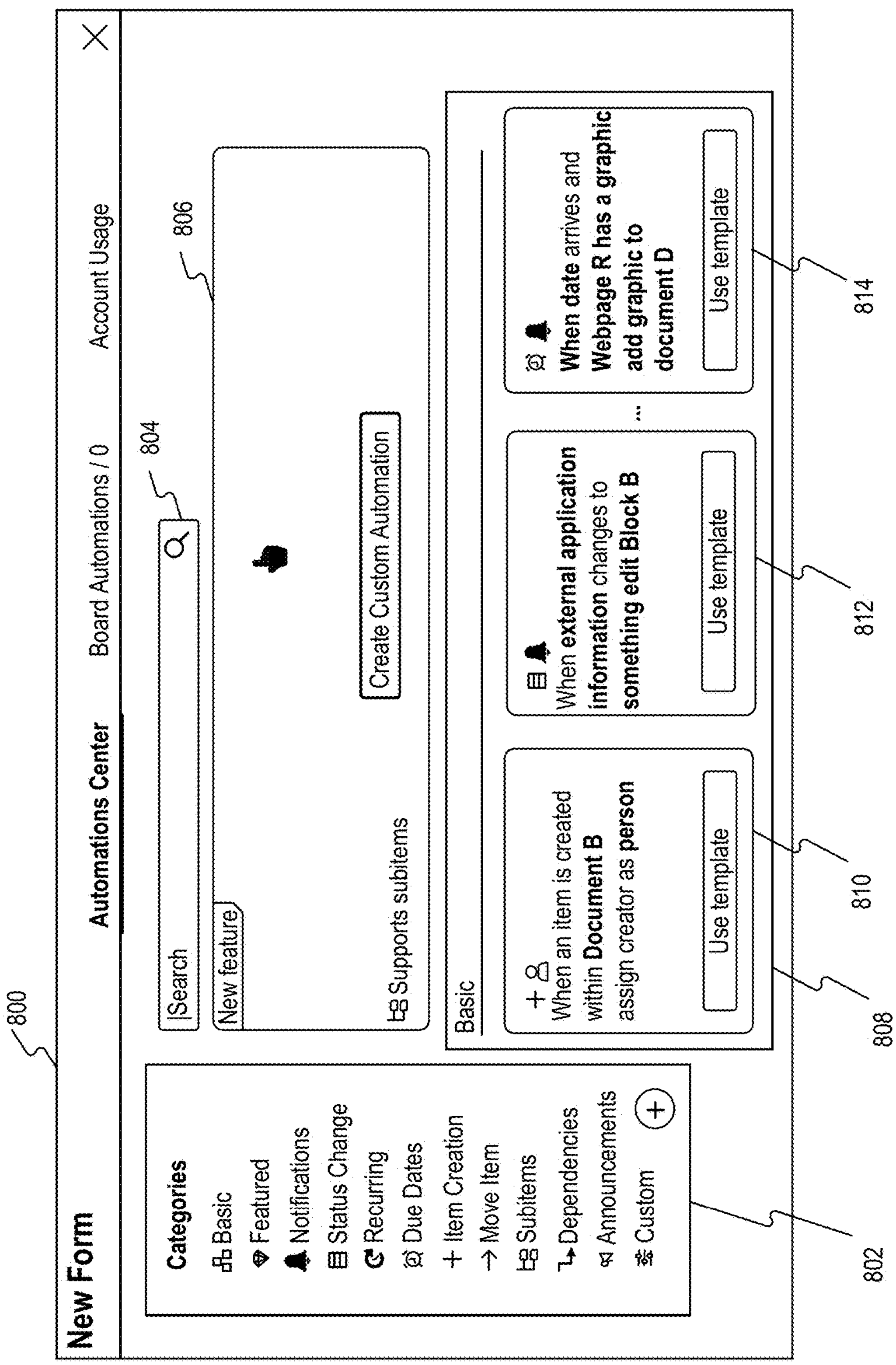
FIG. 8 illustrates an example of an electronic rule template interface, consistent with some embodiments of the present disclosure.
Figure 9:
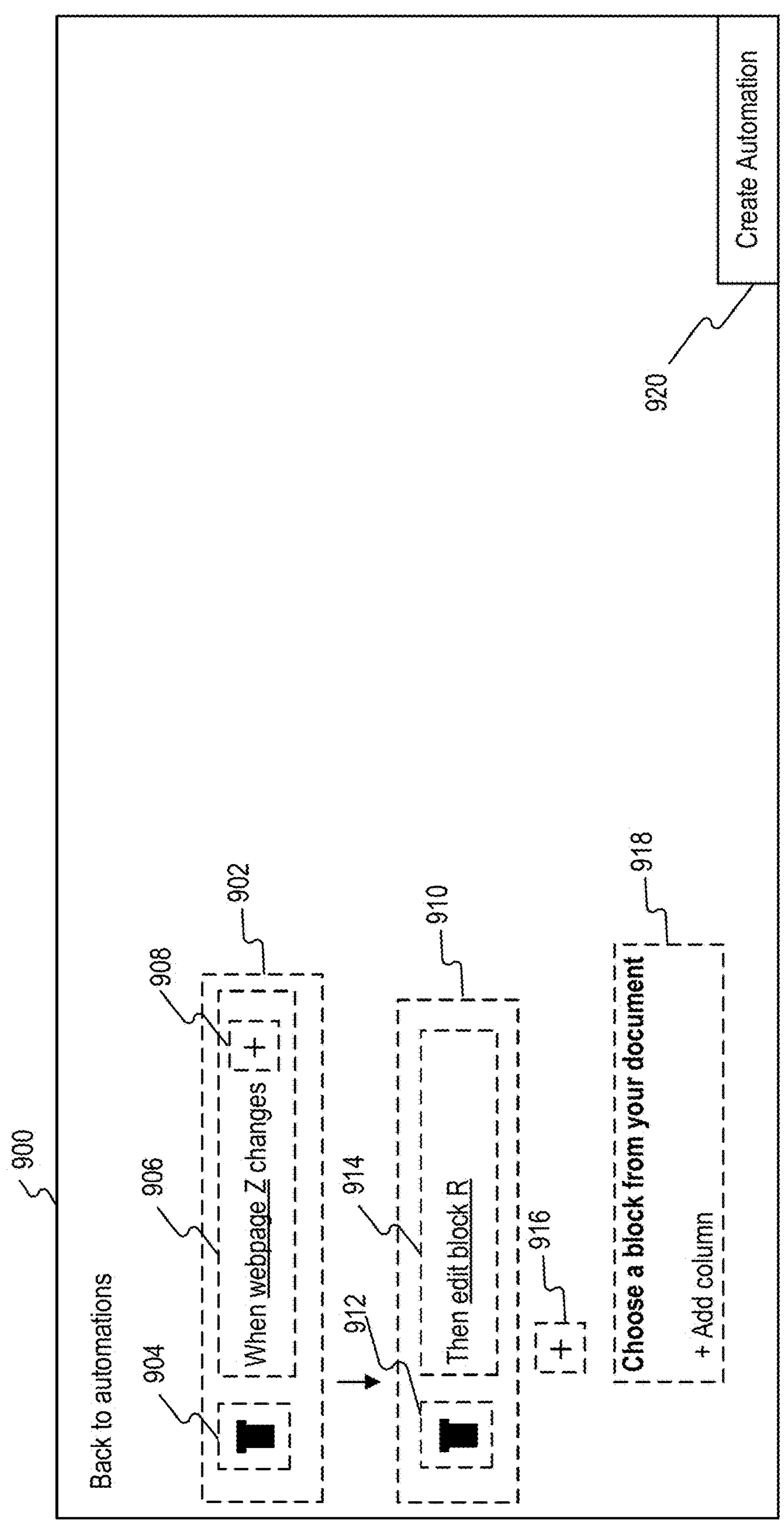
FIG. 9 illustrates an example of an electronic rule construction interface, consistent with some embodiments of the present disclosure.

For example in FIGS. 1 and 2, an external source may be a service (e.g., DBMS 235-1), a storage medium (e.g., repository 230-1), or a device (e.g., computing device 100). FIGS. 8 and 9 illustrate exemplary interfaces associated with defining an electronic rule, which may be shown at a display, such as a display communicably connected to processing circuitry 110 (as shown in FIG. 1). FIG. 8 depicts interface 800, which may include one or more interactable elements to facilitate construction of an electronic rule. For example, interface 800 may include category input area 802, which may indicate one or more categories, which may relate to respective types of electronic rule templates. When category input area 802 is interacted with by a user (e.g., the system detects a mouse click or other gesture from the user), a particular set of templates and/or tools may be displayed, which may be associated with a category selected by the user (e.g., a category indicated within the category input area 802). Interface 800 may also include a search area 804, which may include a search bar or other interactable graphical element that allows a user to search for one or more electronic rule templates or other information related to establishing an electronic rule. For example, a user may type one or more search terms into search area 804, possibly followed by a mouse click or keyboard input, which may initiate the return of search results for an electronic rule template, an electronic rule condition, an electronic rule output, or any other electronic rule parameter. Interface 800 may also include a custom template area 806, which may be associated with displaying one or more tools enabling the creation of an electronic rule. For example, selection of (e.g., a mouse click on) custom template area 806 may cause interface 900 to be displayed. In some embodiments, interface 800 may also include logical template information area 808, which may include graphical elements indicating information about templates, such as template indicator 810 and template indicator 812, up through template indicator 814. In other words, any number of logical templates may be referenced within information area 808 in any form, such logical sentence structures representing underlying logical rules. In some embodiments, when a selection is received at include template information area 808, interface 900 may be displayed, such as with predefined electronic rule parameters (e.g., input conditions, outputs, or any other part of an electronic rule, as discussed above).

FIG. 9 depicts interface 900, which may be configured to receive one or more inputs related to generating, editing, or otherwise configuring an electronic rule. One or more inputs may be received in response to a user interaction with an interactable graphical element. For example, interface 900 may include condition area 902, which may include a deletion initiator 904, a condition input area 906, and condition addition area 908. Of course, multiples of any of these may be displayed within interface 900. Deletion initiator 904 may cause (e.g., upon selection) removal of a condition area 902 and/or deletion of an electronic rule or electronic rule parameter (e.g., associated with condition area 902). Condition input area 906 may be configured to receive one or more inputs establishing one or more parameters related to an electronic rule, consistent with disclosed embodiments. In some embodiments, selection of (e.g., a mouse click on) condition input area 906 may cause the display of a menu of condition options. Condition input area 906 may also display text or other visual indicator of a condition, which may have been selected from a menu. Condition addition area 908 may be configured to receive an input to prompt addition of a parameter (e.g., condition) to an electronic rule. In some embodiments, selection of condition addition area 908 may cause (e.g., upon selection, such as through a mouse click) the generation of another condition area 902 within interface 900.

Interface 900 may also include action area 910, which may include a deletion initiator 912 and an action input area 914. Similar to deletion initiator 904, deletion initiator 912 may cause (e.g., upon selection) removal of an action input area 914 and/or deletion of an electronic rule or electronic rule parameter (e.g., an output action or other operation to be performed when an electronic rule is triggered, consistent with disclosed embodiments). Action input area 914 may be configured to receive one or more inputs establishing one or more parameters (e.g., output actions, such as conditional instructions), related to an electronic rule, consistent with disclosed embodiments. In some embodiments, selection of (e.g., a mouse click on) action input area 914 may cause the display of a menu of action output options. Action input area 914 may also display text or other visual indicator of an output action, which may have been selected from a menu. Interface 900 may also include action addition area 916, may be configured to receive an input to prompt addition of a parameter (e.g., output action, such as a conditional instruction) to an electronic rule, consistent with disclosed embodiments.

Interface 900 may also include block identification area 918, which may be configured to receive an input related to selection of a block (discussed further herein). For example, selection of (e.g., a mouse click on) block identification area 918 may cause the display of a menu, graph, visual depiction of an electronic word processing document, or other visual depiction related to a block. In some embodiments, a user may select a block within a visual depiction, to associate the block with an electronic rule. Additionally or alternatively, a user may select a position within an electronic word processing document to associate with an electronic rule (e.g., a position relative to one or more blocks, relative to lines of text, relative to a page, relative to a paragraph, or positioned with respect to any part of a document). Interface 900 may also include an electronic rule creation initiator 920. In some embodiments, interaction with (e.g., a mouse click on) electronic rule creation initiator 920 may cause generation of an electronic rule, consistent with disclosed embodiments.

In some embodiments, at least one processor may be configured to activate or deactivate an electronic rule. Activating or deactivating an electronic rule may include changing a Boolean value associated with the electronic rule (e.g., a Boolean value that is part of an electronic rule's metadata), changing metadata, changing a rule parameter, or otherwise permitting or preventing an electronic rule from implementing a conditional instruction. For example, an interface may include one or more interactable visual elements, such as visual toggle switches, which may correspond to different electronic rules, and which a user may toggle to activate and/or deactivate the corresponding electronic rule. In response to interaction with an interactable visual element (e.g., toggle switch), the at least one processor may activate or deactivate a corresponding electronic rule.

Figure 10:
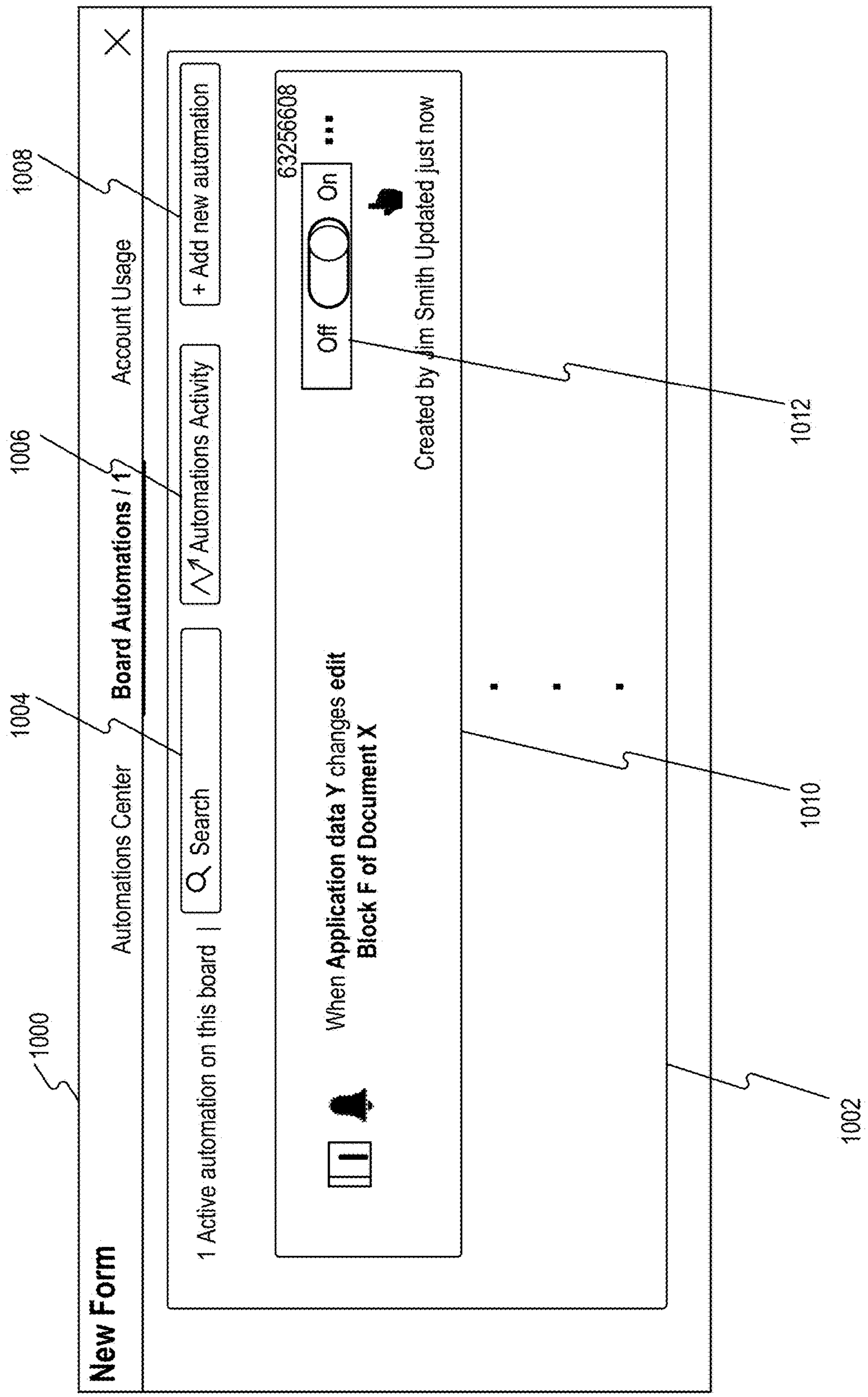
FIG. 10 illustrates an example of an electronic rule configuration list interface, consistent with some embodiments of the present disclosure.

For example, in FIG. 10, interface 1000 includes an electronic rule display area 1002, which may display text, graphics, interactable graphical elements, or other visual indicators of one or more electronic rules, as well as other graphical user elements for manipulating and/or visualizing aspects related to electronic rules. Interface 100 may be shown at a display, such as a display communicably connected to processing circuitry 110 (as shown in FIG. 1). For example, electronic rule display area 1002 may include a search bar 1004, which may permit an input of text, which at least one processor may in turn use to search a database or other storage medium for one or more electronic rules or templates, which may be shown within electronic rule display area 1002. Electronic rule display area 1002 may also include an electronic rule activity tracker button 1006, which, when selected, may cause the display indicators activities taken with respect to one or more electronic rules. For example, the at least one processing device may cause the display of an indicator of at least one of a time of a rule triggering, a circumstance surrounding a rule triggering, one or more conditions that triggered a conditional instruction, a conditional instruction implemented (e.g., a document changed and/or a change made to the document), a change made to an electronic rule, a user associated with a change made to an electronic rule, or any other change made to an electronic rule or made based on implementation of an electronic rule. Electronic rule display area 1002 may also include an electronic rule construction initiation button 1008, which, when selected, may cause the at least one processor to display an interface or other tool for use in constructing an electronic rule, consistent with disclosed embodiments. For example, electronic rule construction initiation button 1008, when selected, may cause the at least one processor to display interface 800 and/or interface 900 as shown in FIGS. 8 and 9. Electronic rule display area 1002 may also include at least one electronic rule visualization area 1010, which may show one or more aspects associated with a particular electronic rule. For example, electronic rule display area 1002 may include at least one instance of text, a graphic, an animation, a graph, a chart, or another visualization displaying information associated with an electronic rule (e.g., an indication of a parameter of an electronic rule). For example, electronic rule display area 1002 may include at least one visual element indicating an electronic rule condition, at least one visual element indicating an output action (e.g., conditional instruction or any other computerized action), and at least one visual element indicating at least one relationship between the two. Electronic rule display area 1002 may also include at least one electronic rule toggle 1012, which may be displayed within an electronic rule visualization area 1010. For example, an electronic rule toggle 1012 may be associated with a corresponding electronic rule, and may, when interacted with (e.g., clicked on using a mouse), cause at least one processor to activate or deactivate the associated electronic rule, consistent with disclosed embodiments.

In some embodiments, the at least one processor may be further configured to access an internet communications interface. An internet communications interface may include any presentation of a visualization of information (as discussed above) for establishing a link to internet based data such as via a wired communication connection between components, a wired communication connection between devices, a wireless communication connection between devices, a network adapter, an API, a router, a switch, an application, a web browser, or any combination thereof. For example, the at least one processor may access a web browser to communicate with a remote device, such as by using a wired (at least in part) connection over the internet.

Aspects of this disclosure may include the at least on processor being further configured to access an internal network communications interface. An internal network communications interface may include any presentation of a visualization of information (as discussed above) for establishing a link to information located in a local repository. An internal network communications interface may involve establishing this linked via at least one of: an internet browser, a network adapter, an application, an API, a LAN connection, a virtual private network (VPN) connection, or any other internet communications interface described above. For example, a user of a device may connect to another device through a LAN connection, such as by using a web browser or application, to connect to a local device (e.g., another device on a common system to the user's device), such as a database or other storage medium. Such a connection may allow multiple devices to quickly access documents, files, and other data, and may also allow for more rapid implementation of a conditional instruction (e.g., caused by the triggered electronic rule). For example, an internal network communications interface may allow for faster conditional editing of an electronic word processing document Consistent with some disclosed embodiments, including those disclosed above, a network may include network 210, across which devices may send or receive data, such as user device 220-1 and repository 230-1 in FIG. 2. In some embodiments, a device may transmit or receive data according to instructions executed by a processing device, such as processing circuitry 110 as shown in FIG. 1. In some embodiments, signal transmissions may be sent or received using network device 140, and may travel through bus 105.

In some embodiments, an external network-based occurrence may include a change to an internet web page, which may be accessible and/or accessed (e.g., by at least one processor) using the internet communications interface. A change to an internet web page may include a change in HTML source code associated with the internet web page, a change in text, displayed by the internet web page, a change to the web page's URL, a change to metadata associated with the web page, a change in an arrangement of a graphic, chart, video, or other visualization on the web page, a change in audio information associated with the web page, or any other visual or auditory information presented by the web page. Any of these changes may serve as an external network-based occurrence, as discussed previously above, for causing operations to be carried out in an electronic word processing document in response to the change being detected.

Consistent with some disclosed embodiments, the at least one processor may be configured to receive a conditional instruction to edit an electronic word processing document in response to the network-based occurrence. A conditional instruction may include an operation, command, function, call, method, script, module, code, or any computerized action that may be executed based on satisfaction of one or more conditions, as discussed above, as part of underlying action associated with an electronic rule. For example, when an event listener detects an event (e.g., a condition is satisfied), it may cause (e.g., according to the electronic rule) the execution of a conditional instruction. For example, the conditional instruction may be an output that is triggered by the electronic rule when one or more conditions are satisfied. In some embodiments, the at least one processor may receive the conditional instruction with a reference to the electronic rule (e.g., a rule identifier, an account identifier, a document identifier, a user identifier, a group identifier, an application identifier, or combination thereof). Additionally or alternatively, the at least one processor may receive the electronic rule itself, which may include the conditional instruction. Receiving a conditional instruction may include, accessing the conditional instruction (e.g., from local storage) via a stored electronic rule, retrieving the conditional instruction from a remote storage device, running an application (or other computer program), establishing a connection, or any other action to access the conditional instruction. Receiving the conditional instruction may involve retrieving the instruction from the stored electronic rule upon detection of an external network-based occurrence meeting a predefined threshold associated with the electronic rule, discussed in further detail below. In some embodiments, the instruction to edit may include at least one of adding text, modifying text, deleting text, rearranging text, adding a graphic within text; inserting video within text, inserting an image within text, or inserting audio information within text. For example, text within an electronic word processing document may be added, deleted, or rearranged. As another example, a graphic, video, image, or audio information may be inserted between lines of text, blocks, non-word processing applications, or other visual information insertable into an electronic word processing document. Additionally or alternatively, the instruction edit may include moving text, adding a data structure (e.g., a block, table, structure associated with an embedded application), removing a data structure, modifying content data of a data structure, changing metadata associated with a data structure, adding an electronic non-word application, altering an electronic non-word application, deleting an electronic non-word application, changing a permission associated with the electronic word processing document, and/or any other operation to change a visual aspect of an electronic word processing document. For example, a conditional instruction may be an instruction to create a new block at a particular position within the electronic word processing document. As another example, a conditional instruction may be an instruction to add or remove a permission associated with a particular block in the electronic word processing document. In some embodiments, a conditional instruction may be an instruction to edit an electronic word processing document in response an edit made at another electronic word processing document, consistent with disclosed embodiments. For example, a block (or other data structure) may be associated with (e.g., exist within) multiple electronic word processing documents, and an electronic rule may cause a change made at the block in one electronic word processing document to be made at another electronic word processing document.

Aspects of this disclosure may include the at least one processor being further configured to pull data from an internet web page and insert the pulled data into the electronic word processing document. Pulling data may include accessing data, copying data, associating a timestamp with data, crawling data, downloading data, parsing data (e.g., transforming data from one data format to another), condensing data (e.g., through data compression or selective extraction of data elements, such as according to a condition parameter for an electronic rule), or any action that makes data suitable for use in performing a conditional instruction. Data may include text (e.g., displayed on a web page), HTML text (which may or may not be displayed on a web page), metadata, a graphic, an image, an animation, a video, audio information, a data structure (e.g., a data structure define in HTML code), API code, application code (e.g., a method defined in code), or any other material that may be represented in a digital format. An internet web page may include a document, file, application, dataset (e.g., combination of data, discussed above), any other information displayable within a web browser, or any combination thereof. For example, an internet web page may include a hypertext document, which may be provided by a web site and/or displayable within a web browser. Inserting the data into the electronic word processing document may include adding text, metadata, a graphic, an image, an animation, a video, audio information, a data structure (e.g., a block), any other digital information, or any combination thereof, to the electronic word processing document (e.g., within the content data represented and/or displayed by the electronic word processing document) such that the data is stored or otherwise associated with the electronic word processing document. Inserting the data into the electronic word processing document may include performing an operation represented by an instruction to edit the information contained in the electronic word processing document, consistent with disclosed embodiments. In some embodiments, editing the electronic word processing document may involve adding information to the electronic word processing document that is associated with a condition of an electronic rule. For example, a condition of an electronic rule may be a condition that text information on a web page has changed in some manner (e.g., a flight time) and the changed text information and/or associated information may be added to the word processing document. As another example, a condition of an electronic rule may be a condition that a user account identifier has been added to a list, and the user account identifier may be added to the word processing document (e.g., as in-document text).

In some embodiments, a conditional instruction may be a conditional instruction to carry out an action other than editing an electronic word document. For example, a conditional instruction may be an instruction to create a file, delete a file, change a permission, generate an alert (e.g., a pop-up window interface at a display), transmit an alert, create an email message, send an email message, change computer code (e.g., HTML code), convert a file to a different file type, or any other instruction to alter data associated with an electronic word processing document or application associated with an electronic word processing document. For example, when an electronic word processing document is edited, an alert may be transmitted to one or more devices. As another example, when a particular block within an electronic word processing document is edited, information associated with the block (e.g., content displayed by the block) may be sent one or more devices (e.g., devices associated with user's having a permission associated with the electronic word processing document.

Consistent with some disclosed embodiments, the at least one processor may be configured to detect an external network-based occurrence. Detecting the external network-based occurrence may include requesting information (continuously or periodically) from a remote data source (e.g., through an API), accessing a web page, accessing a document, parsing data (e.g., information on a web page, HTML text, document text), receiving an alert (e.g., from an event listener), or otherwise determining information associated with a condition of an electronic rule. For example, the at least one processor may parse HTML text of a web page for keywords or other data pertaining to a condition for an electronic rule. In some embodiments, the at least one process may compare HTML text to a version of the HTML text associated with an earlier point in time, to determine if a change corresponding to an electronic rule condition has occurred. Additionally or alternatively, an event listener may cause transmission of an indication of the external network-based occurrence to the at least one processor. Additionally or alternatively, an event API, which may be configured to communicate with one or more APIs, for example a third-party API and an API associated with editing electronic word processing documents.

Aspects of this disclosure may include the at least one processor being configured to implement a conditional instruction and thereby automatically edit an electronic word processing document. Implementing the conditional instruction may include performing an action indicated by the instruction, as discussed above. For example, when the conditional instruction is an instruction to insert a block into the electronic word processing document, the at least one processor may insert a block into the electronic word processing document. Hence, implementing the conditional instruction may thereby automatically edit the electronic word processing document (e.g., implementing the conditional instruction using an electronic rule, without manual intervention). In some embodiments, implementing the conditional instruction may not include editing the electronic word processing document, or may include at least one operation in addition to editing the electronic word processing document, as discussed above. Consistent with some disclosed embodiments, the at least one processor may be configured to implement the conditional instruction in response to the detection of the external network-based occurrence. For example, an external network-based occurrence (discussed above) may occur, and after the at least one processor detects the external network-based occurrence, it may execute an operation to carry out an output action associated with an electronic rule, as discussed above.

Additionally or alternatively, an electronic word processing document may be divided into a plurality of blocks. As discussed herein, a block may include any organizational unit of information in a digital file, such as a single text character, word, sentence, paragraph, page, graphic, or any combination thereof. In some embodiments, an electronic word processing document may include one or more blocks and/or one or more non-block instances of data, which may include unstructured data (e.g., raw text). One or more of the blocks may have at least one separately adjustable permission setting. A separately adjustable permission setting may be set with respect to one block independent from (e.g., without influencing) a separately adjustable permission setting for another block. For example, a permission setting may include a parameter that may control the ability of a user, user account, device, system, or combination thereof to access a block, view a block, use a function associated with a block, edit a block, delete a block, move a block, re-size a block, influence a block, or perform any other operation relative to a block. Permission settings for a particular block in a document may be independent from the permission settings for other blocks located in the same document. For example, a first block may have restrictive permission settings that enable only the author of the document to edit the first block while a second block may have public permission settings that enable any user to edit the second block. As a result, an author of the document may edit both the first block and the second block while a second user (e.g., not an author of the document) would be prevented from making any edits or alterations to the first block and would only be able to do so for the second block. Blocks may be considered "divided" if they are differentiable in some way. For example, blocks may be differentiated by color, font, data type, presentation type, represented by separate data structures, or may be presented in differing areas of a display and/or in differing windows.

In some embodiments, the electronic rule may be embedded within a particular block. Embedding an electronic rule within a particular block may include editing metadata associated with the particular block, adding the electronic rule or an identifier of the electronic rule to metadata associated with the particular block, storing the electronic rule (e.g., in a same storage medium as an electronic word processing document including the particular block), creating a data mapping between the electronic rule and the particular block, or otherwise associating the electronic rule with the particular block. For example, a block may include one or more fields of metadata, and the electronic rule may be inserted into a field configured to associate the electronic rule with the block, which may designate the particular block (e.g., block content or change in block content) as a condition and/or designate the particular block as a recipient of a conditional instruction (e.g., a conditional instruction to edit the block). In some embodiments, an electronic rule may remain embedded within a block, and the electronic rule will still function (e.g., be configured to execute a conditional instruction) even if the block is moved to a different position within an electronic word processing document. For example, if a block is associated with an electronic rule that causes at least one processor to edit the block in response to new information at a web page, and the block is moved from the beginning of an electronic word processing document to the end of the electronic word processing document, the block can still be edited in response to the new information (e.g., through implementation of the electronic rule, which may be represented by metadata of the block). Moreover, in some embodiments, an electronic rule may remain embedded within a block as an electronic word processing document that includes the block is scrolled (e.g., within a web browser application). In some embodiments, embedding the electronic rule within a particular block may include saving the electronic rule within an electronic word processing document that includes the particular block, but not necessarily within a portion of text displayed with the electronic word processing document is displayed. For example, the electronic rule may be saved to HTML code, metadata, or other information linked to the electronic word processing document that is not displayed when the document is open or is open within a particular viewing mode (e.g., a user mode, as opposed to a HTML editor view).

In some embodiments, information related to an electronic rule may be restricted to entities possessing permission for access to the particular block (e.g., when the electronic rule is embedded within the particular block). Information related to the electronic rule may include a condition (which may be influenced by a user, as discussed above), an instruction (e.g., a conditional instruction), a name of an electronic rule, an identifier of an electronic rule, any parameter of an electronic rule, or any combination thereof, consistent with disclosed embodiments. An entity may include a user, user account, group, device, network, network group, or any other device or individual capable of designation for using and/or configuring an electronic rule. Restricting information related to the electronic rule may include reducing or preventing an ability of an entity to view, edit, remove, or otherwise change an electronic rule or portion thereof (e.g., an electronic rule parameter). For example, if the entity is a subset of a group of users, an application running according to user account permissions associated with a user not within the subset may not be able change an electronic rule parameter associated with the electronic rule. Possessing permission for access to the particular block may include being associated with a permission through a data structure (e.g., a permission table), having a user account associated with a permission value (e.g., a Boolean value that activates or deactivates a permission), or otherwise being associated with a value that enables an action with respect to a block. For example, only a user account (or other entity) possessing permission for access to the particular block may be permitted to view a change made to the block based on an electronic rule, consistent with disclosed embodiments. As another example, only a device (or other entity) possessing permission for access to the particular block may be permitted to add a condition (or other electronic rule parameter) to an electronic rule associated with the particular block. For example, the particular block may be associated with (e.g., may include metadata relating to) at least one account identifier, device identifier, network identifier, group identifier, user identifier, or other information delineating at least one criterion, which, when satisfied, causes access to information within the particular block (e.g., an instance of the electronic non-word processing application). In another exemplary embodiment, in response to determining that an entity lacks authorization to access the particular block, the system may omit display of information in the particular block from the unauthorized entity or otherwise prevent the unauthorized entity from interacting with the information in the particular block.

For example, FIG. 11 shows exemplary interface 1100, which may display an electronic word processing document 1102, which may include one or more blocks, such as block 1104a, block 1104b, block 1104c, and block 1104d. Of course, an electronic word processing document may have any number of blocks (including zero blocks). A block, such as block 1104c, may be added to electronic word processing document 1102, modified (e.g., have a change in displayed content and/or non-displayed metadata), or removed from electronic word processing document 1102, such as in response to execution of a conditional instruction, consistent with disclosed embodiments. A block, such as block 1104a, may be associated with one or more permissions (e.g., a permission allowing a particular user to edit a parameter of an electronic rule associated with the block), as discussed above.

Figure 12:
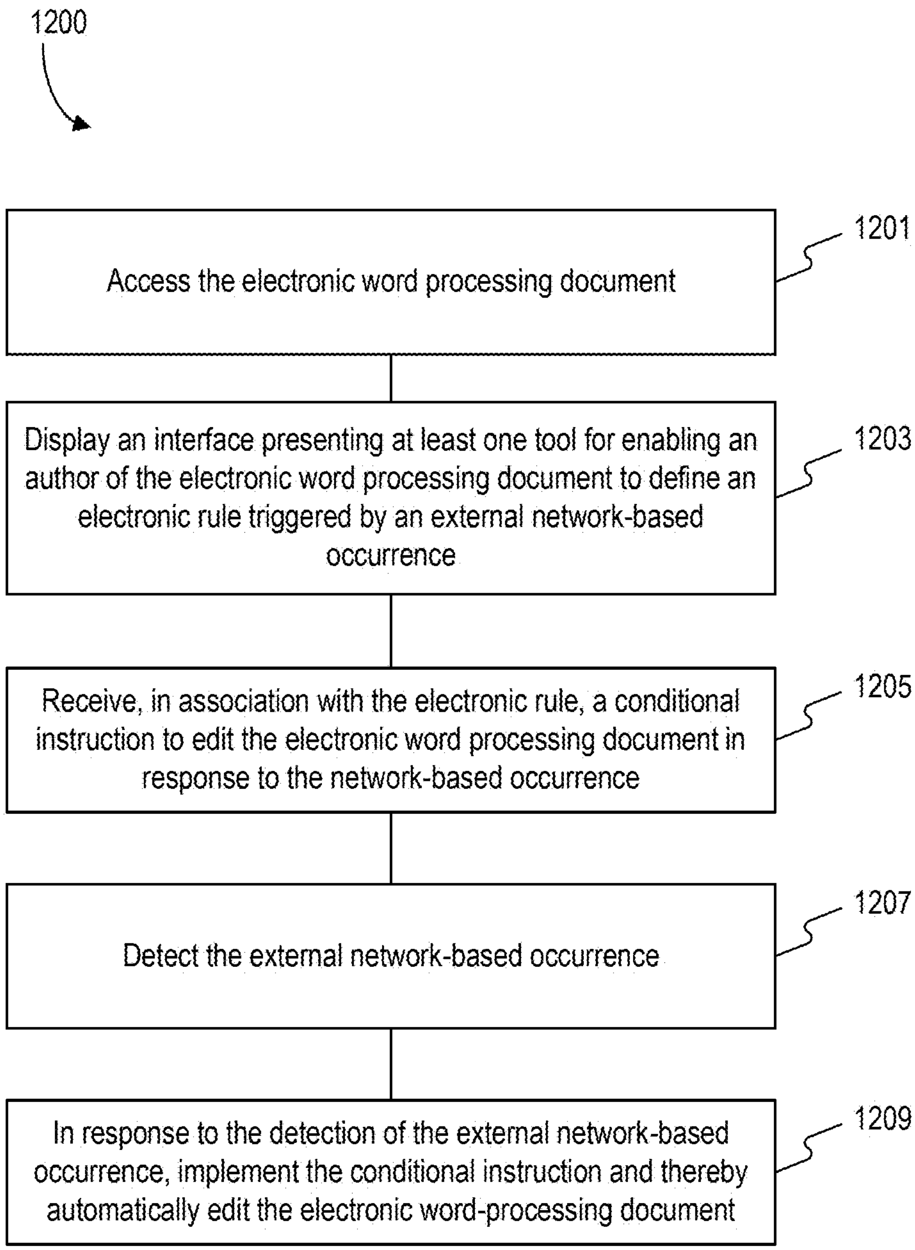
FIG. 12 is a block diagram of an example process for automatically altering information within an electronic document based on an externally detected occurrence, consistent with some embodiments of the present disclosure.

FIG. 12 depicts process 1200, represented by process blocks 1201 to 1209. At block 1201, a processing means (e.g., the processing circuitry 110 in FIG. 1) may access an electronic word processing document (e.g., electronic word processing document 1102 in FIG. 11). At block 1203, the processing means may display an interface presenting at least one tool for enabling an author of the electronic word processing document to define an electronic rule triggered by an external network-based occurrence (e.g., causing the display of interface 900). Consistent with some disclosed embodiments, the interface may include one or more interactable visual elements that may, which interacted with, cause the processing means to configure a portion of an electronic rule.

At block 1205, the processing means may receive, in association with the electronic rule, a conditional instruction to edit the electronic word processing document in response to the network-based occurrence. For example, the processing means may receive a conditional instruction to edit electronic word processing document 1102, such as by adding, removing, or changing a block (or other displayed characteristic of electronic word processing document 1102), such as block 1104d (as shown in FIG. 11). At block 1207, the processing means may detect the external network-based occurrence. As discussed above, the processing means may, for example, use an event listener to determine if data at a source (e.g., a web page) has changed. At block 1209, the processing means may, in response to the detection of the external network-based occurrence, implement the conditional instruction and thereby automatically edit the electronic word processing document. For example, the processing means may execute the received conditional instruction by adding text to electronic word processing document 1102 (as in FIG. 11), such as by adding text within a block.

In electronic word processing systems, it may be beneficial to employ automatic insertion of data to electronic word documents based on external sources. In many instances, rapidly synthesizing information into an electronic word processing document, such as from dynamic sources, can be difficult due to dispersion of data and rigidness of electronic word processing applications. Therefore, there is a need for unconventional innovations for helping to seamlessly insert external data into word processing documents based on external sources and applications.

Such unconventional approaches may enable computer systems to insert a dynamic object into an electronic word processing document according to configurable electronic rules linking text to objects. Having configurable rules influencing the insertion of objects into an electronic word processing document may allow for more rapid configuration of dynamic elements within the document. Additionally, by using automatic object insertion to edit an electronic word processing document, the electronic word processing document may be adjusted more rapidly and integrate dynamic information and/or external application-based features into the electronic word processing document not previously achieved. In some disclosed embodiments, an electronic word processing application may be communicably linked to external data sources, enabling automatic updating of dynamic data objects embedded within the electronic word processing document. In this manner, when data at an external source (e.g., reflected at a specific URL) changes, information within an electronic word processing document may also be automatically updating without any need for intervention. In some disclosed embodiments, an object may be associated with a particular position within editable space of an electronic word processing document, such that the object may reflect live information from an external source even while other portions of the electronic word processing document are editable or being edited. Moreover, the embedded object may continue to reflect live information even if the electronic word processing document is scrolled, even in moments where the embedded object is not displayed. Automatic data insertion through objects embedded within an electronic word processing document may enhance the content of the electronic word processing document by presenting external and/or dynamic information through visual displays not previously integrated with electronic word processing documents. In some embodiments, using automatic data insertion through embedded objects may increase the efficiency and operations of workflow management functionality.

Thus, the various embodiments the present disclosure describe at least a technological solution, based on improvement to operations of computer systems and platforms, to the technical challenge of changing an electronic word document based on detected occurrences.

Disclosed embodiments may involve systems, methods, and computer-readable media for embedding within an electronic word processing document, data derived from a source external to the electronic word processing document. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities.

An electronic word processing document may include a file that may be configurable to store text, a character, an image, an animation, a table, a graph, and/or any other displayable visualization or combination thereof. An electronic word processing document may be configurable to be displayed (e.g., by an electronic word processing application) in a visual form, for example within an interface. For example, an electronic word processing document may be displayed by, manipulable through, or otherwise maintained by an electronic word processing application, consistent with disclosed embodiments. In some embodiments, a displayed form of an electronic word processing document may include a displayed form of information stored by the electronic word processing document, such as text, a table, an image, a graphic, or any other information stored by an electronic word processing document, consistent with disclosed embodiments. In some embodiments, an electronic word processing document may include unstructured data and/or structured data.

Embedding data within an electronic word processing document may include generating a data structure, storing information in a data structure, inserting a data structure into a file or application code, and/or rendering a display of information in the data structure within an interface (e.g., an interface hosted by the electronic non-word processing application) and/or word processing document. In some embodiments, embedding data within an electronic word processing document may include generating, receiving, and/or accessing electronic information, and may include inserting the electronic information into the word processing document. Additionally or alternatively, embedding data within an electronic word processing document may include generating a data structure and placing the data structure within the word processing document. In some embodiments, embedding data within an electronic word processing document may include determining a position within the electronic word processing document at which to embed the data. For example, an electronic word processing application may determine a location within a display of the word processing document selected by a user input (e.g., mouse click), and may determine a corresponding location within an electronic word processing document file or code, such as a location between portions of structured and/or structured data. An electronic word processing application may insert code, such as information from a data structure (e.g., with or without content data) at the determined location. Embedding data within an electronic word processing document may include ignoring and/or removing a user interface element or other data structure associated with (e.g., generated by, maintained by) the electronic word processing application via an interface associated with the electronic word processing application or via a display of an electronic word processing document that may be opened by the electronic word processing application. Additionally or alternatively, embedding data within an electronic word processing document may include configuring an embedded object to carry out its functionality without a user interface element or other data structure associated with the electronic word processing application. In some embodiments, a data structure may be associated with an external source, discussed further below.

A source external to the electronic word processing document may include a web page, a web site, a web portal, a data storage medium, a file, a sensor, or any other structure enabled to display, store, or generate data usable for embedding, independent from the electronic word processing document. For example, a web page may be hosted by a domain that is separate from (e.g., external to) a domain that hosts the electronic word processing document (e.g., through an electronic word processing document application, consistent with disclosed embodiments). As another example, a file stored in a storage medium separate from a storage medium, separate from a storage medium storing the electronic word processing document, may be considered a source external to the electronic word processing document. As yet another example, a sensor, such as a temperature sensor, weather sensor, motion sensor, location sensor, or electronic resource usage sensor, may be considered a source external to the electronic word processing document.

Data derived from a source external to the electronic word processing document may include static data, dynamic data, textual information, visual information, a file, a data structure, content data extracted from a data structure, a calculation result (e.g., a predictive value), a sensor reading, an identifier (e.g., of a user, device, project, system, data source, or network), or any other digital information conveyable by a web page or any other source of information. For example, a web page may convey (e.g., by displaying within a web browser) textual and/or visual information related to a number of physical objects (e.g., products), intangible objects (e.g., stocks, stock prices), or actions (e.g., services, projects). Additionally or alternatively, a web page may display a map identifying one or more locations of a person, group, object, building, or other thing. Additionally or alternatively, a sensor may detect a condition (e.g., temperature, motion, heat, light, sound) and store information indicating the condition to a storage device external to the electronic word processing document. In some embodiments, data derived from a source external to the electronic word processing document may include an application file stored on a storage medium. Of course, other instances of data derivable from a source external to the electronic word processing document are possible.

Consistent with some disclosed embodiments, the at least one processor may be configured to access an electronic word processing document. Accessing the electronic word processing document may include retrieving the electronic word processing document from a storage medium, such as a local storage medium or a remote storage medium. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

In some embodiments, the electronic word processing document may contain text, as well as other types of data, as discussed above. Text may include any combination of one or more alphanumeric characters, non-alphanumeric characters, spaces, carriage return, tab entries, symbols, word processing bullets, or any other displayable character. In some embodiments, an electronic word processing document may contain text that is not displayed when the document is open or is open within a particular viewing mode (e.g., a user mode, as opposed to a HTML editor view). For example, an electronic word processing document may contain HTML text that influences information displayed by the electronic word processing document (e.g., a format, embedded object, embedded widget, embedded non-word processing application) without displaying the HTML text. In some embodiments, an electronic word processing document many contain one or more blocks, as discussed herein. Containing text or other types of data may include storing text or other data within a file or other data structure, displaying text or other data (e.g., within an interface), encapsulating text or other data, or performing any other operation to digitally preserve text or other data.

Some aspects of this disclosure may include the at least one processor being configured to detect an in-line object inserted into text at a particular location. Detecting an in-line object may include discovering, discerning, or otherwise identifying some change in an in-line object. This may occur, for example, by parsing text displayed by an electronic word processing document, parsing text not displayed by an electronic word processing document (e.g., HTML code), parsing metadata associated with an electronic word processing document, determining an identifier of an in-line object (e.g., within HTML code), or any operation of locating a data object associated with information external to the electronic word processing document. An in-line object may include any object that may be insertable between alphanumeric characters where characteristics of the object may be structured to be compatible with characteristics of the alphanumeric characters retrieved from a data structure in a repository. An in-line object may include an alphanumeric character string, space, data structure, text, defined area within an electronic word processing document, electronic link, graphic, program, script, module, widget, instruction set, graphical interface, data structure, and/or any other instance of computerized functionality different from word processing. For example, an in-line object may include a combination of letters (uppercase and/or lowercase letters), numerals, symbols, or any other characters, which may be associated with a particular object (e.g., to be inserted) and/or electronic rule (e.g., URL-based rule). An in-line object may include a data structure for which content data may be sourced and inserted into the data structure. Additionally or alternatively, an in-line object may include a graphic representing an individual or other entity. Additionally or alternatively, an in-line object may include a calendar associated with one or more individuals, projects, devices, systems, networks, or other entities.

In some embodiments, an in-line object may be interactable by a user. For example, when the in-line object is a graphic representing an individual, an electronic word processing application may cause a launching of an email or electronic chat messaging interface in response to detecting a user input (e.g., mouse click) on the graphic. In some embodiments, an in-line object may be a dynamic data object, which may source (e.g., through any combination of API calls, a web page crawler, HTML commands) and display external data, which may change. For example, an in-line object may include a stock ticker graphic, which may display "live" information, such as a present or near-present value of a stock price, which may be determined from an external data source, consistent with disclosed embodiments. Additionally or alternatively, an in-line object may include a weather widget, which may determine (e.g., by parsing an external web page) weather predictions for a particular geographical area and display the weather predictions.

In some embodiments, an in-line object may be inserted into text at a particular location. An object being inserted into text at a particular location may include an object being placed at a defined position within an electronic word document (e.g., a position relative to one or more blocks, relative to lines of text, relative to a page, relative to a paragraph, relative to a length of the electronic word processing document, positioned with respect to any part of a document, or any combination thereof), being associated with (e.g., through a data structure, HTML code, or other data assignment tool) a defined position within an electronic word document. For example, an in-line object may be assigned (e.g., within a data structure, such as HTML source code) one or more position identifiers delimiting a placement for the in-line object within an electronic word processing document. By way of further example, an in-line object may be assigned a first position identifier associated with a first portion of an electronic word processing document (e.g., a block) and a second position identifier associated with a second portion of the electronic word processing document, and may be inserted between the first portion and the second portion.

In some embodiments, an in-line object may be inserted within an electronic word processing document at a particular location in response to one or more inputs. An input may be associated with the in-line object and/or the particular location. For example, an in-line object may be inserted into the text at a particular location in response to receiving a mouse click, keystroke, touch (e.g., on a touchscreen), scroll operation, another electronic input, or any combination thereof. In some embodiments, an in-line object may be inserted based on an input of a particular alphanumeric character string entered within the electronic word processing document, which may be associated with an object and/or electronic rule (e.g., a URL-based rule). By way of example and without limitation, entry of "$YYY" may cause a processing device to insert a stock ticker graphic (e.g., a dynamic in-line object) associated with "YYY" at the location of "$YYY" within the electronic word processing document. As another example, entry of "&99999" may cause a processing device to insert a weather widget (e.g., a dynamic in-line object) associated with a zip code of "99999" at the location of "$99999" within the electronic word processing document. In some embodiments, an in-line object may be inserted based on an input of a particular alphanumeric character string entered within the electronic word processing document followed by an input of a carriage return or tab keystroke. For example, entry of "#ASK" following by entry of a carriage return may cause a processing device to insert a hyperlinked graphic into the electronic word processing document (e.g., which, upon selection, may direct a web browser to a profile page, new email message, social media post, or other interface associated with a person having the initials of ASK). Of course, other keystroke combinations are possible. In some embodiments, an in-line object may be inserted into an electronic word processing document in response to one or more inputs received at an interface. For example, an interface showing a menu of insertable objects may be displayed in response to a mouse click (e.g., a mouse click within an electronic word processing document or associated electronic word processing application), and a processing device may insert an insertable object into an electronic word processing document in response to a selection of one of the insertable objects in the menu. Additionally or alternatively, a processing device may cause the display of a confirmation interface, which may prompt a user to input confirmation of insertion of an in-line object (e.g., in response to input of a particular alphanumeric character string entered within the electronic word processing document followed by an input of a carriage return or tab keystroke). For example, following entry of a string of characters associated with an electronic rule, a processing device may cause the display of a confirmation interface, that prompts a user to enter an input to confirm an insertion of an in-line object associated with the electronic rule, and may insert the in-line object in response to receiving the input. In some embodiments, an in-line object may be manipulable after insertion. For example, an in-line object may be dragged to a different place within an electronic word processing document (e.g., in response to a drag-and-drop input received from a mouse). Additionally or alternatively, an in-line object may be cut, copied, and/or pasted within one or more electronic word processing documents.

Figure 14:
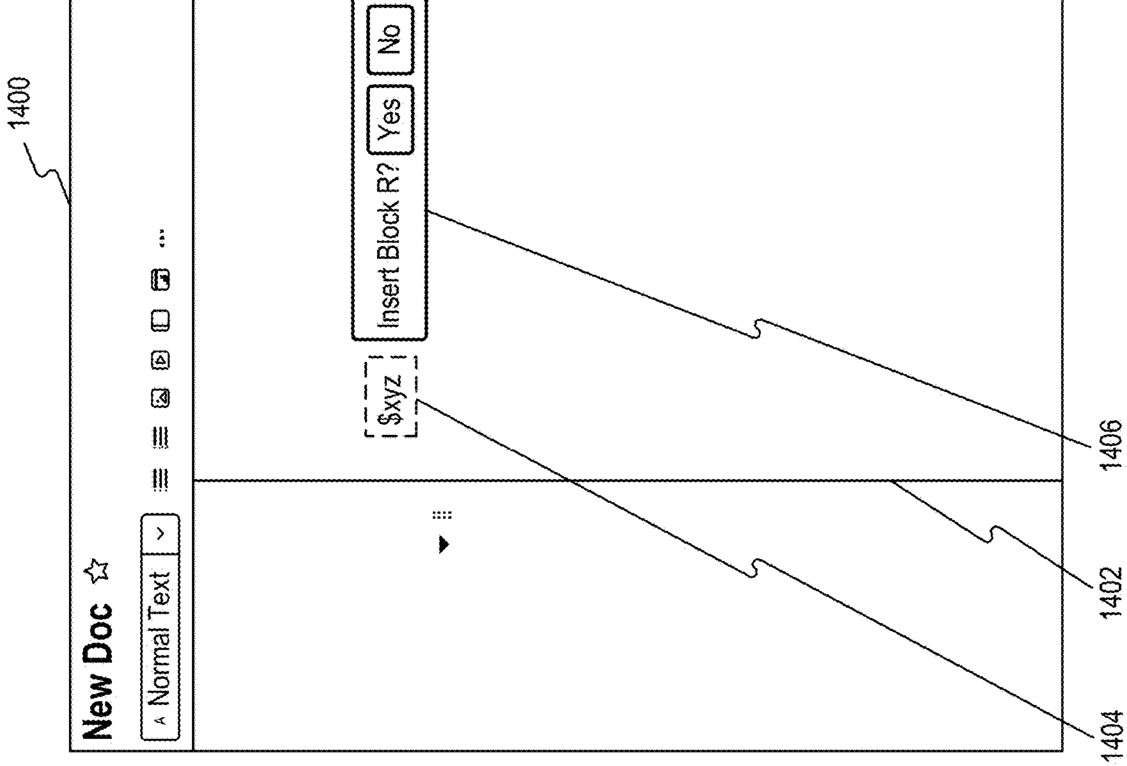
FIG. 14 illustrates an example of an electronic word processing document having text associated with a rule, consistent with some embodiments of the present disclosure.

FIG. 14 illustrates an example of an electronic word processing document having text associated with a rule. In some embodiments, electronic word processing application interface 1400 may display an electronic word processing document 1402, which may contain text, an object, a data structure, unstructured data, an embedded non-word processing application, or any other displayable information, consistent with disclosed embodiments. For example, a text string 1404 may be included in electronic word processing document 1402, such as in response to a processing device detecting keystroke entries corresponding the text string 1404. Of course, electronic word processing document 1402 may include other data patterns or displayed data apart from a text string. In some embodiments, electronic word processing application interface 1400 may display an overlay interface 1406, which may include one or more interactable graphical elements for inserting an in-line object. For example, overlay interface 1406 may include one or more buttons that cause confirming or declining of insertion of an in-line object, which may be associated with text string 1404.

In some embodiments, an in-line object may include a URL-based rule linked to a portion of the text. A URL-based rule may include an if-then statement, a condition, an information source identifier (e.g., URL, IP address, API identifier, client identifier, identifier of a portion of a web page), event listener initialization information, a user identifier, an account identifier, a device identifier, a system identifier, a program, a script, a call, a method (e.g., a Java or other computer programming language method), a conditional instruction, a command, an operation, an input variable, an output variables, an automation associated with an underlying logical rule as described herein, a relationship between at least one variable and a computerized action, or any other parameter associated with at least one variable and a computerized action in association with a resource locating identifier. In some embodiments, an electronic rule may include one or more input conditions, which, if satisfied, cause a particular output. For example, if a processing device detects that a condition for an electronic rule is satisfied, the processing device may perform an operation to change data (e.g., a particular output), such as content data or structure data associated with an electronic word processing document. Additionally or alternatively, an electronic rule may include multiple alternate condition sets, such that if one of the condition sets (which may each include one or more conditions) is satisfied, the electronic rule may produce an output, even if another one of the condition sets is not satisfied (e.g., its conditions are not met). In some embodiments, a URL-based rule may include a URL that directs a processing device to a web page containing information relevant to a condition, a conditional instruction, or other part of an electronic rule. For example, a URL-based rule may include a URL that directs a processing device a web page containing item tracking information, which may be used to update an in-line object, as discussed below.

In some embodiments, a URL-based rule may be linked to a portion of text. Being linked to a portion of text may include an association between a URL-based rule and a portion of, or position within, alphanumerical information an electronic word document (e.g., through a data structure having a text portion identifier and URL-based rule information), metadata associating a URL-based rule and a portion of, or position within, an electronic word document, code (e.g., HTML code) of a word document being configured to place information associated with a URL-based rule at a certain location within an electronic word document, or any other electronic data representation that is configured to cause information associated with a URL-based rule to display at a location within an electronic word processing document. These aspects of URL-based rules may also apply to non-URL-based rules (e.g., rules establishing a particular storage medium as a source of information, without using a URL to locate the storage medium).

In some embodiments, the URL-based rule may include a frequency-based update component. A frequency-based update component may include at least one time period indication (e.g., a value indicating a number of seconds, minutes, hours, days, weeks, months, and/or years), a day-of-the-week indication (e.g., every Thursday), day-of-the-month indication (e.g., the 25th day of a month, the 20th day of every month), time window (e.g., between the hours of 9:00 a.m. and 11:00 a.m.), number of update occurrences, or any other delimiter of when to execute the URL-based rule, or combination thereof. A URL-based rule may be triggered according to one or more frequency-based update components, as discussed below.

In some embodiments, a URL-based rule may include information about a structure of data at an address associated with the URL in a URL-based rule. A structure of data may include at least one layout, format, table, metadata configuration, sequence of elements (e.g., HTML elements), configuration of regions on a web page (e.g., including positioning, size, contained content, or other parameter influencing a data structure or displayed content), size of a displayed element, color of a displayed element, pointer, API, or any other defined format for displaying and/or storing data, or any combination thereof that may be stored in a repository. As mentioned above, a URL-based rule may include a URL (e.g., a web page address for a source of internet located data), and data may be present at an address associated with the URL in the URL-based rule. Information about a structure of data may include text, an HTML element, any indicator of at least one parameter of a structure of data, or any combination thereof. For example, information about a structure of data may include an identification of a portion of a web page (e.g., a first half of a web page, an upper left quadrant of a web page), an HTML element identifier (e.g., an HTML <body> indicator), a column identifier (e.g., a third column), a row identifier (e.g., a fourth row), a container name, or an identification of a portion of a web site (e.g., a group of web pages, a portion of a site map). Data at an address associated with the URL in the URL-based rule may include at least one text segment (e.g., displayed at a web page), dynamic display element (e.g., indicating a current time, sensor reading, location of a movable object (e.g., an object in transit), stock price, predicted (e.g., machine predicted) value, video, image, file, graphic, chart, graph, or any data derived from a source external to the electronic word processing document stored in a repository identifiable by a locating indicator (e.g., an address), discussed above. For example, a web address may be associated with a URL, which may direct a web browser (or other application) to a web page that displays or otherwise provides access to data.

Consistent with some disclosed embodiments, a URL-based rule may be configured to select an internet located data based on context. Context may include at least one of a time of day, geographical area, history of actions (e.g., times and/or types of data changes, possibly associated with a URL or web page), web page layout, data structure, data structure configuration, data format, file, filetype, data type (e.g., text, an image, a video, a link, an advertisement banner), content (e.g., information conveyed by text, such as an identifier of a person, group, place, or object), entity associated with information (e.g., an ultimate and/or intermediate source of information, such as a URL, company, web page identifier, web site identifier, service identifier, application identifier, type of web browser), user accessing data, device accessing data, electronic rule parameter (e.g., URL-based rule parameter), any other information relevant to a selection of internet located data, or any combination thereof. Selecting the internet located data based on context may include using context to determine relevance (e.g., to an electronic rule, such as a URL-based rule) of data content stored in a repository accessible on the internet, determine relevance (e.g., to an electronic rule) of a source of data, determine relevance (e.g., to an electronic rule) of a time associated with data (e.g., determining a last update time, determining a timestamp, determining if data is stale), determine a portion of a web page displaying data relevant to an electronic rule, determine a portion of web page HTML source code expressing data relevant to an electronic rule, determine a portion of a web page displaying data within a similarity threshold of an electronic rule parameter, determine a constraint of an electronic rule associated with a web page or URL, or otherwise applying context to direct analysis of internet located data. For example, at least one processor may determine that a portion of text (e.g., on a web page) satisfies a threshold similarity with a set of characters, words, phrases, sentences, or other alphanumeric combinations, and may select the portion of text in response to the determination. As another example, at least one processor may determine that a portion of a web page displaying an image is irrelevant to a URL-based rule having a conditional instruction to source text from a web page, and may exclude the image from possible selection. Additionally or alternatively, at least one processor may determine (e.g., by parsing data according to a URL-based rule) an identifier that satisfies a parameter of a URL-based rule, such as an identifier of an individual (e.g., a name); an identifier of an activity (e.g., a flight number, tracking number, receipt number, project name, service name), a location identifier (zip code, physical address, latitude-longitude coordinates), an identifier of a physical object (e.g., a product identification number, a vehicle identifier), or an identifier of an intangible object (e.g., stock ticker symbol, HTML element).

In some embodiments, at least one processor may be configured to select internet located data through semantic interpretation of the portion of the text and semantic interpretation of information on a web page associated with the URL-based rule. Semantic interpretation of the portion of text (in an electronic word processing document) may include identifying an alphanumeric sequence (e.g., combination of characters, symbols, words, phrases, sentences, or other alphanumeric objects) as relating to a particular entity, determining one or more alphanumeric characters (e.g., of the portion of text) satisfy a similarity threshold associated with an electronic rule (e.g., the URL-based rule), matching one or more alphanumeric characters (e.g., of the portion of text) to a parameter (e.g., of a URL-based rule), applying a natural language processing (NLP) technique to the portion of text (e.g., by, with respect to the portion of text, using a word embedding, applying an NLP machine learning model, applying a word2vec algorithm or model, applying one or more autoencoders, applying a GloVe algorithm or model). For example, at least one processor may be configured to determine that the portion of text in an electronic word processing document includes a sequence of characters that matches an individual's name or initials (or other identifier, such as an email address), or that the portion of text includes a sequence of characters matching a stock ticker symbol. Additionally or alternatively, at least one processor may determine that the portion of text includes a sequence of characters satisfying a similarity threshold (e.g., predetermined number or percentage of characters in common) with a filename or a web page URL. Additionally or alternatively, at least one processor may apply an NLP learning model to determine that the portion of text indicates a user intent to insert an in-line object corresponding to a particular piece of information (e.g., person, object, action, or any other entity that may be associated with data external to a word processing document).

Semantic interpretation of information on a web page associated with a URL-based rule may include applying a natural language processing (NLP) technique to the information on the web page, parsing text on the web page, applying an optical character recognition operation to information displayed by the web page, application, and/or file, comparing the portion of text (or an electronic rule parameter) to a portion of text displayed on (or otherwise accessible through) the web page, determining that, to within a similarity threshold, the portion of text (or an electronic rule parameter) matches a portion of text displayed on (or otherwise accessible through) the web page, or performing any other semantic interpretation operation, as discussed above with respect to semantic interpretation of the portion of text. For example, at least one processor may determine that at least one sequence of alphanumeric characters on a web page match 80% (an exemplary similarity threshold) of the portion of text or an electronic rule parameter (e.g., another sequence of alphanumeric characters). Additionally or alternatively, at least one processor may determine that a threshold number of keywords (e.g., from a URL-based word associated with the portion of text) are displayed on (or otherwise accessible through) the web page. Additionally or alternatively, at least one processor may determine that one or more keywords (e.g., from a URL-based word associated with the portion of text) appear within one or more threshold distances of each other (e.g., within a number of characters, within a number of words, within a number of sentences, within a same sentence, within a same paragraph, within a pixel distance) on the web page.

Consistent with some disclosed embodiments, at least one processor may be further configured to present a user interface for constructing a URL-based rule. Presenting a user interface for constructing a URL-based rule may include launching an application, determining an information display parameter (e.g., a display size, a display resolution, a selected template associated with a set of rule parameters, a user preference), generating visual information to display, displaying at least one interactable visual element, or performing any other operation to cause the display of a user interface capable of receiving at least one input for constructing logical rules and associating them with links to access data stored in a repository. In some embodiments, a URL-based rule (or any other electronic rule) may be associated with a portion of text through an electronic rule, such as a macro, which may be user-defined. For example, a processing device may construct an electronic rule that associates a string of text (or other data pattern) to a particular object.

Figure 13:
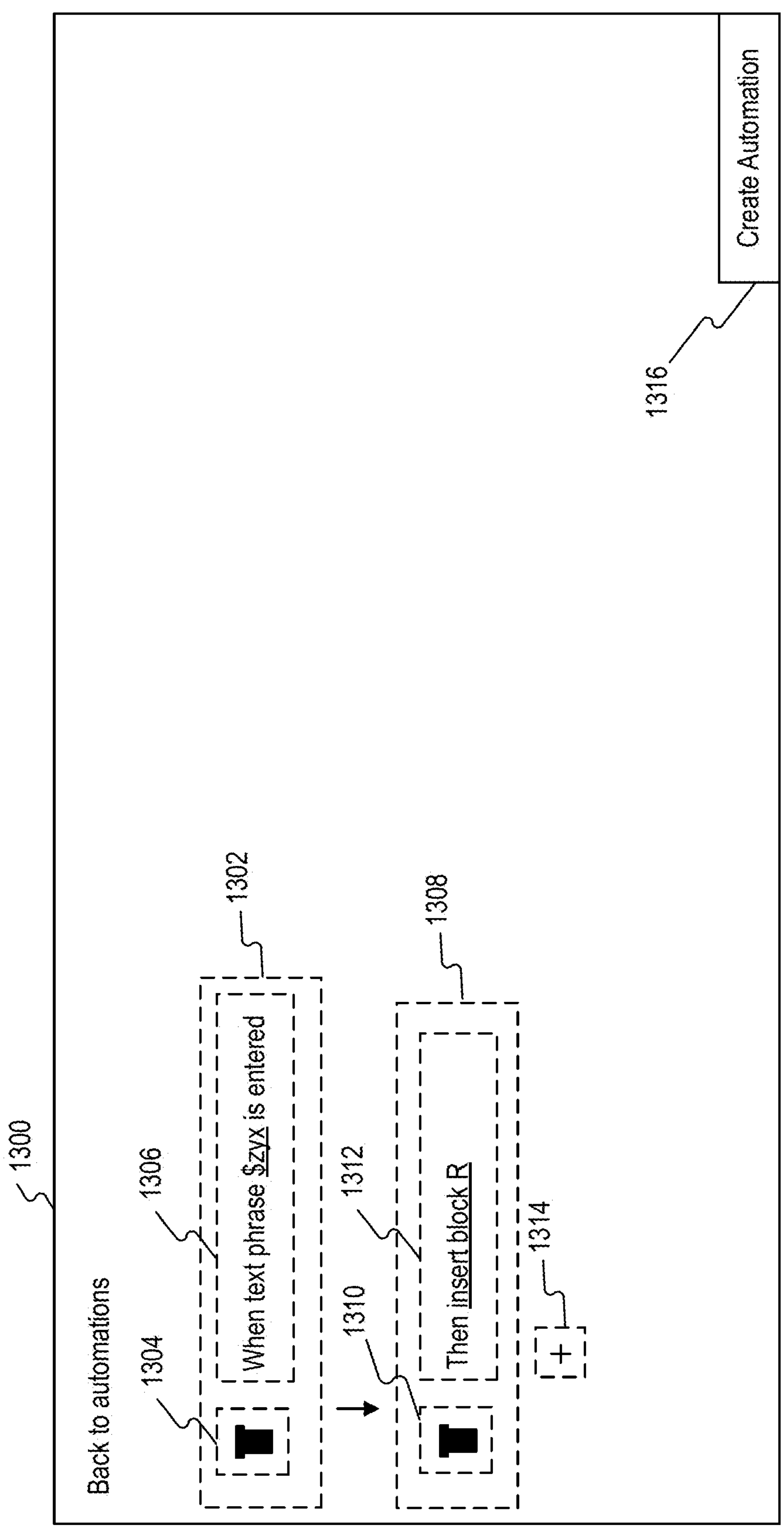
FIG. 13 illustrates an example of an electronic insertion rule construction interface, consistent with some embodiments of the present disclosure.

A processing device may construct an electronic rule in response to one or more inputs received at an interface (e.g., a presented interface). For example, FIG. 13 illustrates an example of an electronic insertion rule construction interface 1300, which may be configured to receive one or more inputs related to generating, editing, or otherwise configuring an electronic rule. One or more inputs may be received in response to a user interaction with an interactable graphical element. For example, interface 1300 may include condition area 1302, which may include a deletion initiator 1304, a condition input area 1306. Of course, multiples of any of these may be displayed within interface 1300. Deletion initiator 1304 may cause (e.g., upon selection) removal of a condition area 1302 and/or deletion of an electronic rule or electronic rule parameter (e.g., associated with condition area 1302). Condition input area 1306 may be configured to receive one or more inputs establishing one or more parameters related to an electronic rule (e.g., a string of text associated with triggering data insertion), consistent with disclosed embodiments. In some embodiments, selection of (e.g., a mouse click on) condition input area 1306 may cause the display of a menu of condition options. Condition input area 1306 may also display text or other visual indicator of a condition, which may have been selected from a menu.

Interface 1300 may also include action area 1308, which may include a deletion initiator 1310 and an action input area 1312. Similar to deletion initiator 1304, deletion initiator 1310 may cause (e.g., upon selection) removal of an action input area 1312 and/or deletion of an electronic rule or electronic rule parameter (e.g., an output action or other operation to be performed when an electronic rule is triggered, consistent with disclosed embodiments). Action input area 1312 may be configured to receive one or more inputs establishing one or more parameters (e.g., a URL, data source, and/or an output action, such as a conditional instruction, which may be an instruction to insert data), related to an electronic rule, consistent with disclosed embodiments. In some embodiments, selection of (e.g., a mouse click on) action input area 1312 may cause the display of a menu of action output options. Action input area 1312 may also display text or other visual indicator of an output action, which may have been selected from a menu. Interface 1300 may also include action addition area 1314, may be configured to receive an input to prompt addition of a parameter (e.g., output action, such as a conditional instruction) to an electronic rule, consistent with disclosed embodiments. Interface 1300 may also include an electronic rule creation initiator 1316. In some embodiments, interaction with (e.g., a mouse click on) electronic rule creation initiator 1316 may cause generation of an electronic rule, consistent with disclosed embodiments.

Consistent with some disclosed embodiments, at least one processor may be configured to execute a URL-based rule to retrieve internet located data corresponding to the URL-based rule. Retrieving internet located data may include accessing data, copying data, associating a timestamp with data, crawling data, downloading data, parsing data (e.g., transforming data from one data format to another), condensing data (e.g., through data compression or selective extraction of data elements, such as according to a condition parameter for an electronic rule), or any action that makes data suitable for use in performing a conditional instruction. Executing the URL-based rule to retrieve internet located data may include carrying out the underling logical rule of the URL-based rule to carry out the action of accessing and transmitting internet located data for at least one processor to further manipulate or store in a repository. Executing the URL-based rule may be carried out manually (e.g., initiated by a user) or may be carried out automatically in response to a condition meeting a threshold, such as a detection of an update or at a defined time interval as discussed above. Internet located data may include at least one of text (e.g., displayed on a web page), HTML text (which may or may not be displayed on a web page, and which may be contained in HTML source code), metadata, a graphic, an image, an animation, a video, audio information, an email, a data structure (e.g., a data structure define in HTML code), API code, application code (e.g., a method defined in code), any other material that may be represented in a digital format, or any combination thereof retrieved from a repository accessible on the internet. Internet located data may be displayed at and/or accessible from (e.g., through parsing HTML source code) a web page. By way of example and without limitation, internet located data may include information related to, or be otherwise associated with: a physical object (e.g., a product), a service, an item identifier, a device identifier, a location (e.g., a zip code, latitude and longitude coordinates, a physical address), a prediction (e.g., weather data, a predicted arrival time, a predicted completion time), unstructured text, an itinerary, a plan, a map, an entity (e.g., a company name), an individual (e.g., a name, birth date, title). In some embodiments, internet located data may be dynamic (e.g., a stock price, a location of a plane in flight). In some embodiments, internet located data may be associated with a particular source or entity, such as a physical object (e.g., a product), a service, an individual, a group, a company, a website, a URL, a web page, an IP address, or any other tangible or intangible thing that may be associated with a dynamic piece of data. For example, at least one processor may locate internet data using at least one identifier associated with an in-line object. For instance, an in-line object may display and/or be associated with (e.g., through metadata, a data structure, or other underlying data representation, which may be linked to an in-line object) at least one identifier, such as a URL, a physical object identification number, a device identifier, a tracking number, a location identifier (e.g., a zip code, a street address, etc.), an individual identifier, or any other data value that may indicate, at least in part, a source of information for an in-line object, which the at least one processor may use to locate internet data. By way of example, an in-line object may be associated with metadata including a tracking number for a physical object in transit, and the at least one processor may the tracking number to determine a source of information (e.g., a web page) associated with information to insert into the electronic word processing document (e.g., within the in-line object, at a location of the in-line object, or overlaying the in-line object. Additionally or alternatively, internet located data may be stored at a remote storage medium and accessed through a web page, API, an FTP interface, any other data transfer interface, or any combination thereof.

Some aspects of this disclosure may include at least one processor being configured to insert a retrieved internet located data into text at a particular location. Inserting the retrieved internet located data into the text at the particular location may include adding, changing, moving, and/or removing: text, metadata, a graphic, an image, an animation, a video, audio information, a data structure (e.g., a block), any other digital information, or any combination thereof, to the electronic word processing document (e.g., as content data represented and/or displayed by the electronic word processing document) such that the data is stored or otherwise associated with the electronic word processing document. For example, the at least one processor may add the retrieved internet located data between characters of text, between lines of text, between blocks, between data structures, and/or at a relative position within an electronic word processing document. For example, the at least one processor may be configured to replace the alphanumeric character string at a particular location within the at least one electronic word processing document, and then add the internet retrieved data at the particular location, such as by adding an in-line object indicating the internet retrieved data. In some embodiments, inserting the retrieved internet located data may include adding a data structure to the electronic word processing document, with the data structure displaying the retrieved internet located data (e.g., as content data). Additionally or alternatively, inserting the retrieved internet located data may include generating a graphic displaying data retrieved from an external source (e.g., internet located data).

Aspects of this disclose may include at least one processor being configured to replace an alphanumeric character string with retrieved internet located data. Replacing the alphanumeric character string with the retrieved internet located data may include removing the alphanumeric character string from the electronic word processing document, generating a data structure, placing a visual element or other representation of information in an electronic word processing document (e.g., at a place from which the alphanumeric character string was removed, a defined position with an electronic word processing document), overlaying a visual element or other representation of information on top of the alphanumeric character string in the electronic word processing document, or any other operation to change an as-displayed alphanumeric character string. In some embodiments, the at least one processor may be configured to replace the alphanumeric character string with a data structure and then populate the data structure with the retrieved internet location data. For example, the at least one processor may remove the alphanumeric character string at a position in an electronic word processing document, insert a dynamic data graphic at the position, and cause the dynamic data graphic to display the retrieved internet location data. For example, at least one processor may replace a text string of #TRACKMAP with a data structure configured to a map and/or list of locations, and may populate the map and/or list using location information of a physical object obtained by accessing a remote source (e.g., retrieving information across the internet using a URL).

Figure 15:
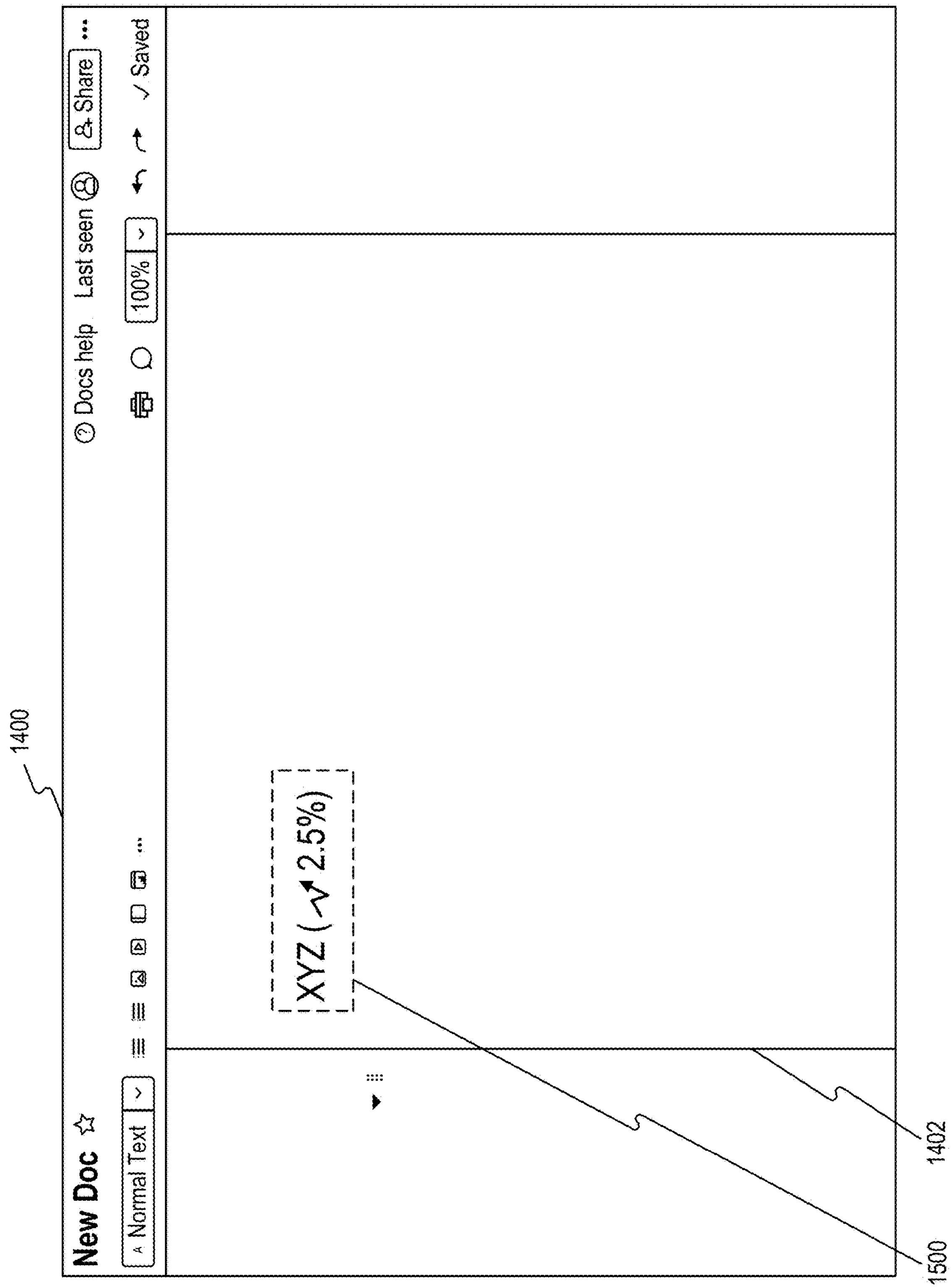
FIG. 15 illustrates an example of an electronic word processing document having an inserted object, consistent with some embodiments of the present disclosure.

As shown in FIG. 15, electronic word processing application interface 1400 may display an electronic word processing document 1402, which may be editable through one or more inputs, consistent with disclosed embodiments. Electronic word processing document 1402 may also include in-line object 1500, which may have been inserted into electronic word processing document 1402 according to one or more inputs (e.g., to electronic insertion rule construction interface 1300). As discussed above, in-line object 1500 may be a dynamic object that changes appearance periodically and/or based on a trigger (e.g., execution of an electronic rule). For example and as shown in FIG. 15, in-line object 1500 may be a stock ticker graphic that may, for instance, update an increase or decrease in a value of a stock in response to data retrieved from an external source. Of course, other dynamic or static in-line objects may also be included in electronic word processing document 1402, as discussed above.

Consistent with some disclosed embodiments, the at least one processing may be configured to trigger a URL-based rule each time an electronic word processing document is launched. Triggering the URL-based rule may include executing (e.g., by a processing device) an operation (e.g., a conditional instruction) in response to a condition meeting a threshold (or a combination of conditions meeting a combination of thresholds). An operation of a URL-based rule may include any functionality such as transmitting a communication (e.g., an API call), receiving a communication (e.g., data to use for updating an electronic file), constructing an API call, translating data (e.g., translating data from one API format to another API format, such as according to a data mapping), parsing data, pulling data, re-arranging data, changing data (e.g., data associated with an in-line object in an electronic word processing document), adding data (e.g., generating and/or inserting into an electronic word processing document any or all of: text, an object, a block, or other visualization of information), displaying data (e.g., as an in-line object), or any other function that can influence data displayable at a device. For example, a URL-based rule may be triggered by a communication from an API indicating that data at a source has changed. Additionally or alternatively, a URL-based rule may be triggered by a processing device parsing data at a source to determine that the data has changed (e.g., using a web page crawler, event listener). In some embodiments, the URL-based rule may be triggered each time the electronic word processing document is launched. Launching the electronic word processing document may include verifying authorization to access the electronic word processing document (e.g., according to a permission) accessing the electronic word processing document, downloading the electronic word processing document, displaying the word processing document (e.g., through an electronic word processing application). In some embodiments, launching the electronic word processing document may cause (e.g., according to an API call, HTML code, or other instruction) execution of an operation to trigger a URL-based rule. For example, the electronic word processing document may be associated with a set of startup instructions, and the triggering of the URL-based rule may be included in the set of startup instructions.

In some embodiments, a URL-based rule may be triggered when a threshold of the frequency-based update component is met. A threshold of a frequency-based update component may include an amount of time (e.g., measured according to a time period indication, as discussed above), a time period, a point in time, or any other delimiter of when to execute the URL-based rule, as discussed above. For example, a threshold of a frequency-based update component may include a value indicating daily at 9:00 a.m. Triggering a URL-based rule when the threshold of the frequency-based update component is met may include comparing a current time value to a time value indicated by the threshold, determining if a current time value matches or exceeds a threshold time value, and/or any aspect of triggering a URL-based rule discussed above. For example, the at least one processor may determine that a URL-based rule includes a frequency-based update component of daily at 9:00 a.m., may determine that a current time is 8:55 a.m., and may delay triggering the URL-based rule for five minutes. Additionally or alternatively, the at least one processor may trigger a URL-based rule based on a history of triggering the rule (e.g., a record generated and stored when a URL-based rule is triggered). For example, the at least one processor may determine that a URL-based rule includes a frequency-based update component of daily (e.g., a 24-hour time period indicator), may determine that the URL-based was last triggered 25 hours ago, may determine that 25 hours exceeds a threshold of 24 hours, and may, based on the determination of the 24-hour time period being exceeded, trigger the URL-based rule. As another example, the at least one processor may determine that a URL-based rule includes a frequency-based update component of weekly, may determine that the URL-based was last triggered 30 hours ago (e.g., based on an electronic word processing document being launched), may determine that 30 hours does not exceed a threshold of one week, and may, based on the determination of the one-week time period not being met or exceeded, not trigger the URL-based rule. Additionally or alternatively, a URL-based rule may be triggered based on a request created in response to a user input. For example, a user may select an interactable graphical element associated with a URL-based rule, and a processing device may cause an output associated with the URL-based rule in response to the user selection. Additionally or alternatively, a URL-based rule may be triggered based on an event listener. For example, an event listener may detect a change to data (e.g., an HTML object), which may satisfy a condition for the URL-based rule and cause an output to be produced, such as by prompting a processing device (e.g., processing circuitry 110) to execute a conditional instruction.

Figure 16:
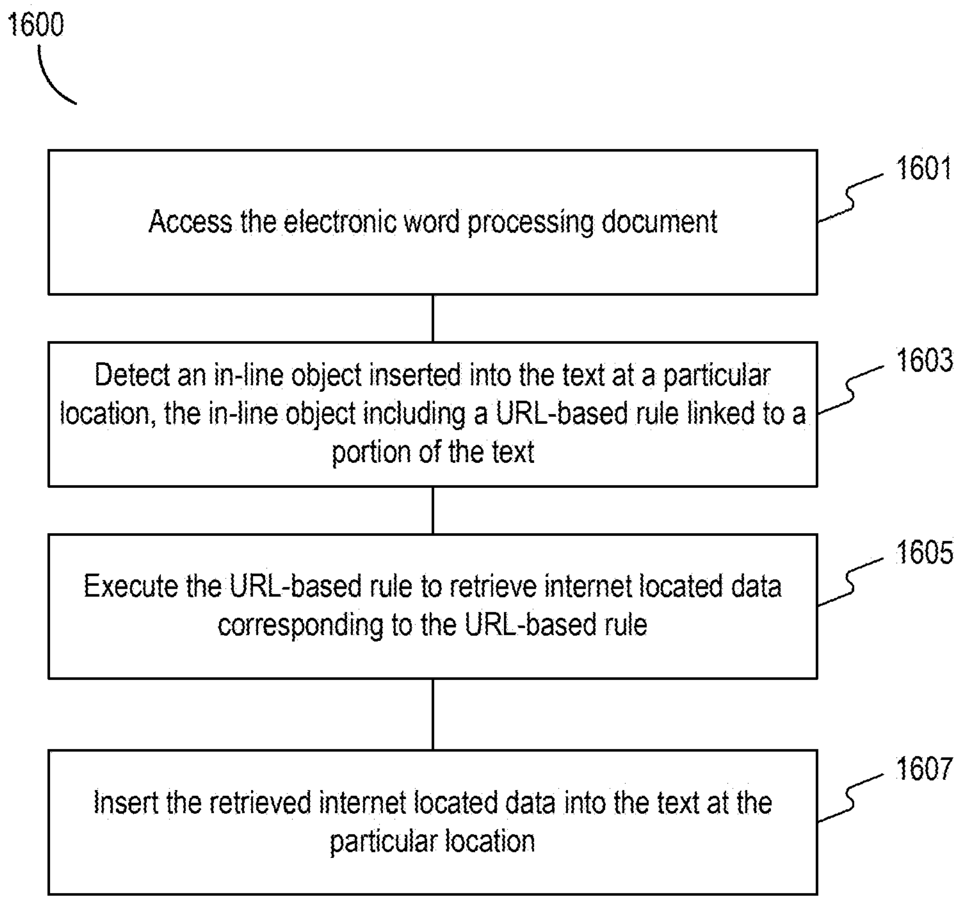
FIG. 16 is a block diagram of an example process for embedding within an electronic word processing document, data derived from a source external to the electronic word processing document, consistent with some embodiments of the present disclosure.

FIG. 16 depicts process 1600, represented by process blocks 1601 to 1607. At block 1601, a processing means (e.g., the processing circuitry 110 in FIG. 1) may access an electronic word processing document (e.g., electronic word processing document 1402 in FIG. 14), consistent with disclosed embodiments. At block 1603, the processing means may detect an in-line object inserted into the text at a particular location (e.g., in-line object 1500 in FIG. 15). Consistent with some disclosed embodiments above, the in-line object may include a URL-based rule linked to a portion of text. In some embodiments, the processing means may detect an in-line object within an electronic word processing document (e.g., electronic word processing document 1402 in FIG. 14), which may be displayed in, or otherwise accessible by, an electronic word processing application interface (e.g., electronic word processing application interface 1400 in FIG. 15).

At block 1605, the processing means may execute the URL-based rule to retrieve internet located data corresponding to the URL-based rule, consistent with disclosed embodiments. For example, user device 220-1 may retrieve internet located data from computing device 100 or DBMS 235-1 in FIG. 2. At block 1607, the processing means may insert the retrieved internet located data into the text at the particular location. For example, the processing means may insert the retrieved internet located data into a portion of an electronic word processing document (e.g., electronic word processing document 1402 in FIG. 14), consistent with disclosed embodiments.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for dynamic work systems. Such systems may involve software that enables electronic word processing documents to include dynamic activity. By way of one example, software may enable various dynamic elements from a live application to be reflected in an electronic word processing document. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

In electronic word processing documents, it may be beneficial to employ a myriad of actions for triggering edits to the document when one or more conditions are met. Ensuring that the information in an electronic word processing document is up-to-date when that information is related to dynamically changing applications external to the electronic word processing document can be daunting when the possible changes to the applications could be endless. Therefore, there may be a need for unconventional innovations for ensuring that data in an electronic word processing document is up-to-date and correct through efficient processing and storing methods.

Some disclosed embodiments may involve systems, methods, and computer-readable media for causing dynamic activity in an electronic word processing document. The systems and methods described herein may be implemented with the aid of at least one processor or non-transitory computer readable medium, such as a CPU, FPGA, ASIC, or any other processing structure(s) or storage medium, as described herein. Dynamic activity, as used herein, may include updating, syncing, changing, manipulating, or any other form of altering information associated with an electronic word processing document in response to an alteration of another source of data or any other trigger or threshold being met. Causing dynamic activity may include carrying out instructions to continuously or periodically update information in an electronic word processing document so that the dynamic activity may be updated in real time or in near-real time. For example, causing dynamic activity may include altering text, images, font size, or any other data present in the electronic word processing document in response to continuous or periodic lookups and detecting a threshold for carrying out an activity, as carried out by steps discussed in further detail below. Electronic word processing document (and other variations of the term) as used herein are not limited to only digital files for word processing, but may include any other processing document such as presentation slides, tables, databases, graphics, sound files, video files or any other digital document or file. Electronic word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration. An electronic word processing document may be stored in one or more repositories connected to a network accessible by one or more users through their computing devices.

Some disclosed embodiments may include accessing an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, as shown in FIG. 2, a user device 220-1 can send a request to access the electronic word processing document to the network 210. The request can then be communicated to the repository 230-1 where the document is stored via the database management system 235-1. The electronic word processing document can be retrieved from the repository 230-1 and transferred through the database management service 235-1 and network 210 for display on the user device 220-1.

By way of example, FIG. 17 illustrates an electronic word processing document 1710, consistent with some embodiments of the present disclosure. As shown in the figure, an electronic word processing document 1710 can include information regarding an itinerary created by a user of the electronic word processing document 1710. For ease of discussion, the electronic word processing document 1710 presented in the figure may be representative of displaying a user's itinerary on a calendar, but, as explained above, it is to be understood that the electronic word processing document can be any digital file.

Some disclosed embodiments may include presenting an interface enabling selection of a live application, outside an electronic word processing document, for embedding in the electronic word processing document. An application consistent with the present disclosure may include any set of instructions or commands for carrying out any number of actions or tasks in relation to a source of data or data object. A live application may be an application that continuously or periodically carries out its instructions. For example, a live application may include a packaged set of instructions for retrieving and displaying data or information such as the price of a stock, the weather for a certain location, flight information, or any other information that may be dynamic. As another example, a live application may include a packaged set of instructions for retrieving static or dynamic data from another electronic word processing document for display or manipulation, such as a graphical representation of a pie chart, status of a project, or any other form of data or metadata present in the other electronic word processing document. A live application outside the electronic word processing document may include a live application hosted by a third party platform independent from the electronic word processing document. For example, a live application outside of the electronic word processing document may include a flight tracking application, a weather application, or any other set of instructions or commands for continuously or periodically carrying out any number of actions or tasks in relation to a source of data or data object hosted by a third party platform independent of the platform hosting the electronic document (e.g., an electronic word processing application). Presenting an interface may include rendering a display of information with activatable elements that may enable interaction with the information through a computing device. An interface enabling selection of a live application may include any rendered display of information that may include options corresponding to different live applications with the same or different functionality such that any of the live applications may be selected through an interaction from a computing device associated with a user (e.g., through an activatable element such as a graphical button). For example, the interface may include a graphical user interface rendering a menu option of one or more live applications that may be depicted by indicators (e.g., graphical, alphanumeric, or a combination thereof) that may be configured to select the corresponding application in response to an interaction with a particular indicator, such as with a mouse click or a cursor hover. In response to a selection of a live application, a user may be enabled to upload electronic word processing documents, elect the data to be embedded, enter a website address along with the relevant data to be embedded, or carry out any other tasks via the interface. As another example, the interface may include a graphical user interface allowing the user to manually identify, via textual or any other sensory form (visual, auditory, or tactile) of input, a data source and/or data set for embedding. Embedding in an electronic word processing document may, in some embodiments, include inserting data or a link within an electronic word processing document. Such embedding may be visible at the user interface level or may occur at the code level. In some embodiments, embedding may involve generating a data structure, storing information in the data structure, and rendering a display of information in the data structure within an electronic word processing document at a particular location of the electronic word processing document or in association with the electronic word processing document, as discussed previously. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

A repository may store data such as an array, linked list, object, data field, chart, graph, graphical user interface, video, animation, iframe, HTML element (or element in any other markup language), and/or any other representation of data conveying information from an application. In some embodiments, embedding in the electronic word processing application may include inserting lines of code (e.g., HTML data) into a file or other software instance representing the electronic word processing document. For example, HTML text may represent the electronic word processing document, and embedding the live application within the electronic word processing application may include inserting lines of code into the HTML text to cause the electronic word processing document to source data (e.g., for rendering within the embedded electronic non-word processing application), which may be content data for an associated data structure. In some embodiments, embedding the live application within the electronic word processing application may include inserting code associated with an API or software development toolkit (SDK) into the electronic word processing application and/or electronic word processing document.

For example, embedding an application in the electronic word processing document may occur when a user selects a position, portion, or region of the document (e.g., the first line of the document) and selects an application to be stored and operated from that position, portion, or region of the document. It should be understood that the user can define how the application is embedded relative to the document layout, the data present in the document, or relative to any other features of the document. For example, a user may embed the application to operate from a static position, such as the bottom right corner of a page of the document, or dynamically, such as in-line with the text of a paragraph so that when a position of the paragraph moves, so too does the embedded application. The system may render an options menu for presenting one or more applications for embedding into the electronic word processing document. The system may perform a lookup of available applications to embed (e.g., through a marketplace or through a local repository) and enable a user to select one or more applications for embedding into the electronic word processing document.

Figure 18:
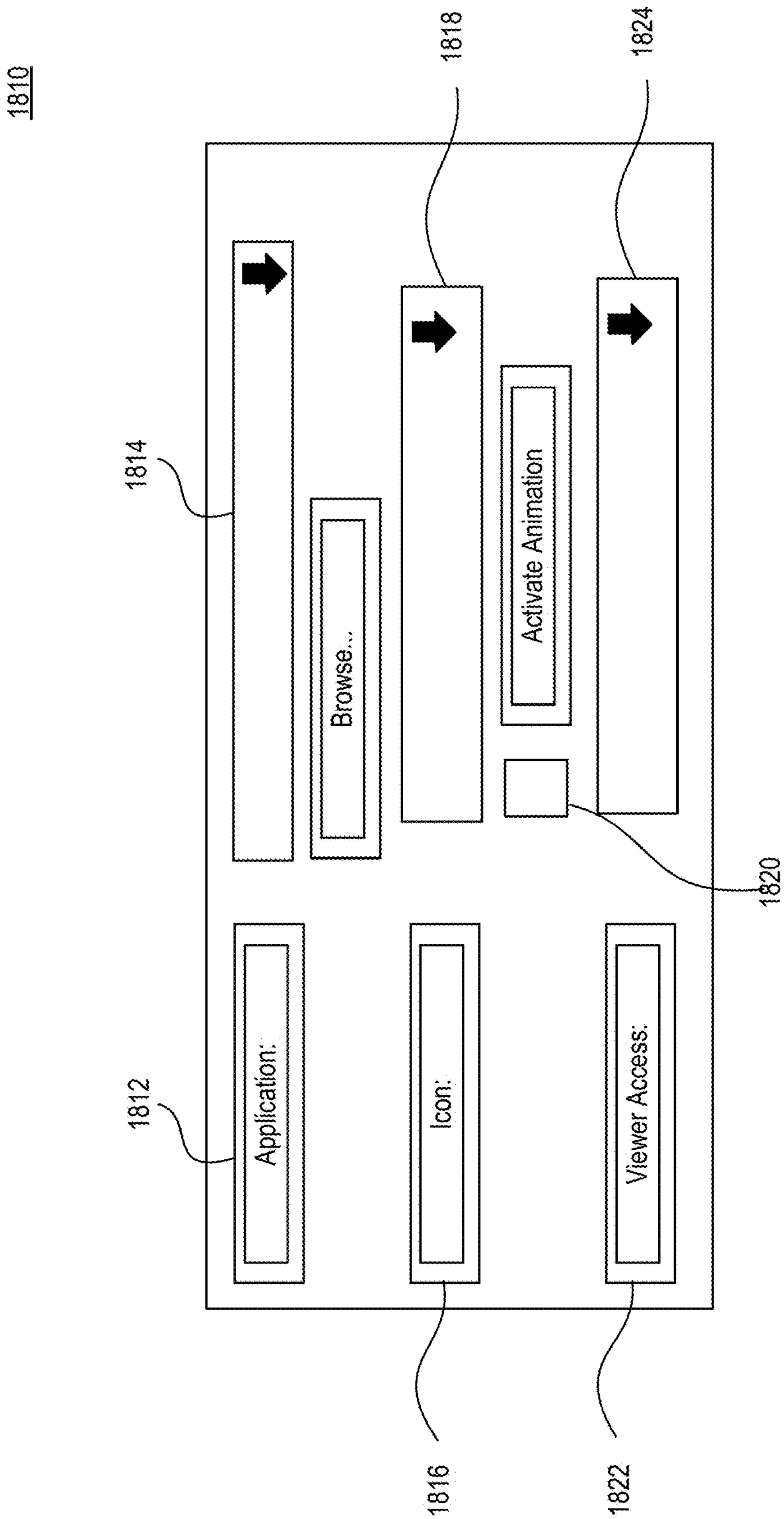
FIG. 18 illustrates an example of an interface enabling selection of a live application, consistent with some embodiments of the present disclosure.

FIG. 18 illustrates an exemplary interface 1810 enabling selection of a live application via indicator 1812, outside the electronic word processing document, for embedding in the electronic word processing document. While not shown, a user may be presented with an interface displaying different applications that may be selected for embedding in an electronic word processing document. In FIG. 18, a user may be enabled to interact with indicator 1812 to confirm a selection of the live application or to change or add a selection of another live application to embed in the electronic word processing document. The live application options may be third party applications hosted by platforms independent of the electronic word processing document. The live applications may be selected for embedding in the document. In FIG. 18, interface 1810 may enable selection of a live application 1812 by interacting with lookup interface 1814 that may enable a user to manually enter text to identify a set of data or information located in a repository, or to upload a new set of information not already stored in a repository. However, it is understood that the selection of a live application is not limited to these embodiments and can be implemented in the any manner as discussed herein or in any manner that allows the user to select an application to act on any selected data for embedding in the word processing document.

Some disclosed embodiments may include embedding, in-line with text of an electronic word processing document, a live active icon representative of a live application. A live active icon as used herein may include symbol, emblem, sign, mark, or any other character graphical representation that may be displayed dynamically (e.g., displayed via animations or displayed according to updates of information). The selection of a live active icon may be automated using automation or logical rules based on the live application or may be selected manually by a user. Embedding a live active icon representative of a live application may include selecting a portion of an electronic word processing document for storing and rendering a graphical representation that may be rendered dynamically and correspond to information associated with a live application, consistent with the methods discussed previously above regarding embedding applications. A live active icon may be said to be representative of a live application in that the live active icon may include a rendering of information related to information in the live application in a reduced or substituted format, discussed in further detail below. Embedding a live active icon in-line with text of the electronic word processing document may include displaying a rendering of a live active icon in a portion of the document that is insertable between alphanumeric characters where characteristics of the live active icon are structured to be compatible with characteristics of the alphanumeric characters retrieved from a data structure in a repository. The data and information stored in the data structure may include the font size, format, color, or any other characteristics of the selected alphanumerical characters. In some embodiments, embedding in-line with text may include sizing a live active icon to correspond to an in-line text font size. Sizing the live active icon to correspond to an in-line text font size may include retrieving and identifying the font size of the alphanumeric characters surrounding the live active icon placement in a data structure and manipulating the rendered display of the live active icon to be equivalent or similar to the size of the alphanumeric characters surrounding the live active icon placement location. Manipulating the rendered display of the live active icon may include altering the size, orientation, imagery, or any other characteristic of the live active icon such that the resulting size of the icon is equivalent or similar to the size of the alphanumeric characters surrounding the live active icon's placement. The sizing of the live active icon may be manually specified by the user, automated based on logical rules, or based on any other manner of defining a process that respond to a condition to produce an outcome. For example, a logical rule could be established to size a display of the live active icon to the maximum in-line text font size that is present in the document as a whole or the maximum in-line font text that is present in the line of text that the live active icon resides in. As a further example, the system may be configured to resolve conflicting sizing requirements in a single embedding. For example, if the font sizes surrounding the placement of the live active icon retrieved from the data structure are not equivalent, the system may size the display of the live active icon to be equivalent to the preceding font size, equivalent to the subsequent font size, an average of both font sizes, or size the live active icon based any other automation, logical rules, or any other defining process that respond to a condition to produce an outcome set by the user or determined by the system.

Some embodiments may include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Figure 19:
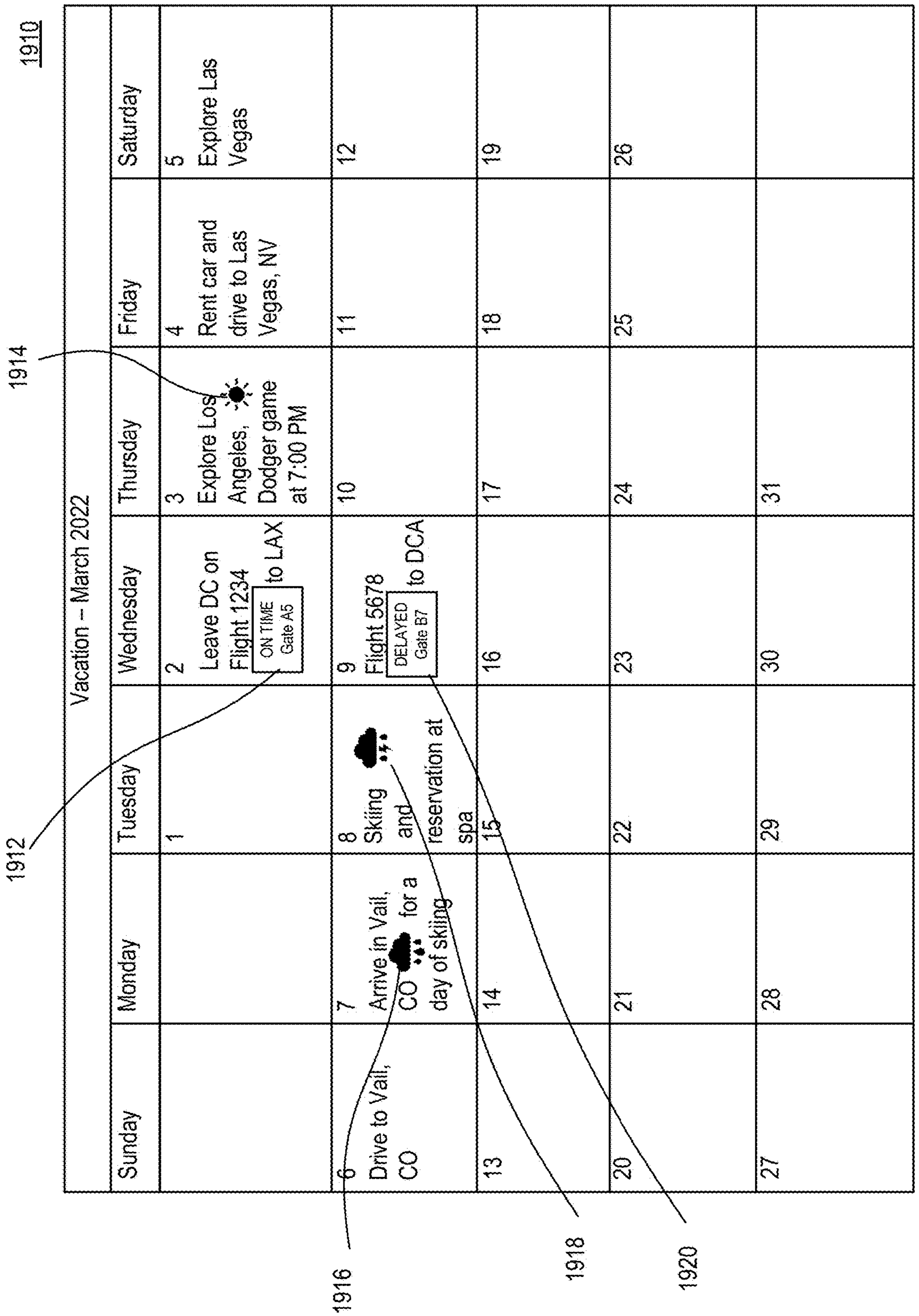
FIG. 19 illustrates an example of an electronic word processing document with embedded live active icons in-line with the text, consistent with some embodiments of the present disclosure.

As illustrated in FIG. 19, the electronic word processing document 1910 may contain live active icons 1912, 1914, 1916, 1918, and 1920, represented by alphanumeric text or graphical representations that are representative of a respective live application, embedded in-line with the text of the electronic word processing document. For ease of discussion, the live active icons present in the figure are representative of the live applications of information related to a flight status and gate information 1912 and 1920 and the weather 1914, 1916, and 1918 for the corresponding days on the calendar, but it is to be understood that the live active icons can be representative of any data that is selected to be included in the live applications. As illustrated, the weather-based live active icon 1914 may correspond to a weather-based, live application and may be depicted with a graphical representation of a sun to represent corresponding information in the live application: the forecasted weather of a sunny day in Los Angeles, CA on Mar. 3, 2022. Similarly, as illustrated, the weather-based live active icon 1916 may be depicted as a graphical representation of a cloud with rain to represent the corresponding information in the weather-based live application that the weather is forecasted to be a rainy day in Vail, CO on Mar. 7, 2022. As illustrated, the weather-based live active icon 1918 may be depicted with graphical representation of a cloud with rain and a lightning bolt to represent the corresponding information in the weather-based live application that is the forecasted weather of thunderstorms in Vail, CO on Mar. 8, 2022. These weather-based active icons may be live in that as the underlying information changes, so too does the graphical representation. For example, weather-based icon 1916 may be rendered with a cloud and rain drops because the live application retrieves forecast information outside the electronic word processing document that rain is expected on March 7 in Vail, CO However, once the forecast information is updated and the application changes its forecast to sunny on March 7 in Vail, CO, the weather-based icon 1916 may be re-rendered with a graphical indication of a sun to reflect the underlying forecast information that has been changed. The underlying data from the live application represented by the live active icons may be determined manually by the user, via a mouse by clicking or hovering on certain data or by any other sensory form (visual, auditory, or tactile) of input, or the data may be determined by the system using logical rules, automation, machine learning, or artificial intelligence. For example, as disclosed above, a user could use the interface 1810 to identify the live application. While not disclosed in FIG. 18, a user may also access the live application and elect certain data from the live application to be represented by the corresponding live active icon. For example, as seen in FIG. 19, the data represented by the live active icon 1914 may be selected by a user accessing the weather tracker live application and selecting the particular data of the expected weather in Los Angeles, CA on Mar. 3, 2022 to be represented by the live active icon. As a further example, once the live application is elected, the system may perform contextual detection on the position of the live active icon in electronic word processing document to determine the relevant data from the live application to be represented in the live active icon. For example, in FIG. 19, once a user selects the live application to be a weather tracker application and selects the position of the live active icon 1914 to be placed in the entry for March 3$^{rd}$, the system may perform contextual detection to analyze the surrounding data in the March 3$^{rd}$ location to determine that the live active icon (and the associated live application) is being applied to represent the particular data from the weather in Los Angeles, CA at 7:00 PM. Once the data from the live application represented by the live active icons is selected, the data may be recorded and stored in a data structure, stored in the metadata of the live active icon, or stored by another other method that allows for the data from the live application to be recorded.

By way of example, FIG. 18 depicts an interface 1810 that may allow a user to choose an icon 1816 to represent the live application 1812 that may be selected for embedding. As represented by the icon selection area 1818 in FIG. 18, the interface 1810 may allow for an icon 1816 to be chosen from a dropdown menu or manually uploaded by the user. FIG. 18 shows an exemplary depiction for these options for selecting an icon, but it is to be understood that the live active icons can be selected in any way that allows for a character to be representative of the live application selected to be embedded.

Some disclosed embodiments may include presenting, in a first viewing mode, the live active icon wherein during the first viewing mode, the live active icon is displayed embedded in-line with the text, and the live active icon dynamically changes based on occurrences outside the electronic word processing document. Presenting, in a first viewing mode, the live active icon, as used herein, may include rendering a display of the live active icon in a first format, such as in the format of an indicator (e.g., graphical, alphanumeric, or a combination thereof) that is representative of the selected data in the live active icon's corresponding live application. Displaying the live active icon embedded in-line with the text may include rendering a presentation of the live active icon in between alphanumeric characters. Dynamically changing, as used herein, may include re-rendering or replacing the icon, changing the icon's color, shape, size, background, orientation, the icon itself, or any other edit or modification in a continuous or periodic basis based on retrieved updates, such as an occurrence outside an electronic word processing document. The live active icons may dynamically change as manually specified by the user, automatically based on logical rules, or based on any other manner of defining a process that respond to a condition to produce an outcome. An occurrence outside the electronic word processing document may include any event that meets a defined threshold according to a condition. For example, an occurrence outside the electronic word processing document may include a flight status changing from "On-time" to "Delayed" because this may meet a defined threshold of any status change. As a result of this flight status change, a system may retrieve this update in a live application across a network, which may cause the display of an associated live active icon to change to reflect the flight status change. Automated dynamic changing may include evaluating if an occurrence has occurred in a live application outside of the electronic word processing document and upon that evaluation, retrieving a display alteration (e.g., a first viewing mode) to apply to the icon from a data structure. A data structure consistent with the present disclosure may include any collection of data values and relationships among them. The data structure may be maintained on one or more of a server, in local memory, or any other repository suitable for storing any of the data that may be associated with a plurality of rules and any other data objects. For example, a live active icon may dynamically change based on the system's evaluation of an occurrence internal or external to the live application, which may then be used to lookup a corresponding icon manipulation in a data structure. Evaluating occurrences outside of the electronic word processing document may include using an application programming interface, scraping text from a data source and comparing that data to the data, for the corresponding live active icon, stored in a data structure and calculating if a change in value has occurred, or any other method of interacting with data outside of the electronic word processing document to analyze the data present at that time. Evaluating occurrences outside of the electronic word processing document may also include establishing triggers for evaluating the data source, such as user defined events, a user defined frequency of evaluation, or any other manner of defining a trigger including user definitions, automation, logical rules, or machine learning.

Figure 20:
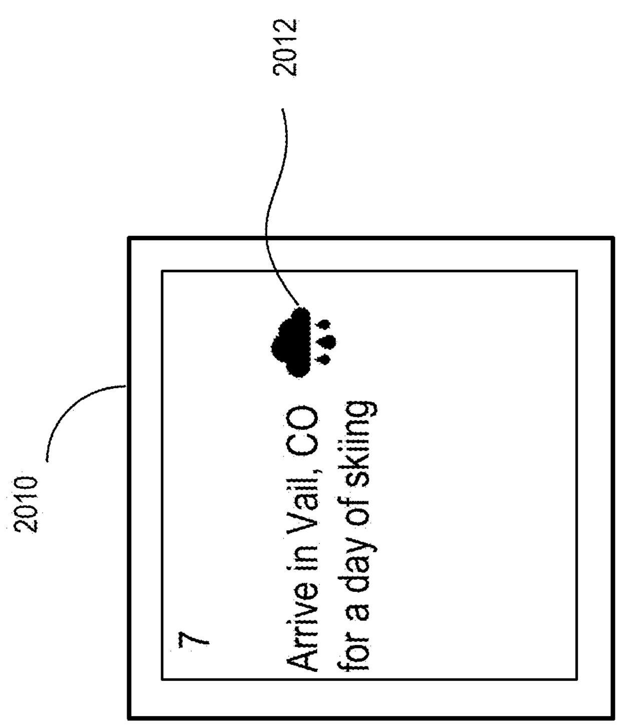
FIG. 20 illustrates an example of a live active icon in a first viewing mode, consistent with some embodiments of the present disclosure.
Figure 21:
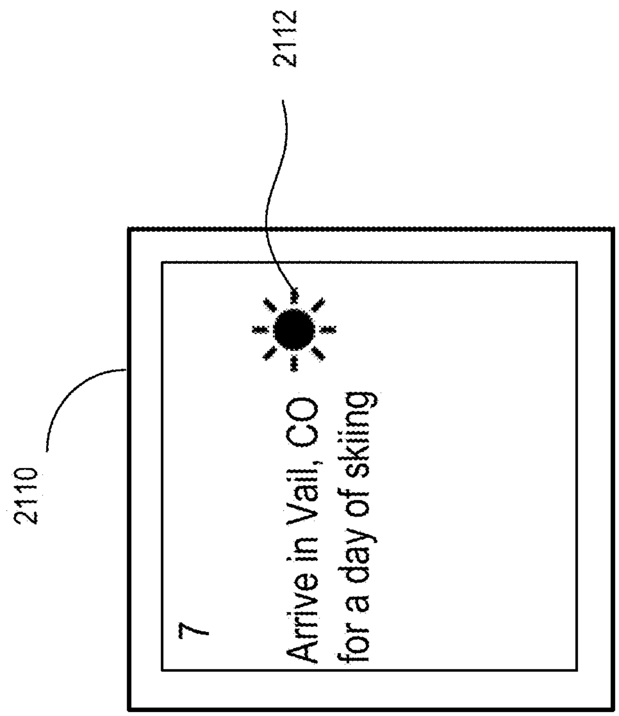
FIG. 21 illustrates an example of a live active icon that has dynamically changed based on occurrences outside the electronic word processing document, consistent with some embodiments of the present disclosure.

FIG. 19, FIG. 20, FIG. 21, FIG. 22, FIG. 23, and FIG. 24 depict exemplary live active icons in a first viewing mode in-line with the text in the electronic word processing document. As illustrated in FIG. 20, and FIG. 21, a live active icon 2012 depicting the live application's forecasted weather in Vail, CO on Mar. 7, 2022 can dynamically change from depicting a live active icon 2012 depicting the live application's rainy forecast to a live active icon 2112 depicting the live application's updated sunny forecast in response to the change in forecast of the live application. FIG. 20 and FIG. 21 depict a live active icon dynamically changing due to the occurrence of an updated weather forecast, but it should be understood that a live active icon as described herein can dynamically change based on any evaluation of data within or outside the electronic word processing document.

Displays of live active icons may also be chosen as a group, family, or any other organization of live active icons. For example, in selecting the live application of weather in Vail, CO, as shown in FIG. 19, a user may select a family of weather based live active icons to represent the live application and its underlying data. In this example, the live active icon could dynamically change to any other live active icons within the family including clouds with rain, clouds with lightning, the sun, or any other icon depicting a weather phenomenon.

In some embodiments, an interface may be configured to enable selection of abridged information for presentation in a first viewing mode. Abridged information for presentation, as used herein, may include any reduction of information (e.g., less than all of the information) that may be displayed in a display format for viewing. Enabling selection of abridged information for presentation may include presenting all or some of the information contained in a live application, receiving an input to instruct the processor to select an amount of information less than the original presentation of all or some of the information, and displaying the selected amount of information as the abridged information. For example, a live application may act on underlying data regarding flight status with a particular airline retrieved from the particular airline's web site. The system may be enabled to receive a selection of information in the live application to select only the flight status itself (e.g., on-time, delayed, canceled) and not the rest of the information in the live application such as the flight number, departure date, and any other information. As a result, the system may present the flight status in a graphical manner as the live active icon that may be embedded in an electronic document. Abridged information may also include data retrieved from the running of an automation, logical rules, machine learning, or artificial intelligence. For example, the abridged information to be presented in the first viewing mode could be based on contextual detection. The system may analyze the text surrounding the position of the live active icon, the data present in the live application, or any other data available to the system to determine which information from the live application to include in the first viewing mode for the live active icon. As another example, the system may use contextual detection to determine the type of information present in the live application (e.g., a flight tracking application or a weather tracking application) to lookup that type of data in a data structure to find the corresponding abridged information to select to include in the first viewing mode. Similar to the example above regarding using the flight status as the abridged information, instead of the system receiving a selection of the information to determine which information to use as the abridged information, the system may automatically detect that the flight status and gate information should be used as the abridged information based on semantic analysis of the particular airline's website providing the underlying information and data. Additionally, the determination of the abridged information to include in the first viewing mode could be performed using automation, logical rules, machine learning, or any other manner of analyzing a data source to determine the data is relevant to include in the first viewing mode.

By way of example, FIG. 19 depicts live active icons 1912 and 1920 in the first viewing mode containing abridged information of the flights that may be dynamically changed on the corresponding days of the itinerary in the electronic word processing document 1910 including the flight status and departure gate. The abridged information present in the display of the live active icons 1912 and 1920 may be selected manually by the user or automatically by the system using contextual detection, automation, logical rules, machine learning, or any other manner of analyzing a data source (e.g., the airline's website) to determine the relevant data to include in the first viewing mode.

In some embodiments, a live active icon may include an animation that plays in-line with the text during the first viewing mode. An animation that plays, as used herein, may include any visual display of the live active icon in a manner that visually changes or otherwise re-renders to display different information. For example, an icon may visually change in color to show a change in temperature over time. In another example, the icon may be visually depicted to represent movement, such as a graphical representation of an airplane with a moving propeller prop (e.g., via a GIF, video clip, or any other sequence of visual representations). In another example, the live active icon may rotate between different modes of display such that the live active icon displays different amounts of information in each mode. For example, a live active icon may alternate between a graphical display of an airplane, which may then switch to a display of alphanumerics including flight status or other flight information. The method of manipulating the live active icon to show changes or edits may include a sequence and may include implementing a user defined manipulation or a manipulation based on logical rules or any other manner of defining an output for a corresponding input. For example, a user may elect to animate the selected live active icon to be embedded, to which the system would retrieve the corresponding animation for the selected live active icon from a data structure. Playing in-line with the text during the first viewing mode, as used herein, may include using animations that do not alter the position or placement of the live active icon with respect to the surrounding alphanumeric characters when the live active icon is displayed in the first viewing mode as discussed previously above.

Figure 22:
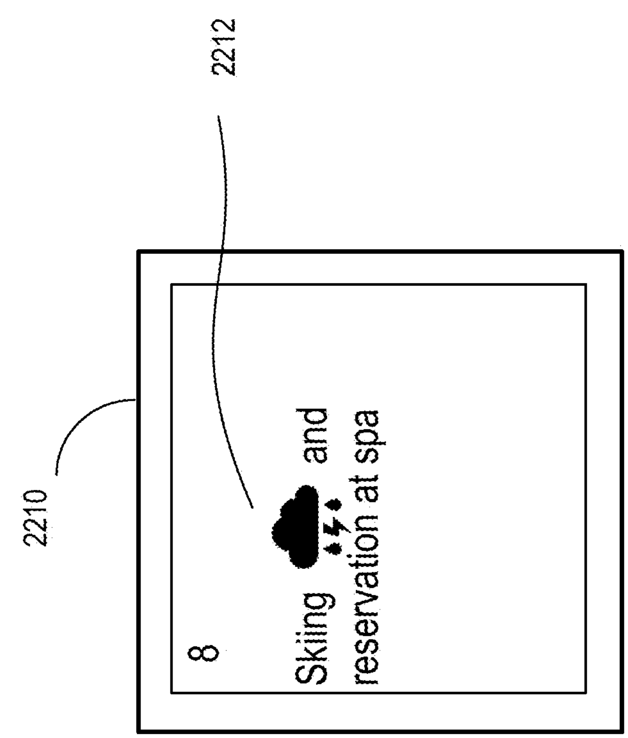
FIG. 22 illustrates an example of a live active icon in a first viewing mode, consistent with some embodiments of the present disclosure.
Figure 23:
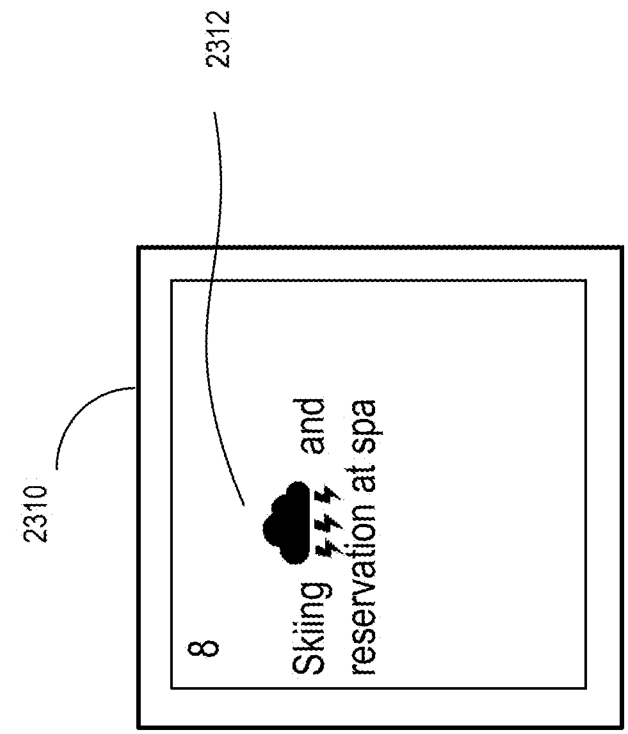
FIG. 23 illustrates an example of a live active icon with an animation that plays in-line with the text during the first viewing mode, consistent with some embodiments of the present disclosure.

By way of example, FIG. 18 depicts an interface 1810 that allows a user to select indicator 1820 to elect the live active icon to be animated. By way of example, in FIG. 22 a live active icon 2212 is depicted representing the weather based live application's forecast for Vail, CO on Mar. 8, 2022 as having thunderstorms where the live active icon 2212 is rendered with a cloud with rain and a single lightning bolts. The animation of that live active icon 2312 is illustrated in FIG. 23 where the live active icon 2312 is re-rendered as a cloud without rain but with three lightning bolts. The animation of the live active icon in FIG. 22 and FIG. 23 is shown in a two-step sequence, but it should be understood that an animation may manipulate a live active icon is any number of sequences and may manipulate the live active icon in any manner.

Some disclosed embodiments may include receiving a selection of a live active icon. Selecting the live active icon, as used herein, may include the use of a keyboard or a pointing device (e.g., a mouse or a trackball) by which the user can provide input (e.g., a click, gesture, cursor hover, or any other interaction) to an associated computing device to indicate an intent to elect a particular live active icon that may be displayed on an associated display of the computing device. Other kinds of devices can be used to provide for interaction with a user to facilitate the selection as well; for example, sensory interaction provided by the user can be any form of sensory interaction (e.g., visual interaction, auditory interaction, or tactile interaction).

Figure 24:
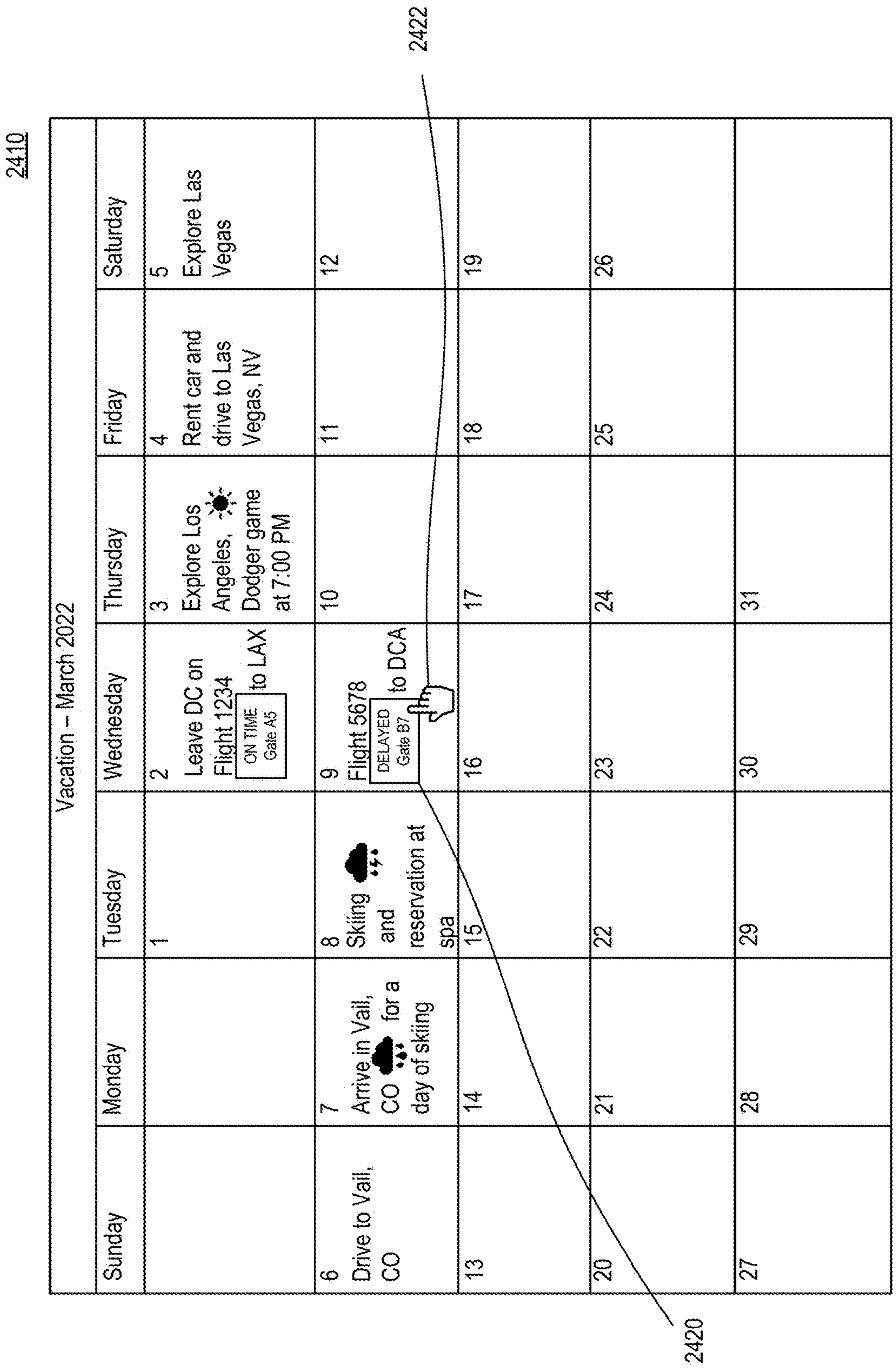
FIG. 24 illustrates an example of receiving a selection of the live active icon, consistent with some embodiments of the present disclosure.

By way of example, FIG. 24 shows the input of a selection of a live active icon 2420 can be performed using a pointing device 2422.

Some disclosed embodiments may include, in response to a selection, presenting a second viewing mode, an expended view of a live application. Presenting a second viewing mode may include rendering a visual representation that may be rendered dynamically and correspond to information associated with a live application as well as using an auditory device, tactile device, or any other form of sensory feedback. The information included in the second viewing mode may include more, less, or the same data present in the first viewing mode (e.g., the rendering of the live active icon). An expanded view of the live application may include a display of additional information related to the live application or any other form of sensory feedback including additional information relative to the live application, which may be rendered on a larger area of a display than that of the first viewing mode. The information to be included in the second view as used herein may include live application data manually identified by the user or data identified based on logical rules, automation, machine learning, or any other manner of identifying relevant data to include in the expanded view. For example, the system may use contextual detection to determine the type of data present in the live application and use that classification to find the corresponding data to be presented in a second viewing mode based on a relationship stored in a data structure. In some embodiments, the at least one processor is configured to present the second viewing mode in an iframe. In some embodiments, the live active icon in a first viewing mode may have an appearance corresponding to imagery present in the expanded view. The appearance of a live active icon may include the rendered display of a live active icon to the user, the animation or sequence of a live active icon, the data or metadata of a live active icon, or any other sensory feedback associated with the live active icon. Imagery present in the expanded view may include images, alphanumerics, text, data, metadata, video, sound, or any other sensory feedback that is present within the display of information relative to the live application. An appearance corresponding to the imagery present in the expanded view may include dynamically changing the appearance of a live active icon to possess similar data, text, color, alphanumerics, images, or any other sensory feedback present in the expanded view. For example, the processor may detect the information present in an expanded view (e.g., full information from a live application) and look up a rule for a corresponding appearance stored in a data structure for the live active icon (e.g., abridged information). The corresponding appearance may correlate with the full information in an expanded view. For example, a live application in an expanded view may include a visual display of multiple depictions of racecars racing around a track. In a corresponding live active icon (e.g., the first viewing mode), the live active icon may contain a visual rendering of a single racecar (similar imagery) or a checkered flag (different but related imagery) to correspond to the imagery in the expanded view. Further, the system may use contextual analysis based on the classification of a live application (e.g., determining a live application possesses information related to an airplane flight) to determine which data present in the expanded view to include in the live active icon (e.g., the flight's status and gate information). Additionally, the appearance of a live active icon may change form from an image to text, text to animation, audible output to another form of sensory feedback, or from any first appearance to a second appearance. For example, a live active icon may initially be depicted as a sun to reflect imagery present in an expanded view consisting of a sunny weather forecast. If the system's connection with the live application were to be interrupted, the exemplary expanded view may consist of an "error" message, and as such, the live active icon may dynamically change from the sun to a text-based live active icon depicting "ERROR."

Figure 25:
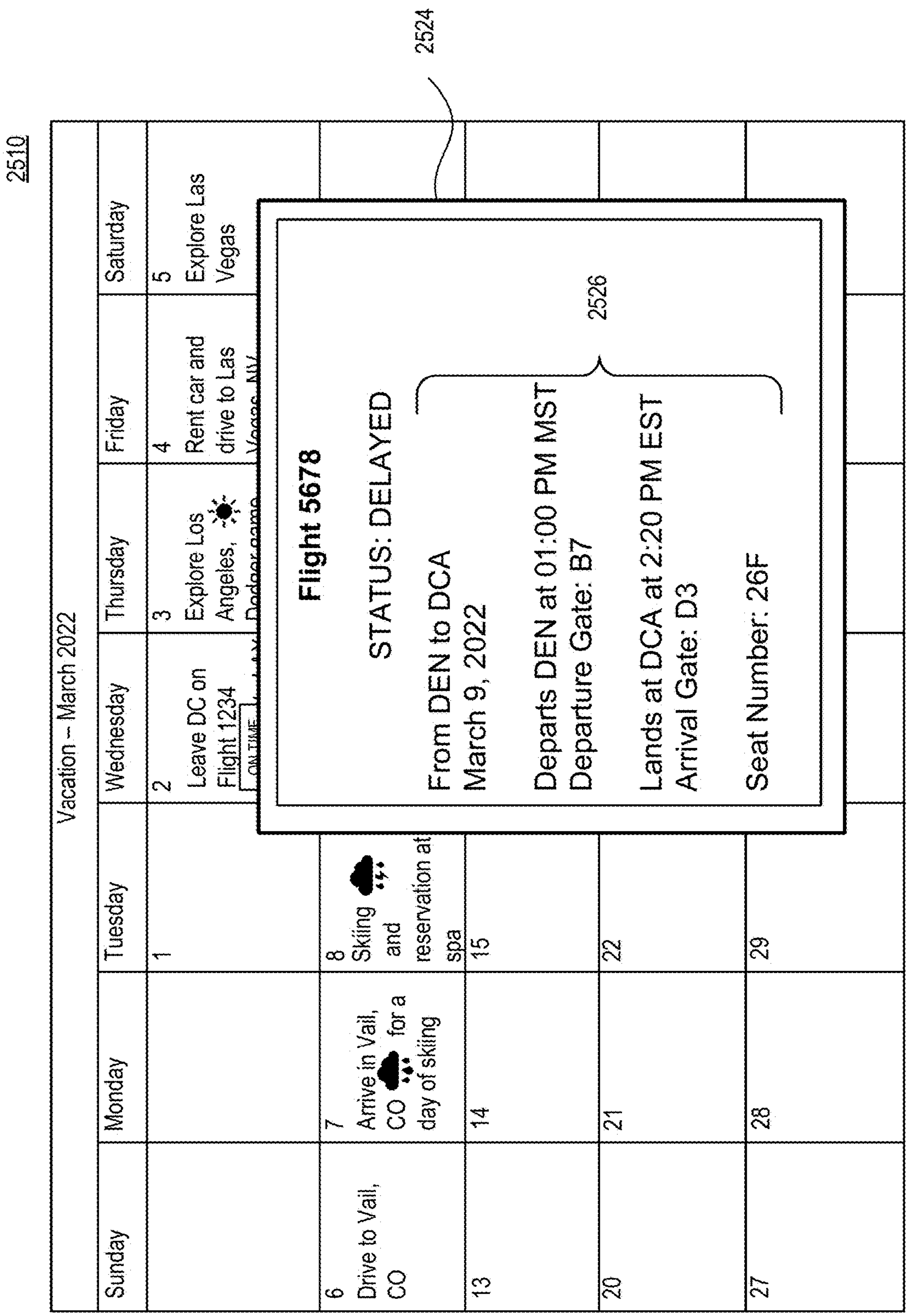
FIG. 25 illustrates a second viewing mode, an expanded view of the live application consistent with some embodiments of the present disclosure.

By way of example, in FIG. 25, in response to the selection of active icon 2420 with cursor 2422 of FIG. 24, a second viewing mode 2524 may be presented that includes additional information 2526 from the corresponding live application. In other embodiments, the system may have stored the underlying data to display additional information 2526 as all, or less than all but more than the information included in the live active icon, of the information that is normally presented in the live application (e.g., the second viewing mode 2524). As a result of embedding a live active icon (e.g., live active icon 2420 of FIG. 24) that is associated with the live application, the system may present abridged information from the live application for the live active icon 2420. For example, second viewing mode 2524 presents all, or less than all but more than the information included in the live active icon, information including additional information 2526 in FIG. 25. Corresponding live active icon 2420 of FIG. 24 may present abridged information to display only "DELAYED" and "Gate B7," which represent part of all of the available underlying information associated with the live application (as presented in the second viewing mode 2524 of FIG. 25).

Further, in FIG. 24, the appearance of an exemplary live active icon 2420 in its first viewing mode contains text corresponding to the displayed additional information 2526 in the expanded view 2524 of FIG. 25. The text included in the appearance of the exemplary live active icon 2420 of FIG. 24 may be set by the user, retrieved from a data structure, determined by rules, automation, machine learning, artificial intelligence, or any other method of analyzing data and formulating an output.

In some embodiments, an interface may include a permission tool for enabling selective access restriction to at least one of a live active icon or an expanded view. Enabling selective access restriction may include altering a presentation of at least a portion of information in an electronic word processing document, altering a user's interaction with a portion of information in the electronic word processing document, or any other method of restricting access to a portion of information in the electronic word processing document to prohibit or otherwise reduce a user's ability to view or edit a particular portion of information. An expanded view may include a presentation of information that is more substantive than the presentation of information in a live active icon, consistent with the discussion above regarding the second viewing mode for presenting information of the live application. For example, enabling selective access restriction may include enabling selectable portions of the live active icons or their expanded views in the electronic word processing document to be altered visually (e.g., redacted, blurred, or another other visual manipulation) or changing the settings of the electronic word processing document such that only authorized users can interact with the selected portions or the entirety of the information displayed in either the live active icon or in the expanded view. A permission tool as used herein may include graphical user interface elements or any other manner enabling the support of the management of the input, display, and access of users attempting to interact with or access information associated with a live active icon or the expanded view (e.g., the live application).

By way of example, FIG. 18 depicts an interface 1810 allowing a user to control access, via permission indicator 1822, by entering control settings into permission menu indicator 1824 which can allow the user to select from a dropdown menu or manually enter names of parties that are allowed to access the live application or extended view. However, it should be understood that the manner of enabling the support of the management of the input, display, and access of users attempting to interact with a live active icon or the expanded view should not be limited to these examples.

Some disclosed embodiments may include receiving a collapse instruction. A collapse instruction, as used herein, may include a command signal indicating an intent to reduce or obscure the presentation of information. Receiving a collapse instruction may include receiving the command signal by the use of a keyboard or a pointing device (e.g., a mouse or a trackball) by which the user can provide input to a computing device, or through the lack of an instruction to default to the collapse instruction (e.g., a time out threshold is reached for inactivity). Other kinds of devices may include providing for a collapse instruction as well; for example, a sensory instruction provided by the user (e.g., visual instruction, auditory instruction, or tactile instruction). Further, the collapse instruction may be transmitted based on a corresponding rule, retrieved from a data structure, dependent on the data present in the second viewing mode or based on a permission tool parameter (e.g., allowing the user, as a part of the permission tool, to set a maximum duration that other users may view the second viewing mode). Some disclosed embodiments may include, in response to the collapse instruction, reverting from the second viewing mode to the first viewing mode. Reverting from the second viewing mode to the first viewing mode, as used herein, may include closing or otherwise obscuring the second viewing mode or any other manner of transitioning from the seconding viewing mode to the first viewing mode.

By way of example, as illustrated in FIG. 24 and FIG. 25, reverting from the second viewing mode 2524 of FIG. 25 would result in the live active icon returning to its first viewing mode 2420 as shown by FIG. 24. This may be a result of a user, through an associated computing device, sending an instruction to the system to revert to the first viewing mode via a collapse instruction. This collapse instruction may be received when the user's cursor 2422 selects an activatable element that sends the collapse instruction to the system, or when the user's cursor 2422 stops moving in the display over a period of time (that may be a default or defined), in which the system may also default to interpreting this as a collapse instruction. The collapse instruction may also be received when the user's cursor 2422 selects a different live active icon or when the user's cursor 2422 selects any part of the electronic word processing document external to the second viewing mode 2524.

Figure 26:
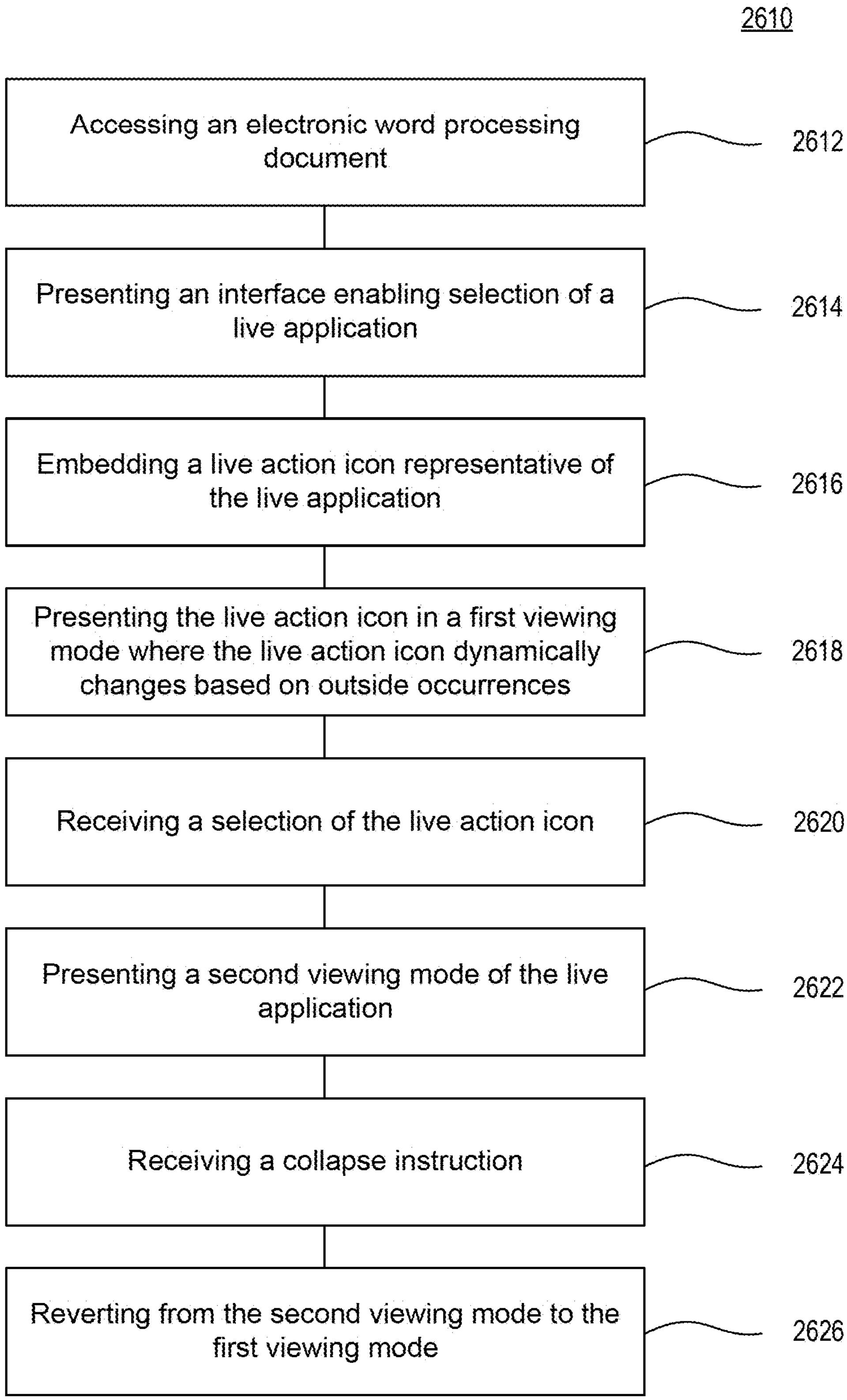
FIG. 26 illustrates a block diagram of an example process for causing dynamic activity in an electronic word processing document, consistent with some embodiments of the present disclosure.

FIG. 26 illustrates a block diagram of an example process 2610 for causing dynamic activity in an electronic word processing document. While the block diagram may be described below in connection with certain implementation embodiments presented in other figures, those implementations are provided for illustrative purposes only, and are not intended to serve as a limitation on the block diagram. In some embodiments, the process 2610 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 17 to 25 by way of example. In some embodiments, some aspects of the process 2610 may be implemented as software (e.g., program codes or instructions) that are stored in a memory (e.g., the memory portion 122 in FIG. 1) or a non-transitory computer-readable medium. In some embodiments, some aspects of the process 2610 may be implemented as hardware (e.g., a specific-purpose circuit). In some embodiments, the process 2610 may be implemented as a combination of software and hardware.

FIG. 26 includes process blocks 2612 to 2626. At block 2612, a processing means (e.g., any type of processor described herein or that otherwise performs actions on data) may access an electronic word processing document, consistent with some embodiments of the present disclosure.

At block 2614, the processing means may present an interface enabling selection of a live application. The live application may be outside the electronic word processing document and the selection may be made for embedding the live application in the electronic word processing document, as previously discussed in the disclosure above.

At block 2616, the processing means may embed a live active icon representative of the live application. The live active icon may be embedded in-line with text of the electronic word processing document, consistent with the discussion above.

At block 2618, the processing means may present the live active icon in a first viewing mode where the live active icon dynamically changes based on outside occurrences. The live active icon in the first viewing mode may be embedded in-line with text of the electronic word processing document, consistent with the discussion above.

At block 2620, the processing means may receive a selection of the live active icon, as previously discussed in the disclosure above.

At block 2622, the processing means may present a second viewing mode of the live application. The second viewing mode may be an expended view of the live application, consistent with the discussion above.

At block 2624, the processing means may receive a collapse instruction, as previously discussed in the disclosure above.

At block 2626, the processing means may revert from the second viewing mode to the first viewing mode, as previously discussed in the disclosure above.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for dynamic work systems. Such systems may involve operations that enable electronic word processing documents to include dynamic activity. By way of one example, operations may enable various dynamic elements from an external file to be reflected in an electronic word processing document. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

In electronic word processing documents, it may be beneficial to employ a myriad of actions for triggering edits to the document when one or more conditions are met. Ensuring that the information in an electronic word processing document is up-to-date when that information is related to dynamically changing files external to the electronic word processing document can be daunting when the possible changes to the applications could be endless. Therefore, there may be a need for unconventional innovations for ensuring that data in an electronic word processing document is up-to-date and correct through efficient processing and storing methods.

Some disclosed embodiments may involve systems, methods, and computer-readable media for automatically updating an electronic word processing document based on a change in a linked file and vice versa. The systems and methods described herein may be implemented with the aid of at least one processor or non-transitory computer readable medium, such as a CPU, FPGA, ASIC, or any other processing structure(s) or storage medium, as described herein. Electronic word processing documents (and other variations of the term) as used herein are not limited to only digital files for word processing, but may include any other processing document such as presentation slides, tables, databases, graphics, sound files, video files or any other digital document or file. Electronic word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration. An electronic word processing document may be stored in one or more repositories connected to a network accessible by one or more users through their computing devices.

Automatically updating an electronic word processing document may include carrying out instructions to sync, change, manipulate, or any other form of altering information associated with an electronic word processing document. Such automatic updating may occur in response to a change in a linked file, or vice versa (e.g., causing an automatic update to the linked file in response to a change in the electronic word processing document), or any other trigger or threshold being met. It should be understood that all embodiments and disclosures discussed and disclosed herein do not have to operate in a certain order (e.g., variable data element to corresponding data in the external file, data in external file to corresponding variable data element). As such, all changes, updates, edits, or other manipulations should be understood to occur in any manner, sequence, direction, and do not possess a structured order. Updating may be initiated by the user or by the system based on a trigger or threshold being met. A linked file may include any electronic document that may be associated with or otherwise have an established relationship with the electronic word processing document. A linked file may also include another electronic word processing document, files or data external to the electronic word processing software or application, or any other type of file or set of data (e.g., presentations, audio files, video files, tables, data sets). A change in a linked file may include any update, alteration, manipulation, or any other form of variation to the data present in a linked file in its entirety or to a portion, region, block, or section of the data present in a linked file including metadata. Detecting a change in a linked file may involve receiving an API call (or other type of software call) regarding a change to the entirety or a portion, region, block, or section of a linked file. Detecting a change in a linked file may also include the system storing the data present in a linked file in a data structure and periodically accessing the linked file to evaluate if the data present in the linked file has changed, such as scraping HTML text of the file, when compared to the data from the linked file stored in the data structure. The periodic evaluation of the data present in the linked file may be established by a user at any time interval (e.g., every millisecond, second, minute, hour, day, or any other increment) or may be set established by the system using an automation, logical rules, machine learning, artificial intelligence, or any other manner of establishing a time interval based or event dependent based evaluation of data present in a linked file.

By way of example, FIG. 27 illustrates an electronic word processing document 2710, consistent with some embodiments of the present disclosure. As shown in the figure, an electronic word processing document 2710 can include information regarding a schedule created by a user of the electronic word processing document 2710. For ease of discussion, the electronic word processing document 2710 presented in the figure may be representative of displaying a new hire orientation schedule created by the user that is to be distributed to the listed speakers and new hires, but, as explained above, it is to be understood that the electronic word processing document can be any digital file.

Some embodiments may include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Some disclosed embodiments may include accessing an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, as shown in FIG. 2, a user device 220-1 may send a request to access the electronic word processing document to the network 210. The request can then be communicated to the repository 230-1 where the document is stored via the database management system 235-1. The electronic word processing document can be retrieved from the repository 230-1 and transferred through the database management service 235-1 and network 210 for display on the user device 220-1.

Some disclosed embodiments may include identifying in an electronic word processing document a variable data element, wherein the variable data element may include current data presented in the electronic word processing document and a link to a file external to the electronic word processing document. A variable data element may include any text, image, alphanumeric, video file, audio file, or any other information present in an electronic word processing document that may be subject to automatic updates such that the information in the variable data element may be considered to be dynamic information. Identifying a variable data element in an electronic word processing document may include analyzing the information present in the electronic word processing document to automatically detect if any information possesses a link to an external file. Identifying a variable data element in an electronic word processing document may also include the system accessing a data structure to identify the current data presented in the electronic word processing document that is stored in the data structure to correspond to a variable data element with its corresponding link(s) to external file(s). In additional embodiments, identifying a variable data element may include a manual selection of static information in an electronic document to designate that the selection is a variable data element that may be reconfigured to include dynamic information (e.g., by linking the selected information to an external file). Current data presented in the electronic word processing document, as used herein, may include any information (e.g., image, text, alphanumeric, video file, audio file, or any other data) present in the electronic word processing document that may correspond to a variable data element. A variable data element may include a link to a file external to the electronic word processing document. A link to a file external to the electronic word processing document may include a functioning hyperlink that may be activated or triggered to access and retrieve data in a separate electronic document from the electronic word processing document within the system or external to the system. Activating the link may cause the processor to retrieve information in an external file from a storage medium, such as a local storage medium or a remote storage medium. For example, the link may include a text hyperlink, image hyperlink, bookmark hyperlink, or any other type of link that may allow the system to retrieve the external file from a separate storage device or a third party platform independent from the electronic word processing document. A file external to the electronic word processing document may include a file hosted by a third party platform independent from the electronic word processing document, a file separate from the electronic word processing document, or any other collection of data outside of the electronic word processing document (e.g., audio files, video files, data files, etc.). In some embodiments, an external file may include an additional electronic word processing document. In some embodiments, the current data may include text of the electronic word processing document and the link may include metadata associated with the text. As discussed above, the variable data element may include current data presented in the electronic word processing document and a link to a file external to the electronic word processing document. The variable data element may include current data in the form of text (e.g., the text "DEAL PENDING") that may be configured to be dynamic. The link may include metadata associated with the text in a manner that reflects the semantic meaning of the text in the current data. For example, when the variable data element includes the text "DEAL PENDING" in a first electronic document, the link between the variable data element to the external file (e.g., a second electronic document) may be an activatable hyperlink with tagged information indicative of the status of the variable data element as pending or incomplete. In this way, the tagged information in the form of metadata may be retrieved and presented on a display, or may be transmitted across a network to the external file (e.g., the second electronic document) so that the status of the variable data element in the first electronic document may be transmitted without the need for an additional accessing or retrieving of information step of data in the first electronic document to decrease processing times and decrease memory usage.

By way of example, FIG. 28 illustrates a file 2810 external to an electronic word processing document 2710 of FIG. 27, consistent with some embodiments of the present disclosure. As shown in FIG. 28, the file 2810 external to an electronic word processing document 2710 may be another electronic word processing document and can include information regarding a schedule created by a user. For ease of discussion, the file 2810, external to the electronic word processing document 2710, as illustrated in FIG. 27, presented in the figure may be representative of displaying a new hire orientation schedule created by the user, but, as explained above, it is to be understood that the file external to an electronic word processing document can be any collection of data outside of the electronic word processing document. For ease of discussion, in the particular example depicted by FIG. 28, the external file 2810 is a new hire orientation schedule prepared by the Human Resources department of a company that is organizing the new hire orientation. As such, for this discussion, only employees in the Human Resources department may have access to the planning document. As discussed in more detail below, a variable data element may be designated from current data in an electronic document such as electronic document 3010 of FIG. 30. The current data in the electronic document may be in the form of textual information such as variable data elements 3012, 3014, and 3016.

In some embodiments, the at least one processor may be further configured to present an interface in an electronic word processing document for enabling designation of document text as a variable data element and for enabling designation of a file as a source of replacement data. Presenting an interface in the electronic word processing document may include rendering a display of information with activatable elements that may enable interaction with the information through a computing device. It should be understood that the rendering of this display may occur within the electronic word processing document, outside of the word processing document, in an iframe, or in any other manner of rendering the display to the user. An interface enabling designation of a variable data element may include any rendered display of information that may include options corresponding to different data present in the electronic word processing document with the same or different functionality such that any of the data present in the electronic word processing document may be selected through an interaction from a computing device associated with a user (e.g., through an activatable element such as a graphical button). Designation of a variable data element may include the use of an interface allowing the user to manually identify, via interaction with a computing device associated with the user, textual input, or any other sensory form (visual, auditory, or tactile) of input, data or sets of data, including document text (e.g., alphanumerics, graphics, or a combination thereof), present in the electronic word processing document to be a variable data element. Designation of a variable data element may also include the processor implementing logical rules, automations, machine learning, or artificial intelligence (e.g., semantic analysis) to determine and designate information in an electronic document as a variable data element. For example, an interface may allow a user to designate document text present in an electronic word processing document as a variable data element by using an interface allowing the user to select the document text through an interaction from a computing device (e.g., a mouse, keyboard, touchscreen, or any other device) associated with a user. An interface enabling designation of a file as a source of the replacement data may include any rendered display of information that may include options corresponding to different files with the same or different functionality such that any of the files may be selected through an interaction from a computing device associated with a user (e.g., through an activatable element such as a graphical button). Designation of a file as a source of the replacement data may include allowing the user to manually identify and assign, via textual or any other sensory form (visual, auditory, or tactile) of input, an external file using an interface that allows the user to upload the identification information of the file (e.g., a web address, a file location, or any other address or file path). The user may also designate a file as a source of replacement data by manually entering, via textual or any other sensory form (visual, auditory, or tactile) of input, the identification information of the file in-line with the text or other data contained in the electronic word processing document. A source of replacement data, as used herein, may include any electronic file containing data or information (e.g., text, images, data, alphanumerics, video files, audio files, or any other data in the external file) that the user or system selects to correspond to or is otherwise linked or associated with the current data (e.g., document text) in the electronic word processing document represented by a variable data element such that if there is a change in the source replacement data in the external file, the current data of the corresponding variable data element in the electronic word processing document will change to match or reflect a change in the replacement data. For example, the user may utilize an interface to select document text present in the electronic word processing document to be designated as current data for a variable data element and use the interface to manually enter the file location of the external file and identify the replacement data in that file corresponding to the selected variable data element. As another example, the system may allow the user to identify the relevant file(s) and replacement data and store the data, and replacement data, of the relevant file(s) in a data structure. The system may then perform contextual analysis, or any form of automation, machine learning, semantic analysis, or artificial intelligence, on the current data present in the electronic word processing document to suggest, recommend, or identify data present in the electronic word processing document to be designated as current data for a variable data element linked to one or more of the replacement data in the relevant files identified by the user. The system may store the variable data element, the link(s) to the corresponding external file(s), and the replacement data in those files in a data structure.

Figure 29:
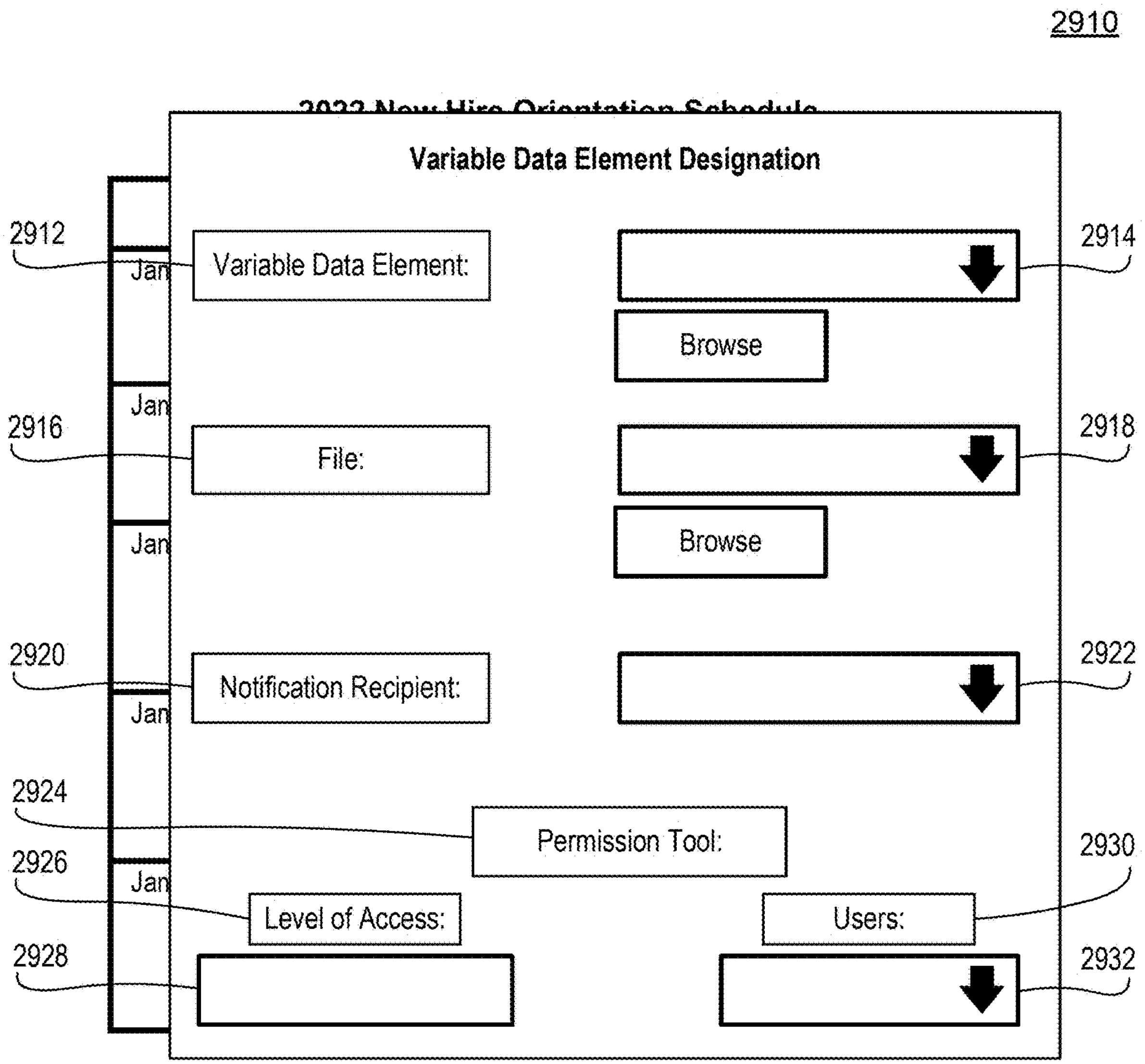
FIG. 29 illustrates an example of an interface enabling designation of document text as a variable data element, designation of a file as a source of replacement data, and permissions to be set on a variable data element, consistent with some embodiments of the present disclosure.

FIG. 29 illustrates an exemplary interface 2910 enabling designation of current data in the electronic word processing document 2710 of FIG. 27 as a variable data element via activatable element indicator 2912, consistent with some embodiments of the present disclosure. In FIG. 29, a user may be enabled to interact with indicator 2912 to confirm a selection of current data or to change or add a selection of another set of current data to designate as a variable data element. This may involve selecting a location in the electronic document to select data, or may involve a manual interaction with the current data in the electronic document (e.g., highlighting textual information) to make the selection. In FIG. 29, interface 2910 may enable designation of current data as a variable data element 2912 by interacting with lookup interface 2914 that may enable a user to manually enter text to identify current data located in the electronic word processing document 2710 of FIG. 27 or enable a user to browse the electronic word processing document 2710 of FIG. 27 and manually interact with the document to select current data as a variable data element. While not shown in this figure, it should be understood that the lookup interface 2914 may also feature a drop-down menu that allows the user to view all or filter by types of data present in the electronic word processing document 2710 of FIG. 27 for designation as a variable data element. For example, a user may interact with the lookup interface 2914 to view a rendered menu of all image files (e.g., JPG, PNG, etc.), retrieved from a data structure storing all data present in the document, present in the electronic word processing document 2710 of FIG. 27 and select an image from the menu to designate as a variable data element. In FIG. 29, an exemplary interface may also enable designation of a file via activatable element indicator 2916 as a source of replacement data, consistent with some embodiments of the present disclosure. A user may interact with lookup interface 2918 that may enable a user to manually enter identification information of a file (e.g., web address, file location, etc.) or enable a user to upload an external file. While not shown in this figure, it should be understood that the lookup interface 2918 may feature a drop-down menu allowing the user to designate recent files, or any other classification of files, as the source of the replacement data. Further, while not shown in this figure, it should be understood that the interface 2910 may allow a user to access the identified external file to identify the replacement data in the external file (e.g., specific data, a specific cell, a region of a document, the document in its entirety, etc.).

FIG. 30 illustrates an exemplary electronic word processing document 3010 containing current data that has been designated as variable data elements 3012, 3014, and 3016, consistent with some embodiments of the present disclosure. For ease of discussion, the text that has been designated as variable data elements 3012, 3014, and 3016 is displayed in bold and italics. However, it should be understood that a variable data element can be displayed in any manner distinguishing the data of the variable data element or in any manner not distinguishing the variable data element data from other data. For example, a data that has been designated as a variable data element may be displayed with a small icon next to the data, may change color once designated, may change font style, may change size, or may be displayed with any other distinguishing feature or without distinguishing features.

Some disclosed embodiments may include accessing an external file identified in a link. Accessing an external file identified by a link may include retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), and/or any other suitable communication method that provides a medium for exchanging data. Accessing an external file may also involve constructing an API call, establishing a connection with a source of the external file (e.g., using an API or other application interface), authenticating a recipient of application data, transmitting an API call, receiving application data (e.g., dynamic data), and/or any other electronic operation that facilitates use of information associated with the external file. The link may be associated with a location of an external file in a repository such that the processor may access and retrieve the data associated with the external file quickly by activating and interpreting the information associated with the link.

Some disclosed embodiments may include pulling, from an external file, first replacement data corresponding to the current data. Pulling, from an external file, replacement data corresponding to the current data, as used herein, may include copying, duplicating, reproducing, extracting, or any other form of transferring the value of the data (e.g., information such as text) designated as the first replacement data in the external file corresponding to the current data in the electronic word processing document. For example, the system may access the external file and copy the image, text, audio file, video file, alphanumerics, or any other character or data that has been designated as the replacement data, as described throughout. The replacement data may then be retrieved from the external file for further processing or for transmission to the electronic word processing document so that the processor may re-render a display of the current data with the replacement data.

Some disclosed embodiments may include replacing current data in an electronic word processing document with first replacement data. Replacing current data in an electronic word processing document, as used herein, may include overriding, substituting, editing, making note of, re-rendering a display of information, or any other form of changing the current data in an electronic word processing document to reflect a change in the first replacement data. However, it should be understood that replacing current data in an electronic word processing document with a first replacement data does not require the current data, after replacing, to be identical to the replacement data. For example, if the settings of the source of the replacement data, an external file, allow the value of the replacement data to extend to five significant figures and the settings of the electronic word processing document only allowed data to extend to three significant figures, replacing the current data with the replacement data may result in the replaced current data and the replacement data to not be equivalent.

By way of example, FIG. 31 illustrates a file 3110 external to an electronic word processing document 2710 of FIG. 27 displaying an updated version of the external file 2810 in FIG. 28. The text 3112 represents an updated entry for the assigned speaker for the welcome speech scheduled on Jan. 2, 2022. For ease of discussion, similar to the external file 2810 in FIG. 28, this file 3110 may be internal to the Human Resources department of a company such that only employees of that department can access this document and serve as a source of replacement data. For example, electronic document 3010 has current data "Michelle Jones, CEO" 3012 in the form of text that has been designated as a variable data element. This variable data element 3012 may be linked to an external file serving as a source of replacement data as shown in FIG. 31. FIG. 31 shows an example of a change that has been made to the speaker from Michelle Jones, CEO 3012 of FIG. 30 (e.g., the "current data") to Randall James, CTO 3112 (e.g., the "replacement data") of FIG. 31. As a result of this change in the source of replacement data in the speaker on Jan. 2, 2022, the system may update the variable data element 3012 of FIG. 30 to reflect the updated speaker to be Randall James, CTO, reflected in updated variable data element 3212 of electronic document 3210. FIG. 32 illustrates an electronic word processing document 3210 containing variable data elements 3212, 3214, and 3216. FIG. 32 illustrates the replacing of the former document text of variable data element 3012 of FIG. 30, displayed as Michelle Jones, CEO, with the corresponding value of the variable data element's 3212 replacement data 3112 as depicted in FIG. 31. The document text of variable data element 3212 of FIG. 32, now matches the replacement data 3112 of FIG. 31, displayed as Randall James, CTO.

Some embodiments may include identifying a change to a variable data element in an electronic word processing document. A change to a variable data element in the electronic word processing document may include any editing, manipulating, updating, altering (e.g., addition, subtraction, rearrangement, or a combination thereof), re-sizing a display, or any other form of variation to the variable data element. For example, editing the text of a text-based variable data element or changing the percentage represented in a pie chart of an image-based variable data element may constitute a change to the variable data element. Identifying a change to a variable data element may include the processor comparing the value of the data of the variable data element to the value to the prior current data stored in a data structure for the corresponding variable data element or use any other method of evaluating the value of the current data of a variable data element. The processor may initiate a comparison after detecting a user's interaction with the document resulting in an edit of the document, such as a user editing the text of a text-based variable data element, highlighting a portion of a variable data element and deleting it, or any other user interaction with the document resulting in an edit or manipulation of a variable data element. Further, the system may evaluate the value of data corresponding to a variable data element upon trigger events, such as when the document is opened, when the document is saved, after a certain amount of time has passed, or any other event that may trigger an evaluation of the data corresponding to the variable data element.

By way of example, FIG. 33 illustrates an electronic word processing document 3310 including variable data elements 3312, 3314, and 3316, consistent with some embodiments of the present disclosure. As illustrated in FIG. 33, variable data element 3314 (document text of Jan. 4, 2022) and variable data element 3316 (document text of Jan. 3, 2022) have changed from their former document text values of the variable data element 3214 with a document text of Jan. 3, 2022, and variable data element 3216, with a document text of Jan. 4, 2022, as illustrated in FIG. 32. For ease of discussion, the new values variable data elements 3314 and 3316 present in the electronic word processing document 3310 could have been performed manually by an entity with access to the electronic word processing document 3310. For example, Sam Miller, Benefits Coordinator in this example, may have had a scheduling conflict on Jan. 4, 2022, and thus edited the schedule on an associated computing device to switch timeslots with Carl Howard such that Carl would present on January 4$^{th}$ and Sam could present on January 3$^{rd}$ in a source of replacement data. In response to these edits, the processor may receive the input as replacement data and transmit the information to the variable data elements and cause the display to re-render the variable data elements with the updated information input by Sam. Further to the example, but not present in the figure, when the system detects Sam interacting the document text of the variable data elements, the system may evaluate the data of the variable data elements Sam interacts with and compare the data to the corresponding variable data element stored in a data structure to determine if Sam edited the variable data elements as shown by variable data elements 3316 and 3314.

In some embodiments, at least one processor may be configured to transmit a message to a designated entity when a variable data element is changed. A designated entity may include any assigned name, phone number, email address, employee identification number, or any other identifying information to deliver or transmit a message or notification to. Establishing a designated entity may be accomplished manually by the user via an interface allowing a user to manually enter entity information or may be accomplished automatically by the system via logical rules, automation, machine learning, or artificial intelligence. For example, a logical rule may be established such that if a change to a variable data element is identified, a message is sent to the author of the document, the entity that designated the data as a variable data element, or any other entity involved or interested in the document. Transmitting a message to a designated entity when a variable data element is changed may include sending a message via email, SMS, MMS, push-notifications, phone call, or any other manner of communicating information relating the change that occurred in the variable data element. For example, if text representing the name of the presenter for a presentation was designated to be a variable data element and the name of presenter was changed, the user may have designated the entities to receive a message to be employees with the names matching that of the previously listed presenter and the newly listed presenter. In another example, the system may use logical rules to determine the designated entities. Further to this example, if text representing a time frame for a series of presentations is changed, a logical rule may designate the entities to receive a message to be all listed presenters or only the presenters whose time slots were changed. In addition to this example, the user or system may establish a threshold of change that must be met to transmit a message to a designated entity. For example, if text representing a stock price was designated to be a variable data element, a user may only be interested if the stock price changed to be above or below a certain threshold, as such the user may establish a threshold such that a message only be transmitted if the lower or upper threshold is crossed. The message may be transmitted in response to an established threshold is met, such as when the displayed information or any data associated with the variable data element (e.g., metadata) is updated.

FIG. 29 illustrates an exemplary interface 2910 allowing the user to designate an entity, via activatable element indicator 2920, to receive a message if any edits are made to the variable data element 2912, consistent with some embodiments of the present disclosure. In FIG. 29, interface 2910 may enable designation of entities to be notified of a change in a variable data element 2912 by interacting with lookup interface 2922 that may enable a user to manually choose a designated entity from a drop-down list such as an employee list or manually enter contact information such as a phone number or email address. While not pictured in the figure, upon the detection of a change to a variable data element, the system may enact logical rules, automation, machine learning, or artificial intelligence to determine an interested party in relation to the change. It should be understood that while the interface 2910 illustrated at FIG. 29 includes the ability to designate entities to be notified upon identification of a change to a variable data element in the same interface 2910 allowing designation of data as a variable data element, these designations do not have to be included in the same rendered interface. It is understood that the transmission of a message and designation of an entity to receive the message may be done in any manner as discussed herein or any manner allowing an entity to be designated to receive a message.

In some embodiments, at least one processor may be configured to display an interface for enabling permissions to be set on a variable data element and to thereby restrict modifications thereto. Displaying an interface for enabling permissions to be set on a variable data element may include rendering a display of information with activatable elements that may enable interaction with the information through a computing device. Permissions to be set on a variable data element may include a parameter that may control the ability of a user, user account, device, system, or combination thereof to access a variable data element, view a variable data element, use a function associated with a variable data element, edit a variable data element, delete a variable data element, move a variable data element, re-size a variable data element, influence a variable data element, or perform any other operation relative to a variable data element. Enabling permissions to be set on a variable data element and to thereby restrict modifications thereto may include controlling the ability of a user, user account, device, system, or combination thereof to prevent alterations, changes, edits, or any other modification or limitation to the data corresponding to a variable data element. This may involve sending instructions to the processor to place a memory lock on the data stored in the repository associated with the variable data element until an entity accessing the data associated with the variable data element is determined by the processor to be an authorized editor. Restricting modifications may include reducing the ability to alter (e.g., may alter a color, but not the text) or completely prohibiting any alterations to a variable data element. Permission settings for a particular variable data element in a document may be independent from the permission settings for other variable data elements located in the same document. For example, a first variable data element may have restrictive permission settings that enable only the author of the document to edit the first variable data element while a second variable data element may have public permission settings that enable any user to edit the second variable data element. As a result, an author of the document may edit both the first variable data element and the second variable data element while a second user (e.g., not an author of the document) would be prevented from making any edits or alterations to the first variable data element and would only be able to do so for the second variable data element.

FIG. 29 illustrates an exemplary interface 2910 allowing the user to enable permissions to be set on a variable data element and to thereby restrict modifications thereto, consistent with some embodiments of the present disclosure. In FIG. 29, interface 2910 may enable designation different levels of access via activatable element indicator 2926 and lookup interface 2928. Lookup interface 2928 may allow the user to access a drop down menu containing different levels of permission (e.g., "view only" or "redact data"). Further, interface 2910 may enable the user to designate the users to which the various level of access may apply via activatable element indicator 2930. Lookup interface 2932 may allow the user to manually enter a user's name to correspond to the level of access identified via indicator 2826. Lookup interface 2932 may also enable the user to designate the users to which the level of access applies by allowing the user to select the users from a list, such as an employee list. However, it is understood that the display of an interface for enabling permissions to be set on a variable data element may be displayed in any manner as discussed herein or any manner allowing the user to enable permissions.

Some embodiments may include, upon identification of a change, accessing an external file via a link. Accessing an external file via a link may include retrieving the electronic word processing document from a storage medium, such as a local storage medium or a remote storage medium, following activation of a text hyperlink, image hyperlink, bookmark hyperlink, or any other type of link allowing the system to identify a repository and retrieve the file from a separate storage device or a third party platform independent from the electronic word processing document. In some embodiments, accessing the external file via a link may include retrieving the file from a web browser cache. Additionally or alternatively, accessing the external file may include accessing a live data stream of the external file from a remote source. In some embodiments, accessing the external file may include logging into an account having a permission to access the document. For example, accessing the external file may be achieved by interacting with an indication associated with the external file, such as an icon or file name, which may cause the system to retrieve (e.g., from a storage medium) a particular external file associated with the indication.

Some embodiments may include updating an external file to reflect a change to a variable data element in the electronic word processing document. Updating an external file to reflect a change to a variable data element may include syncing, changing, modifying, editing, manipulating, or any other form of altering data associated with the variable data element in the external file in response to a change to a variable data element. The external file reflecting a change to a variable data element may include updating the data in the external file corresponding to the data or information associated with the variable data element in the electronic word processing document to be equivalent to the change to the variable data element, to be similar to the change to the variable data element, to manipulate the data by a similar magnitude or process as the variable data element, or any other edit to reflect the change to the variable data element. For example, the variable data element present in an electronic word processing document may be text-based data identifying the amount of money a company has raised at a fundraiser and is linked to an external accounting file. If on the final day of the fundraiser, the president of the non-profit receives a donation in person that puts the amount of donations collected over the company's goal, the president may edit the variable data element to reflect the new total and change the font color to green. Following this example, the data of the external accounting file corresponding to the variable data element in the electronic word processing document may be updated to reflect the change (e.g., adding "Goal Reached" to the external file) and thus, represent the new total in a green font or otherwise reflecting an indication of the information reflected in the variable data element.

By way of example, FIG. 34 illustrates an exemplary external file 3410 including text-based data 3412, 3414, and 3416 corresponding to variable data elements 3312, 3314, and 3316 in an electronic word processing document 3310 of FIG. 33, consistent with some embodiments of the present disclosure. As shown in FIG. 34, the external file 3410 has been updated to reflect the changes to variable data elements 3314 and 3316 in FIG. 33 such that the data corresponding to variable data element 3314 has changed from Jan. 3, 2022 to Jan. 4, 2022 and the data corresponding to variable data element 3316 has changed from Jan. 4, 2022 to Jan. 3, 2022.

In some embodiments, at least one processor may be configured to receive a selection of a variable data element and to present, in an iframe, information from an external file. Receiving a selection of a variable data element, as used herein, may include the use of a keyboard or a pointing device (e.g., a mouse or a trackball) by which the user can provide input (e.g., a click, gesture, cursor hover, or any other interaction) to an associated computing device to indicate an intent to elect a particular variable data element that may be displayed on an associated display of the computing device. Other kinds of devices can be used to provide for interaction with a user to facilitate the selection as well; for example, sensory interaction provided by the user can be any form of sensory interaction (e.g., visual interaction, auditory interaction, or tactile interaction).

By way of example, FIG. 35 shows the input of a selection of a variable data element 3512 in an electronic word processing document 3510 which can be carried out using a cursor 3518 associated with a device (e.g., touchpad, touchscreen, mouse, or any other interface device), consistent with some embodiments of the present disclosure.

Presenting, in an iframe, information from an external file may include rendering display of an iframe or a similar window including any data present or otherwise stored in an external file. The information from the external file included in the iframe may include the entirety of the external file, the replacement data in the external file, or any other data present in the external file and selected by the user or system to be included in the iframe. For example, the system may use logical rules, automation, machine learning, or artificial intelligence to determine the information from the external file to include in the iframe based on contextual analysis of the data corresponding to the variable data element. As an additional example, the information in the iframe may include the past values of the replacement data, retrieved from a data structure that stores the value of the replacement data each time the system receives an API call (other type of software call) that the replacement data has changed or the system detects a change in the replacement data, to show to change over time in the value of the replacement data in the external file. For example, a user may select a variable data element corresponding to the inventory for a particular product via a mouse click and, in response, the system may render a display of an iframe including information related to the inventory of a particular item, retrieved from the external file, such as the price of the item, the next estimated restock date, and the history of sales for that item.

Figure 36:
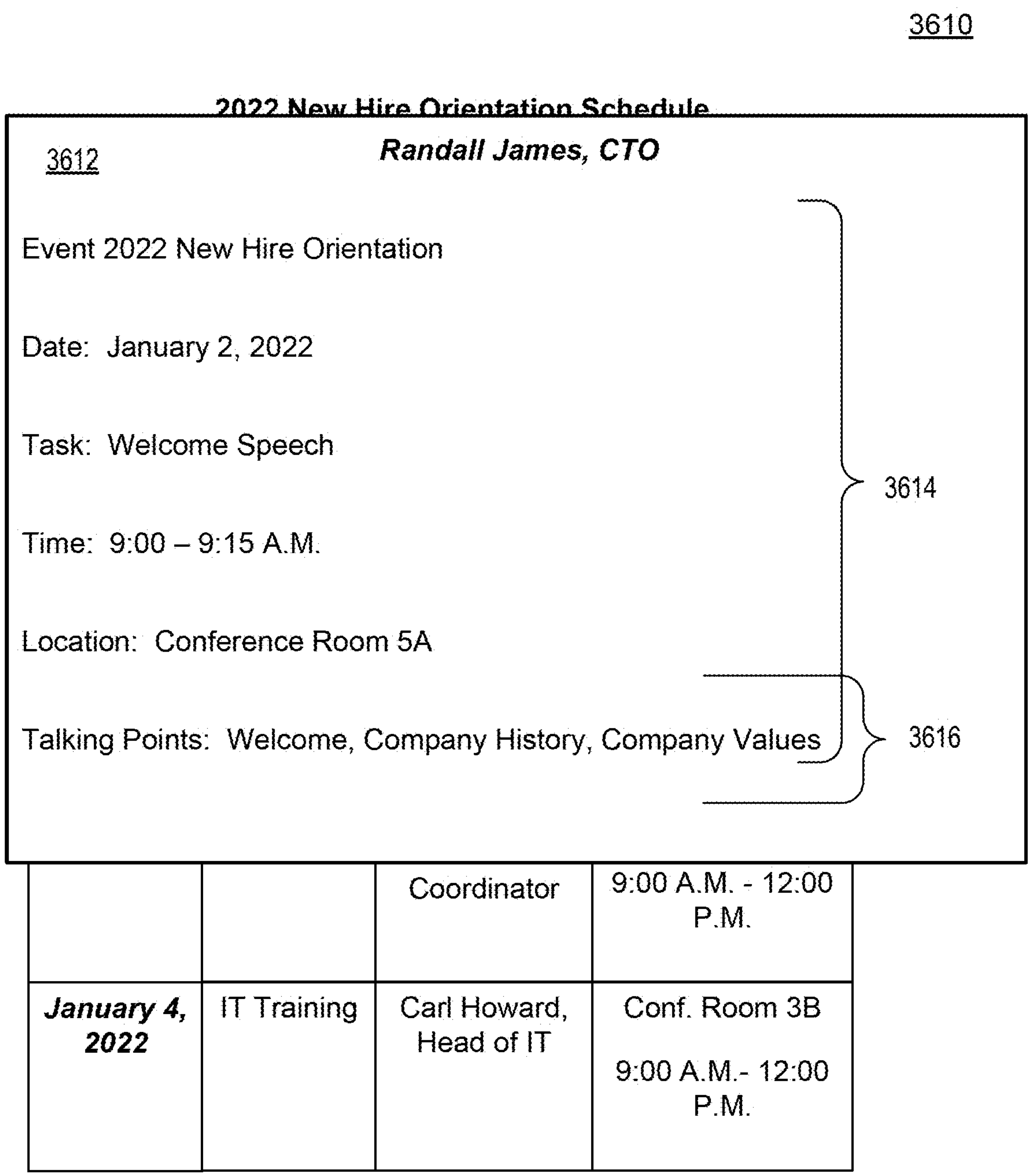
FIG. 36 illustrates an example of an iframe, containing information from an external file, being presented in response to a selection of a variable data element, consistent with some embodiments of the present disclosure.

By way of example, in FIG. 36, in response to the selection of variable data element 3512 with cursor 3518 in FIG. 35, an iframe 3612 may be presented to display data from the external file 3614 and its associated information (e.g., textual, graphical, or a combination thereof), consistent with some embodiments of the present disclosure. For example, the information 3614 from the external file may include additional information not typically displayed in the electronic word processing document 3610 such as the text-based data representing Randall James' talking points 3616 or metadata that is stored in the electronic word processing document 3610.

Figure 37:
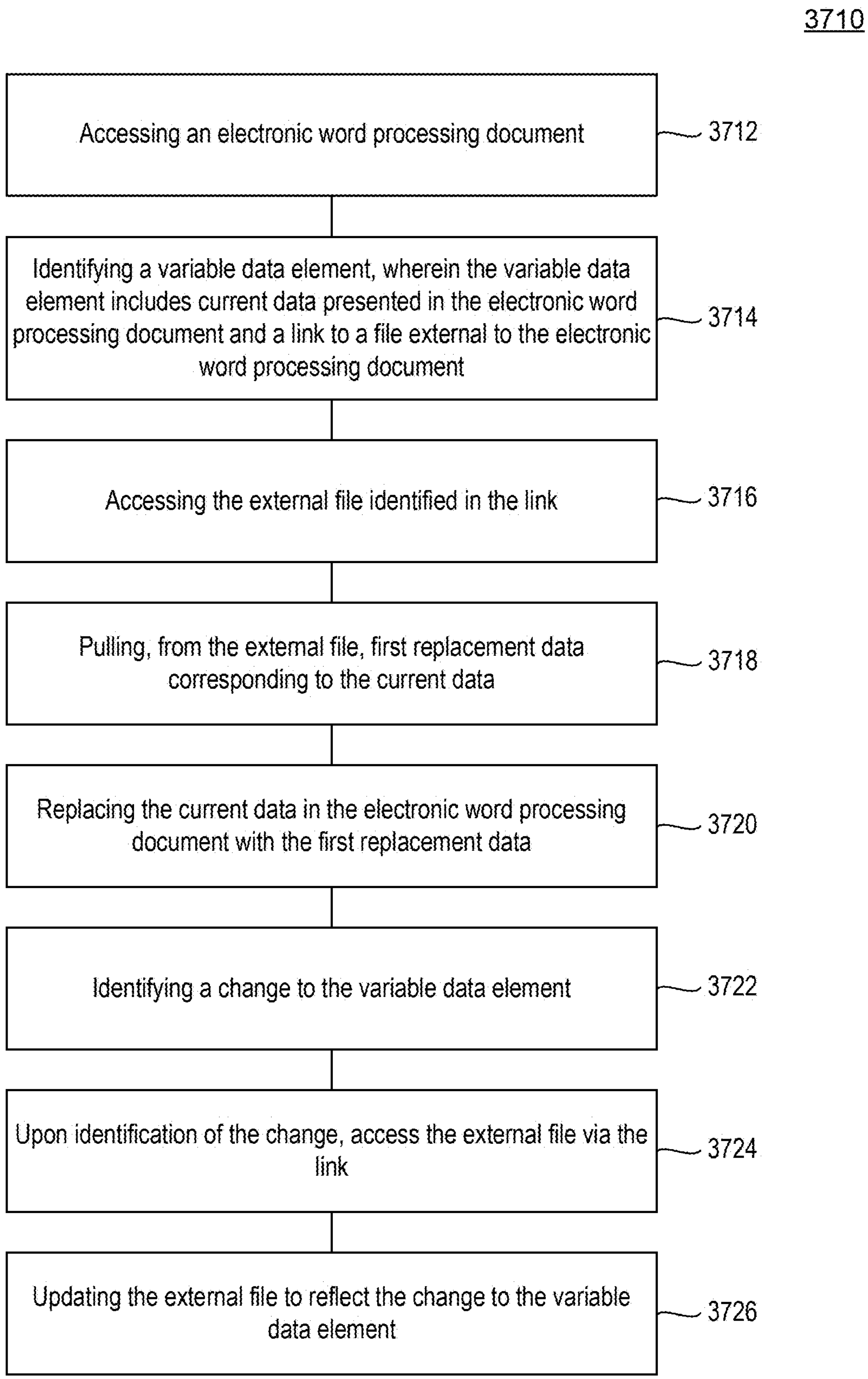
FIG. 37 illustrates a block diagram of an example process for automatically updating an electronic word processing document based on a change in a linked file and vice versa, consistent with some embodiments of the present disclosure.

FIG. 37 illustrates a block diagram of an example process 3710 automatically updating an electronic word processing document based on a change in a linked file and vice versa. While the block diagram may be described below in connection with certain implementation embodiments presented in other figures, those implementations are provided for illustrative purposes only, and are not intended to serve as a limitation on the block diagram. In some embodiments, the process 3710 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 27 to 36 by way of example. In some embodiments, some aspects of the process 3710 may be implemented as software (e.g., program codes or instructions) that are stored in a memory (e.g., the memory portion 122 in FIG. 1) or a non-transitory computer-readable medium. In some embodiments, some aspects of the process 3710 may be implemented as hardware (e.g., a specific-purpose circuit). In some embodiments, the process 3710 may be implemented as a combination of software and hardware.

FIG. 37 includes process blocks 3712 to 3726. At block 3712, a processing means (e.g., any type of processor described herein or that otherwise performs actions on data) may access an electronic word processing document, consistent with some embodiments of the present disclosure.

At block 3714, the processing means may identify a variable data element. The variable data element may include current data presented in the electronic word processing document and a link to a file external to the electronic word processing document, as discussed above.

At block 3716, the processing means may access an external file identified in the link, as previously discussed in the disclosure above.

At block 3718, the processing means may pull, from the external file, first replacement data corresponding to the current data, as previously discussed above.

At block 3720, the processing means may replace the current data in the electronic word processing document with the first replacement data, as previously discussed above.

At block 3722, the processing means may identify a change to the variable data element present, as previously discussed above.

At block 3724, the processing means may, upon identification of the change, access the external file via the link, as previously discussed above.

At block 3726, the processing means may update the external file to reflect the change to the variable data element, as previously discussed above.

Various embodiments of this disclosure describe unconventional systems, methods, and computer-readable media for enabling simultaneous group editing of electronically stored documents. While multiple users may simultaneously edit electronically stored documents, it may be difficult to distinguish which group or groups the edits correspond to. It may be difficult to define groups and limit which users are able to edit another user's previous edits. It may be beneficial to separate the multiple users into separate defined groups. Edits made by a first group may need to be identified and distinguished from edits made by a second group. Further it may be beneficial to automatically identify new users as belonging to the first group, second group, or a new third group based on characteristics of the new users. It may be beneficial to require permission before members become part of a group and make edits on behalf of the group. Furthermore, it may be beneficial to decide when alterations made by one group may be viewed by the other group. By enabling groups of editors collaborating on an electronic document, a system may increase its processing efficiency by sorting users into determined, different groups so that users belonging to certain groups may be identified together and streamline the system's tracking process for edits from numerous computing devices associated with different user accounts.

Some disclosed embodiments may involve systems, methods, and computer-readable media for enabling simultaneous group editing of electronically stored documents. A group may refer to one or more members associated with an aggregate where each member may include any entity such as a person, client, group, account, device, system, network, business, corporation, or any other user accessing a collaborative electronic document through an associated computing device or account. An electronically stored document, as used herein, may include a file containing any information that is stored in electronic format, such as text files, word processing documents, Portable Document Format (pdf), spreadsheets, sound clips, audio files, movies, video files, tables, databases, or any other digital file. Editing may include adding, deleting, rearranging, modifying, correcting, or otherwise changing the data or information in an electronically stored document. Group editing may be simultaneous in that multiple users may edit an electronically stored document in real time or near real time. Group editing may also occur at different times. For example, a first group (e.g., company A) may have employees and a second group (e.g., company B) may have their own employees, and both the first group and the second group may have their respective employees accessing and editing an electronic collaborative word processing document stored in a cloud-based repository, discussed in further detail below.

Some disclosed embodiments may include accessing a collaborative electronic document. Accessing may refer to gaining authorization or entry to download, upload, copy, extract, update, edit, or otherwise receive, retrieve, or manipulate data or information. For example, for a client device (e.g. a computer, laptop, smartphone, tablet, VR headset, smart watch, or any other electronic display device capable of receiving and sending data) to access a collaborative electronic document, the client device may send a request to retrieve information stored in a repository associated with a system, which may require authentication or credential information, and the system processor may confirm or deny authentication information supplied by the client device as needed. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication. A collaborative electronic document may be any processing document, including word processing, presentation slides, tables, databases, graphics, sound files, video files or any other digital document or file (e.g. a text, programming language, video, presentation, audio, image, design, document, spreadsheet, tabular, virtual machine, a link or shortcut, an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, or any other type of file which may be stored in a database). Accessing a collaborative electronic document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data.

For example, a collaborative electronic document may be stored in repository 230-1 as shown in FIG. 2. Repository 230-1 may be configured to store software, files, or code, such as a collaborative electronic document developed using computing device 100 or user device 220-1. Repository 230-1 may further be accessed by computing device 100, user device 220-1, or other components of system 200 for downloading, receiving, processing, editing, or viewing, the collaborative electronic document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™ Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include linking a first entity and a second entity to form a first collaborative group, and linking a third entity and a fourth entity to form a second collaborative group. The relational terms herein such as "first" and "second" are used only to differentiate an entity or operation from another entity or operation, and do not require or imply any actual relationship or sequence between these entities or operations. An entity may include a person, client, group, account, device, system, network, business, corporation, or any other user accessing a collaborative electronic document through an associated computing device or account. Linking a first entity and a second entity may include joining, connecting, associating, or otherwise establishing a relationship between the first and second entity. A collaborative group may refer to any combination of entities linked together to form an aggregate entity. The first entity and second entity may be linked to form a first collaborative group. The first entity and second entity may be manually or automatically linked. For example, the first entity and second entity may be manually assigned to a collaborative group by an administrator, supervisor, or any other user. For example, the user may input instructions into a computing device that associates two entities together to form a group. Automatic linking may include automatically assigning the first and second entities to a collaborative group based on one or more settings, conditions, instructions, or other factors including but not limited to the company they work for, a shared network drive, the domain associated with their email address, the team they are on, a predetermined or predefined list, randomly, or any other way of classifying entities. For example, the system may determine that the first user associated with a first email address (e.g., employee1@company1.com) and the second user associated with a second email address (e.g., employee2@company1.com) belong to a first collaborative group (e.g., Company1) because the email addresses include the same or similar email address domains. Once an entity is assigned to a collaborative group, the entity may also be unlinked from the collaborative group and may be further reassigned to another collaborative group.

Some disclosed embodiments may include linking a third entity and a fourth entity to form a second collaborative group. The definitions of accessing a collaborative electronic document, collaborative group, and linking, as described above in connection with the first collaborative group applies equally to the second collaborative group. However, the specific functionality associated with each collaborative group may vary. In one embodiment for example, the first collaborative group may be linked automatically while the second collaborative group may be linked manually.

In some embodiments a first collaborative group may include a plurality of first additional entities linked to first and second entities, and a second collaborative group may include a plurality of second additional entities linked to third and fourth entities. An additional entity may be any added, extra, or supplemental entity to the first and second entities as discussed previously above. For example, a first additional entity may be linked to the first collaborative group (e.g., already including the first and second entities) so there are three entities in the first collaborative group: the first entity, the second entity, and the first additional entity. One or more first additional entities may be linked to the first collaborative group. Similarly, for example, a second additional entity may be linked to the second collaborative group so there are three entities in the second collaborative group: the third entity, the fourth entity, and the second additional entities. One or more second additional entities may be linked to the second collaborative group. Additional entities may be included at the formation of the collaborative group or after the collaborative group was formed. As a non-limiting example, the first additional entity may be linked to the first and second entities at or near the same time as the formation of the first collaborative group. Alternatively, for example, the first additional entity may be linked to the first entity and second entity at a time after the formation of the first collaborative group. The plurality of first and second additional entities may be linked to the first and second collaborative groups consistent with linking steps previously discussed. Similarly, the first and second additional entities may be unlinked from the collaborative groups and reassigned to other collaborative groups as needed by manual or automatic steps. For example, if a first additional entity (e.g., employee3@company1.com) was linked to a first collaborative group, but then leaves the company, the system may detect that the email address no longer exists and remove the first additional entity from the first collaborative group. Additionally or alternatively, if the first additional entity (e.g., employee3@company1.com) was linked to a first collaborative group (e.g., Company1), but then changes companies to Company2, the system may detect the updated email address domain for the first additional entity and in response, link the first additional entity with the second collaborative group (e.g., Company2).

Some disclosed embodiments may include receiving a first alteration by a first entity to a collaborative electronic document, tagging the first alteration by the first entity with a first collaborative group indicator, receiving a second alteration to the collaborative electronic document by a second entity, and tagging the second alteration by the second entity with the first collaborative group indicator. An alteration may include any edit, addition, deletion, comment, change, subtraction, rearrangement, correction, or any other modification of the information in a collaborative electronic document. Receiving the alteration may include receiving an input from any computing device associated with an entity that provides instructions to at least one processor to manipulate data or other information contained in the collaborative electronic document. For example, receiving an alteration may include a computing device associated with a user manually inputting information or instructions, sending a signal associated with a change of information (e.g. a status change), or any other information that may be input, detected, or transmitted. Tagging the alteration may include identifying, marking, labeling, associating, classifying, or otherwise indicating the source of the first alteration through an identifier such as metadata that may be stored in a repository. For example, the system may receive an input from a computing device that adds metadata to an associated alteration to link and store the metadata with the alteration in a repository so that any collaborating entity may access the tagged information. A first collaborative group indicator may include any identification for the collaborative group, such as one or more colors, names, shapes, symbols, graphical indicators, images, pictures, alphanumeric characters, avatars, videos, VR or AR object, metadata, or any combination thereof. For example, the system may receive an edit to the collaborative electronic document made by a first employee of Company1, that results in a rendering of a collaborative group indicator, such as a logo of Company1, in the collaborative electronic document so any entity accessing the document can see the logo of Company1 associated with the edit. The system may receive a second edit to the collaborative electronic document by a different, second employee of Company 1. The second edit may result in the rendering of a collaborative group indicator, such as the logo of Company1, that also appears in the collaborative electronic document so any entity accessing the document can see the logo of Company1 associated with the second edit. Further, the system may tag the alteration by the second entity with the first collaborative group indicator because the system may recognize that the second entity belongs to the first collaborative group, as discussed previously above. For example, the first and second employees at Company1 may make edits, and the system may determine they belong to the same first collaborative group (e.g., Company1). As a result, the system may display an indicator associated with edits made by both with the same color associated with Company1.

Some disclosed embodiments may include receiving a third alteration to a collaborative electronic document by a third entity, tagging the third alteration by the third entity with a second collaborative group indicator, receiving a fourth alteration from the fourth entity to the collaborative electronic document, and tagging the fourth alteration by the fourth entity with the second collaborative group indicator. As stated above, the relational terms herein such as "first," "second," "third," and so on are used only to differentiate an entity or operation from another entity or operation, and do not require or imply any actual relationship or sequence between these entities or operations. The definitions of an alteration, tagging, and a collaborative group indicator, as described above in connection with the first collaborative group indicator applies equally to the second collaborative group indicator. However, the specific functionality associated with each collaborative group may vary. The second collaborative group indicator may be different from the first collaborative group indicator. The second collaborative group indicator may distinguish the third and fourth alterations from the first and second alterations. For example, the second collaborative group indicator may be the color red, while the first collaborative group indicator may be the color blue. Additionally, or alternatively, the second collaborative group indicator may be the name of a company, while the first collaborative group indicator may be the name of a different company. This may reduce the processing time and storage requirements associated with a collaborative electronic document, since the system may only need to track and store information by collaborative groups after the system determines the collaborative group associations, rather than track and store information according to individual users.

Figure 38:
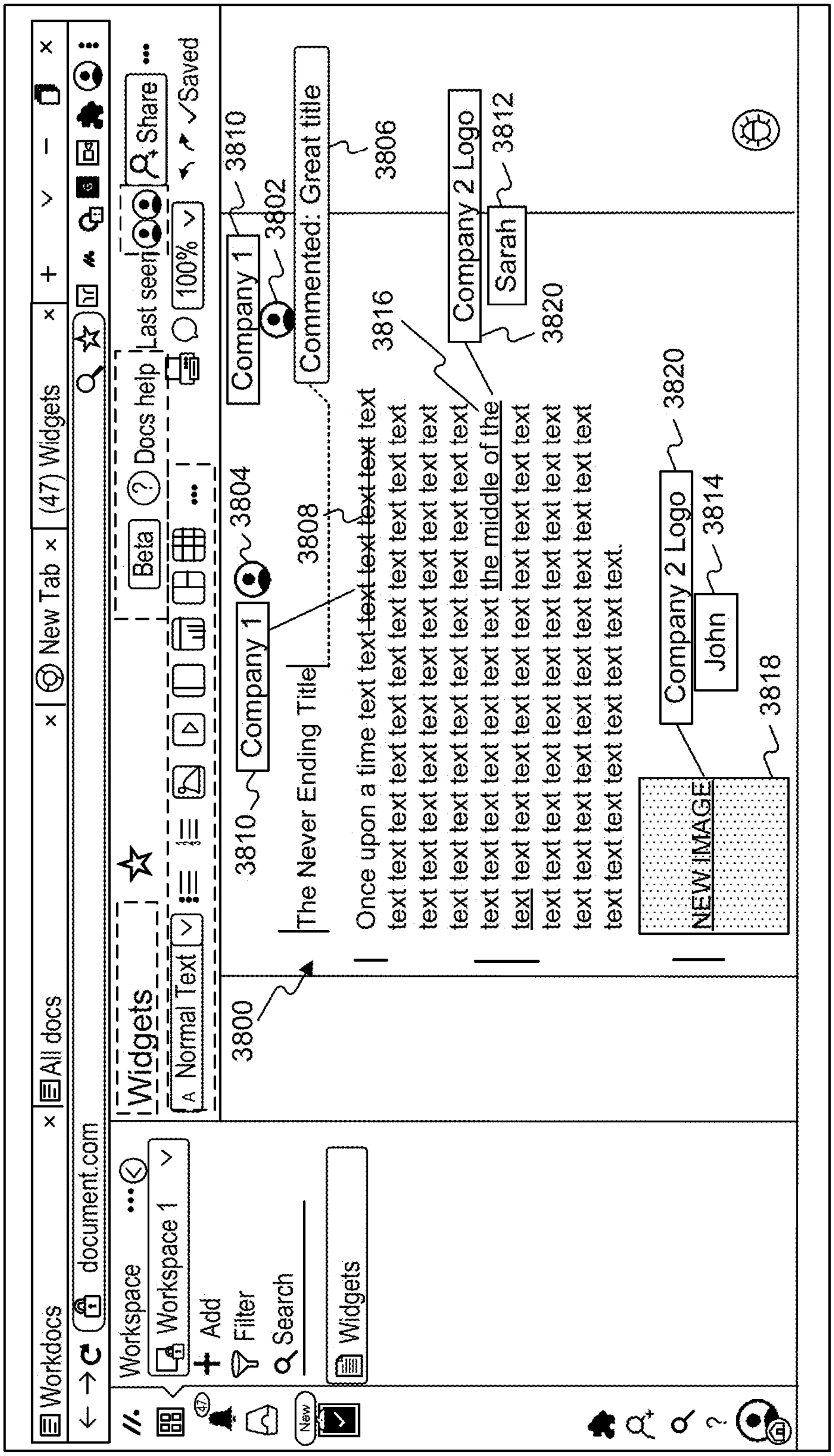
FIG. 38 illustrates an example of a collaborative electronic document, consistent with some embodiments of the present disclosure.

For example, as shown in FIG. 3, the collaborative electronic document may be an electronic collaborative word processing document 301 via an editing interface or editor 300. In FIG. 38, may illustrate another embodiment of a collaborative electronic document 3800. A first entity 3802 (identified by a thumbnail) and a second entity 3804 (identified by a thumbnail) may be represented by a thumbnail or any other graphical or alphanumeric indicator in the collaborative electronic document. A third entity 3812 (identified by an alphanumeric indicator) and a fourth entity 3814 (identified by an alphanumeric indicator) may be represented by their name. The first entity 3802 and the second entity 3804 may be linked to form the first collaborative group, manually or automatically by the system as discussed above. The first collaborative group may be indicated by the first collaborative group indicator 3810, the name "Company 1." The third entity 3812 and the fourth entity 3814 may be linked to form the second collaborative group, which may be indicated by the second collaborative group indicator 3820, "Company 2 logo." The first entity 3802 may make a comment, "Great title" on part of the collaborative electronic document, which may be the first alteration 3806. The second entity 3804 may make a deletion which may be the second alteration 3808. Both the first alteration 3806 and the second alteration 3808 may be tagged by the system with the first collaborative group indicator 3810 as a result of recognizing that the first alteration 3806 and the second alteration 3808 were made by entities belonging to the first collaborative group. The third entity 3812 may add text, "the middle of the text" to part of the document, which may be the third alteration 3816. The fourth entity 3814 may add a "NEW IMAGE" to the document, which may be the fourth alteration 3818. The third alteration 3816 and the fourth alteration 3818 may be tagged with the second collaborative group indicator 3820 as a result of recognizing that the third alteration 3816 and the fourth alteration 3820 were made by entities belonging to the second collaborative group.

Aspects of this disclosure may prevent a second collaborative group from making edits to a first alteration and a second alteration. Preventing may refer to inhibiting, not allowing, disabling, blocking, or otherwise limiting any action. Making edits may refer to removing, deleting, cutting, adding to, correcting, rewriting, modifying, or making any other alteration. Preventing entities from the second collaborative group from making edits to alterations made by the first collaborative group, for example, may lock the display of information altered by the first collaborative group so that entities from the second collaborative group may only view the altered information. For example, if the first alteration made by the first entity of the first collaborative group adds an image to the collaborative electronic document, the third entity and fourth entity of the second collaborative group may not be allowed to change, delete, or interact with the image. In some embodiments, the system may also provide a notification to the entities of the second collaborative group that they may be restricted from making alterations. In other embodiments, the system may render the information altered by the first collaborative group in a different format or any other indication (e.g., text that is in gray font) to indicate to the second collaborative group that the system is preventing it from making edits to the altered information.

For example, in FIG. 38, the first entity 3802 and the second entity 3804 may not be able to delete the third alteration 3816 ("the middle of the text") that was added by the third entity 3812 (identified by the alphanumeric characters "Sarah"). Similarly, the first entity 3802 and the second entity 3804 may not be able to delete the fourth alteration 3818 "NEW IMAGE."

Some disclosed embodiments may include a processor configured to receive an attempt by a fifth entity to change a first alteration, access permissions settings, determine whether the fifth entity possess a permission enabling change of the first alteration, and upon determination of a change-enabling permission, apply the change to the first alteration. Receiving an attempt by a fifth entity to change the first alteration may include the system receiving a signal from a computing device associated with the fifth entity that contains instructions for making an edit to the first alteration. A change may include any instructions to edit, remove, delete, add, correct, rewrite, rearrange, or otherwise modify information in the collaborative electronic document. Permission settings may include any configurations that can grant, allow, restrict, limit, check, verify or otherwise determine user access associated with a collaborative electronic document. Permission settings may be any permissions associated with a collaborative electronic document that may be defined by a user or predefined by the system. As discussed above, user access to an electronic collaborative word processing document may be managed through permission settings set by an author of the electronic collaborative word processing document. Accessing permission settings may include performing a lookup in a storage or repository containing permission configurations for authorized accounts that access a collaborative electronic document. A permission enabling change may include any approval, consent, agreement, assent, permit, or other authorization of an entity to make an alteration. Determining whether the fifth entity possess a permission may refer to verifying, regulating, or otherwise determining if the fifth entity has a change-enabling permission. This may involve performing a lookup in a repository of authorized entities to verify whether the accessing entity is listed in a list of pre-authorized entities for accessing information. Applying the change to the first alteration may include adopting the instructions to make the change and manipulation the information contained in the first alteration, as discussed above, and carrying out the instructions and storing the change in the repository. After carrying out these instructions, the system may be configured to then determine whether the fifth entity belongs to a previously recorded collaborative group or belongs to a new collaborative group, discussed in further detail below.

For example, a permission may be based on a predetermined condition or other requirement stored in a repository that may be determined based on a processor performing a lookup in the repository and determining that an entity accessing the collaborative electronic document meets a threshold and is authorized to access the information or functionality in the collaborative electronic document. Alternatively, permission may be determined, assigned, or otherwise designated by a user or any other entity associated with the collaborative electronic document. For example, permission or authorization to change may only be allowed by certain entities such as an administrator, manager, group, team, or other authorized individuals or entities. For example, the system may determine that the fifth entity does not possess change-enabling permission after the system performs a lookup of authorized entities in the stored permission settings. Alternatively, for example, it may be determined that the fifth entity does possess change-enabling permission. Some disclosed embodiments may require permission or approval from the first entity, the second entity, or both the first and the second entity in order for the fifth entity to possess change-enabling permission. This may ensure that all entities associated with the first collaborative group authorize each other's alterations before releasing the alterations to the other collaborative groups on the collaborative electronic document. Additionally or alternatively, it may be required that a different entity (i.e. administrator, manager, or other user) determine whether the fifth entity possess change-enabling permission. In some disclosed embodiments, for example, each attempt by a fifth entity to make a change to an alteration may require determining whether the fifth entity possess change-enabling permission. Alternatively, for example, whether the fifth entity possess change-enabling permission may only need to be determined once, which may then be recorded in the repository as a permission setting regarding the fifth entity for accessing the collaborative electronic document.

For example, in FIG. 2, a fifth entity may access a collaborative electronic document from user device 220-2 via Network 210 and stored in repository 230-1. After accessing the collaborative electronic document, the fifth entity may see alterations made on user device 220-1 by a first entity of a first collaborative group. The fifth entity may attempt to change the alterations made by the first entity. The computing device 100 may then determine, by looking up instructions stored in its memory whether the fifth entity (user device 220-2) has permission to change the first alteration. It may be determined that the fifth entity has permission to change, and the changes may then be stored in repository 230-1. The next entity that accesses the collaborative electronic document on user device **220-*m*, via Network 210**, may see the changes made by the fifth entity to the collaborative electronic document.

In some aspects of the disclosure, it may be determined that a fifth entity possesses the permission, based on a determination that the fifth entity is associated with the first collaborative group. Determination that the fifth entity is associated with the first collaborative group may include analyzing characteristics of the fifth entity, comparing them to the characteristics of the first collaborative group, and identifying a similar or matching characteristic such that the fifth entity is related to the first collaborative group, consistent with the discussion above. For example, it may be required that the fifth entity be a part of the first collaborative group (i.e., linked to the first entity and the second entity) to possess a change-enabling permission. Alternatively, for example, it may be determined that the fifth entity may possess a change-enabling permission and may not be a part of the first collaborative group. Alternatively, some embodiments may include at least one processor further configured to recognize a fifth entity as a member of a third collaborative group with permission to change alterations of a first collaborative group, to permit the change to a first alteration, and to tag the change with a third collaborative group indicator. Recognizing the fifth entity as a member of a third collaborative group may include determining that the fifth entity may be linked to an additional collaborative group (e.g., the third collaborative group) or that it may not belong to either the first collaborative group or the second collaborative group. For example, the system may analyze characteristics of the fifth entity and recognize that it is associated with Company3, different from Company1 that is associated with a first collaborative group, and different from Company2 that is associated with a second collaborative group. The system may determine that the fifth entity is associated with a third collaborative group and that the third collaborative group has permission to change alterations made by the first collaborative group (Company1). The changes may be tagged or otherwise associated with a third collaborative group indicator (e.g. the logo of Company3). Recognizing that the third collaborative group with permission to change alterations of the first collaborative group may include determining that the third collaborative group is authorized to change the first alteration based on default or configured permission settings, consistent with the disclosure discussed previously above. For example, the third collaborative group may be permitted to change alterations of the first collaborative group but may not be permitted to change alterations of the second collaborative group. Alternatively, the third collaborative group may be permitted to change alterations of the first and second collaborative group. Consistent with the discussion above, permitting the change to the first alteration may refer to allowing or authorizing an entity to edit, add, delete, comment on, change, subtract, rearrange, correct or any other granting of authority to modify the first alteration. Tagging the change with a third collaborative group indicator may include identifying, marking, labeling, associating, classifying, or otherwise indicating the source of the change through an identifier (e.g., the third collaborative group indicator). For example, tagging a change may include associating metadata with the change that may be stored in a repository and not necessarily displayed. In other examples, tagging the change may include associating an indicator (e.g., graphical, alphanumeric, or a combination thereof) that may be presented in a manner to indicate additional information relating to or otherwise identifying the collaborative group.

Figure 39A:
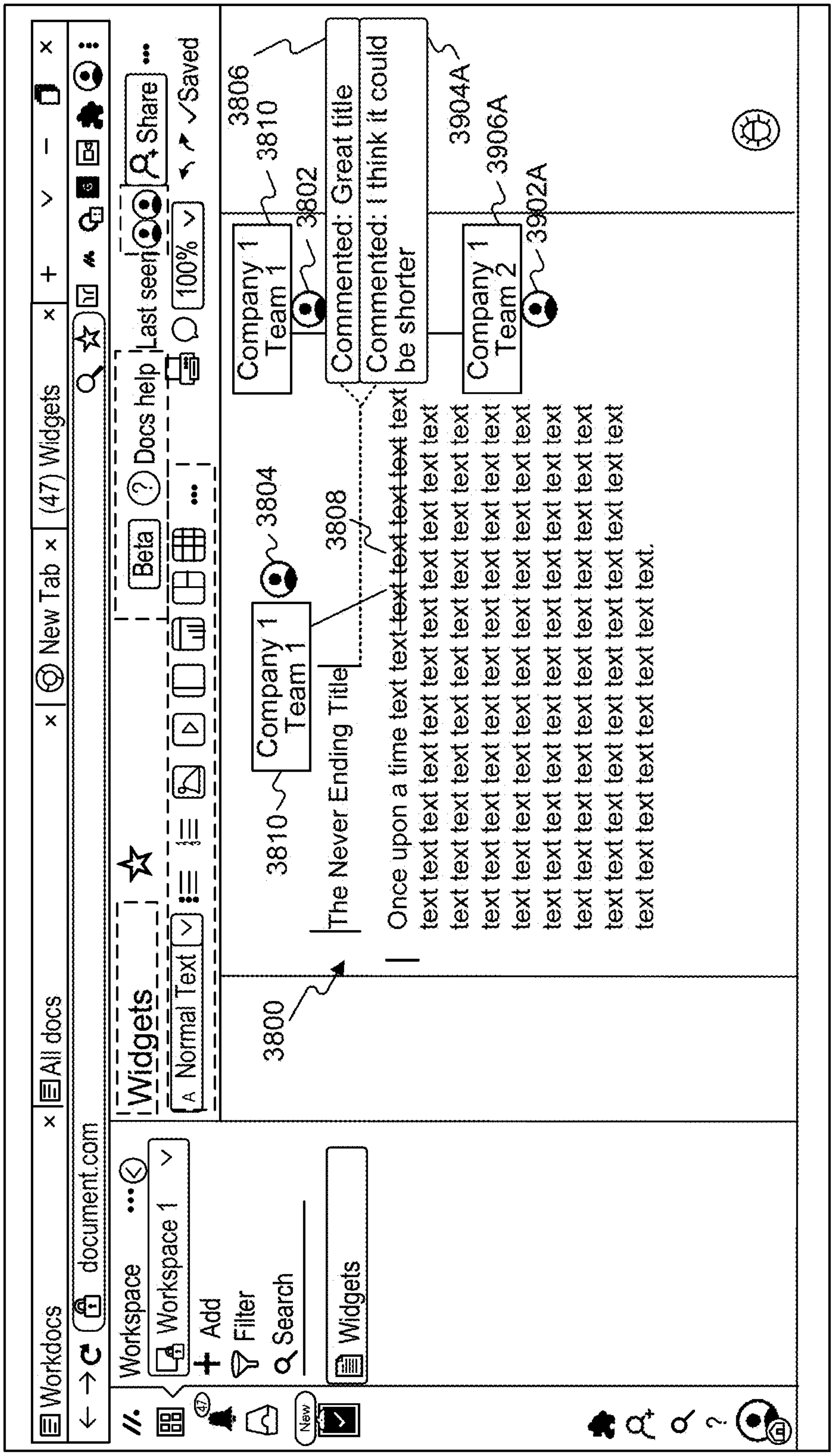
FIG. 39A illustrates an example of a first instance of a collaborative electronic document, consistent with some embodiments of the present disclosure.

For example, FIG. 39A, illustrates a display of a collaborative electronic document 3800. A fifth entity 3902A, represented by a thumbnail image, may be recognized as a member of a third collaborative group with permission to change alterations of the first collaborative group. Fifth entity 3902A may reply to the comment "Great title" (the first alteration 3806) with their own comment "I think it could be shorter" which may be the fifth alteration 3904A. The third collaborative group indicator 3906A may indicate that the fifth alteration 3904A came from the third collaborative group. Additionally or alternatively, the fifth entity 3902A may decide to also edit (not shown) the second alteration 3808. For example, the fifth entity 3902A may add text to the second alteration 3808 and the added text (not shown), which may also be indicated by the third collaborative group indicator 3906A.

Further, some embodiments of this disclosure may include receiving an attempt by a sixth entity to change the first alteration, access permissions settings, determine whether that the sixth entity lacks permission enabling change of the first alteration, and generates a duplicate version of the collaborative electronic document in which the sixth entity is permitted to change the first alteration. Generating a duplicate version of the collaborative electronic document may include copying and reproducing the information contained in a collaborative electronic document in a new electronic document. Determining that an entity lacks permission enabling change of the first alteration may include performing a lookup of authorized entities, through permission settings as discussed above, that an entity may not be authorized to change the first alteration and restricting the entity from making the change. By way of example, it may be determined that the sixth entity does not have permission to change the first alteration in the collaborative electronic document. In response to this determination, the system may generate a duplicate of the collaborative electronic document for the sixth entity to make alterations without affecting the original collaborative electronic document. For example, the first entity may be a manager with change-enabling permission while the sixth entity may be a subordinate without change-enabling permission. The sixth entity may attempt to change the first alteration, the system, through a lookup in a repository of authorized entities, may determine that the sixth entity does not have permission to make changes to the first alteration, which results in the system generating a duplicate version of the collaborative electronic document for the sixth entity to make edits such that the sixth entity may work on an independent version of the collaborative electronic document without affecting the original document.

Figure 40:
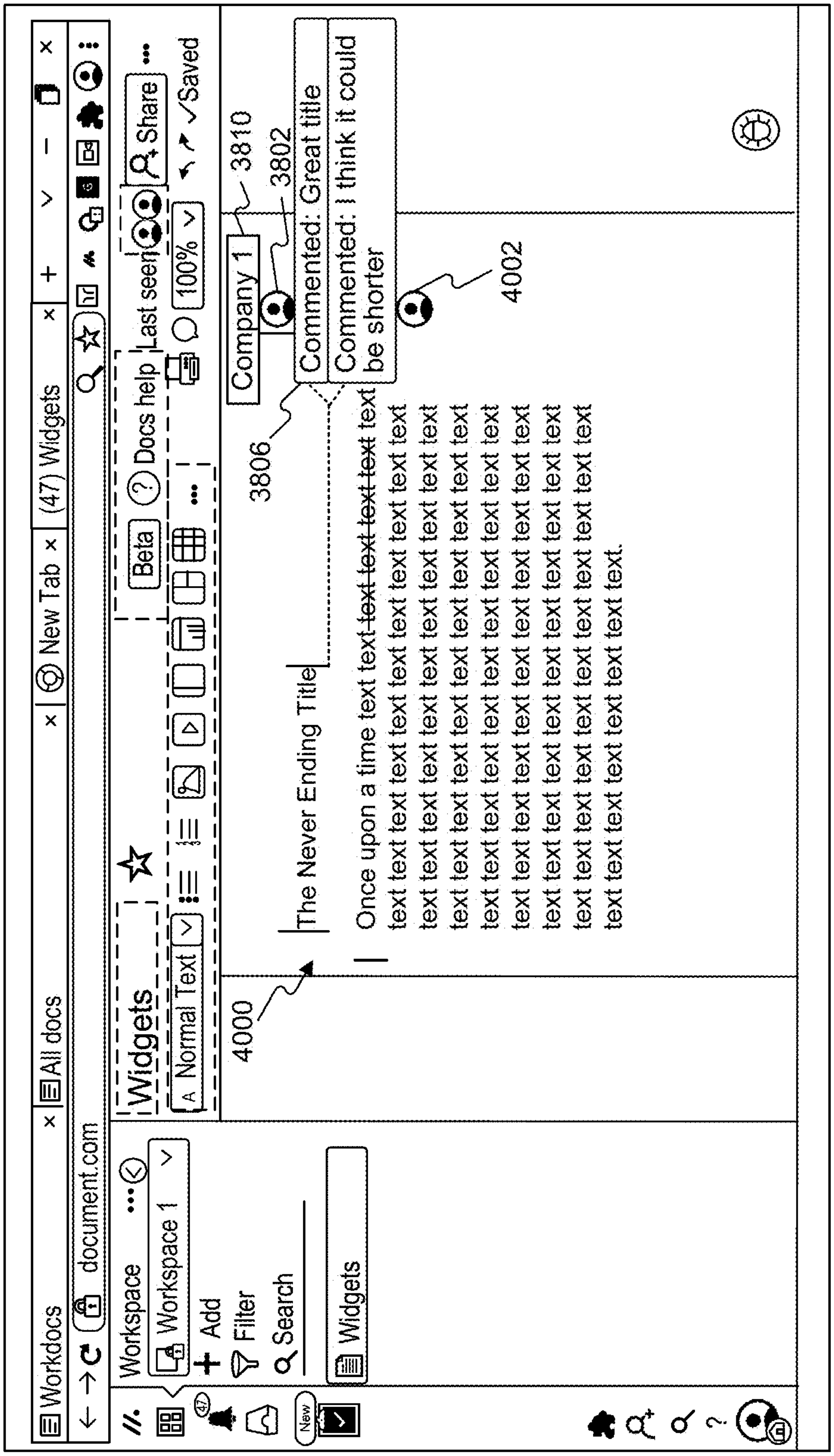
FIG. 40 illustrates an example of a duplicate version of a collaborative electronic document, consistent with some embodiments of the present disclosure.

By way of example in FIG. 40, a sixth entity 4002 (identified by a thumbnail) may attempt to change the first alteration 3806 in the collaborative electronic document 3800 (as shown in FIG. 38). It may be determined that the sixth entity 4002 does not have permission to change the first alteration, so the sixth alteration may not appear in the collaborative electronic document 3800. However, a new duplicate collaborative electronic document 4000 may be generated for the sixth entity that allows the sixth entity to change the first alteration without affecting the original collaborative electronic document 3800. This may enable the sixth entity to edit the collaborative electronic document 3800 in a duplicate copy without being delayed by the lack of permission to edit the original collaborative electronic document 3800.

Some disclosed embodiments may involve rendering a display of a collaborative electronic document, wherein the rendered display includes presenting a first collaborative group indicator in association with a first alteration and a second alteration, and wherein the rendered display includes a second collaborative group indicator displayed in association with a third alteration and a fourth alteration. Rendering a display of the collaborative electronic documents may include causing a presentation of information contained in an electronic document on a device, as described previously above, such that a user associated with a computing device may view and interact with the information in the collaborative electronic document. Rendering the display may include providing the collaborative electronic document to an entity by outputting one or more signals configured to result in the presentation of the collaborative electronic document on a screen, or other surface, through a projection, or in a virtual space with the entity. This may occur, for example, on one or more of a touchscreen, a monitor, AR or VR display, or any other means previously discussed and discussed further below. The electronic word processing document may be presented, for example, via a display screen associated with the entity's computing device, such as a PC, laptop, tablet, projector, cell phone, or personal wearable device. The electronic word processing document may also be presented virtually through AR or VR glasses, or through a holographic display. Other mechanisms of presenting may also be used to enable the entity to visually comprehend the presented information. Presenting the first collaborative group indicator in association with the first alteration and the second alteration may include displaying or rendering the first collaborative group indicator corresponding to the first and second alterations in a manner that is next to, below, above, together with, in conjunction with, related to, embedded in, or otherwise connected to the first alteration and the second alteration. By way of example, both the first alteration and the second alteration may be identified as originating from the first collaborative group by their association with the first collaborative group indicator. The first collaborative group indicator may be identical for the first alteration and the second alteration. For example, the first collaborative group indicator may be a graphical rendering of a logo of a company. Additionally or alternatively, the first collaborative group indicator may be different for the first alteration and the second alteration. For example, the first collaborative group indicator in association with the first alteration may include a display of the logo of a company and a thumbnail indicating the identity of the first entity, while the first collaborative group indicator in association with the second alteration may be the display of the logo of a company and a thumbnail indicating the identity of the second entity.

As stated above, the relational terms herein such as "first," "second," "third," and so on are used only to differentiate an entity or operation from another entity or operation, and do not require or imply any actual relationship or sequence between these entities or operations. The definitions of rendering a display and presenting or displaying the collaborative group indicator in association with the alteration applies equally to the second collaborative group. However, the specific functionality associated with each collaborative group may vary. For example, the second collaborative group indicator may be below the third and fourth alterations, while the first collaborative group indicator may be next to the first and second alterations.

Figure 39B:
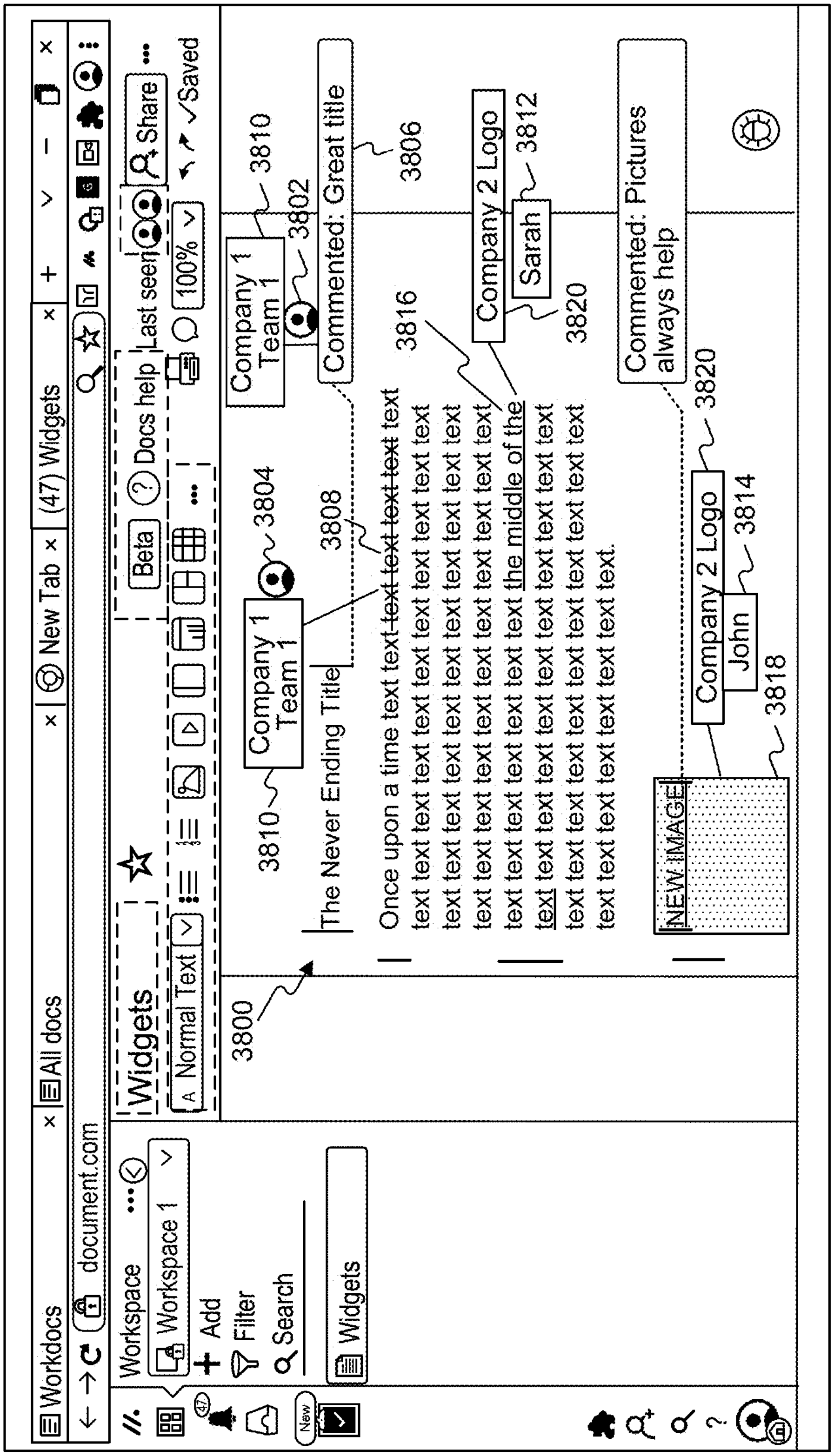
FIG. 39B illustrates an example of a second instance of a collaborative electronic document, consistent with some embodiments of the present disclosure.

For example, FIG. 39A and FIG. 39B may show a display of the same collaborative electronic document 3800 at two different points in time. FIG. 39A may be at a point in time that is before FIG. 39B. FIG. 39A illustrates an example situation when a display of the rendered collaborative electronic document 3800 does not show the third alteration or the fourth alteration. The third alteration 3816 and the fourth alteration 3818 may require approval from the third entity 3814 (e.g. "John") before being displayed. FIG. 39B, a later point in time, may show a disclosed embodiment of the collaborative electronic document 3800 after the third entity 3814 (John) approves the alteration through an interaction with the document (e.g. clicking an approval button or any other gesture or command instructing the same) and allows the display of the third alteration 3816 and the fourth alteration 3818. That is, for example, the first collaborative group 3810 may not be able to see the third alteration 3816 and the fourth alteration 3818 (e.g. FIG. 39A) until the third entity 3814 approves the third alteration 3816 and the fourth alteration 3818, at which point the first collaborative group 3810 may view the third alteration 3816 and the fourth alteration 3818 (e.g. FIG. 39B).

Aspects of this disclosure may include at least one processor configured to display a first collaborative group indicator in association with a first alteration and a second alteration, including a first instance of the first collaborative group indicator displayed in association with the first alteration and a second instance of the first collaborative group indicator displayed in association with the second alteration. Further, a third alteration and a fourth alteration may include a first instance of a second collaborative group indicator displayed in association with the third alteration and a second instance of the second collaborative group indicator displayed in association with the fourth alteration. An instance of the first collaborative group indicator may refer to an occasion, occurrence, display or any presentation of the collaborative group indicator. For example, multiple instances of the first collaborative group indicator may be rendered in conjunction with edits from the first and second entity alterations such that each of the alterations from the first collaborative group may be identified with a common indicator.

For example, presenting the first collaborative group indicator in association with the first alteration and the second alteration may be simultaneous, or near simultaneous as the first alteration and second alteration are made in the collaborative electronic document. Alternatively, for example, presenting the first collaborative group indicator in association with the first alteration and the second alteration may be completed after, at a time other than when the alterations are made. Some disclosed embodiments may additionally require approval before presenting the first alteration, the second alteration, or both. For example, the first alteration made by the first entity may require approval from the second entity before the first instance of the first collaborative group indicator may be displayed in association with the first alteration. This may ensure that all entities associated with the first collaborative group authorize each other's alterations before releasing the alterations to the other collaborative groups on the collaborative electronic document. Additionally, or alternatively, the first alteration my require the approval by another entity (i.e. an administrator, manager, or other user) before the first instance of the first collaborative group indicator may be displayed in association with the first alteration. Similarly, it may be required for the first entity to select an interactive element (e.g. any element in a user interface which may be interacted with through a mouse cursor, a touchable area (as on a touchscreen our touchpad), eye movement (such as with eye trackers), a gesture (such as may be detected by a camera), an application program interface (API) that receives a keyboard input, or any hardware or software component that may receive user inputs) or other means of activation before the first alteration may be displayed in association with the first collaborative group indicator. By a non-limiting example, the system may require the first entity to press a button indicating approval of the first alteration before the first alteration is displayed. Alternatively, the system may require a second entity to press a button indicating approval of the first alteration. Additionally or alternatively, the system may require both the first and the second entity to press a button indicating approval of the first alteration.

Figure 41:
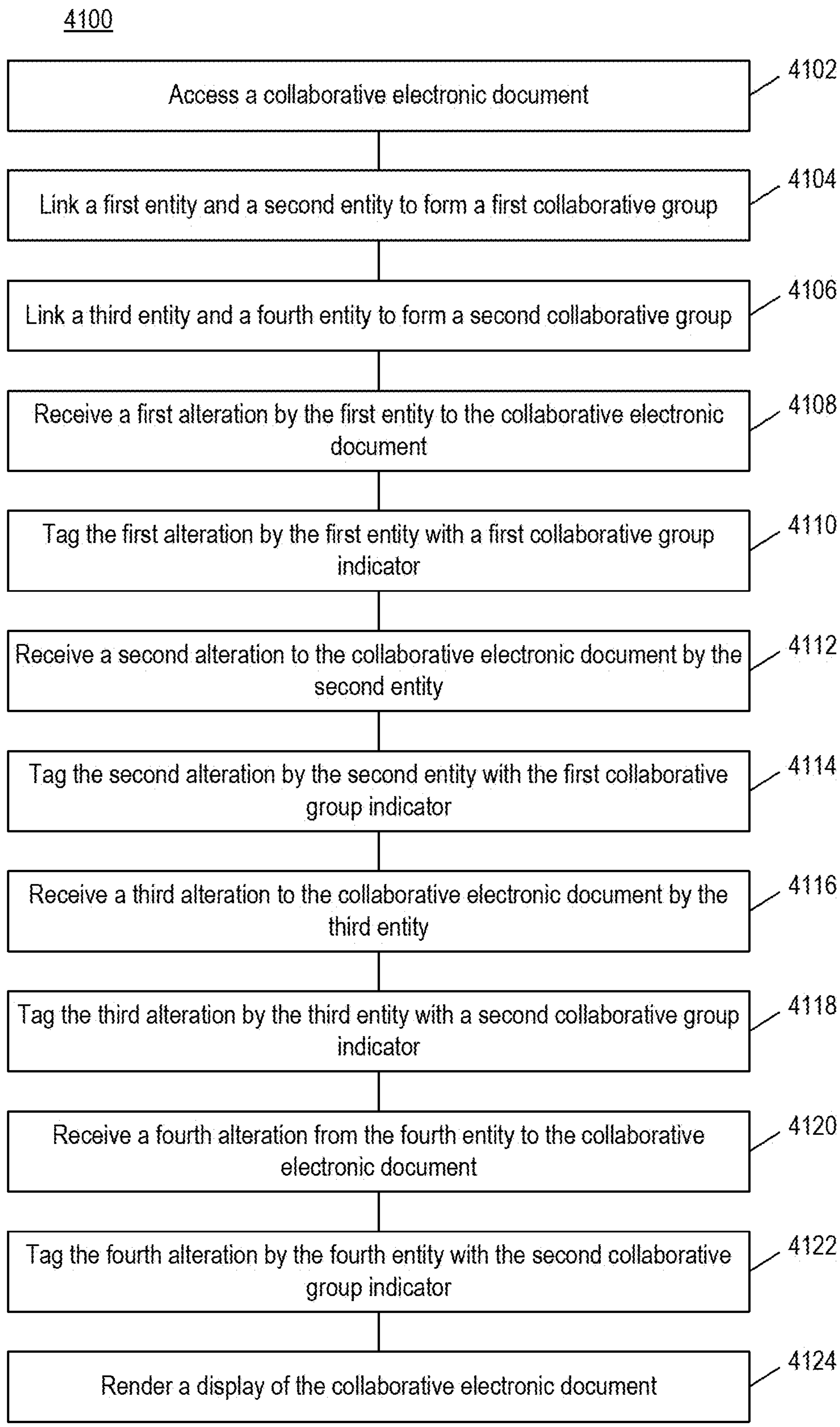
FIG. 41 illustrates a block diagram of an exemplary process for enabling simultaneous group editing of electronically stored documents, consistent with some embodiments of the present disclosure.

FIG. 41 illustrates a block diagram of an example process 4100 for enabling simultaneous group editing of electronically stored documents. While the block diagram may be described below in connection with certain implementation embodiments presented in other figures, those implementations are provided for illustrative purposes only, and are not intended to serve as a limitation on the block diagram. In some embodiments, the process 4100 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 38 to 40 by way of example. In some embodiments, some aspects of the process 4100 may be implemented as software (e.g., program codes or instructions) that are stored in a memory (e.g., the memory portion 122 in FIG. 1) or a non-transitory computer-readable medium. In some embodiments, some aspects of the process 4100 may be implemented as hardware (e.g., a specific-purpose circuit). In some embodiments, the process 4100 may be implemented as a combination of software and hardware. FIG. 41 may include process blocks 4102 to 4124:

At block 4102, the processing means may be configured to access a collaborative electronic document, consistent with the earlier disclosure.

At block 4104, the processing means may involve linking a first entity and a second entity to form a first collaborative group, as discussed previously in the disclosure above.

At block 4106, the processing means may be configured to link a third entity and a fourth entity to form a second collaborative group, as discussed previously in the disclosure above.

At block 4108, the processing means may be configured to receive a first alteration by the first entity to the collaborative electronic document, as discussed previously in the disclosure above.

At block 4110, the processing means may be configured to tag the first alteration by the first entity with a first collaborative group indicator, as discussed previously in the disclosure above.

At block 4112, the processing means may involve receiving a second alteration to the collaborative electronic document by the second entity, as discussed previously in the disclosure above.

At block 4114, the processing means may involve tagging the second alteration by the second entity with the first collaborative group indicator, as discussed previously in the disclosure above.

At block 4116 the processing means may further be configured to receive a third alteration to the collaborative electronic document by the third entity, consistent with the earlier disclosure.

At block 4118, the processing means may be further configured to tag the third alteration by the third entity with a second collaborative group indicator, as discussed previously in the disclosure above.

At block 4120, the processing means may involve receiving a fourth alteration from the fourth entity to the collaborative electronic document, as discussed previously in the disclosure above.

At block 4122, the processing means may involve tagging the fourth alteration by the fourth entity with the second collaborative group indicator, as discussed previously in the disclosure above.

At block 4122, the processing means may be further configured to render a display of the collaborative electronic document, as discussed previously in the disclosure above.

Various embodiments of this disclosure describe unconventional systems, methods, and computer-readable media for enabling granular rollback of historical edits in an electronic document. While users may undo edits made to an electronic documents, it may be difficult to distinguish the entire document from a specific portion of a document where a user may want to undo. It may be difficult to only undo edits made to a specific portion of a document without also undoing edits made to other portions of a document. Further, it may be difficult to view a history of edits made to a specific portion of a document. It may be beneficial to enable viewing of historical edits made to a specific portion of the document. It may be beneficial to enable choosing which, if any, previous edit should be restored. It may be beneficial to allow changing only a specific portion of a document to a previous edit. By enabling granular rollback of historical edits in an electronic document, it may increase the efficiency of editing electronic documents by reducing the number of files that need to be stored in memory for version control, which thereby also increases the overall system's processing speed of processing historical edits for just a single electronic file.

Some disclosed embodiments may involve systems, methods, and computer-readable media for enabling granular rollback of historical edits in an electronic document. Edits may include any addition, deletion, rearrangement, modification, correction, or other change made to the data or information in an electronic document. Historical edits may be any edit made previously, in the past, prior to, or otherwise made at a time before the present time. An electronic document, as used herein, may be any file containing any information that is stored in electronic format, such as text files, word processing documents, Portable Document Format (pdf), spreadsheets, sound clips, audio files, movies, video files, tables, databases, or any other digital file. Granular rollback of historical edits in an electronic document may refer to any review, analysis, or assessment of past edits made to a subset, detailed display, or other specific portion of an electronic document. Additionally, enabling granular rollback may refer to allowing, permitting, or otherwise authorizing rollback of historical edits on any selected portion of information an electronic document. For example, a user may be working in an electronic document and review the previous edits made to a specific paragraph of the document, or any other organization of information in the electronic document (e.g., a character, a word, a sentence, a paragraph, a page, or any combination thereof). Granular rollback of historical edits may be stored, retrieved, and/or transmitted by a user within an electronic document. For example, the system may be configured to automatically enable the granular rollback of historical edits. Alternatively, the system may be configured to only enable granular rollback of historical edits when prompted by a user (e.g., by a toggle on and off feature).

Some disclosed embodiments may include accessing an electronic document, having an original form. Accessing may refer to gaining authorization or entry to download, upload, copy, extract, update, edit, or otherwise receive, retrieve, or manipulate data or information through an electrical medium. For example, for a client device (e.g., a computer, laptop, smartphone, tablet, VR headset, smart watch, or any other electronic display device capable of receiving and sending data) to access an electronic document, it may require authentication or credential information, and the processor may confirm or deny authentication information supplied by the client device as needed. Accessing an electronic document may include retrieving the electronic document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic document may include retrieving the electronic document from a web browser cache. Additionally or alternatively, accessing the electronic document may include accessing a live data stream of the electronic document from a remote source. In some embodiments, accessing the electronic document may include logging into an account having a permission to access the document. For example, accessing the electronic document may be achieved by interacting with an indication associated with the electronic document, such as an icon or file name, which may cause the system to retrieve (e.g., from a storage medium) a particular electronic document associated with the indication. Having an original form may include any new, initial, prior, previous, first or other edition, display, instance, or other version of an electronic document. The original form may be a new, unedited electronic document (e.g., the generation of a new document such that it is a blank document without any populated data or information). Alternatively, the original form may be an already edited or existing version of an electronic document. For example, a user may generate a new, blank document that is an original form of the document. Alternatively or additionally, a user may save an already edited document to a location on a network and that may be an original form of an electronic document. For example, a user may determine the original form of an electronic document, such as, by an input (e.g., the selection of a button) that stores information or instructions in a repository or other storage medium that, when executed by at least one processor, may identify the selected version as the original form. For example, a user input may add metadata to a version (e.g., the original form of an electronic document) to link and store the metadata with that version of the electronic document in a repository. Alternatively or additionally, the system may automatically determine the original form of an electronic document. By way of a non-limiting example, the system may be configured to automatically store, in a repository or other storage medium, the data and information associated with an electronic document as the original form after the first time the electronic document is saved. Similarly, for example, the system may be configured to automatically store, in a repository or other storage medium, the data and information associated with an electronic document as the original form when the electronic document is first created.

Figure 42:
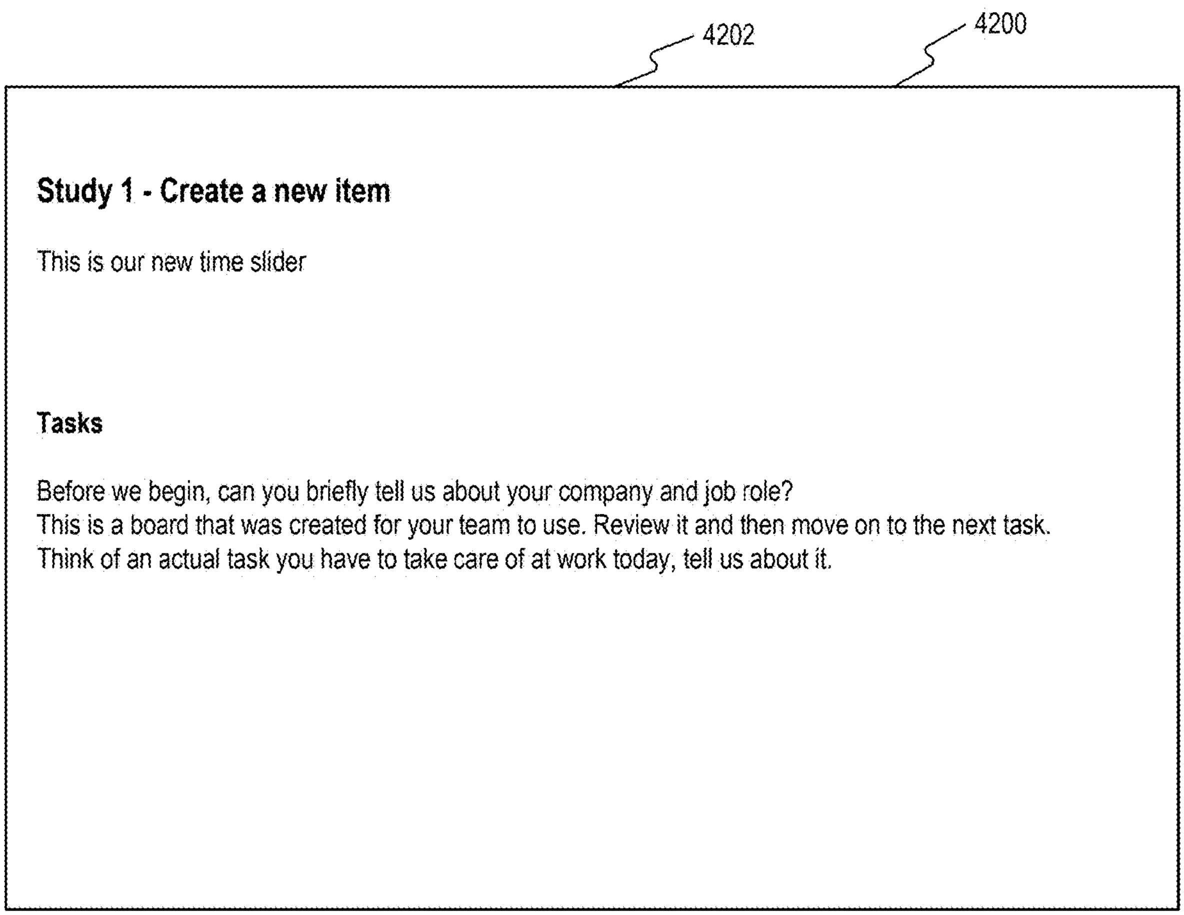
FIG. 42 illustrates an example of a first instance of an electronic document, consistent with some embodiments of the present disclosure.

FIG. 42, for example, may be the original form 4202 of electronic document 4200. For example, in FIG. 2, a user may save, via network 210, the original form of an electronic document (e.g., 4202 of FIG. 42) in repository 230-1. Repository 230-1 may be configured to store software, files, or code, such as the original form of an electronic document developed using computing device 100 or user device 220-1. A computing device 100, user device 220-1, or a different user device 220-2 may access, as discussed above, the electronic document in its original form from repository 230-1. Repository 230-1 may further be accessed by computing device 100, user device 220-1, or other components of system 200 for downloading, receiving, processing, editing, or viewing, the electronic document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include recording at a first time, first edits to a specific portion of an electronic document, recording at a second time, second edits to the specific portion of the electronic document, and recording at a third time, third edits to the specific portion of the electronic document. The relational terms herein such as "first," "second," and "third" are used only to differentiate an edit or operation from another edit or operation, and do not require or imply any actual relationship or sequence between these edits or operations. Recording edits may refer to storing, saving, keeping, maintaining, or preserving alterations made to an electronic document in memory or repository (e.g., a data structure). Recording may be done automatically or manually. For example, as discussed in more detail below, the edits may be recorded at a default or predetermined time intervals (e.g., by seconds, minutes, hours, days, or any other time increment). Additionally or alternatively, edits may be recorded when prompted by user action. For example, edits may be recorded when a user saves the electronic document. Similarly, for example, edits may be recorded when a user closes the electronic document. Further, for example, edits may be recorded by the selection of an interactive element (e.g., pressing a button). The edits may be stored in any non-transitory computer-readable medium. At least one processor may then perform a lookup of permission settings to confirm whether the computing device has authorization to make the edit. In a situation where authorization is confirmed, the system may then implement and store the edit with the electronic document such that any other computing devices accessing the document may retrieve the recorded edit. In another situation where authorization is not confirmed for the editing entity, the system may lock the information in the electronic document such that the information in the electronic document is unable to be altered by the editing entity.

Edits, as referenced above, may refer to any addition, deletion, rearrangement, modification, correction, or other change made to the data or information in an electronic document. For example, edits to an electronic document may be made by one entity, by a group, or by the processor (e.g., via a logical rule for carrying out the task of making an alteration). Alternatively, edits to an electronic document may be made my more than one entity. Recording edits at a time may include any storing an instance of the completed edits at a distinct point in time (e.g., in response to an input from a user indicating an instruction to record), instance, occurrence, interval, or other measure of time that may be determined according to preference or according to a default. For example, a first time may be any point in time occurring before a second time. Alternatively or additionally, a first time may be any interval of time occurring before any second time. A specific portion of the electronic document may be any subset, piece, segment, page, section, or other part of the electronic document. For example, the electronic document may be a word processing document, and the specific portion of the electronic document may be a letter, word, sentence, part of a sentence, paragraph, page, or any other portion of the electronic word processing document. For example, recording at a first time, first edits to a specific portion of the electronic document may include associating metadata with the edits that may be stored in a repository so at least one processor may identify the instance of those edits. Recording at a first time, first edits to a specific portion of the electronic document may involve, for example, storing the addition of a new sentence to the specific portion of the electronic document in a repository.

By way of example, in FIG. 1 and FIG. 2, at least one processor may implement recording a first edit made to a specific portion of an electronic document by storing the edit in storage 130 in FIG. 1, or in a repository 230-1 in FIG. 2. Similarly, the at least on processor may implement recording a second edit made to the specific portion of an electronic document by storing it in storage 130 in FIG. 1, or in a repository 230-1 in FIG. 2. A computing device 100 or a user device 220 may access, as discussed above, the stored edits and may display (e.g., on a screen, other surface, through a projection, or in a virtual space) data and information from the first edit, the second edit, or both the first edit and the second edit, as discussed in more detail below.

Some disclosed embodiments may include receiving at a fourth time, a selection of a specific portion. Receiving a selection may include the system accepting a user input from a computing device associated with a user that indicates instructions to make a selection. The user input may be transmitted over a network to a repository where the electronic document is stored. A selection may be any action taken to elect, pick, designate, or otherwise choose a portion of the electronic document. For example, a selection may be a mouse click, a user input, a mouseover, a highlight, a hover, a touch on a touch sensitive surface, a keystroke, a movement in a virtual interface, or any other action indicating a choice of a specific portion of the electronic document. For example, a selection may be using a mouse to click and highlight (e.g., by mouse click and drag) of a specific portion of an electronic document. Additionally or alternatively, a selection may require an additional click of an activatable element, such as a button.

Figure 43:
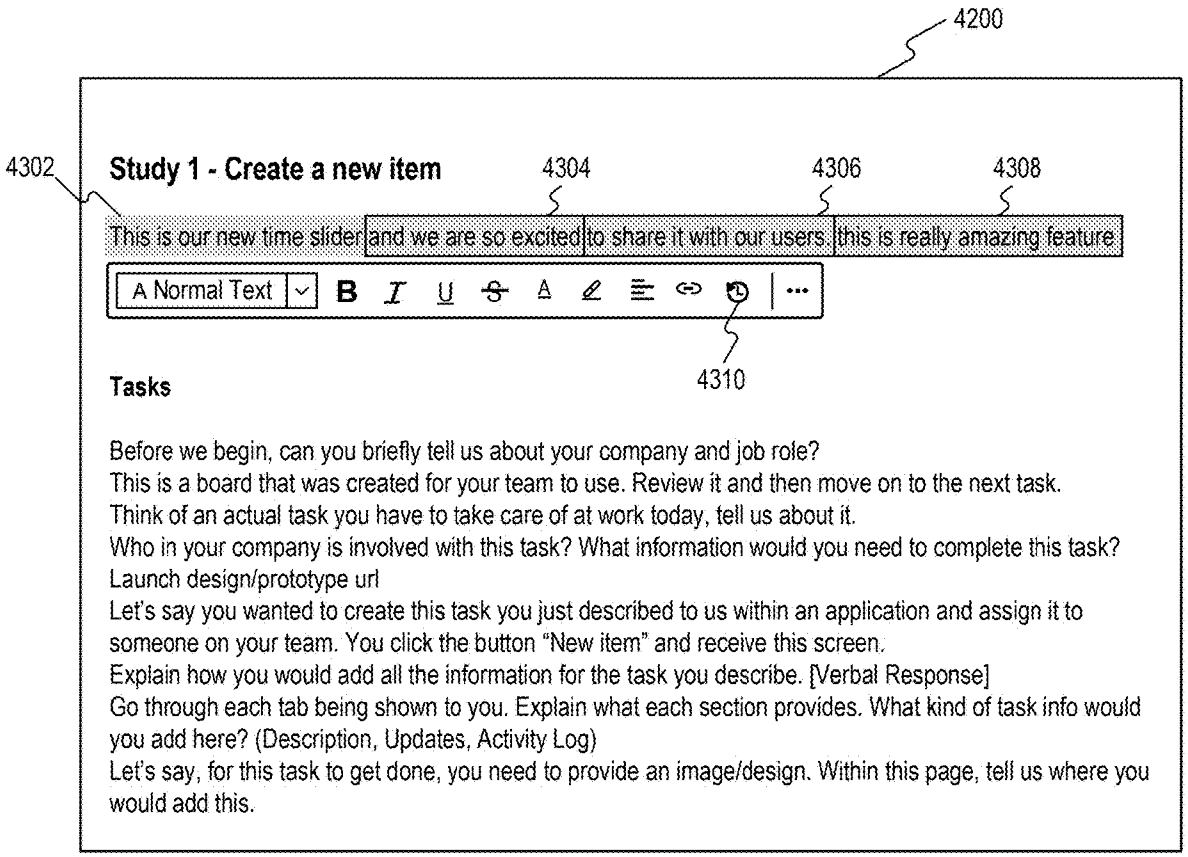
FIG. 43 illustrates an example of a second instance of an electronic document, consistent with some embodiments of the present disclosure.

In FIG. 43, for example, the selection may be made by highlighting the specific portion of text 4302 (e.g., "This is our new time slider and we are so excited to share it with our users. this is really amazing feature") and then clicking an icon button 4310. For example, selecting a specific portion may include any signal or indication that meets a threshold for carrying out instructions for rendering a historical interface (see below for more detail).

In response to a selection, some disclosed embodiments may include, rendering a historical interface enabling viewing of an original form of the selection, first edits, second edits, and third edits. Rendering the historical interface may include causing a display of data or information in the historical interface via a display device. For example, previous versions (e.g., the original form of the selection, the first edits, the second edits, or the third edits) may be displayed, which may require the at least one processor to perform a lookup of the previous version in storage or a repository, and then the system may implement and display the previous version in the historical interface. Each previous version (e.g., the original form of the selection, the first edits, the second edits, or the third edits) may, for example, include metadata associated with the version allowing the at least one processor to identify the version and distinguish it from the other versions. A historical interface may refer to one or a combination of a graphical user interface (GUI), software interface, a web page, an application interface, or any other interface that enables interaction between a human and a machine. The historical interface may include, in some embodiments, an interface with activatable elements that displays previous, prior, past, and/or current versions of the electronic document or portions of the electronic document. As discussed above, the previous versions (e.g., the original form of the selection, the first edits, the second edits, or the third edits) may be stored in a repository or other storage medium. The interactive elements included in the historical interface may include, for example, a mouse cursor, a touchable area (as on a touchscreen), keyboard input, or any hardware or software component that can receive user inputs. The historical interface may include a pop-up window, a webpage, a drop-down menu or any graphical user interface element.

For example, in response to the selection, a rendering of the historical interface may appear inside of, on top of, above, below, next to, or otherwise associated with a rendering of an electronic document. For example, the historical interface may appear in the same window as the electronic document. Alternatively, the historical interface may appear in a new window. The historical interface may include one or more interactable visual elements, such as buttons, sliders, dials, or other visual interactable graphics. Enabling viewing of an original form of a selection and edits may refer to any process or procedure that causes a display (e.g., on a screen, other surface, through a projection, or in a virtual space) of the original form of the selection, the first edits, the second edits, and the third edits. For example, as discussed above, the original form and edits made to the selection may be stored in a repository and include metadata so the at least one processor may identify the original form or edit. For example, all or some of the original form of the selection, the first edits, the second edits, and the third edits, or any combination thereof may be displayed in the historical interface at the same time. Alternatively, one of the original form of the selection, the first edits, the second edits, and the third edits may be displayed in the historical interface at a time. For example, user interaction may enable changing the display from one edit to another with a historical interface that may include a slider that enables a user to change between different displays or forms of the specific portion of the electronic document, such as, a display of the original form of the selected portion, a display of the selected portion after first edits were made to the electronic document, a display of the selected portion after second edits were made to the electronic document, and a display of the selected portion after the third edits were made to the electronic document. In response to the user interacting with the historical interface, such as moving the slider to a marker, discussed in more detail below, associated with an edit, the processor may look up additional data or information stored and associated with the edit, for example. the day and time the edits were made.

Figure 44A:
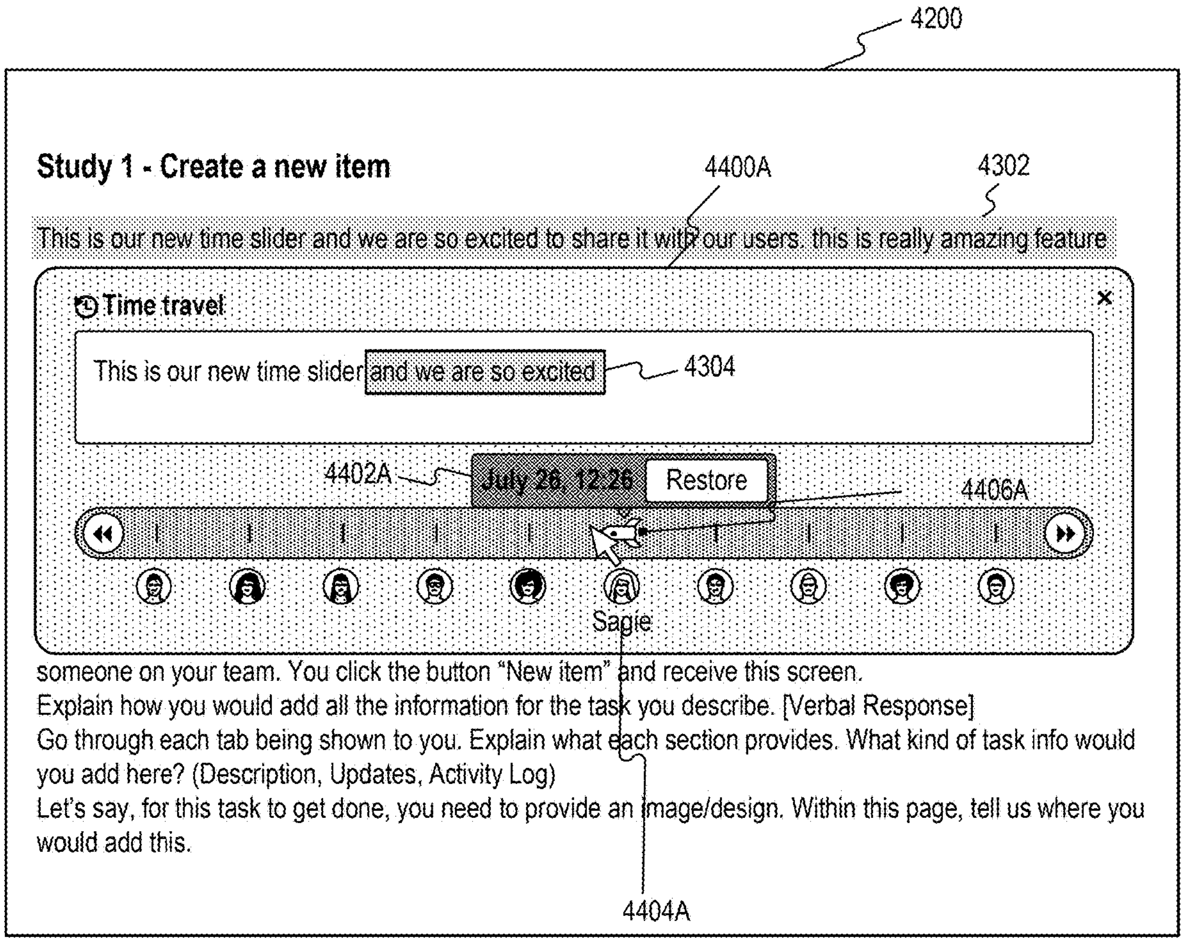
FIG. 44A illustrates an example of a third instance of an electronic document, consistent with some embodiments of the present disclosure.
Figure 44B:
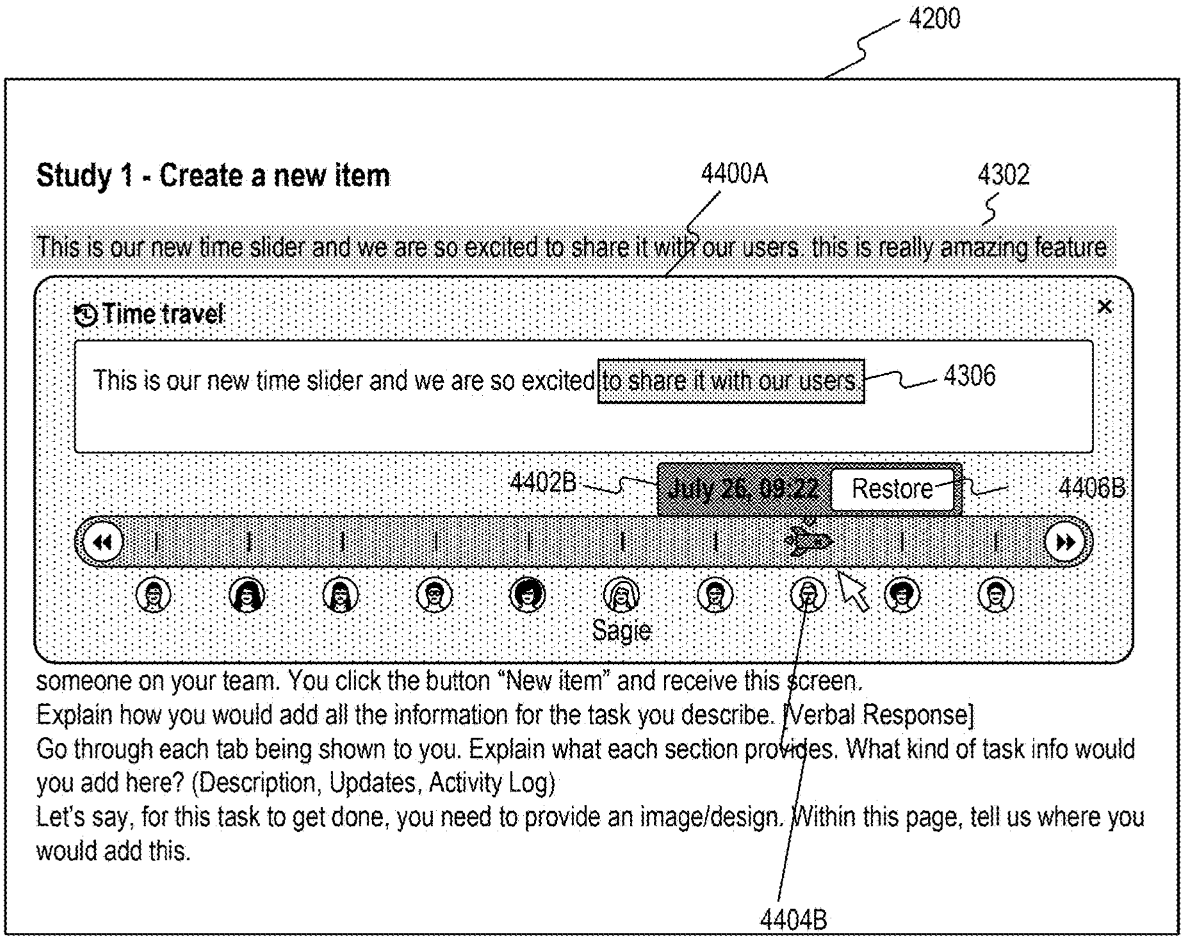
FIG. 44B illustrates an example of a fourth instance of an electronic document, consistent with some embodiments of the present disclosure.
Figure 44C:
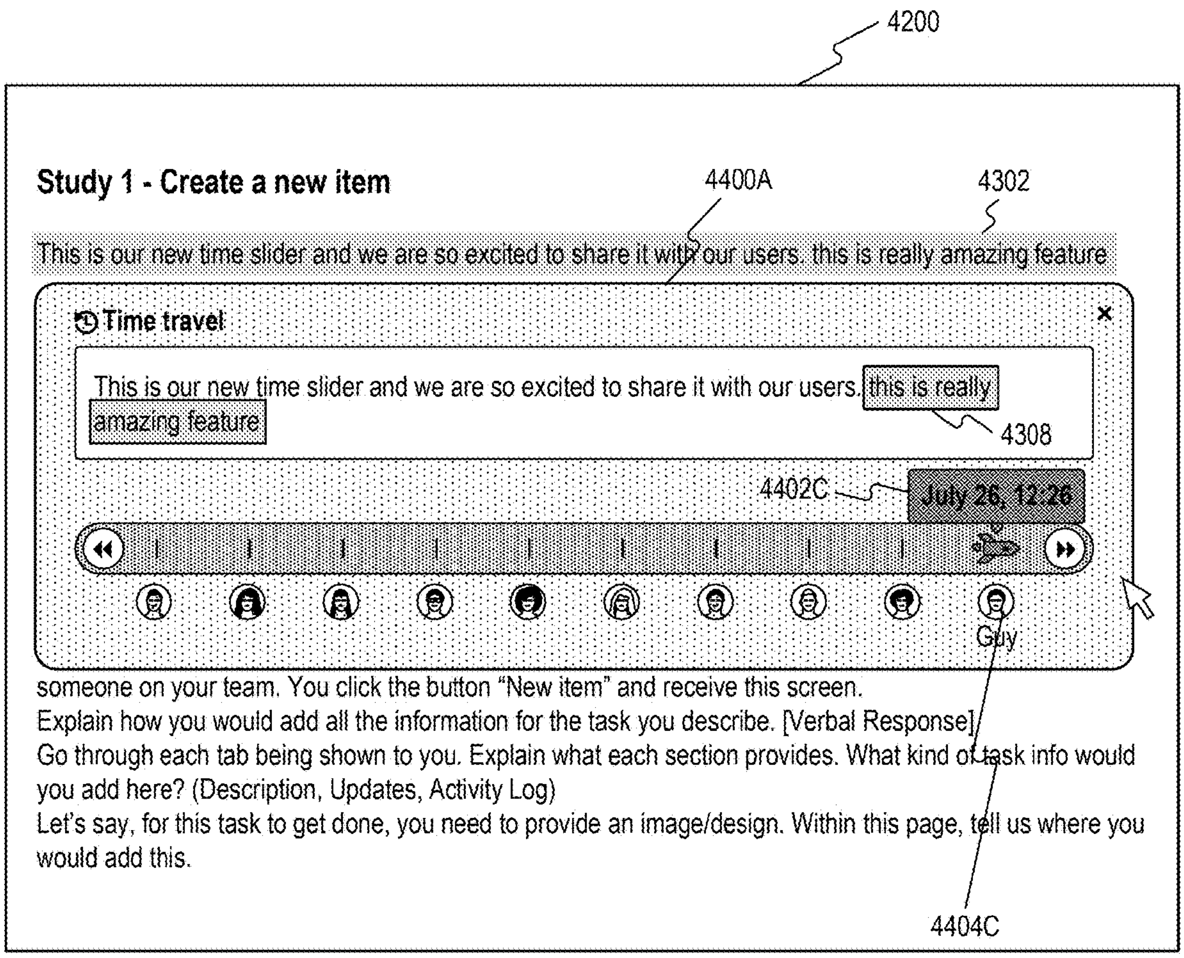
FIG. 44C illustrates an example of a fifth instance of an electronic document, consistent with some embodiments of the present disclosure.

For example, FIG. 44A to FIG. 44C may include exemplary renderings of a historical interface 4400A. For example, in FIG. 44A to FIG. 44C, after a selection of a specific portion of a document 4302 is made, as discussed above, (e.g., "This is our new time slider and we are so excited to share it with our users. this is really amazing feature"), a historical interface 4400A may be rendered on a display of an associated computing device. The historical interface 4400A may enable viewing of the original form of the selection (not shown) by presenting the original form or presenting a link or any other activatable element to access the original form. As shown in FIG. 44A, the historical interface 4400A may enable viewing of the selected portion 4302 after first edits 4304 ("and we are so excited") were made at a first time 4402A. As shown in FIG. 44B, the historical interface 4400A may enable viewing of the second edits 4306 (e.g., "to share it with our users.") made at a second time 4402B. And as shown in FIG. 44C, the historical interface 4400A may enable viewing of the third edits 4308 (e.g., "this is really amazing feature") made at a third time 4402C.

In some disclosed embodiments, a historical interface may include an interactive timeline enabling rollback of edits to markers on the timeline denotating the original form of the selection, the first edits, the second edits, and the third edits. An interactive timeline may refer to any rendered interface (e.g., a graphical user interface) that may include any number of activatable visual elements that may be activated via any interaction (e.g., a cursor hover, mouse click, gesture, keyboard input) that send instructions to the processor, such as for retrieving historical edits from memory and for presenting those edits on a display. For example, as discussed above, an interactive timeline may allow a user to change between different displays, versions, or forms of the specific portion of the electronic document selected. For example, each marker on the interactive timeline may be associated with a different version of the electronic document and, as discussed above, each version (e.g., the original form and each edit) may be stored in a repository and include metadata so the at least one processor may identify the and display the version associated with each marker.

Markers on the timeline may include any visual rendering such as a sign, dash, symbol, icon, pointer, or other indicator that denotes, distinguishes, or represents a time in which edits were made in an electronic document. For example, one or any combination of the original form of the selection, the first edits, the second edits, and the third edits may be denoted by markers on the timeline and may be rendered at specific locations in the timeline to suggest a relative time an edit was made in comparison to other edits or the original form. Markers on a timeline may represent different edits made to the electronic document. For example, a first marker on the timeline may indicate first edits made at a first time. Similarly, a second marker on the timeline may indicate second edits made at a second time. Each marker may represent different edits made to the specific portion of the electronic document. For example, as discussed above, the system may perform a lookup and display the historical edits associated with the marker selected by a user. Alternatively, two or more markers may render the same display, for example, if no edits were made to the specific portion of the electronic document between two or more time intervals represented by markers. Enabling rollback of edits to markers on the timeline may refer to authorizing a user to interact with the timeline to activate the interactable elements (e.g., the markers) that may cause the processor to retrieve historical edits associated with each of the markers available on the timeline. Rollback may include causing a re-rendering of a display to present historical edits at a particular time. Selecting a marker (e.g., by a mouse click, gesture, cursor movement, or any other action that results in the selection of a marker) on the timeline may display edits associated with that marker. For example, if the first marker on the timeline represents the first edits made at a first time, selecting the first marker may render a display of the first edits. Similarly, if the second marker on the timeline represents the second edits made at a second time, a selection of the second marker may render a display of the second edits. A marker on the timeline may represent the original form of an electronic document. Further, a marker on the timeline may represent the most recent, or current form of the document.

For example, in FIG. 2, a historical interface with markers may be displayed on user device 220-1, and a user may select, via an activatable element on user device 220-1, one of the markers. In response to the selection, the system, via network 210, may look up in repository 230-1 the historical edit associated with the selected marker. For example, in FIG. 44A, a selection of a marker associated with edits may be made by moving a rocket slider 4406A to a marker location. For example, selecting a marker associated with the first edits 4404A may enable a rollback of the selected portion to the first edits 4304 ("and we are so excited"), made at a first time represented by a time indicator 4402A. Similarly, as shown in FIG. 44B, selecting a marker associated with the second edits 4404B may enable a rollback of the selected portion to the second edits 4306 ("to share it with our users."), made at a second time represented by a time indicator 4402B. Further, in FIG. 44C, selecting a marker associated with the third edits 4404C may enable a rollback of the selected portion to the third edits 4308 ("this is really amazing feature"), made at a third time represented by a time indicator 4402C. The marker associated with the third edits 4404C may be the most recent edits made to the specific portion of the electronic document 4302.

In some disclosed embodiments, the first edits may be made by a first entity, the second edits may be made by a second entity and the third edits may be made by a third entity, and the markers may enable identification of a particular entity associated with a particular edit. In further disclosed embodiments the markers may indicate an identity of an associated entity responsible for an associated edit. An entity may include a person, client, group, account, device, system, network, business, corporation, or any other user accessing an electronic document through an associated computing device or account. Markers enabling identification of a particular entity associated with a particular edit may include visual indicators linking, detecting, recognizing, classifying, associating, or otherwise determining a relationship or connection between edits made to an electronic document with an entity. A particular edit may be any alteration made to an electronic document, such as any of the first, second, and third edits. Markers identifying an entity responsible for an associated edit may refer to any visual indicator that presents information associated for a responsible entity or account that made a correlating alteration to an electronic document. For example, a computing device may associate metadata with any edit made to an electronic document with data or information associated with an entity that makes each edit, and the system may be configured to store the metadata with the edit in a repository. For example, based on one or more settings, conditions, instructions, or other factors, a system may be configured to identify the entity responsible for an associates edit. Identifying information may include the IP address, MAC address, the user ID associated with a user device (such as user device 220 of FIG. 2), or any other comparable information that can be used to identify a particular user account, a user device, information of a user (e.g., name, image, email address), or other means of identifying a specific entity. In some embodiments, edits made by a specific user device may be associated with an entity, information regarding the specific user device may be stored as metadata with the edit such that the processor may retrieve the metadata and present an indicator identifying the specific user or associated computing device that is responsible for the edit. The first edits may be made by a first entity, and the processor may record, as discussed above, the identity of the first entity with the first edits in a repository. As a result, when receiving a selection of a portion of the document including the first edits, the rendered historical interface may present a marker representing when the first edits were made, and the marker may include any visual indicator representing and/or identifying the first entity, such as an avatar, a thumbnail image, alphanumeric text, or a combination thereof. Additionally, the second edits may be made by a second entity, and a second marker representing when the second edits may include any identifying visual indicator associated with the second entity, similar to the markers of the first entity. When markers are rendered on a historical interface, each marker may be rendered in similar or different manners. For example, a first marker associated with when a first edit was made may include a graphical indicator of a depiction of a llama to represent a first entity responsible for making the first edit. In the same historical interface, a second marker associated with when a second edit was made may include a visual indicator including textual information such as initials or a name that identifies a second entity responsible for making the second edits.

In FIG. 44A, an exemplary historical interface 4400A may include markers presented as thumbnail images identifying the particular entity associated with a particular edit. One marker 4404A may include a thumbnail identifying the particular entity (e.g., "Sagie") associated with the particular edit 4304.

In some disclosed embodiments the first edits, the second and the third edits may be each associated with a common entity. Being associated with a common entity may refer to each of the first, the second, and the third edits being made by or attributed to the same, similar, equivalent, or other associated entity or entities. For example, a common entity may be a person, client, group, account, device, system, network, business, corporation, or any other user or users accessing an electronic document through an associated computing device or account. A common entity on an associated computing device may make multiple edits to an electronic document, such as the first edits, the second edits, and the third edits as discussed previously above. Additionally or alternatively, the first edits, the second edits, and the third edits may be made on different user devices associated with a common entity (e.g., each of the edits are made by different employees at the same company). The first edit, second edit, and third edit may be represented by different markers, or may be represented by a common marker.

For example, in FIGS. 44A to 44C, each marker associated with edits, may be associated with different entities. For example, the marker associated with the first edits 4404A in FIG. 44A may be associated with a user device ("Sagie's device"). The marker associated with the third edits 4404C may be associated with a different user device ("Guy's device"). In alternative embodiments not shown, the markers in the historical interface may be associated with a common entity, such as the same user device, the same user account, or member of the same company.

Some disclosed embodiments may include applying a time interval to document edits wherein selection of a particular marker may cause a presentation of changes that occurred during the time interval. In further disclosed embodiments, the time interval may be user-definable. A time interval may be any period, duration, length, or other amount of time that may be defined with a beginning and end time. The time interval may be defined by the system. For example, the time interval may be a default time interval, instructing the system to record edits in a repository at each default time interval. Additionally and alternatively, the time interval may be manually or automatically defined. For example, the system may require a user to input a time interval to record edits in a repository at each input time interval. Applying a time interval to document edits may include assigning, allocating, or otherwise choosing a time interval during which edits are made and recorded in a repository, as discussed above, as occurring during that time interval. For example, as discussed above, edits may be every change or any change made over a time interval. Applying the time interval may include sending instructions to the at least one processor to record in a repository the edits made during the time interval. The edits made during the time interval may, for example, store metadata with the edits in a repository so that the at least one processor may perform a lookup in a repository for edits that have a timestamp within the time interval. A presentation of changes that occurred during the time interval may include causing a display of the data and information stored in a repository associated with the edits made during a time interval via a display device. The selection of a particular marker causing presentation of changes that occurred during the time interval may include, for example, displaying the data and information associated with the changes that occurred during a time interval on a user device. A time interval may be considered to be user-definable when the time interval is determined, defined, assigned, or otherwise designated by a user or any other entity on an associated computing device of the electronic document. For example, the time interval may be defined by an administrator, manager, group, team, or other authorized individuals or entities. For another example, there may be no edits made to a specific portion of the electronic document during a time interval (e.g., no alterations have been made). Alternatively, there may be edits to the specific portion of the electronic document during a time interval.

For example, an authorized user on a user device 220-1 or a computing device 100 of FIGS. 1 and 2 may assign a time interval of one hour to an electronic document. The system may carry out instructions to record edits to the electronic document every hour and store the edits in a repository 230-1. The user may select, via an activatable element on a historical interface, a particular marker, which may represent a specific hour. As discussed above, in response to the user's selection of the specific hour, the at least one processor may perform a lookup in a repository for the edits made during that hour interval and may display the edits made during the particular hour on a user device. Similarly, and as discussed above, if the user selects a different marker, representing a different hour, the at least one processor may perform a lookup in a repository for the edits made during that different hour interval and may display the edits made during the different hour interval on a user device.

In some disclosed embodiments the historical interface may be configured to simultaneously display the first edit, the second edit, and the third edit. Simultaneously display may mean presenting any combination of or all of the first edit, the second edit, and the third edit at the same time or near the same time. Display, as used herein, may include any visualization of data associated with the first edit, the second edit, and the third edit. For example, a historical interface may display the first edit above the second edit and the second edit above the third edit. This may allow a user to compare the edits at or near the same time. For example, the at least one processor may retrieve from the repository data and information associated with each edit (e.g., an original form, a first edit, a second edit, and/or a third edit) and may render a historical interface enabling viewing of the edits at the same time. In other examples, the historical interface may render a display of just the markers associated with each of the first, second, and third edits at the same time.

Some disclosed embodiments may include co-displaying a timeline in a vicinity of a specific portion of an electronic document. Co-displaying a timeline in a vicinity of a specific portion of an electronic document may include enabling the visualization of a historical interface and a specific portion of the electronic document at the same time, or near the same time in a common presentation on a display. For example, the historical interface may be shown above, below, next to, together with, side by side with, or otherwise near the specific portion of the electronic document. This may enable a user to compare the specific portion of the electronic document selected with one or more of the edits made to the electronic document.

For example, in FIG. 44A, the historical interface 4400A may appear as a pop-up window below the specific portion of the electronic document 4302, and as a window above the rest of the information displayed in the electronic document.

Some disclosed embodiments may include receiving an election of one of the original form of the electronic document, the first edits, the second edits, and the third edits, and upon receipt of the election, presenting a rolled-back display reflecting edits made to the specific portion of the electronic document, the rolled-back display corresponding to a past time associated with the election. Receiving an election of one of the original form of the electronic document, the first edits, the second edits, or the third edits may include receiving an input from an associated computing device of a user or account that indicates an intent for choosing, picking, deciding, appointing, or otherwise selecting (e.g., by a mouse click, gesture, cursor movement, or any other action by a user) the original form of the electronic document, the first edits, the second edits, or the third edits. Receiving an election may be a data input from a computer device. For example, receiving an election may include any signal or indication that meets a threshold for carrying out instructions for presenting a rolled-back display, such as performing a lookup of data or information stored in a repository associated with the election. A rolled-back display reflecting edits made to the specific portion of the electronic document may include the presentation of any recorded version of the specific portion of the electronic document as discussed previously above. Presenting a rolled-back display reflecting edits made to the specific portion of the electronic document upon receipt of the election may include outputting one or more signals configured to result in the rendering of the alterations to the information in the specific portion of the electronic document associated with the previously received election on any display methods, as described herein. The rolled-back display corresponding to a past time associated with the election may include the presentation of the selected version. For example, a user may select the first edits, and in response, the system may perform a lookup of the data and information stored in a repository associated with the first edits and present the first edits on a display device, as discussed previously above.

For example, after receiving an election of the original form (e.g., by selecting a graphical indicator associated with the original form on the historical interface), the rolled-back display may show the specific portion of the electronic document in an original form (e.g., before the first edits, the second edits, or the third edits were made). Alternatively, after receiving an election of the first edits in the historical interface, the rolled-back display may show the information in the specific portion of the electronic document as it existed after the first edits were made to the specific portion. The rolled-back display reflecting edits made to a specific version of the electronic document may present only the rolled-back display for the specific portion of the electronic document selected. For example, receiving an election of the original form may present a rolled-back display of the original form of the specific portion of the electronic document, while the rest of the electronic document (i.e. the portion of the electronic document that was not selected) may remain unchanged. An election may include recording the selection of a new edit to the electronic document. For example, an election may be recorded and another selection of the specific portion of the electronic document may render a historical interface that includes the election as an edit to a specific portion of the electronic document.

For example, FIG. 45 may represent a presentation of a rolled-back display 4500 reflecting edits made to a specific portion of the electronic document. For example, as discussed above, FIG. 44B may show a historical interface 4400A enabling viewing of the second edits 4306 (e.g., "to share it with our users.") made at a second time 4402B to a specific portion of the electronic document 4302 (e.g., "This is our new time slider and we are so excited to share it with our users. this is really amazing feature"). An election may be received by clicking the "Restore" button 4406B. After the election is made, for example, FIG. 45 may show a rolled-back display 4500.

Figure 46:
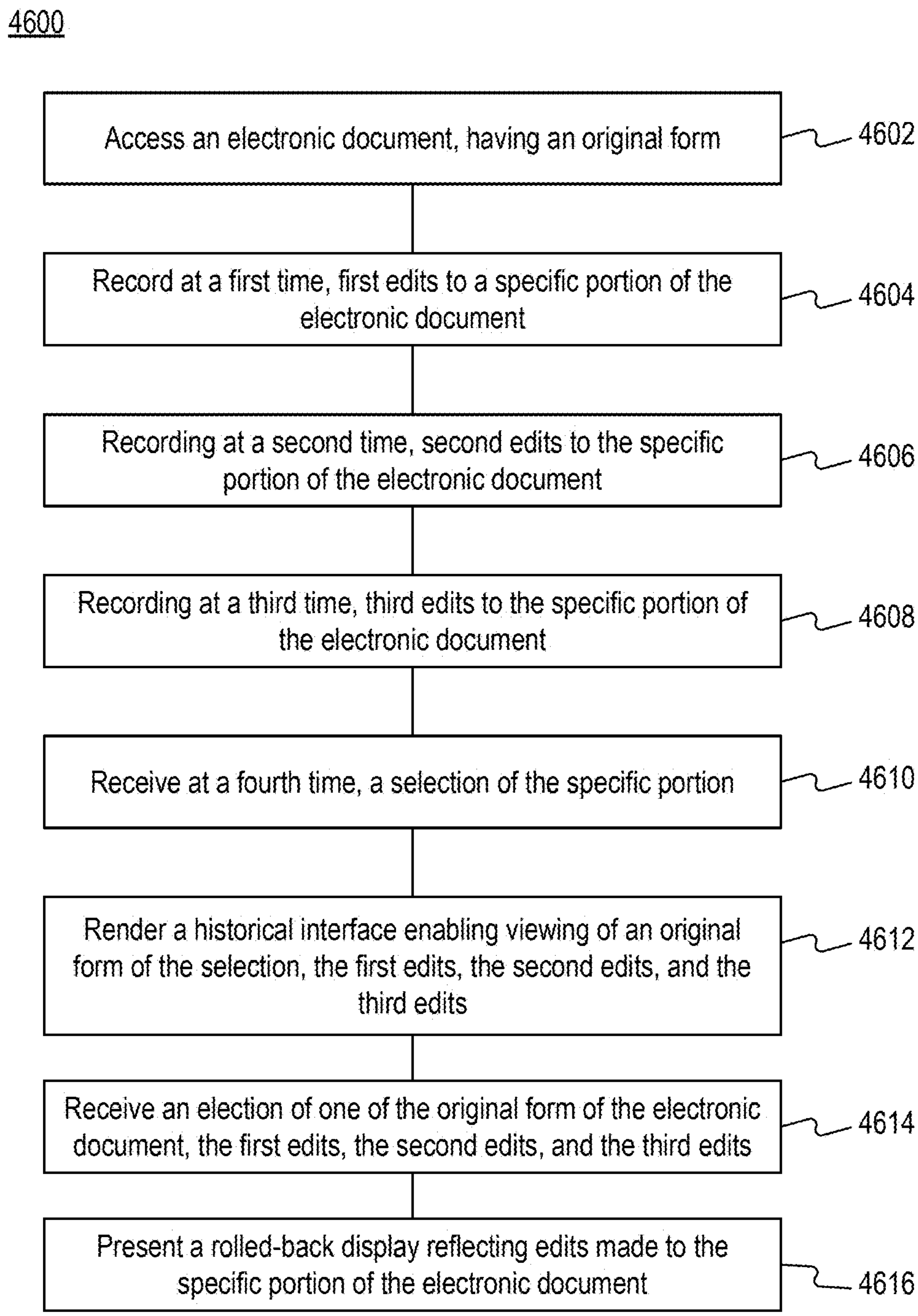
FIG. 46 illustrates a block diagram of an exemplary process for enabling granular rollback of historical edits in an electronic document, consistent with some embodiments of the present disclosure.

FIG. 46 illustrates a block diagram of an example process 4600 for enabling granular rollback of historical edits in an electronic document. While the block diagram may be described below in connection with certain implementation embodiments presented in other figures, those implementations are provided for illustrative purposes only, and are not intended to serve as a limitation on the block diagram. In some embodiments, the process 4600 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 42 to 45 by way of example. In some embodiments, some aspects of the process 4600 may be implemented as software (e.g., program codes or instructions) that are stored in a memory (e.g., the memory portion 122 in FIG. 1) or a non-transitory computer-readable medium. In some embodiments, some aspects of the process 4600 may be implemented as hardware (e.g., a specific-purpose circuit). In some embodiments, the process 4600 may be implemented as a combination of software and hardware.

FIG. 46 may include process blocks 4602 to 4618:

At block 4602, the processing means may be configured to access an electronic document, having an original form, consistent with the earlier disclosure.

At block 4604, the processing means may be configured to record at a first time, first edits to a specific portion of the electronic document, as discussed previously in the disclosure above.

At block 4606, the processing means may involve recording at a second time, second edits to the specific portion of the electronic document, as discussed previously in the disclosure above.

At block 4608, the processing means may involve recording at a third time, third edits to the specific portion of the electronic document, as discussed previously in the disclosure above.

At block 4610, the processing means may be configured to receive at a fourth time, a selection of the specific portion, as discussed previously in the disclosure above.

At block 4612, the processing means may be configured to render a historical interface enabling viewing of an original form of the selection, the first edits, the second edits, and the third edits, as discussed previously in the disclosure above.

At block 4614, the processing means may be configured to receive an election of one of the original form of the electronic document, the first edits, the second edits, and the third edits, as discussed previously in the disclosure above.

At block 4616 the processing means may be further configured to present a rolled-back display reflecting edits made to the specific portion of the electronic document, consistent with the earlier disclosure.

Various embodiments of this disclosure describe unconventional systems, methods, and computer-readable media for tracking on a slide-by-slide basis, edits to presentation slides. In a stored deck of presentation slides, it may be difficult to only undo changes made to a particular slide without also undoing changes made to an entire deck of slides. Further, it may include difficult to view a history of changes made to a particular slide. It may be beneficial to allow viewing of historical changes made to a particular slide. It may be beneficial to enable choosing which, if any, previous changes should be reincorporated. It may be beneficial to enable editing of only particular slide of a deck. By tracking on a slide-by-slide basis, edits to presentation slides, it may increase the efficiency of users editing stored decks of presentation slides by reducing the number of files that need to be stored in memory for version control, which thereby also increases the overall system's processing speed of processing historical edits for a stored slide deck.

Some disclosed embodiments may involve systems, methods, and computer-readable media for tracking on a slide-by-slide basis, edits to presentation slides. Tracking may include following, recording, maintaining, saving, or otherwise storing data and information. For example, data and information associated with an electronic file may be tracked by storing associated data in memory or a repository. Presentation slides may include any program, digital document, or other electronic document used to store and display data or information. Presentation slides may include any presentable data and information as a single page of an electronic document, or multiple pages associated with each other in a deck. For example, a presentation slide may include one or more of text, programming language, video, audio, image, design, document, spreadsheet, tabular, virtual machine, a link or shortcut. The presentation slide may be stored in any manner such as in an image file, a video file, a video game file, an audio file, a playlist file, an audio editing file, a drawing file, a graphic file, a presentation file, a spreadsheet file, a project management file, a pdf file, a page description file, a compressed file, a computer-aided design file, a database, a publishing file, a font file, a financial file, a library, a web page, a personal information manager file, a scientific data file, a security file, a source code file, any other type of file, or other presentable data and information which may be stored in memory or a repository. A slide, as used herein and as discussed above, may include any software, program, or electronic document used to present data or information that may be visually displayed in a single page. A slide may include any subset, portion, page, document, sheet, or specific display of a stored deck of presentation slides. Edits may include any addition, deletion, rearrangement, modification, correction, or other change made to the data or information of a slide. Tracking on a slide-by-slide basis, edits made to presentation slides may include storing or recording alterations made to slides of a stored deck of presentation slides such that alterations made to the slides may be stored in and retrieved from memory or repository individually for each slide. For example, edits made to slides may include metadata that associates the edits with a specific slide and allows a processor to identify the edits as associated with the slide. In a deck of multiple slides, the repository may store alterations to each of the slides individually in different locations in the repository such that when the processor retrieves the data associated with a particular slide, the processor only needs to access the repository once to retrieve all of the data associated with a particular slide. Tracking on a slide-by-slide basis, edits made to presentation slides may involve, for example, storing the addition of a new sentence to the slide in a repository.

Some disclosed embodiments may include presenting a first window defining a slide pane for displaying a slide subject to editing. The relational terms herein such as "first," "second," and "third" are used only to differentiate a window or operation from another window or operation, and do not require or imply any actual relationship or sequence between these windows or operations. Presenting a window may include causing a display of the data or information contained in a dedicated portion of a display in a rendered visualization via a display device, discussed in further detail below. For example, presenting a window may include outputting one or more signals configured to result in the display of a window on a screen, or other surface, through projection, or in virtual space. For example, presenting a window may include visually representing or rendering, on a user device, the data and information associated with a slide in a window. This may occur, for example, on one or more of a touchscreen, a monitor, AR or VR display, or any other means previously discussed and discussed further below. The window may be presented, for example, via a display screen associated with the entity's computing device, such as a PC, laptop, tablet, projector, cell phone, or personal wearable device. The window may also be presented virtually through AR or VR glasses, or through a holographic display. Other mechanisms of displaying may also be used to enable an entity to visually comprehend the presented information.

A window may include any defined area of a rendered display of information dedicated to present information or data. For example, a window may be associated with a width, height, aspect ratio, position indicator, and/or any other information delineating the window's size or position within an electronic file (e.g., represented in metadata associated with the window). In some embodiments, a window may be positioned and/or sized according to one or more inputs initiated by a user (e.g., dragging an outline of the window using a mouse). A slide pane may include any separate, defined, distinct, individual, or other area of a rendered display used for displaying, viewing, modifying, editing, or otherwise receiving input or interaction with one or more slides. A slide pane may refer to a window as described above. A slide subject to editing may be any slide that is actively presented for alteration that allows a user (e.g., by user inputs) to add, delete, rearrange, modify, correct, or otherwise change the data and information in a particular slide. For example, a user may change the text of a slide in a slide subject to editing and may indicate to a processor a particular slide for editing by selecting the particular slide to appear in a slide pane. A first window defining a slide pane for displaying a slide subject to editing may refer to a window rendering information associated with a slide, where the window may be an active editing display that enables editing of that particular slide.

For example, a first window may display a slide on a computing device, such as computing device 100 (of FIG. 1) and may provide a user the ability to make edits to the slide in the presented first window. The first window may display a primary editing window for presentation slides. For example, in FIG. 47A, the first window 4702A may define a slide pane for displaying a slide subject to editing. In this example, the first window 4702A may allow a user to edit "Slide 1" since it appears in the first window 4702A acting as a window pane for actively altering a particular slide appearing in the first window 4702A.

Some disclosed embodiments may include presenting in a second window a current graphical slide sequence pane, for graphically displaying a current sequence of slides in the deck. A current graphical slide may include any visual representation of an existing, recent, or present version of a slide. A current graphical slide sequence pane may refer to a window presenting, via a display device, one or more visual representations of information that may be presented in a succession, series, chain, progression, arrangement, or other order according to a deck of slides that may be selected for presentation. Graphically displaying may include rendering any visual representation, aid, demonstration, showing, or other presentation of data or information in a visual manner. Graphically displaying a current sequence of slides in a deck may include presenting the most recent, existing, latest, or present order of slides in a deck. For example, slides in a deck may be numbered one to four (e.g., it is the intent of a user for the slides to present one after another in order) and may be presented with a preview of this sequence in a dedicated window of a screen. A deck may include any series, set, or group of one or more slides of a presentation or any other electronic document. Presenting in a second window a current graphical slide sequence pane may include displaying a particular deck of slides opened for presentation in the latest order of slides determined by the deck on a display device. The second window may graphically display the current sequence of slides in the deck in any arrangement or order. For example, a slide deck may contain three slides numbered one, two, and three, and the second window may arrange and display the first slide to the left of the second slide which itself may appear to the left of the third slide. Alternatively, in the second window, the first slide may be above the second slide, and the second slide may be above the third slide.

Figure 47A:
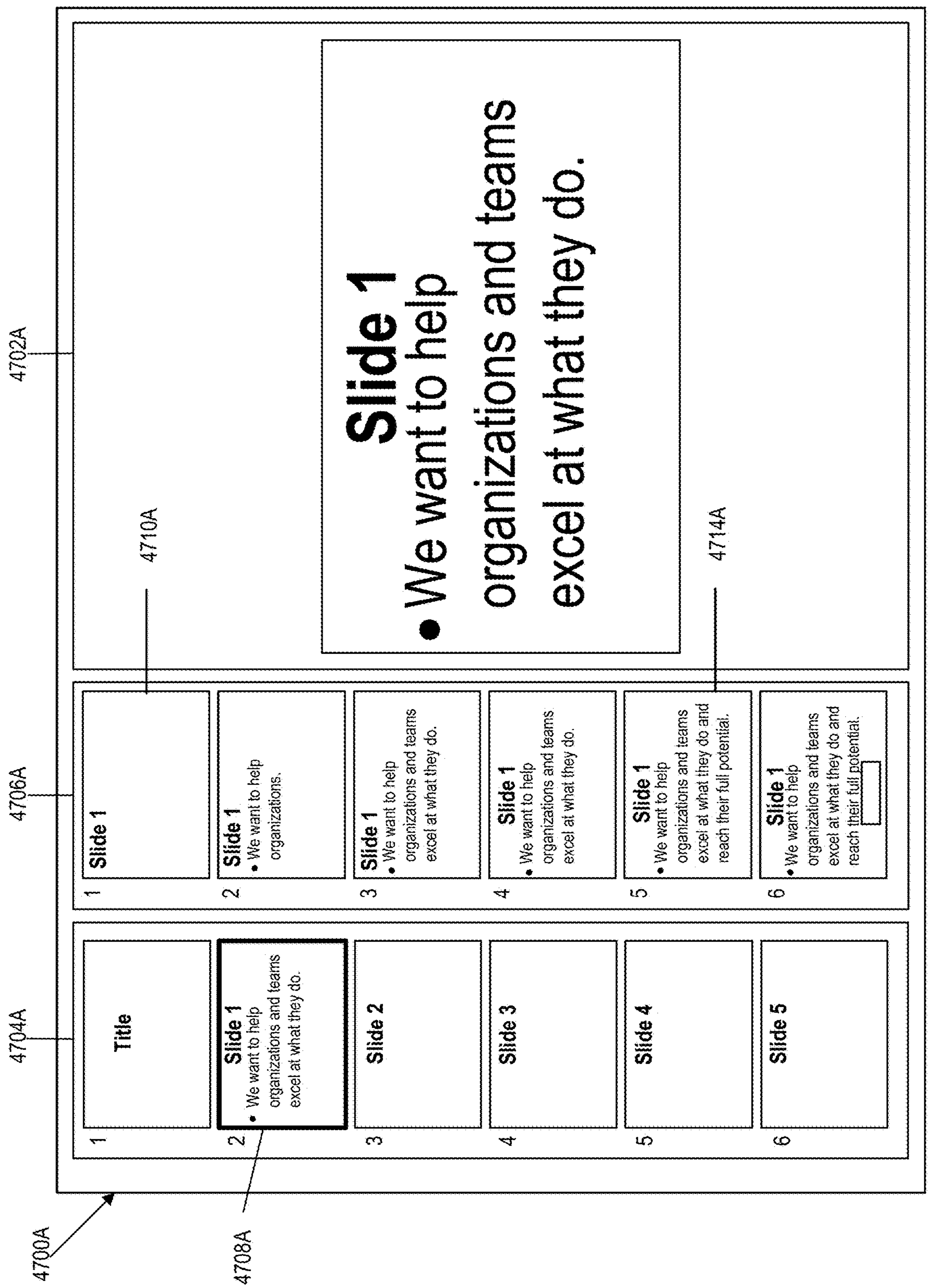
FIG. 47A illustrates an example of a first instance of a stored deck of presentation slides, consistent with some embodiments of the present disclosure.

For example, in FIG. 47A, a second window 4704A may render a visualization of a current graphical slide sequence pane for presenting a visual representation of the current order of the slides in a deck (e.g., Title, Slide 1, Slide 2, Slide 3, Slide 4, Slide 5).

Some disclosed embodiments may include presenting in a third window a historical graphical slide sequence pane for graphically presenting a former sequence of slides in the deck. A historical graphical slide may include any of a previous, past, or prior edition, rendering, display, or version of a slide that was previously stored in memory. A historical graphical slide sequence pane may include a window displaying, via a display device, data or information associated with retrieved historically stored versions of a particular slide according to a particular order. For example, former versions of a slide may be displayed, which may require a processor to perform a lookup of the former versions of a slide in storage or a repository, and then the system may implement and display the former version in a historical graphical slide sequence pane (i.e., the third window). Each previous version of a slide may, for example, include metadata associated with the version allowing the at least one processor to identify the version and distinguish it from other previous versions and the current version of the slide. Historical versions of a particular slide may be saved and/or stored manually or automatically in a repository or other storage medium. For example, a historical version of a slide may be saved in a repository in response to a user input (e.g., the selection of a button) that stores information or instructions in a repository or other storage medium that, when executed by at least one processor, may identify the historical version as associated with the particular slide. Additionally or alternatively, for example, the system may be configured to automatically store, in a repository or other storage medium, the data and information associated with the historical version after a certain amount of time. Graphically presenting may include any visual rendering, representation, aid, demonstration, showing, or other display of data or information. A former sequence may include any order and arrangement of the previous versions of a slide. For example, the slides may be presented in an order based on the time edits were made to the slide. For example, the earliest version of a slide, with edits made at an earliest time, may appear on top of each subsequent previous version of the slide. Alternatively, the most recent historical graphical slide may appear on top and the earliest historical graphical slide may be on the bottom. Graphically presenting a former sequence of slides in the deck may include displaying previous, past, historical, or prior editions, displays, instances, or other versions of a particular slide or for multiple slides. For example, presenting in a third window a historical graphical slide sequence pane for graphically presenting a former sequence of slides in the deck may include displaying historical versions of a slide in the chronological order in which edits were made to the slide. For example, the third window may display three prior versions of a slide, each version visually representing the slide at different previous times. The processor may be configured to store different versions of the slides in a repository or other storage medium and may include metadata so a processor may identify each version of a slide and display each previous version in an any order. For example, graphically presenting a former sequence of slides in the deck may include associating each slide with a different timestamp, and the processor may, in one lookup, retrieve all the data associated with a particular slide (each historical graphical slide) from a repository and display the historical graphical slides in chronological order, based on the timestamp.

For example, in FIG. 47A, a third window 4706A may include a rendering of a historical graphical slide sequence pane and may present previous versions of a particular slide (e.g., Slide 1). As shown, the previous versions of the slide (e.g., Slide 1) may be ordered to represent different versions of the slide. For example, slide 4710A may represent a first version of a particular slide, and 4714A may represent a later version of the particular slide (e.g., edits made after the edits made to the first version) in a chronological manner.

Some disclosed embodiments may include accessing a stored deck of presentation slides. Accessing may include gaining authorization or entry to download, upload, copy, extract, update, edit, or otherwise receive, retrieve, or manipulate data or information through an electrical medium. For example, for a client device (e.g., a computer, laptop, smartphone, tablet, VR headset, smart watch, or any other electronic display device capable of receiving and sending data) to access a stored deck, it may require authentication or credential information, and the processor may confirm or deny authentication information supplied by the client device as needed. Accessing a stored deck may include retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the stored deck may include retrieving the deck from a web browser cache. Additionally or alternatively, accessing the stored deck may include accessing a live data stream of the stored deck from a remote source. In some embodiments, accessing the stored deck may include logging into an account having a permission to access the deck. For example, accessing the stored deck may be achieved by interacting with an indication associated with the stored deck, such as an icon or file name, which may cause the system to retrieve (e.g., from a storage medium) a particular electronic document associated with the indication. A stored deck of presentation slides, as discussed previously above, may include any software, program, digital document, or other electronic document used to display or present data or information on one or more displayed pages in at least one deck that may be stored in a repository.

For example, a deck may be stored in repository 230-1 as shown in FIG. 2. Repository 230-1 may be configured to store software, files, or code, such as presentation slides developed using computing device 100 or user device 220-1. Repository 230-1 may further be accessed by computing device 100, user device 220-1, or other components of system 200 for downloading, receiving, processing, editing, or viewing, the presentation slides. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include populating a first window, a second window, and a third window with slides of a deck. Populating a window may include receiving instructions for retrieving data from a repository to present the data in a rendered display of a window on a screen, where the window may display information corresponding to the retrieved data. For example, populating a window may require a processor to perform a lookup in a repository for the data and information that will fill the rendered window on a screen. Populating a window with slides in a deck may include filling a window (e.g., the first window, the second window, and the third window) with retrieved data associated with a deck of slides and render the corresponding information associated with the deck in the window. For example, a slide deck may be stored in memory or a repository, and a processor may be configured to retrieve the information and display the information retrieved in the first window, the second window, and/or the third window.

Some disclosed embodiments may include receiving a selection of a particular slide having a current version displayed in the second window and a former version displayed in the third window. Receiving a selection may include the system accepting a user input from a computing device associated with a user that indicates instructions to make an election or selection. The user input may be transmitted over a network to a repository where the stored deck of presentation slides may be stored. A selection may include any action taken to elect, pick, designate, or otherwise choose a particular slide. A selection may involve an input from a user input device (e.g., a mouse, a keyboard, touchpad, VR/AR device, or any other electrical or electromechanical device from which signals may be provided) or non-user input (e.g., a sensor reading, an event listener detection, or other automatic computerized sensing of changed circumstances). For example, a selection may be a mouse click, a mouseover, a highlight, a hover, a touch on a touch sensitive surface, a keystroke, a movement in a virtual interface, or any other action indicating a choice of a particular slide. For example, a selection may be using a mouse to click a particular slide. Additionally or alternatively, a selection may require an additional click of an activatable element, such as a button. A particular slide may refer to any single, specific, unique, or distinct slide. For example, a particular slide may be one slide selected from a slide deck. A current version of a slide may include any existing, recent, or present form of a particular slide in a deck. For example, the current version of a slide may be the most recent form of the slide that was saved to a repository. Additionally or alternatively, the current version of a slide may be the most recent form of the slide that is open and displayed on a user device. A current version displayed in the second window may include presenting the current version of a particular slide in a rendered second window. For example, the system may output one or more signals configured to result in the data and information associated with the current version to display in the second window on a screen of a user device. A former version of a slide may include any previous, earlier, past, historical, prior, or other form of the slide at a time before the present time. For example, a prior version of the slide may be recorded, saved, and/or stored in a repository with metadata associating it as a former version of the particular slide. A former version displayed in the third window may include presenting the former version of the slide in the third window. For example a processor may retrieve from a repository the former version of the particular slide and present it in the third window.

Some disclosed embodiments may include receiving a first selection of a particular slide in a second window, and upon receipt of the first selection, cause a rendition of the particular slide to appear in a first window. Further, at least one processor may be configured to receive a second selection of the particular slide in a third window; and upon receipt of the second selection, cause a rendition of the particular slide to appear in the first window. Receiving a selection, as discussed previously above, may include the system accepting a user input from a computing device associated with a user that indicates instructions to make a selection. Receiving a first selection of a particular slide in a second window may include, for example, a user input (e.g., a mouse click) indicating an election of a particular slide rendered visually in the second window. A user may select any slide in the second window. For example, a user may select any slide in a sequence of slides in a deck, such as the first slide in a deck, and/or the last slide in a deck. Receiving a second selection of a particular slide in the third window may include a user input indicating an election of a slide rendered visually in the third window. A user may select any slide in the third window. For example, a user may select any of the historical versions of the particular slide appearing in the third window. Causing a rendition of a particular slide may include outputting a signal resulting in a display of data and information associated with the particular slide in a window on a display device. For example, at least one processor may perform a lookup of the particular slide in a repository, retrieve the data associated with the particular slide, and output signals to cause the data of the particular slide to be visually displayed in a window with information associated with the particular slide. Causing a rendition of a particular slide to appear in the first window may include showing, presenting, outputting, rendering, mirroring, or otherwise displaying the selected particular slide in the first window. For example, a user may select a slide in the second window, and the system may be configured to display the selected slide in the first window.

Figure 47B:
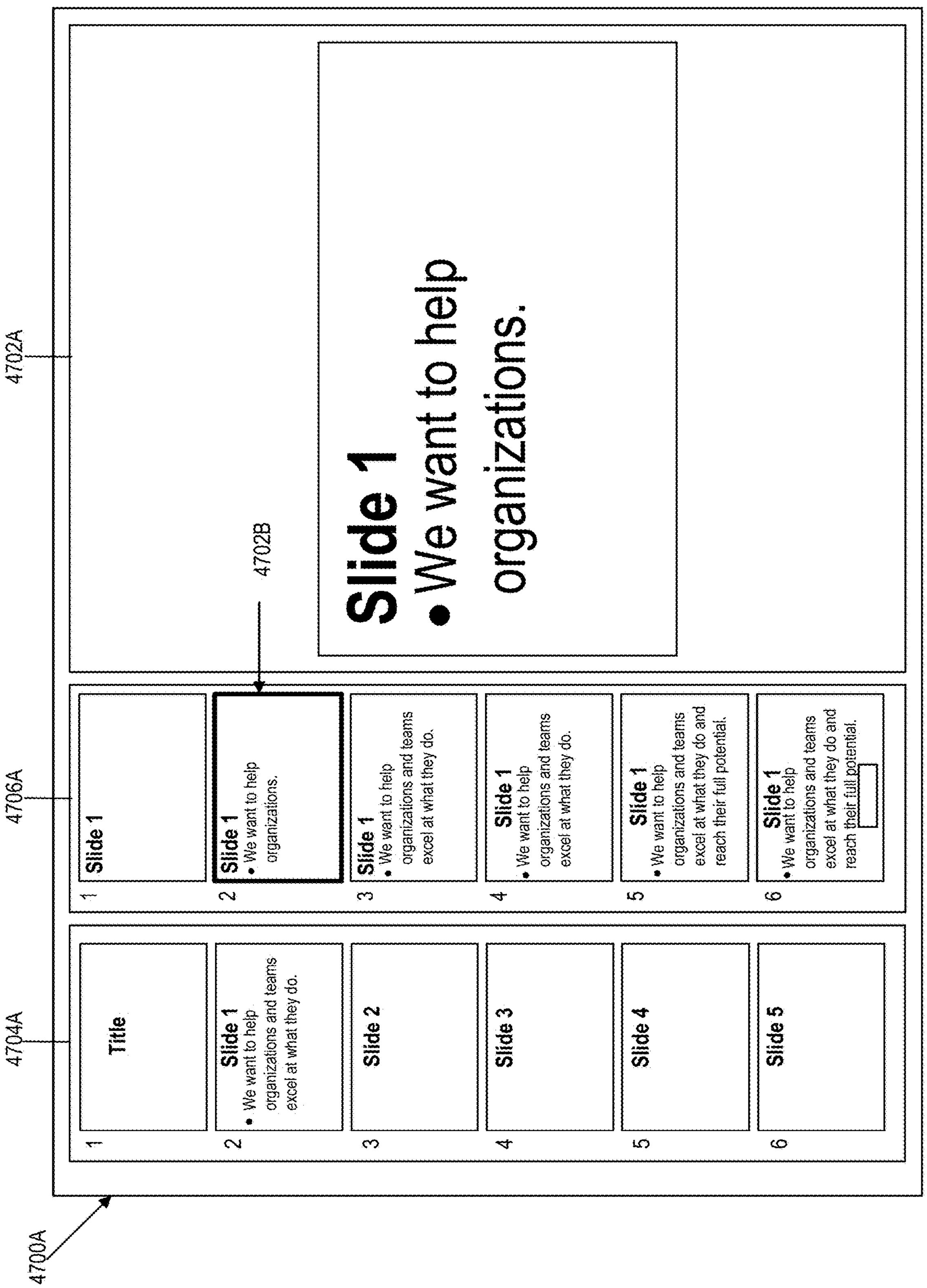
FIG. 47B illustrates an example of a second instance of a stored deck of presentation slides, consistent with some embodiments of the present disclosure.
Figure 47C:
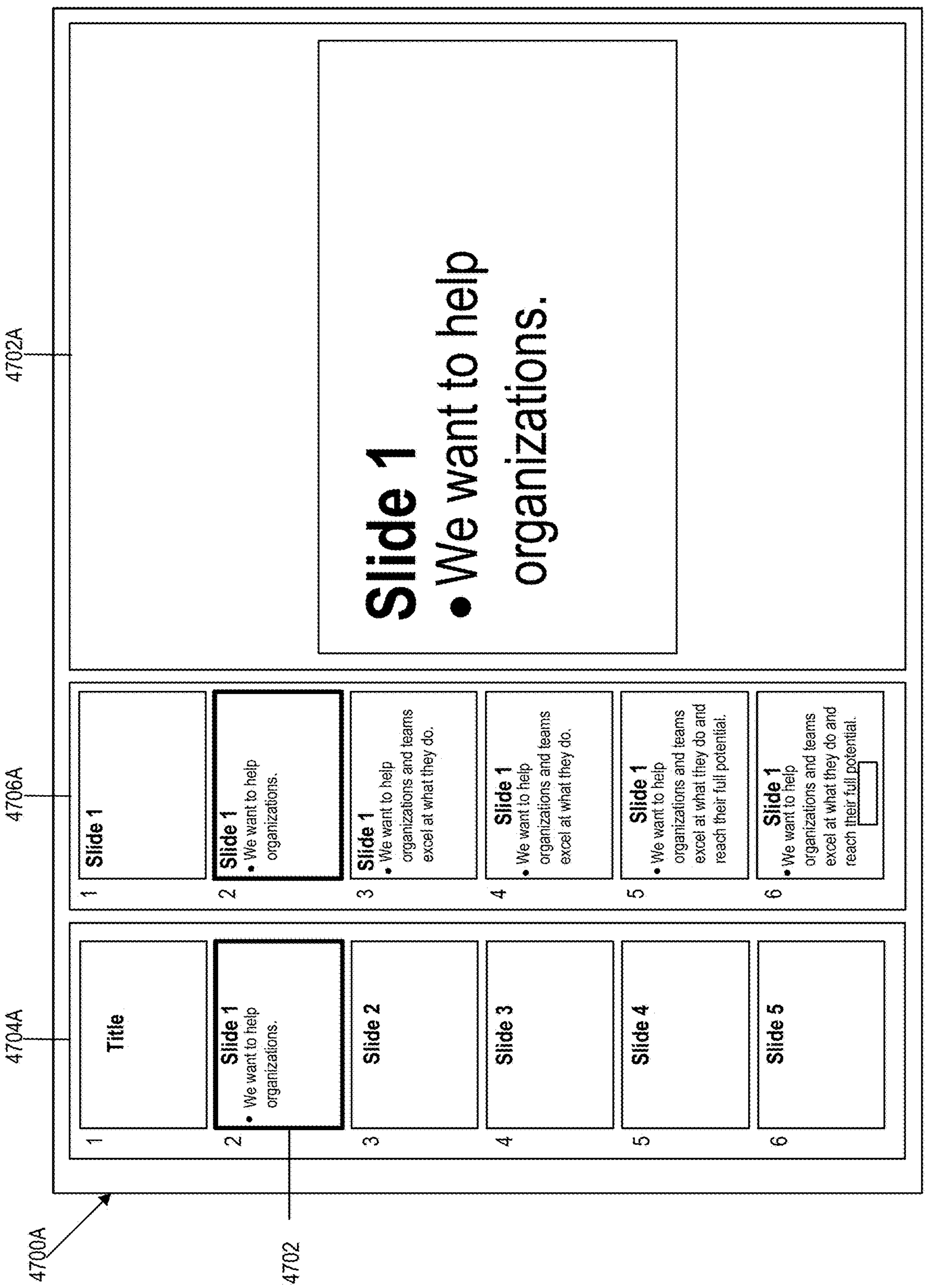
FIG. 47C illustrates an example of a third instance of a stored deck of presentation slides, consistent with some embodiments of the present disclosure.

For example, FIG. 47A to FIG. 47C may represent a stored deck of presentation slides presented on a display device. In FIG. 47A, a user may select (e.g., via a mouse click or any other interaction) a particular slide 4708A from the second window 4704A (e.g., the current graphical slide sequence), which may cause the particular slide 4708A to appear in the first window 4702A. Next, as shown in FIG. 47B, a user may select a particular slide 4702B in the third window 4706A (e.g., a historical graphical slide sequence), which may cause the particular slide 4702B to appear in the first window 4702A.

Some disclosed embodiments may include receiving a drag of a particular slide from the third window into the second window, to thereby reincorporate an earlier version of the particular slide from the former version into the current sequence of slides in the second window, where the at least on processor may be further configured to store in a timeline repository, a first record of the drag. Receiving a drag may include the system accepting a user input from a computing device associated with a user that indicates instructions to make an election of a data object in a rendered display and reposition the visual representation of the data object to a different location in the rendered display. The user input may be transmitted over a network to a repository where the stored deck of presentation slides may be stored. A drag may refer to an election of a visual representation of a data object (e.g., clicking on a particular slide) and repositioning the visual representation of the data object to a different location in a screen. For example, a drag may include pressing a mouse button down and moving the mouse while holding the button to send instructions to the processor to reposition a data object in a rendered display of information. Alternatively, a drag may refer to a mouse click in a first location on a display device and a second mouse click in a second location on the display device to indicate an intent to cause a drag of a data object. For example, a drag may involve electing a particular slide rendered in a third window and repositioning the particular slide to a second window. Dragging a particular slide between different windows may include a seamless visualization of repositioning the particular slide from one window to another, or may involve a re-rendering of the display of information in a particular slide to simply appear in another window. Reincorporating an earlier version of the particular slide from the former version into the current sequence of slides in the second window may include receiving instructions to retrieve information associated with a previously recorded version of a slide and replacing a current version of the slide in memory to adopt the previously recorded version of the slide into the current version of a presentation file. Reincorporating an earlier version may involve outputting one or more signals configured to result in the rendering of the earlier version of the particular slide in the second window. For example, the earlier version may replace the current version displayed in the second window. Similarly, for example, the earlier version of the particular slide may be stored with a current sequence of slides in the deck so a former version of the particular slide may appear in the current sequence of slides in the deck, and the replaced version may then be stored in a repository as a historical version of the slide (e.g., the replaced version may become a new "earlier" version of the slide sequence after it is replaced). A timeline repository may include any memory, repository, or other storage medium that may contain data or information and or commands, operations, or instructions capable of being carried out by at least one processor. For example, historical versions of a slide may be stored in a timeline repository. Storing in a timeline repository, a record of the drag may include saving, recording, keeping, maintaining, or preserving the first record of the drag in memory or repository (e.g., data structure). For example, the timeline repository may record each drag so each historical version of a particular slide may be retrieved and rendered to appear in the third window in chronological order according to a timestamp that may be stored with each record of each drag.

Upon dragging, some disclosed embodiments may include moving an associated slide from a second window to a third window and storing in a timeline repository a second record of the moving. An associated slide from a second window may include any slide in the second window that is moved, rearranged, modified, corrected, replaced, or otherwise changed due to the dragging. Moving an associated slide from a second window to a third window may include causing the rendition of the associated slide in the third window, as discussed previously above. For example, a slide in the second window may be replaced by the dragging of a historical version of the slide from the third window, and the system may be configured to cause the associated replaced slide to appear in the third window. As a result of moving the associated slide from the second window to the third window (e.g., a drag) the processor may, in response to detecting the moving, store in the timeline repository a second record of the moving.

In some disclosed embodiments, at least one processor may be configured to present a slider extending between a second window and a third window, to enable sequential sets of changes to be displayed as the slider is dragged from a location proximate the third window representing an earliest slide version to a location proximate the second window representing a latest slide version. Further disclosed embodiments may include receiving a selection of a slide portion from an earlier version for incorporation into a current version. Presenting a slider extending between the second window and the third window may include causing a display of an interactable element between windows for interacting with displayed information between windows, such as in the form of a slider. A slider may be part of a visual interface that displays multiple previous versions corresponding to a particular slide, where the slide may be an activatable element that enables a user to view the previous versions of the particular slide. For example, the slider extending between the second window and the third window may include causing multiple previous versions of the particular slide to be rendered in a displayed interface. Enabling sequential sets of changes to be displayed may including receiving instructions to retrieve historical alteration data to a particular slide and causing the historical alteration data to be rendered on a screen in a chronological order. Sequential sets of changes may include edits made previously, in the past, prior to, or otherwise made at a time before the present time in an order of when the changes were made in a particular logical order, such as in a chronological manner. For example, changes may be stored in a repository with metadata associated with an instance in time such that the at least one processor may determine the order changes were made to a particular slide and display, via a display device, the changes in an order. A location proximate a window may include any place or position that is near, next to, adjacent, or otherwise close to a window. A window, as discussed above, may represent a particular version of a slide in time, with one window rendering information from an earliest slide version and another window rendering information from a latest slide version. For example, the processor may lookup historical data associated with a particular slide in a repository and cause a display of a progression of changes made over time to the slide based on metadata identifying a timestamp associated with different historical versions of the slide, such as displaying the earliest versions of a slide (e.g., earliest timestamp) near the third window and the most recent changes (e.g., latest timestamp) appearing near the second window. This may allow, for example, a user to identify the edits made to a particular slide over time. A slide portion may include any subset, piece, segment, section, or other part of information displayed in a visually rendered slide. Receiving a selection of a slide portion from an earlier version, as discussed above, may include choosing, picking, or otherwise selecting a portion of a slide from an earlier version and incorporating it into a current version. For incorporation into a current version may refer to accessing the current version data and replacing it with data from an earlier version of the particular slide. The data associated with the replaced version may be stored in the repository associated with the particular slide as a historical version of the particular slide. For example, a user may select a part of a historical version of the particular slide (e.g., a single sentence in a paragraph), and instead of reincorporating the entire slide, as discussed above, the system may be configured to reincorporate the part of the historical version chosen (e.g., the single sentence in the paragraph). For example, the title of a particular slide may change over time, and the information presented on the slide may also change. The system may allow a user to keep the information presented on the current slide but reincorporate the previous title. For example, a historical version of a particular slide may be stored in a repository and the data associated with the title may be different from the title of the current slide. In response to a user selection of the title from the historical version, the system may access the data associated with the title of the current version and replace it with the title of the historical version. The version of the slide with the replaced title (e.g., the current version before the user selection) may then be stored in a repository as a new historical version of the particular slide.

Some disclosed embodiments may include displaying a timeline slider in association with a particular slide, the timeline slider enabling viewing of a sequence of changes that occurred over time to the particular slide, and where at least one processor may additionally be configured to receive an input via the timeline slider to cause a display of an editing rollback of the particular slide. Displaying a timeline slider may include rendering an interactive display of an interface that may present historical information associated with a particular slide in a sequential order (e.g., chronological). For example, historical versions of a particular slide may be displayed which may require the at least one processor to perform a lookup of the historical versions of a particular slide in storage or a repository, and then implement and present the historical versions with the time slider. Each historical version of a particular slide may include metadata associated with the version allowing the at least one processor to identify the version and distinguish it from other versions of the particular slide. A timeline slider in association with a particular slide may include one or more interactable visual elements, such as a slider with markers, enabling a user to change between displays of different previous versions of the particular slide. For example, a user may click a marker on the timeline slider and the marker may allow the user to view a version of the particular slide associated with that marker. A user may then click a different marker on the timeline slider which may cause the display of a different version of the particular slide. Enabling viewing of a sequence of changes that occurred over time to the particular slide may include causing a display of historical information associated with a particular slide such that an authorized user may view and interact with the historical alterations made to the particular slide in a timeframe. For example, the timeline slider may be presented to enable a user to view previous versions or forms of a particular slide and interact with these previous versions of the particular slide for incorporating into an electronic file. Receiving an input may include detecting an instruction from an associated computing device of a user or account that indicates an intent for choosing, picking, deciding, appointing, or otherwise selecting (e.g., by a mouse click, gesture, cursor movement, or any other action by a user) a specific action, such as selecting data in memory to adopt into a current version of an electronic document. For example, receiving an input may be a data input from a computer device. Receiving an input may include any signal or indication that meets a threshold for carrying out instructions for presenting an editing rollback display, such as performing a look up of data or information stored in a repository associated with the particular slide. Causing a display of an editing rollback of the particular slide may include rendering a presentation of a historical version of a particular slide in response to receiving an input by a user to view historical information associated with the particular slide. An editing rollback of a particular slide may include a displayed preview of a previous version of the particular slide in a manner that returns a current display of the particular slide to the previous version. For example, the system may receive an input via the timeline slider, such as selecting a version of the particular slide, and in response to the selection, the system may perform a lookup of the data and information stored in a repository associated with the selected version. As a result of the lookup, the processor may retrieve historical data and present it in a display as an editing rollback for that particular slide in a manner enabling a user to interact with the historical data for further manipulation or adoption.

Figure 48:
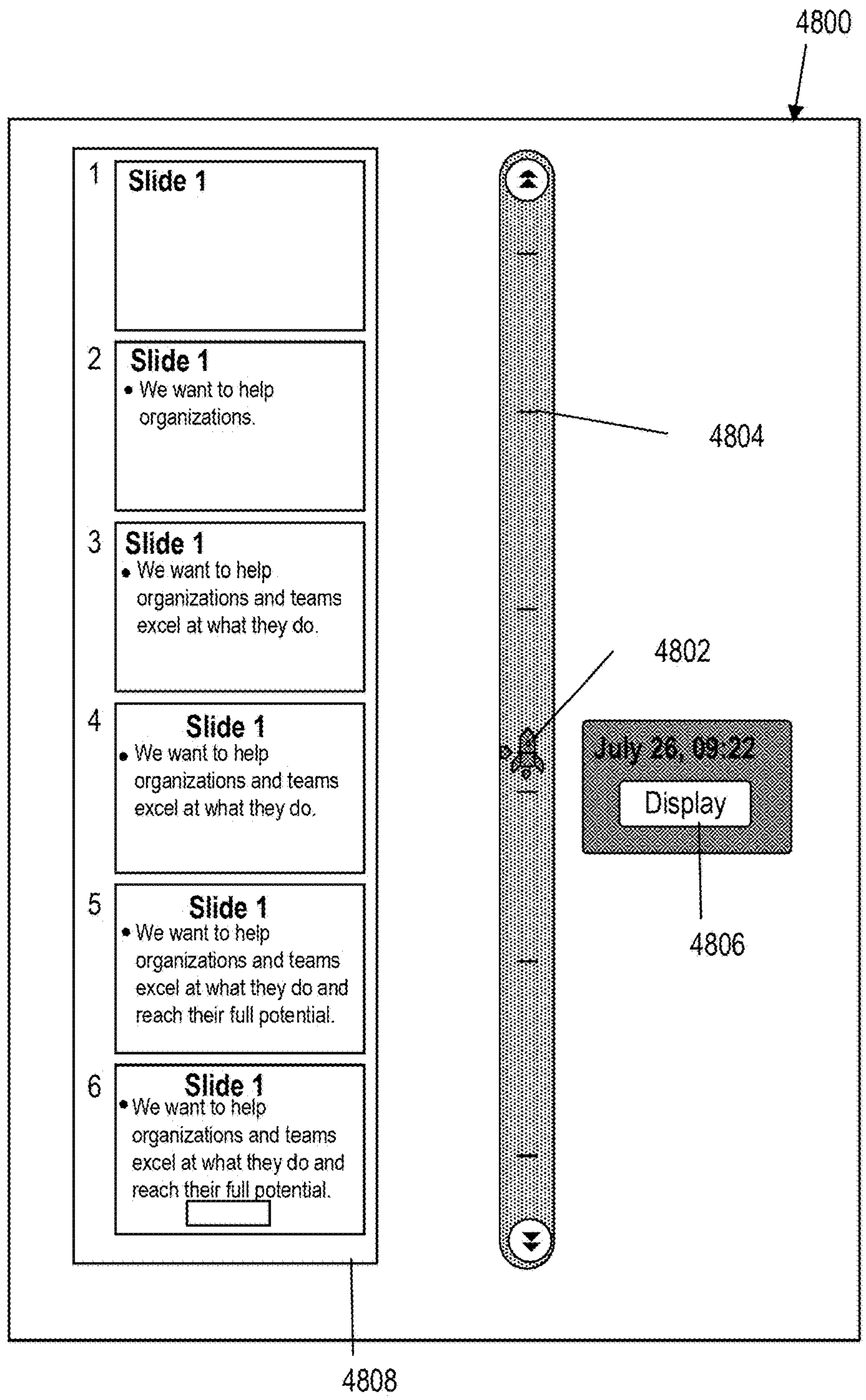
FIG. 48 illustrates an example of a timeline slider, consistent with some embodiments of the present disclosure.

For example, FIG. 48 illustrates a timeline slider 4800. A user may interact with the timeline slider 4800 by, for example, dragging a visual icon 4802 (e.g., the rocket ship) or by clicking on a marker 4804. Changing between different markers may allow a user to view a sequence of changes made over time to a particular slide. A user may also interact with the timeline slider 4800 to provide an input to the processor by interacting with an interactable element 4806 that may send instructions to cause a display of editing rollback of the particular slide in a rendered display 4808.

During a display of an editing rollback, some disclosed embodiments may include a display characteristic that differs from a display characteristic that occurs during a current slide display. A display characteristic may include any visual feature, trait, element, interface, attribute, or other quality of slide. A display characteristic different from a display characteristic that occurs during a current slide display may include any display characteristic that is unique, distinct, changed, individual, or otherwise not the same as the display characteristic of the current slide display. For example, a historical version of a particular slide may not have any graphical images or pictures associated with the slide, while the current slide display may contain pictures. In another example, a historical version of a particular slide may have a display characteristic where the text is displayed with a red color while a display characteristic of the current version of the particular slide may be displayed with a black color.

Figure 49:
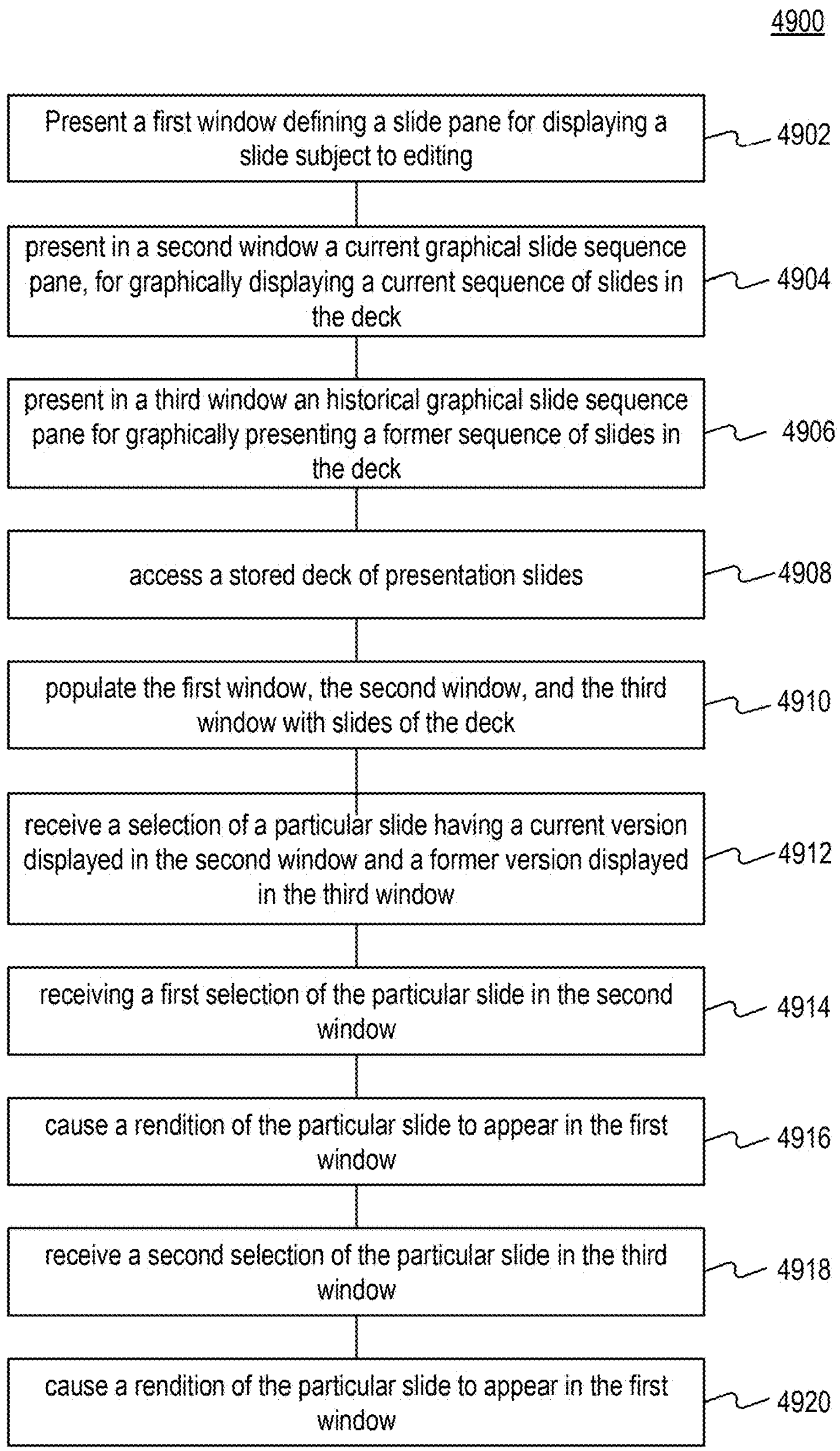
FIG. 49 illustrates a block diagram of an exemplary process for tracking on a slide-by-slide basis, edits to presentation slides, consistent with some embodiments of the present disclosure.

FIG. 49 illustrates a block diagram of an example process 4900 for tracking on a slide-by-slide basis, edits to presentation slides. While the block diagram may be described below in connection with certain implementation embodiments presented in other figures, those implementations are provided for illustrative purposes only, and are not intended to serve as a limitation on the block diagram. In some embodiments, the process 4900 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 71-1 to 48 by way of example. In some embodiments, some aspects of the process 4900 may be implemented as software (e.g., program codes or instructions) that are stored in a memory (e.g., the memory portion 122 in FIG. 1) or a non-transitory computer-readable medium. In some embodiments, some aspects of the process 4900 may be implemented as hardware (e.g., a specific-purpose circuit). In some embodiments, the process 4900 may be implemented as a combination of software and hardware.

FIG. 49 may include process blocks 4902 to 4920:

At block 4902, the processing means may be configured to present a first window defining a slide pane for displaying a slide subject to editing, consistent with some embodiment discussed above.

At block 4904, the processing means may be configured to present in a second window a current graphical slide sequence pane, for graphically displaying a current sequence of slides in the deck, as discussed previously in the disclosure above.

At block 4906, the processing means may be configured to present in a third window an historical graphical slide sequence pane for graphically presenting a former sequence of slides in the deck, as discussed previously above.

At block 4908, the processing means may be configured to access a stored deck of presentation slides, as discussed previously.

At block 4910, the processing means may be configured to populate the first window, the second window, and the third window with slides of the deck, as discussed previously above.

At block 4912, the processing means may be configured to receive a selection of a particular slide having a current version displayed in the second window and a former version displayed in the third window, as discussed previously above.

At block 4914, the processing means may include receiving a first selection of the particular slide in the second window, as discussed above.

At block 4916 the processing means may be further configured to cause a rendition of the particular slide to appear in the first window, consistent with the earlier disclosure.

At block 4918, the processing means may be further configured receive a second selection of the particular slide in the third window, as discussed previously in the disclosure above.

At block 4920 the processing means may be further configured cause a rendition of the particular slide to appear in the first window, consistent with the earlier disclosure.

In a collaborative word processing document, multiple users may simultaneously edit a single document in real time or near real time. Edits by a first user in one section of a document may interfere with the display of a second editor making edits to the same document, which may hamper the second editor's ability to make simultaneous edits in the document. The problem may be compounded when large groups make simultaneous edits to the same document, or when one user adds a large amount of content to the document. The introduction of text, graphics, or other objects to an earlier page in a collaborative word processing document may adjust the location of text or objects in a later page of the document or may shift a user's viewport so that the user's active editing location is no longer within the user's view. This reduces efficiency in collaboration between users and may lead to unintended editing errors by the user. Therefore, there is a need for unconventional innovations for managing display interference in an electronic collaborative word processing document to enable multiple users simultaneously edit a collaborative word processing document.

Such unconventional approaches may enable computer systems to implement functions to improve the efficiency of electronic collaborative word processing documents. By using unique and unconventional methods of classifying and storing data associated with a collaborative word processing document or by grouping editable segments of the collaborative word processing document into unique and discrete segments, a system may provide display locking techniques to increase the efficiency of electronic collaborative word processing documents. Various embodiments of the present disclosure describe unconventional systems, methods, and computer readable media for managing display interference in an electronic collaborative word processing document. Various embodiments of the present disclosure may include at least one processor configured to access the electronic collaborative word processing document, present a first instance of the electronic collaborative word processing document via a first hardware device running a first editor, and present a second instance of the electronic collaborative word processing document via a second hardware device running a second editor. The at least one processor may be configured to receive from the first editor during a common editing period, first edits to the electronic collaborative word processing document made on earlier page of the electronic collaborative word processing document that result in a pagination change. The at least one processor may be further configured to receive from the second editor during the common editing period, second edits to the electronic collaborative word processing document made on a second page of the electronic collaborative word processing document later than the first page. The at least one processor may be configured to, during the common editing period, lock a display associated with the second hardware device to suppress the pagination change caused by the first edits received by the second hardware device, and upon receipt of a scroll-up command via the second editor during the common editing period, cause the display associated with the second hardware device to reflect the pagination change caused by the first edits.

Thus, the various embodiments in the present disclosure describe at least a technological solution, based on improvements to operations of computer systems and platforms, to the technical challenge of managing display interference caused by simultaneous edits to an electronic collaborative word processing document.

Some disclosed embodiments may involve systems, methods, and computer readable media for managing display interference in an electronic collaborative word processing document. Display interference may refer to an undesirable adjustment of a viewing display, or editing location within an electronic collaborative word processing document caused by edits made by another user, or by any other alterations in the electronic collaborative word processing document. Display interference may include any shift in the location of information or data displayed within an electronic collaborative word processing document. For example, a user may be editing paragraph "A" on a second page of a collaborative word processing document. Another user may add two pages of text on a first page of the same collaborative word processing document. The addition of two pages of text to the collaborative word processing document may cause paragraph "A" to move to a fourth page in the collaborative word processing document that is out of the current view of the first user. This movement of paragraph "A" is one example of a display interference. Display interference is not limited to an unwanted shift of an active editing location outside of the current viewport. Display interference may include unwanted shifts of an active editing location within a viewport. For example, display interference may include the addition of a single line of text to a collaborative word processing document that causes paragraph "A" to move one line of text down in the collaborative word processing document, with paragraph "A" either remaining wholly or partially within the current viewport. Display interference is not limited to vertical shifts in information or data displayed within an electronic collaborative word processing document and may include horizontal shifts or a combination of vertical and horizontal shifts in the display of information or data caused by other edits within the document. Furthermore, display interference is not limited to movement in the location of information or data in an active editing location and may include the movement in the location of any information or data within a collaborative word processing document. Managing display interference may include any steps taken by the system to resolve display interference that may occur on one or more displays of one or more users accessing an electronic collaborative word processing document, which is discussed in further detail below.

Some aspects of the present disclosure may involve display interference within an electronic collaborative word processing document. An electronic collaborative word processing document may be a file read by a computer program that provides for the input, editing, formatting, display, and output of text, graphics, widgets, objects, tables, or other elements typically used in computer desktop publishing applications. An electronic collaborative word processing document may be stored in one or more repositories connected to a network accessible by one or more users via at least one associated computing device. In one embodiment, one or more users may simultaneously edit an electronic collaborative word processing document, with all users' edits displaying in real-time or near real time within the same collaborative word processing document file. The one or more users may access the electronic collaborative word processing document through one or more user devices connected to a network. An electronic collaborative word processing document may include graphical user interface elements enabled to support the input, display, and management of multiple edits made by multiple users operating simultaneously within the same document. Though this disclosure refers to electronic collaborative word processing documents, the systems, methods, and techniques disclosed herein are not limited to word processing documents and may be adapted for use in other productivity applications such as documents, presentations, worksheets, databases, charts, graphs, digital paintings, electronic music and digital video or any other application software used for producing information.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Some disclosed embodiments may include accessing an electronic collaborative word processing document. An electronic collaborative word processing document may be stored in one or more data repositories and the document may be retrieved by one or more users for downloading, receiving, processing, editing, or viewing, the electronic collaborative word processing document. An electronic collaborative word processing document may be accessed by a user using a user device through a network. Accessing an electronic collaborative word processing document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A user may access the electronic collaborative word processing document using a user device, which may include a computer, laptop, smartphone, tablet, VR headset, smart watch, or any other electronic display device capable of receiving and sending data. In some embodiments, accessing the electronic word processing document may include retrieving the electronic word processing document from a web browser cache. Additionally or alternatively, accessing the electronic word processing document may include connecting with a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, an electronic collaborative word processing document may be stored in repository 230-1 as shown in FIG. 2. Repository 230-1 may be configured to store software, files, or code, such as electronic collaborative word processing documents developed using computing device 100 or user device 220-1. Repository 230-1 may further be accessed by computing device 100, user device 220-1, or other components of system 200 for downloading, receiving, processing, editing, or viewing, the electronic collaborative word processing document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™ Joyent™, vmWare™, or other cloud computing providers. Repository 230-1 may include other commercial file sharing services, such as Dropbox™, Google Docs™, or iCloud™. In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

Some disclosed embodiments may include presenting a first instance of an electronic collaborative word processing document. Presenting an instance of an electronic word processing document may include causing a display of the information contained in the electronic word processing document via a display device. An electronic collaborative word processing document may be presented in multiple instances on multiple user devices. Presenting multiple instances of the electronic collaborative word processing document on multiple devices may facilitate collaborative editing of the same document because multiple users may access and edit the same document file at the same time from different user devices. A first instance of the electronic collaborative word processing document may include the presentation of data and information contained in the electronic collaborative word processing document to a first user. For example, a user may view or edit a first instance of the electronic collaborative word processing document and the user may control the location of the user's view (e.g., an active display window) or edits in the first instance of the electronic collaborative word processing document. This location may be independent or distinct from other users' views or editing locations in any other instance of the electronic collaborative word processing document. In one embodiment, edits made by a user in an instance of the electronic collaborative word processing document are synchronized in real time or near-real time to all other instances of the same electronic collaborative word processing document.

A first instance of an electronic collaborative word processing document may be presented via a first hardware device running a first editor. A first hardware device may include a computer, laptop, smartphone, tablet, VR headset, smart watch, or any other electronic display device capable of receiving and sending data. A first editor may be a user interface that provides for the input, editing, formatting, display, and output of text, graphics, widgets, objects, tables, or other elements in an electronic word processing document. A first editor may receive user input via a keyboard, mouse, microphone, digital camera, scanner, voice sensing, webcam, biometric device, stylus, haptic devices, or any other input device capable of transmitting input data. In one embodiment, a user accesses an electronic collaborative word processing document using a computer and views the document in an editor that receives text and other input via a mouse and keyboard.

Figure 50:
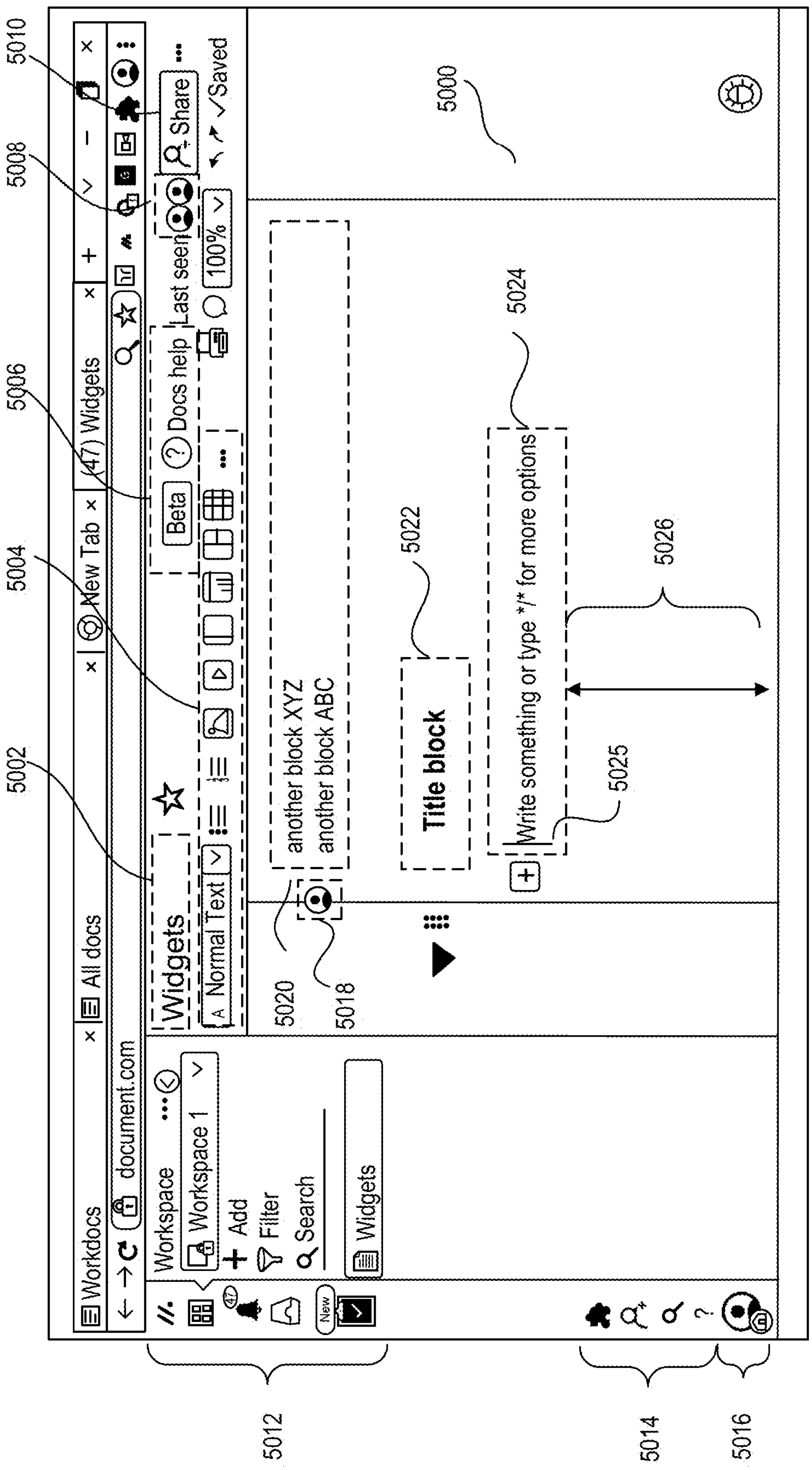
FIG. 50 illustrates an example of an instance of a collaborative word processing document, consistent with some embodiments of the present disclosure.

By way of example, FIG. 50 illustrates an instance of a collaborative electronic word processing document presented within an editor 5000. In some embodiments, editor 5000 may be displayed by a computing device (e.g., the computing device 100 illustrated in FIG. 1), software running thereon, or any other projecting device ((e.g., projector, AR or VR lens, or any other display device) as previously discussed). Editor 5000 may include various tools for displaying information associated with the document of for editing the document. For example, editor 5000 may display a title 5002 indicating the title of the document. Formatting bar 5004 may depict various tools to adjust formatting of information or objects within the document. Help bar 5006 may be included which may provide hyperlinks to information about various features of the editor 5000. Share button 5010 may be included to invite additional users to edit another instance of the collaborative electronic word processing document. Editor 5000 may include tool bar 5012 and interface bar 5014.

Some disclosed embodiments may include presenting a second instance of the electronic collaborative word processing document. Presenting a second instance of the electronic collaborative word processing document may be achieved in the same or similar manner as presenting a first instance of the electronic collaborative word processing document, as discussed above. Presenting a second instance may include the display of data and information contained in the electronic collaborative word processing document to a second user. For example, a second user may view or edit a second instance of the electronic collaborative word processing document and the second user may control the location of the second user's view or edits in the second instance of the electronic collaborative word processing document. Views presented and edits made in the second instance of the electronic collaborative word processing document may be made independently of the views presented or edits made by other users in any other instance, such as in the first instance discussed previously above. For example, the first instance and the second instance of the electronic collaborative word processing document may display different portions of the document and may receive edits to the electronic collaborative word processing document at different locations within the document. Edits made by a user in the first or the second instance of the electronic collaborative word processing document may be incorporated into other instances of the electronic collaborative word processing document in real time. In some embodiments, the first instance and the second instance of the electronic collaborative word processing document may share a common viewport displaying some of the same data and information in both the first and second instances of the document. Edits made in the first or second instance may be demarcated by user identification indicators in the first and second instance. User identification indicators may include a graphic, a user ID indicator, a color, a font, or any other differentiator that indicates the source of an edit in an instance of the electronic collaborative word processing document. The second instance of the electronic collaborative word processing document may be presented via a second hardware device running a second editor, in a similar manner to the first hardware device and the first editor described herein. Any number of hardware devices may run an editor to access another instance of the electronic collaborative word processing document.

Returning to FIG. 50 by way of example, editor 5000 may indicate the that multiple users are accessing an electronic collaborative word processing document through the display of user indicator, such as user display indicator 5008 which indicates two users are running an instance of the electronic collaborative word processing document. Editor 5000 may include current user indicator 5016. Current user indicator 5016 may indicate the identification of the user running the displayed instance of the collaborative word processing document. In some embodiments, the objects and information displayed for editing may be controlled by the current user shown in 5016 in each instance of the electronic collaborative word processing document. For example, FIG. 50 may depict an editing location that is actively edited by the current user, such as editing location 5024. Editing location 5024 may be a block as described herein. Other blocks may be shown in the viewport of editor 5000 but may not be the active editing location. For example, FIG. 50 includes Title block 5022 and paragraph block 5020 which are not actively being edited by the user. The location that a different user is actively editing in another instance of the electronic collaborative word processing document may be indicated by icon 5018, which may indicate the active working location of another user, which in this example is paragraph block 5020.

Some embodiments may include receiving from a first editor during a common editing period, first edits to an electronic collaborative word processing document. A common editing period may include a time when at least two instances of the electronic collaborative word processing document are presented in two editors. In one embodiment, a common editing period may include two users each viewing and editing the same electronic collaborative word processing document in two instances displayed on separate hardware devices associated with each of the two users. A common editing period is not limited to situations when two users are editing a document and may include any number of users editing a document in real or near real time. An edit to an electronic collaborative word processing document may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or any other data within the electronic word processing document. Receiving the first edits may include the system receiving an edit request from a computing device associated with a user. The request may be transmitted over a network to a repository where the electronic collaborative word processing document is stored. At least one processor may then perform a lookup of permission settings to confirm whether the computing device has authorization to make the edit. In a situation where authorization is confirmed, the system may then implement and store the edit with the electronic collaborative word processing document such that any other computing devices accessing the document may retrieve the document with the implemented change.

In some embodiments, edits made during a common editing period may be transmitted or received through a communications interface. A communications interface may be a platform capable of sending and retrieving data through any electrical medium such as the types described herein that manage and track edits made in a collaborative electronic word processing document from one or more editors. In one embodiment, the communications interface may be integrated with the electronic collaborative word processing document editor. For example, protocols may be incorporated into the editor that manage exchanges of data between multiple editors running one or more instances of the electronic collaborative word processing document. In other embodiments, the communications interface may be separate from the editor and may run on separate hardware devices.

For example, a communications interface may run on a computing device, such as computing device 100 (of FIG. 1), and may transmit or receive edits made by a first editor running on user devices 220-1 and a second editor running on user device 220-2 through network 210 (of FIG. 2). More broadly, a communications interface may refer to any platform capable transmitting or receiving edits made to an electronic collaborative word processing document through a network or other electronic medium.

In some embodiments, first edits may occur on a first earlier page of an electronic collaborative word processing document and result in a pagination change. A pagination change may include any alteration to a length of an electronic document, such as by a line of text, a page of text, or multiple pages of text. The pagination change may a result of an addition, deletion, rearrangement, or any other modification to the information in the electronic collaborative word processing document. For example, data and objects in the electronic collaborative word processing document may be arranged in a publication display format that depict the display of data and objects on printed pages, such as the display found in desktop publishing applications or other editing software. Objects and data may be arranged so that pages of data are displayed sequentially, for example, in a vertical or a horizontal arrangement of the display of pages. A pagination change may occur when edits include the addition or arrangement of content in the document that causes certain data and content in the document to move to another page, or to move to another location on the same page. For example, a document may contain paragraph "A" located in the middle of the second page of the document. First edits may occur on the first page of the document that introduce the addition of two additional pages of text. This may result in a pagination change of paragraph "A," which may move from page two to page four in the document. A pagination change is not limited to the movement of objects and data from one page to another and may include movements of objects and data within the same page either by a single line, part of a line, a paragraph, or horizontally within a single line. More broadly, a pagination change may refer to any adjustment in the location of objects or text within the location of a page in the collaborative electronic word processing document.

Some disclosed embodiments may include receiving from a second editor during the common editing period, second edits to an electronic collaborative word processing document. Second edits may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or data within the electronic word processing document as previously discussed. As used herein, second edits refer to edits made in a second instance of the collaborative electronic word processing document. Second edits may occur either earlier in time, later in time, or simultaneously with first edits and are not limited to edits occurring later in time than first edits in the document.

In some embodiments, second edits may occur on a second page of an electronic collaborative word processing document later than a first page. As described herein, objects and data within the electronic collaborative word processing document may be displayed on sequentially arranged pages, for example, in a vertical or a horizontal arrangement of the display of pages. Second edits may occur on a second page in that the second page is arranged sequentially after edits from the first page in the document. A second page may be later than a first page if it occurs anywhere in the sequence of pages after the first edits. In one non-limiting example, second edits in the document may occur on page 4 of the document and first edits may occur on page 2. In this example, the second edits on the second page occur later than the first page in that page 4 is displayed sequentially after page 2. In other embodiments, first and second edits may occur on the same page, with the second edits occurring sequentially after the first edits within the same page. For example, if a second edit occurs lower on a page than a first edit, then the second edit may be considered later than first edits. In some embodiments, second edits may be associated with a block in an electronic collaborative word processing document. As described herein, the electronic collaborative word processing document may organize objects and data into blocks. A block may be any collection of objects or data within the electronic collaborative word processing document, as described herein. For example, the electronic collaborative word processing document may contain one or more title blocks which display formatting text information. Other blocks may include other text portions of the document, such as a sentence, a group of sentences, a paragraph, or a collection of paragraphs, or any grouping of text. Blocks are not limited to text alone, and objects such as charts, graphics, widgets, objects, or tables, or any other component in the document may be recognized as a block.

Some disclosed embodiments may include recognizing an active work location of the second editor. An active work location of an editor may include any portion of the electronic collaborative word processing document displayed in or receiving edits from the editor. For example, a user may be editing a portion of the electronic word processing document using an instance of an editor, and the active work location may correspond to the location of the edits. In another example, a user may be viewing a portion of the document, and the active work location may correspond to the location of the viewport displayed by the editor. In yet another embodiment, there may be multiple active work locations, for example, when a user may be editing one portion of the electronic word processing document while viewing a second portion of the electronic word processing document, such as using multiple viewports or by scrolling away from the edit location. Recognizing the active work location may be performed in various ways and may include any process of determining at least a portion of an electronic collaborative word processing document for display or alteration on a computing device. In some embodiments, the recognition of the active work location may be based on a cursor location in the second instance of the collaborative electronic word processing document. A cursor location may include any indication of a location on a display that represents an intent to interact (e.g., manipulate text, select data objects, view information, activate a link, or any other interaction) with the location of the indication is presented in the display. The cursor location may be displayed visually or may be omitted from display according to preference. A cursor location may be determined by an editing location or by a hovering location. For example, a user may be editing a document at the location of an editing cursor and the system may recognize the cursor as the active work location. In other embodiments, the system may recognize adjacent objects and data around the cursor location as included in the active work location. For example, adjacent letters, words, sentences, or paragraphs near the cursor may be included as part of the active work location depending on certain contexts. In yet another example, a user may use a device (e.g., a mouse) to move a cursor location and hover over a certain portion of a collaborative electronic word processing document without selecting a specific location for editing, such a scrolling location. In other embodiments, the recognition of the active work location may be based on a scrolling location in the second instance of the collaborative electronic word processing document. A scrolling location may include any displayed portion of the collaborative electronic word processing document, which may be displayed independently of the editing cursor location. The system may recognize a location within the viewport as the active work location. A scrolling location may be recognized in various ways. For example, determining a scrolling location may be based on an amount of time a viewport displays a location of the document, based on a distance away from the editing cursor, or based on user preferences.

In yet other embodiments, the recognition of the active work location may be based on a block location in the second instance of the collaborative electronic word processing document. A block location may include a relative or absolute position of a block within an electronic collaborative word processing document. For example, each block within the electronic collaborative word processing document may include a unique block identification ("ID") with associated location data. The associated location data may determine a block's location within the electronic collaborative word processing document. For example, the location data may describe a block's location with respect to other blocks, describe a sequence of blocks for display, or describe a block's intended position within a document based on distances from margins or other blocks or a combination of these factors. The system may recognize that a block is an active work location based on the location of edits or the viewport displayed in the second editor, or any other way based on data received by the editor.

By way of example, FIG. 50, shows active work location 5024 indicated by the user's cursor 5025 positioned in a text block. Distance 5026 may indicate the positioning of the active work area 5024 from the edge of the display or viewport. Data associated with the active work location 5024 and blocks, such as blocks 5020, 5022, and 5024, may be stored in a repository, such as repository 230-1, so that the system can track the positioning of the active work location 5024 and block locations 5020, 5022, and 5024 in relation to a first or second instance of the editor. Location data of the user's cursor 5025, or of the users scrolling location may also be stored in a repository. The user's scrolling location may be defined by a collection or grouping of blocks. In the example shown in FIG. 50, the user's scrolling location contains the collection of blocks 5022 and 5024. When a first user accesses the collaborative electronic word document from their computing device 220-1, the system may record an active work location for the first user and cause the system to display information from the stored collaborative electronic word document at that first active work location to computing device 220-1. Independently, when a second user accesses the collaborative electronic work document from a second computing device 220-2, the system may recognize a second active work location for the second user and cause the second computing device 220-2 to display only the second active work location independently from the display of the first computing device 220-1.

Some disclosed embodiments may include, locking a display associated with the second hardware device. Locking a display may refer to fixing the location of objects and information in a viewport of a hardware device. For example, the location of objects and information depicted on a screen of the second hardware device may shift during operation of an editor. When a display is locked, the location of objects and information depicted on a screen of the second hardware device may remain in a location that does not change, independent of the location of the objects and information in relation to their placement in a document. In some embodiments, locking a display may indicate that objects and information depicted on a screen are fixed at the pixel level. In other embodiments, locking a display may indicate that objects and information depicted on a screen are fixed with respect to a determined measurement taken from the boundaries of the viewport. In yet other embodiments, locking a display may indicate that objects and information depicted on a screen are fixed with respect to one direction but may not be fixed with respect to another direction. For example, a display may depict a block at a location in the document. Locking a display may fix the distance between the first line of the block and a boundary of the display but edits to the block may cause the distance from other lines of the block to the boundary of the display to change. Locking a display is not limited to fixing pixel locations or dimensions to boundaries of the viewport to blocks but may include any fixing of the display with respect to any objects or information within the electronic collaborative word processing document.

In some embodiments, locking a display may suppress a pagination change caused by the first edits received by the second hardware device during a common editing period. A pagination change may be a shift in the location of objects or data from one page in a document to another page based on changes in objects or data on an earlier page, as described previously above. The pagination change may occur as a result of a single user editing a document, or as a result of multiple users editing the document at the same time during a common editing period, as previously discussed above. In an unlocked display, introduction of objects or information at an earlier location in an electronic collaborative word processing document may cause the location of objects and information located on a later page in the document to shift to another page due to the first edits. Pagination changes may be caused by any edits of objects and data at an earlier page in a document, and may include, as non-limiting examples, introduction, modification, or removal of text, formatting, images, objects, comments, redlines, tables, graphs, charts, references, headers, covers, shapes, icons, models, links, bookmarks, headers, footers, text boxes, or any other objects or data. For example, paragraph "A" on page three of a document may shift to page five in the document if two pages of table data are added to the document at a location before paragraph "A." In some embodiments, locking a display to suppress a pagination change may include fixing the location of objects or information to a location within a page of an electronic collaborative word processing document as described herein. For example, a user may be editing text on a third page in an electronic collaborative word processing document using a second hardware device in a common editing period, and another user may introduce two additional pages of text and graphics at a location earlier in the document using a first hardware device. In this example, the system may freeze the location of the text on the third page in a display of the second hardware device and will not adjust the location of this text to a new page based on the edits in an earlier location of the document caused by the first hardware device.

Figure 51:
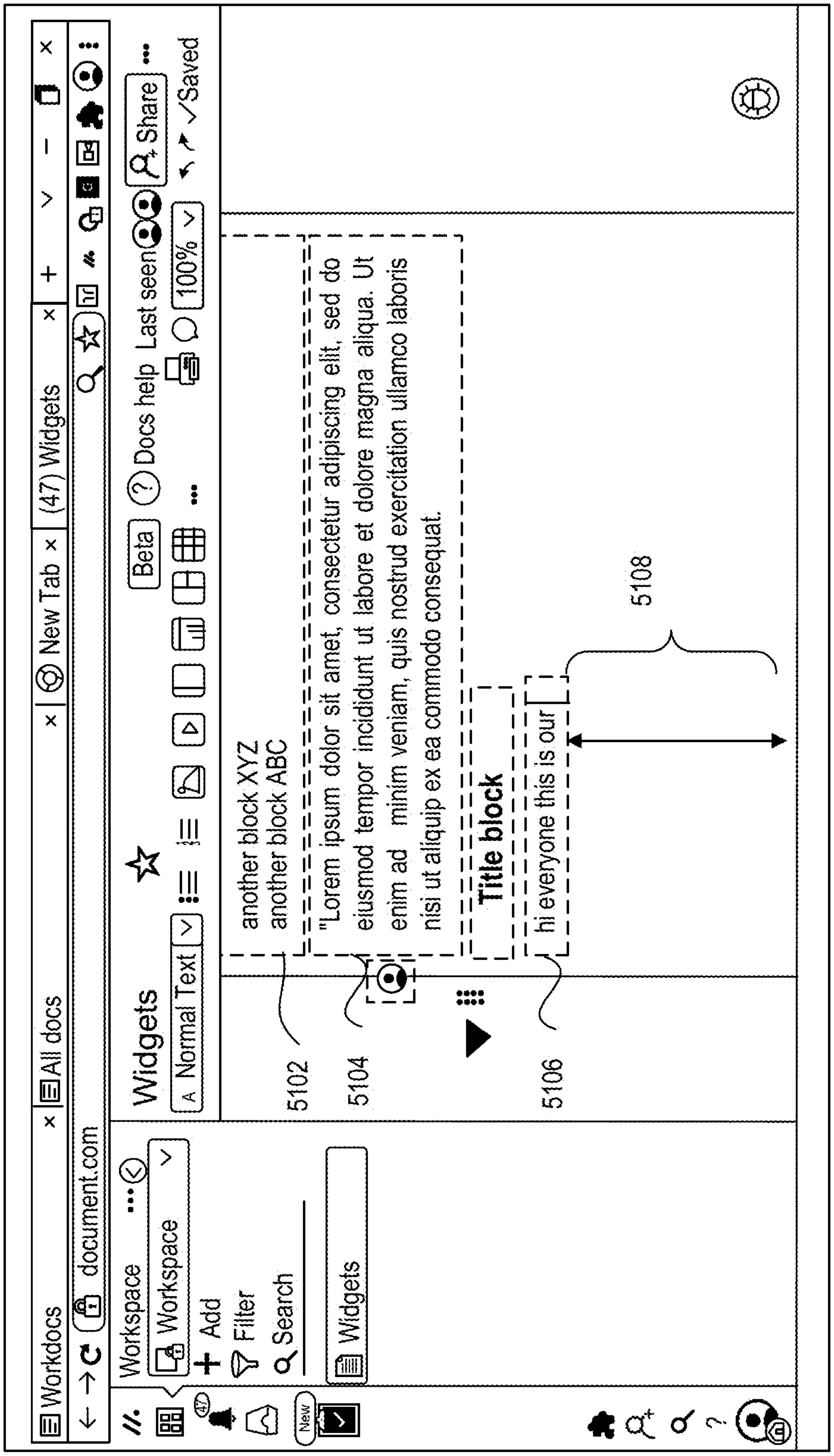
FIG. 51 illustrates an example user interface of a collaborative word processing document with a locked display, consistent with some embodiments of the present disclosure.

By way of example, FIG. 51 depicts an electronic collaborative word processing document with a locked display at an active work location. FIG. 51 is an example of the same interface in FIG. 50 after first and second edits have been made to the document. For example, second edits have made by a user operating a second hardware device, such as hardware device 220-2 (of FIG. 2), at location 5106. Location 5106 represents the same active editing location shown in FIG. 50 at 5024. A first user operating a different hardware device 220-1 (of FIG. 2) has introduced first edits 5104 to the document at a location earlier in the document than the active editing location 5106 being edited by the second user on hardware device 220-2. The display shown on hardware device 220-2 is locked in that the vertical distance 5108 from the active work location to the edge of the display in FIG. 51 is the same distance as vertical distance 5026 in FIG. 1 made prior to the first and second edits. In response to the first user's edits in 5104 made on hardware device 220-1, the system has adjusted the location of text earlier in the document shown on hardware device 220-2, such as text in block 5102, while the display is locked. While the display is locked, additional edits made by the first user to location 5104 on hardware device 220-1 will continue to adjust the location of text earlier in the document shown on hardware device 220-2, such as text block 5102, but the location of the active editing area by the second user at 5106 will remain fixed with respect to the viewport shown in hardware device 220-2.

Figure 52:
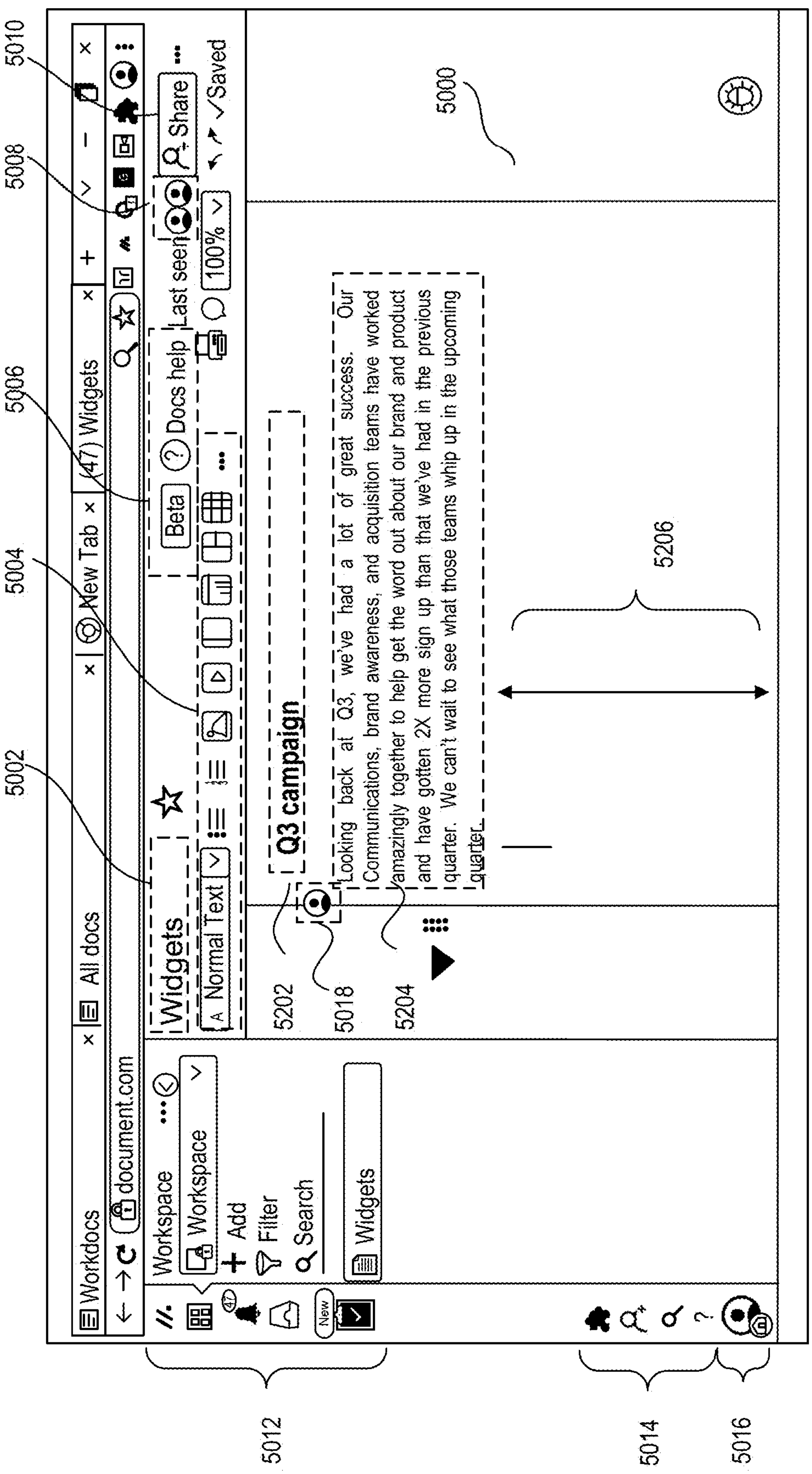
FIG. 52 illustrates another example of a collaborative word processing document with an active work location, consistent with some embodiments of the present disclosure.
Figure 53:
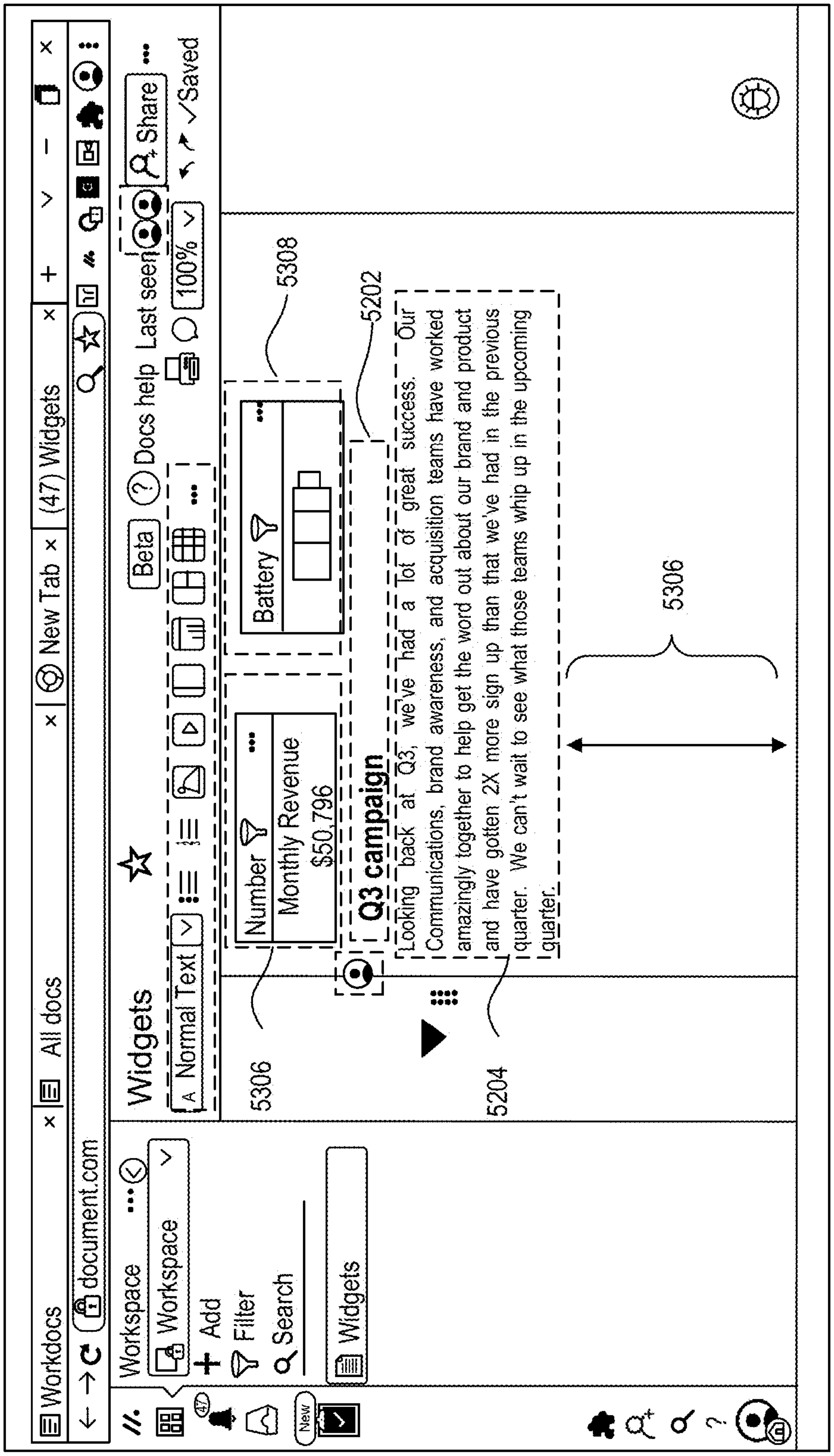
FIG. 53 illustrates another example of a collaborative word processing document with a locked display, consistent with some embodiments of the present disclosure.

FIG. 52 and FIG. 53 depict another example of locking a display. A display may be locked with the introduction of widgets, figures, or charts at an earlier location in the document. For example. FIG. 52 shows an active work location 524 of a user running an editor. FIG. 53 depicts the same editor later in time after a different user has introduced widgets 5306 and 5308 in the document. As can be seen in FIG. 52 and FIG. 53, the distance 5206 from the active work location to the bottom of the editor before the addition of the widgets and the distance 5306 from the active work location to the bottom of the editor after the addition of the widgets is constant in a locked display.

In some embodiments, locking the display scrolling associated with the second display may be based on the recognized active work location so as not to interrupt viewing of the active work location. The system may recognize an active work location as described herein and then freeze or lock the display of the active work location at a location on the screen when edits made at an earlier location in the document would otherwise result in a shift in the location of the active work location, as discussed previously. Not interrupting viewing of the active work location may include maintaining the display of the active work location even though other users make alterations to a document. For example, if the active work location is confined to information in a block and the block includes a paragraph, the system may recognize that the paragraph is the active work location and may fix the location of the paragraph in the display. Alternatively, blocks may include header lines, charts, graphs, or widgets or any other objects or information as described herein. As another example, the system may recognize that a block that includes a chart is the active work location and may fix the location of the chart in the display. The system may track the relative arrangement of blocks based on certain data associated with the blocks. For example, each block may retain location data that positions that block in relationship to the location of other blocks within the document. This data may be independent of location data associated with the display of information in the electronic collaborative word processing document. The system may compute or record the relative arrangement of the display of blocks within the document by updating data describing the relative position of the blocks but may not update the location of the block associated with the active work location within the document when the display is fixed. In this way, a second editor can receive edits from a first editor that updates block information, including the relative position data associated with the introduction of new blocks at an earlier location in the document, but allows the second editor to lock the display of the active work location.

In some other embodiments, a lock may remain in place until an active work location is changed in a second editor. The active work location may be changed based on user actions, user preferences, or other determinations by the system. For example, the active work location may be changed upon a user moving the cursor to a second location, scrolling to a new location in the document, editing a different block, an amount of time since the last user input, selecting an icon or toggle associated with the display lock, or any other change in the editing location by the user. When the lock is released, the display may update to reflect a revised location of the active work location based on edits that occurred at an earlier page in the document.

In some embodiments, the system may receive a scroll-up command via a second editor during the common editing period. A scroll-up command may be any input from a user that indicates a user intent to change the viewport to display additional information. For example, a user may roll a mouse wheel, click a scroll bar on a document, or provide input through a keyboard, voice headset, haptic controls, or other user device that indicates a user desire to adjust a display. A scroll commend in general may be any input to indicate a direction in which the system may re-render the viewport to display additional information in any direction in relation to the electronic document being displayed in the viewport. In some embodiments, receipt of a scroll-up command may cause the display associated with the second hardware device to reflect the pagination change caused by the first edits. Reflecting the pagination change caused by the first edits may include updating or re-rendering the display to reflect a revised location of objects and information currently displayed on the second editor to reflect location changes caused by edits that occurred at an earlier page in the document. For example, when a second editor is altering information on page 2 of an electronic collaborative document while a first editor is altering information on page 1 of the same document, if the first editor's alterations adds an additional page of text to add a new page 2 and push the previous page 2 into new page 3, the second editor's viewport of the electronic collaborative document may lock the second editor's display so that a second user of the second editor is not interrupted and displays information on the previous page 2. However, as soon as the second user inputs a scroll-up commend in the second editor, the system may render the second editor's viewport to view the newly added page 2 from the first editor in a seamless manner.

In yet other embodiments, a scroll-up command that causes a second hardware device to reflect the pagination change may include a scroll to a page other than a page currently displayed on a second display. For example, adjustments to the viewing location of less than one page may not cause the system to reflect the pagination change caused by the first edits. In one embodiment, a user may want to view a different part of a page associated with an active work location and may scroll up to another part of the page without changing the viewing page. In this embodiment, the system may not reflect the pagination change caused by first edits on an earlier page. If the user issues a scroll-up command that adjusts the viewing location to a different page than the currently displayed page on the second display, the system may update the display to reflect a revised location of objects and information currently displayed on the second editor to reflect location changes caused by edits that occurred at an earlier page in the document.

Figure 54:
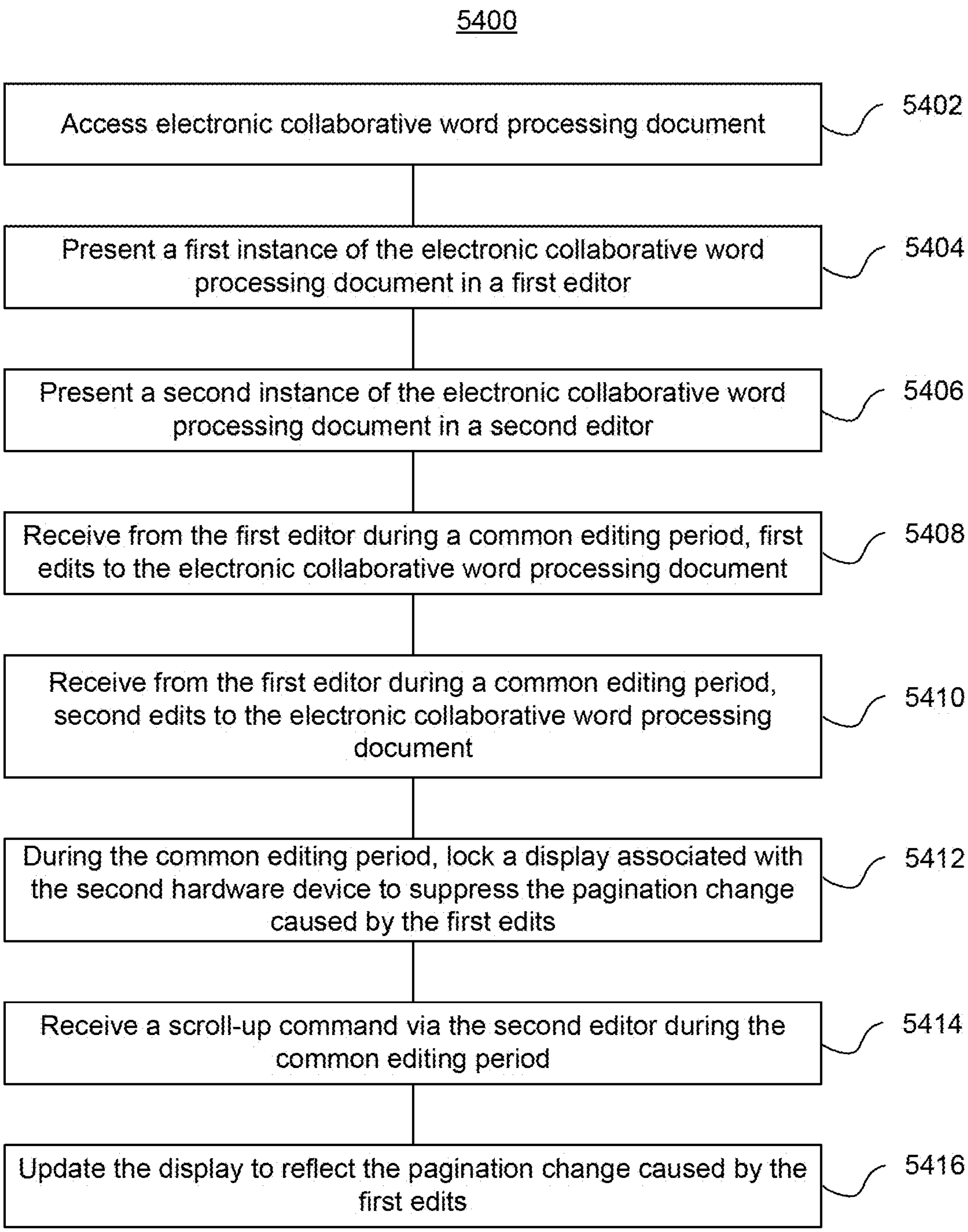
FIG. 54 illustrates a block diagram of an example process for managing display interference in an electronic collaborative word processing document, consistent with some embodiments of the present disclosure.

FIG. 54 illustrates a block diagram of an example process 5400 for managing display interference in an electronic collaborative word processing document. While the block diagram may be described below in connection with certain implementation embodiments presented in other figures, those implementations are provided for illustrative purposes only, and are not intended to serve as a limitation on the block diagram. In some embodiments, the process 5400 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 50 to 53 by way of example. In some embodiments, some aspects of the process 5400 may be implemented as software (e.g., program codes or instructions) that are stored in a memory (e.g., the memory portion 122 in FIG. 1) or a non-transitory computer-readable medium. In some embodiments, some aspects of the process 5400 may be implemented as hardware (e.g., a specific-purpose circuit). In some embodiments, the process 5400 may be implemented as a combination of software and hardware.

FIG. 54 includes process blocks 5402 to 5416. At block 5402, a processing means may access an electronic collaborative word processing document, as discussed previously in the disclosure above.

At block 5404, the processing means may present a first instance of the electronic collaborative word processing document in a first editor, as discussed previously in the disclosure above.

At block 5406, the processing means may present a second instance of the electronic collaborative word processing document in a second editor, as discussed previously in the disclosure above.

At block 5408, the processing means may receive from the first editor during a common editing period, first edits to the electronic collaborative word processing document, as discussed previously in the disclosure above.

At block 5410, the processing means may receive from the first editor during a common editing period, second edits to the electronic collaborative word processing document, as discussed previously in the disclosure above.

At block 5412, the processing means may, during the common editing period, lock a display associated with the second hardware device to suppress the pagination change caused by the first edits, as discussed previously in the disclosure above.

At block 5414, the processing means may receive a scroll-up command via the second editor during the common editing period, as discussed previously in the disclosure above.

At block 5416, the processing means may update the display to reflect the pagination change caused by the first edits, as discussed previously in the disclosure above.

Figure 55:
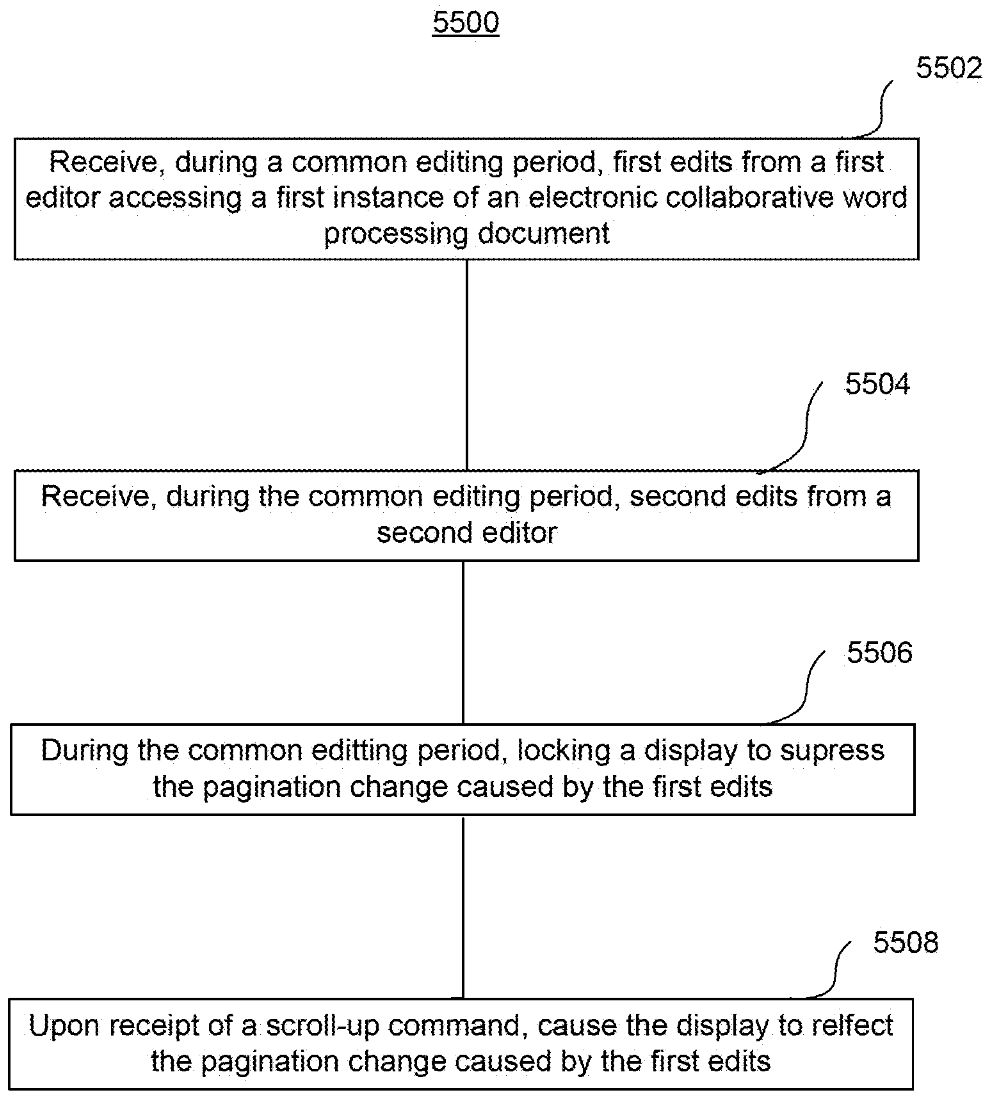
FIG. 55 illustrates a block diagram of another example process for managing display interference in an electronic collaborative word processing document, consistent with some embodiments of the present disclosure.

FIG. 55 illustrates a block diagram of an example process 5500 for managing display interference in an electronic collaborative word processing document. While the block diagram may be described below in connection with certain implementation embodiments presented in other figures, those implementations are provided for illustrative purposes only, and are not intended to serve as a limitation on the block diagram. In some embodiments, the process 5500 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 50 to 53 by way of example. In some embodiments, some aspects of the process 5500 may be implemented as software (e.g., program codes or instructions) that are stored in a memory (e.g., the memory portion 122 in FIG. 1) or a non-transitory computer-readable medium. In some embodiments, some aspects of the process 5500 may be implemented as hardware (e.g., a specific-purpose circuit). In some embodiments, the process 5500 may be implemented as a combination of software and hardware.

FIG. 55 includes process blocks 5502 to 5508. At block 5502, a processing means may receive via a communications interface during a common editing period, first edits from a first editor accessing a first instance of the electronic collaborative document via a first hardware device, wherein the first edits occur on a first earlier page of the electronic collaborative word processing document and result in a pagination change, as discussed previously in the disclosure above.

At block 5504, the processing means may receive during the common editing period, second edits from a second editor accessing a second instance of the electronic collaborative document via a second hardware device, as discussed previously in the disclosure above.

At block 5508, the processing means may, during the common editing period, lock a display associated with the second hardware device to suppress the pagination change caused by the first edits received via the communications interface, as discussed previously in the disclosure above.

At block 5508, the processing means may, upon receipt of a scroll-up command via the second editor during the common editing period, cause the display associated with the second hardware device to reflect the pagination change caused by the first edits, as discussed previously in the disclosure above.

In a collaborative word processing document, multiple users may simultaneously edit a single document in real time, near real time, or asynchronously. Problems may arise when certain edits made by a user in a collaborative word processing document are visible to or shared with all other users in the collaborative word processing document. In some instances, a user may input data into an electronic collaborative word processing document that the user does not intend to share with all other users of the collaborative word processing document. For example, a user may input confidential salary data in a portion of a collaborative word processing document that the user wishes to hide from some or all other users in the same document. In other instances, a user may wish to mask or hide the user's edits to one or more portions of a collaborative word processing document for a period of time. For example, a user may wish to make several private revisions, or drafts, to a portion of a collaborative word processing document, and then share the user's final edits with the other users in the collaborative word processing document at a later time. More generally, users editing a collaborative word processing document may wish to control the timing and visibility to some or all other users of certain edits that are shared within the collaborative word processing document. Therefore, there is a need for unconventional innovations for enabling dual mode editing in collaborative documents to enable private changes.

Such unconventional approaches may enable computer systems to implement functions to improve the efficiency of electronic collaborative word processing documents. By using unique and unconventional methods of classifying and storing data associated with a collaborative word processing document or by grouping, storing, and displaying histories and iterations of editable segments of the collaborative word processing document into unique and discrete elements with access restriction controls, a system may provide dual mode editing in collaborative documents to enable private changes to increase the efficiency of electronic collaborative word processing documents. Various embodiments of the present disclosure describe unconventional systems, methods, and computer readable media for enabling dual mode editing in collaborative documents to enable private changes in an electronic collaborative word processing document. Various embodiments of the present disclosure may include at least one processor configured to access an electronic collaborative document in which a first editor and at least one second editor are enabled to simultaneously edit and view each other's edits to the electronic collaborative document, and output first display signals for presenting an interface on a display of the first editor, the interface including a toggle enabling the first editor to switch between a collaborative mode and a private mode. The at least one processor may be configured to receive from the first editor operating in the collaborative mode, first edits to the electronic collaborative document and to output second display signals to the first editor and the at least one second editor, the second display signals reflecting the first edits made by the first editor. The at least one processor may be configured to receive from the first editor interacting with the interface, a private mode change signal reflecting a request to change from the collaborative mode to the private mode, and in response to the first mode change signal, initiate in connection with the electronic collaborative document the private mode for the first editor. The at least one processor may be configured to, in the private mode, receive from the first editor, second edits to the electronic collaborative document, and in response to the second edits, output third display signals to the first editor while withholding the third display signals from the at least one second editor, such that the second edits are enabled to appear on a display of the first editor and are prevented from appearing on at least one display of the at least one second editor.

Thus, the various embodiments in the present disclosure describe at least a technological solution, based on improvements to operations of computer systems and platforms, to the technical challenge of managing display interference caused by simultaneous edits to an electronic collaborative word processing document.

Some disclosed embodiments may involve systems, methods, and computer readable media for enabling dual mode editing in collaborative documents to enable private changes. Enabling dual mode editing may refer to presenting an interactable interface with the ability to provide two independent modes of making changes to an electronic document. In one mode, changes made in an electronic collaborative word processing document may be public changes and may also be known as collaborative mode. A public change may include any edit to an electronic collaborative document that may be shared with or accessible to all users (or a designated group of users) in the electronic collaborative document in real-time or near-real time. Alternatively, a user may, through dual mode editing, enable private changes. Enabling a private change may include providing options to a user on an associated computing device to make any edit to an electronic collaborative document that is not shared with all other users in real-time, or not shared to at least some users who may have access to an electronic collaborative document. Dual mode editing to enable private changes may operate in various ways. For example, in collaborative mode, all of a user's changes may be shared and displayed with all other users accessing an electronic collaborative document. When in private mode, a user may designate edits to a portion of an electronic collaborative document to be visible to a subset of all users who have access to the collaborative document. In another example, some or all of a user's edits may not be visible to other users with access to an electronic collaborative document until the user signals that the edits should be visible to other users. More generally, dual mode editing to enable private changes allows a user to make any edit to an electronic collaborative document while restricting the timing or audience of the user's edits.

Dual mode editing to enable private changes may be enabled in electronic collaborative documents. A collaborative document may include any electronic file that may be read by a computer program that provides for the input, editing, formatting, display, and output of text, graphics, widgets, data, objects, tables, or other elements typically used in computer desktop publishing applications. An electronic collaborative document may be stored in one or more repositories connected to a network accessible by one or more users via at least one associated computing device. In one embodiment, one or more users may simultaneously edit an electronic collaborative document, with all users' edits displaying in real-time or near real-time within the same collaborative document file. The one or more users may access the electronic collaborative document through one or more user devices connected to a network. An electronic collaborative document may include graphical user interface elements enabled to support the input, display, and management of multiple edits made by multiple users operating simultaneously within the same document. Though this disclosure subsequently refers to electronic collaborative word processing documents, the systems, methods, and techniques disclosed herein are not limited to word processing documents and may be adapted for use in other productivity applications such as documents, presentations, worksheets, databases, charts, graphs, digital paintings, electronic music and digital video or any other application software used for producing information.

FIG. 3 is an exemplary embodiment of a presentation of an electronic collaborative word processing document 301 via an editing interface or editor 300. Though an electronic collaborative word processing document is depicted in this example, solutions and techniques are not limited to electronic collaborative word processing documents and may be included in any other types of electronic collaborative documents described herein. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Some aspects of the present disclosure may involve accessing an electronic collaborative document. An electronic collaborative document may be stored in one or more data repositories and the document may be retrieved by one or more users for downloading, receiving, processing, editing, or viewing, the electronic collaborative document. An electronic collaborative document may be accessed by a user using a user device through a network. Accessing an electronic collaborative document may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A user may access the electronic collaborative document using a user device, which may include a computer, laptop, smartphone, tablet, VR headset, smart watch, or any other electronic display device capable of receiving and sending data. In some embodiments, accessing the electronic document may include retrieving the electronic document from a web browser cache. Additionally or alternatively, accessing the electronic document may include connecting with a live data stream of the electronic word processing document from a remote source. In some embodiments, accessing the electronic document may include logging into an account having a permission to access the document. For example, accessing the electronic document may be achieved by interacting with an indication associated with the electronic word processing document, such as an icon or file name, which may cause the system to retrieve (e.g., from a storage medium) a particular electronic document associated with the indication.

For example, an electronic collaborative document may be stored in repository 230-1 as shown in FIG. 2. Repository 230-1 may be configured to store software, files, or code, such as electronic collaborative documents developed using computing device 100 or user device 220-1. Repository 230-1 may further be accessed by computing device 100, user device 220-1, or other components of system 200 for downloading, receiving, processing, editing, or viewing, the electronic collaborative document. Repository 230-1 may be any suitable combination of data storage devices, which may optionally include any type or combination of slave databases, load balancers, dummy servers, firewalls, back-up databases, and/or any other desired database components. In some embodiments, repository 230-1 may be employed as a cloud service, such as a Software as a Service (SaaS) system, a Platform as a Service (PaaS), or Infrastructure as a Service (IaaS) system. For example, repository 230-1 may be based on infrastructure of services of Amazon Web Services™ (AWS), Microsoft Azure™, Google Cloud Platform™, Cisco Metapod™, Joyent™, vmWare™, or other cloud computing providers. Repository 230-1 may include other commercial file sharing services, such as Dropbox™, Google Docs™, or iCloud™ In some embodiments, repository 230-1 may be a remote storage location, such as a network drive or server in communication with network 210. In other embodiments repository 230-1 may also be a local storage device, such as local memory of one or more computing devices (e.g., computing device 100) in a distributed computing environment.

In some embodiments, a first editor and at least one second editor may be enabled to simultaneously edit and view each other's edits to the electronic collaborative document. A first editor may be a user interface that provides for the input, editing, formatting, display, and output of text, graphics, widgets, objects, tables, or other elements in an electronic word processing document or any other electronic collaborative document. A first editor may receive user input via a keyboard, mouse, microphone, digital camera, scanner, voice sensing, webcam, biometric device, stylus, haptic devices, or any other input device capable of transmitting input data. In one embodiment, a user accesses an electronic collaborative document using a computer and views the document in an editor that receives text and other input via a mouse and keyboard. Another instance of the electronic collaborative document may be presented via a second hardware device running a second editor, in a similar manner to the first hardware device and the first editor described herein. Any number of hardware devices may run an editor to access another instance of the electronic collaborative word processing document.

A first editor and at least one second editor may be enabled to simultaneously edit and view each other's edits to an electronic collaborative document. Enabling simultaneous editing and viewing of other's edits to an electronic collaborative document may include providing the ability to access an electronic collaborative document to multiple users at the same time such that information in the electronic collaborative document may be presented to the multiple users and authorize the multiple users to alter information presented to them. For example, edits made by a user in the first or the second instance of the electronic collaborative document may be incorporated into other instances of the electronic collaborative document in real time. In some embodiments, the first instance and the second instance of the electronic collaborative document may share a common viewport displaying some of the same data and information in both the first and second instances of the document. Edits made in the first or second instance may be demarcated by user identification indicators in the first and second instance.

User identification indicators may include a graphic, a user ID indicator, a color, a font, or any other differentiator that indicates the source of an edit in an instance of the electronic collaborative document.

Figure 56:
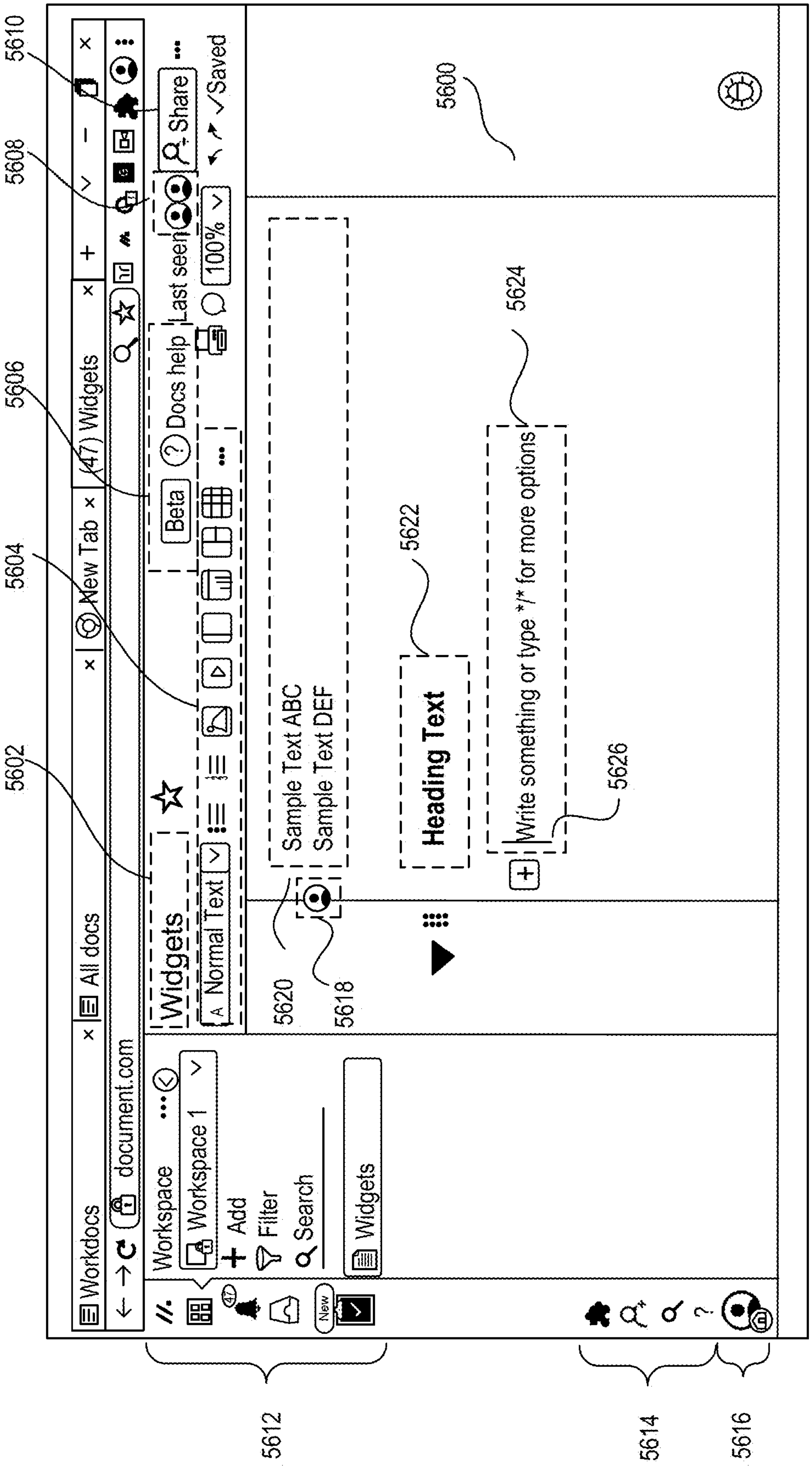
FIG. 56 illustrates an exemplary editor for an electronic collaborative word processing document operating in collaborative mode, consistent with some embodiments of the present disclosure.

By way of example, FIG. 56 illustrates an electronic collaborative document (e.g., an electronic collaborative word processing document) presented within an editor 5600 operating in collaborative mode. In some embodiments, editor 5600 may be displayed by a computing device (e.g., the computing device 100 illustrated in FIG. 1), software running thereon, or any other projecting device ((e.g., projector, AR or VR lens, or any other display device) as previously discussed). Editor 5600 may include various tools for displaying information associated with the document of for editing the document. For example, editor 5600 may display a title 5602 indicating the title of the document. Formatting bar 5604 may depict various tools to adjust formatting of information or objects within the document. Help bar 5606 may be included which may provide hyperlinks to information about various features of the editor 5600. Share button 5610 may be included to invite additional users to edit another instance of the collaborative electronic word processing document. Editor 5600 may include tool bar 5612 and interface bar 5614. Editor 5600 may indicate the that multiple users are accessing an electronic collaborative document through the display of user indicator, such as user display indicator 5608 which indicates two users are running an instance of the electronic collaborative document. Editor 5600 may include current user indicator 5616. Current user indicator 5616 may indicate the identification of the user running the displayed instance of the collaborative document. In some embodiments, the objects and information displayed for editing may be controlled by the current user shown in 5616 in each instance of the electronic collaborative document. For example, FIG. 56 may depict an editing location that is actively edited by the current user, such as editing location 5624 indicated by cursor 5626. A second user, indicated by icon 5618, is actively editing in another instance of the electronic collaborative document paragraph block 5620. With operating in collaborative mode, edits made by the first user in the first editor are immediately displayed in the editor viewed by the second user, and vice versa. For instance, any information or data added at the active work location 5624 will be visible to the second user, and any information added by the second user to paragraph block 5620 will be visible in editor 5600. Future edits to additional fields, such as title block 5622 will also be visible in both editors. The first user and the second user may correspond to users operating one or more user devices shown in FIG. 2. For example, first user may operate user device 220-1 (of FIG. 2) to view editor 5600 (of FIG. 56). Second user may operate the second editor through user device 220-2 (of FIG. 2). Additional users may further access the electronic collaborative document using additional user devices.

Some aspects of the present disclosure may involve outputting first display signals for presenting an interface on a display of the first editor. A display signal may be an electronic instruction that transmits display information. A display signal may be any phenomena capable of transmitting electronic display information and may include a time varying voltage, current, or electromagnetic wave or any other method of transmitting data through an electrical medium. Outputting a display signal may include transmitting a signal containing instructions to present an interface on a display of a first editor. A first display signal may represent a display signal that may be transmitted at a certain period of time before subsequent display signals or before toggling a change in the dual mode. Presenting an interface on a display of a first editor may include displaying a visualization with activatable elements that a user may interact with and provide input on a user device, which may include a computer, laptop, smartphone, tablet, VR headset, smart watch, or any other electronic display device capable of receiving and sending data. An interface may display data and information associated with the editor and the collaborative electronic document. The interface may receive user input via a keyboard, mouse, microphone, digital camera, scanner, voice sensing, webcam, biometric device, stylus, haptic devices, or any other input device capable of transmitting input data. In one embodiment, presenting an interface on a display of a first editor may include a user accessing an electronic collaborative word processing document using a computer and viewing the document in an editor that receives text and other input via a mouse and keyboard.

In some embodiments, an interface may include a toggle enabling a first editor to switch between a collaborative mode and a private mode. As described above, collaborative mode may be a manner of displaying an electronic collaborative document where changes made by one or more users are public changes. A public change is any edit to an electronic collaborative document that is immediately shared with all users in the electronic collaborative document in real-time. A private mode may be a manner of displaying an electronic collaborative document where edits made by a user to an electronic collaborative document is not shared with all other users in real-time. As described herein, private mode may operate in various ways. For example, a user may designate edits to a portion of an electronic collaborative document to be visible to a subset of all users who have access to the collaborative document. In another example, some or all of a user's edits may not be visible to other users with access to an electronic collaborative document until the user signals toggles back to collaborative mode. More generally, private mode allows a user to make any edit to an electronic collaborative document while restricting the visibility of the user's edits to other users viewing other instances of an electronic collaborative document for a period of time.

In some embodiments, the interface may switch between a collaborative mode and a private mode via a toggle. A toggle may be any activatable graphical user interface element that enables a change between one state to another state. For example, a toggle may be a button or other icon in a user interface that can be selected by a user. In other embodiments, the toggle is presented outside of the interface in an HTML hyperlink or file path. For example, the system may generate a unique hyperlink for an instance of an electronic collaborative document with a selection between collaborative mode and private mode pre-enabled. When a user selects the hyperlink, an interface on a display of an editor may be displayed in collaborative mode or private mode as indicated in the instructions in the hyperlink. A toggle enabling the first editor to switch between a collaborative mode and a private mode may include any activatable element on an interface that may send instructions to a processor to operate in a collaborative mode, to operate in a private mode, or to switch from an actively operating collaborative mode to private mode and vice versa.

Some aspects of the present disclosure may involve receiving from a first editor operating in the collaborative mode, first edits to the electronic collaborative document. An edit to an electronic collaborative document may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or any other data within the electronic collaborative document. Receiving the first edits may include the system receiving an edit request from a computing device associated with a user. The request may be transmitted over a network to a repository where the electronic collaborative document is stored. At least one processor may then perform a lookup of permission settings to confirm whether the computing device has authorization to make the edit. In a situation where authorization is confirmed, the system may then implement and store the edit with the electronic collaborative document such that any other computing devices accessing the document may retrieve the document with the implemented change.

Some embodiments may involve outputting second display signals to a first editor and at least one second editor, the second display signals reflecting first edits made by the first editor. A second display signal may be a display signal that is made at a later time than a first display signal, which may be output and transmitted to cause a rendering of information as discussed previously above. The second display signal may reflect first edits made by the first editor. As described herein, while in collaborative mode, an edit made by a user may be immediately shared with all other users operating instances of the electronic collaborative document in additional editors in real-time. Once a user makes first edits in an interface of a first editor, second display signals may be transmitted to the first and second editor reflecting the changes, resulting in the edits being visible in both the first and second editors to each user. Second display signals are not limited to transmission to a first and second editor, but may also include transmission to any number of editors accessing the electronic collaborative document.

Some aspects of the present disclosure may involve receiving from a first editor interacting with an interface, a private mode change signal reflecting a request to change from a collaborative mode to a private mode. A private mode change signal may be any electronic communications instruction from an editor indicating an intent to enable private mode operation from a collaborate mode operation. A private mode change signal may be indicated by user input via a keyboard, mouse, microphone, digital camera, scanner, voice sensing, webcam, biometric device, stylus, haptic devices, or any other input device capable of transmitting input data, which may then be received by at least one processor to carry out the associated instructions. In some embodiments, the private mode change signal may be generated by a user selecting a toggle in a graphical user interface.

Some embodiments may include, in response to a first mode change signal, initiating in connection with an electronic collaborative document a private mode for the first editor. Initiating the private mode for the first editor in connection with an electronic collaborative document may include causing some or all of the edits made in the first editor associated with a first editor to be withheld from display in other instances of the collaborative electronic document in other editors. Private mode may be initiated for all or part of an electronic collaborative document. For example, initiating private mode may cause all changes made in the first editor to be visible in the first editor only and not be visible in other instances of the collaborative electronic document in the second editor or any other editor. In some embodiments, private mode may be initiated in a portion of the collaborative electronic document. As described herein, collaborative electronic documents may be organized into one or more blocks of information. Private mode may be enabled for one or more blocks as designated by the user through the editor. In this scenario, changes made to blocks via the first editor that have private mode initiated will not display in other instances of the electronic collaborative word processing document, and changes made to blocks where private mode is not initiated changes will continue to display edits made by the first editor in real time.

Figure 57:
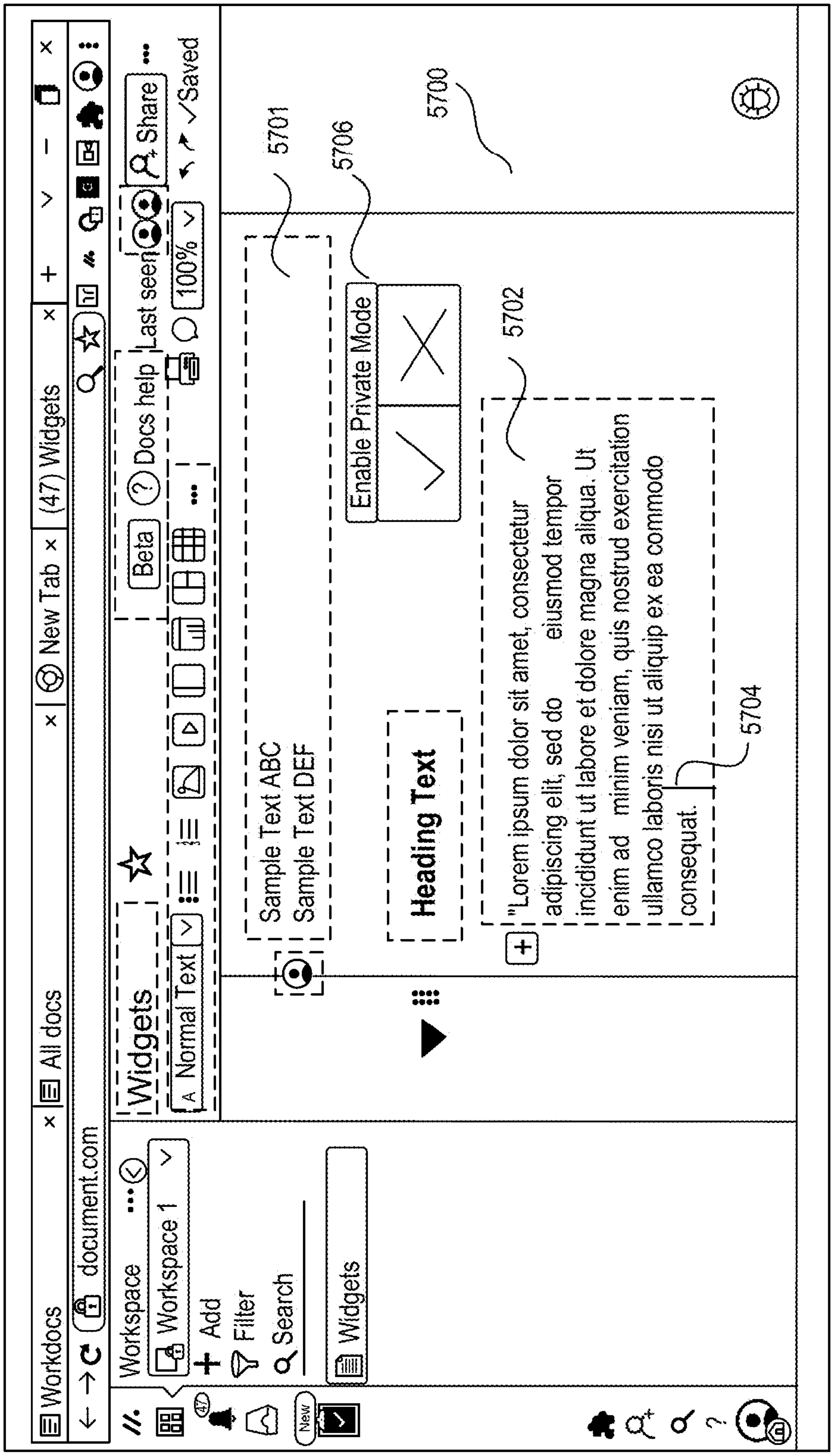
FIG. 57 illustrates an exemplary editor for an electronic collaborative word processing document with an option for enabling dual mode editing to enable private changes displayed, consistent with some embodiments of the present disclosure.

By way of example, FIG. 57 depicts an exemplary editor 5700 for an electronic collaborative document with an option for enabling dual mode editing to enable private changes displayed. Editor 5700 may include private mode change toggle 5706 which may cause a private mode change signal to be transmitted as described herein. Once editor 5700 activates the private mode change toggle 5706 via a user input, the private mode for the first editor may be initiated.

Some aspects of the present disclosure may involve, in a private mode, receiving from a first editor, second edits to an electronic collaborative document. Second edits may include the addition, manipulation, or deletion of objects or data, and may include addition, manipulation, or deletion of text, graphics, tables, images, formatting, highlights, manipulation of fonts, icons, shapes, references, headers, footers, or any other addition, deletion, or manipulation of objects or data within the electronic collaborative document as previously discussed. As used herein, second edits may refer to edits made in a second instance of the collaborative electronic word processing document while private mode is enabled. Second edits may occur either earlier in time, later in time, or simultaneously with first edits and are not limited to edits occurring later in time than first edits in the document. For example, a user may toggle between collaborative mode and private mode multiple times. In this example, all edits made while operating in private mode may be considered second edits, even if the edits were made before or after first edits made while the editor is in collaborative mode.

Some aspects of the present disclosure may involve, in response to second edits, outputting third display signals to a first editor while withholding third display signals from at least one second editor. A third display signal may be a display signal that contains data for second edits that may be transmitted to cause a presentation of the second edits, consistent with the earlier discussion. Withholding a display signal may include not transmitting the display signal so that an editor does not receive information associated with the display signal. The processor may transmit the third display signal with second edits made by the first editor to a display (e.g., the first editor may be re-rendered to include the second edits in a presentation) while the processor may not transmit or withhold the third display signal to the second editor (e.g., resulting in the second editor to not re-render with the second edits. The third display signal may be differentiated between the first and second display signals in that the third display signal contains second edits made by an editor while private mode is enabled. Outputting third display signals to the first editor while withholding the third display signals from the at least one second editor may enable second edits to appear on a display of the first editor and prevent second edits from appearing on at least one display of the at least one second editor. Third display signals that are unique from first or second display signals may be transmitted containing instructions to display the second edits. The third display signals may be selectively transmitted some but not all editors. For example, a user operating a first editor may add text data to a document after enabling private mode. Upon receipt of third display signals, the user's text will display in the editor operated by the user (e.g., second edits may appear on a display of the first editor). When private mode editing is enabled, the third display signals may be withheld from the second editor, which means the second edits may not display in the second editor (e.g., second edits are prevented from appearing on at least one display of at least one second editor). By enabling private mode editing in part or all of a document, the user operating the first editor designates which editors receive third display signals containing second edits and designates which editors do not receive third display signals and continue to receive second display signals instead.

By way of example and returning to FIG. 57, editor 5700 may include first edits made in collaborative mode that are visible to all users accessing the electronic collaborative document. For example, text block 5701 includes first edits made by editor 5700 that are displayed in editor 5700 and in other editors accessing the electronic collaborative document. Text block 5702 displays edits made in editor 5700 in private mode. Text block 5702 is displayed in editor 5700 but not in any other editors viewing the same electronic collaborative document. Additional edits made at cursor 5704 while private mode is enabled may not be displayed in other editors viewing the same electronic collaborative document until collaborative mode is enabled.

Some aspects of the present disclosure may involve receiving from a first editor interacting with an interface, a collaborative mode change signal reflecting a request to change from a private mode to a collaborative mode. A collaborative mode change signal may be any electronic communications instruction from the editor indicating an intent to enable collaborative mode operations. A collaborative mode change signal may be indicated by user input via a keyboard, mouse, microphone, digital camera, scanner, voice sensing, webcam, biometric device, stylus, haptic devices, or any other input device capable of transmitting input data. In some embodiments, the collaborative mode change signal may be generated by a user selecting a toggle in a graphical user interface. In response to receipt of the collaborative mode change signal, subsequent edits made by the first editor may be enabled to be viewed by the at least one second editor. A subsequent edit may include an edit made by the first editor after receipt of the collaborative mode change signal. When edits are made by a first editor in collaborative mode, these edits may be immediately shared in real time to all other users and rendered on associated displays of the users accessing the collaborative electronic document. In some embodiments, the collaborative mode change signal may be toggled for the entire document. In this embodiment, all subsequent edits made to the document in collaborative mode may be displayed in other editors viewing other instances of the electronic document. In other embodiments, the collaborative mode change signal may be applied to one or more portions of a document. In this embodiment, only subsequent edits to certain portions of the electronic collaborative document may be displayed to all other editors in real time, while other portions of the electronic collaborative document remain in private mode. In some embodiments, a collaborative mode change signal may be toggled with respect to one or more blocks and may operate at the block level.

Some aspects of the present disclosure may involve segregating second edits made in private mode, such that upon return to a collaborative mode, viewing of the second edits are withheld from at least one second editor. Segregating second edits made in private mode may involve a method of saving and storing data that independently tracks and stores data associated with second edits in a manner that does not transmit the stored data until additional instructions are received to release the segregated second edits to particular editors. Data indicating that the edits were made in private mode may be stored as a property of the document, and in some embodiments, may be stored as a property of each individual block in the document. For example, a first editor may be enabled in private mode and may make second edits in private mode to one or more blocks of an electronic document. These edits may be initially withheld from display to other instances of the electronic document. Continuing with the example, the editor may close the document and reopen it at a later time and toggle collaborative mode. The second edits made to the one or more blocks may be displayed in the first editor but may not be displayed in the second editor or other editors because the second edits have been segregated when they were made in private mode. More generally, segregating edits made in private mode may refer to any method of data manipulation and storage that tracks the state of the dual mode at the of the editor at the time the second edits are made.

Some aspects of the present disclosure may involve receiving from a first editor a release signal, and in response thereto, enabling at least one second editor to view the second edits. Receiving a release signal from an editor may include any electronic communications instruction from the editor that transmits a user desire to publish second edits to the second editor. Enabling an editor to view edits may include transmitting a display signal to a particular computing device associated with an editor to cause information associated with particular edits to be rendered on a screen associated with the editor. As previously discussed, an editor may utilize both a collaborative mode and a private mode when editing an electronic document. Edits made in the electronic document while operating in collaborative mode may be shared and displayed in real time to all other users. Edits made in private mode may not be shared with all other users in the electronic collaborative document. In some embodiments, switching between collaborative mode and private mode may not publish the edits made to the electronic collaborative document that were made in private mode. Instead, a release signal may operate to publish edits made in private mode to the other users in the electronic collaborative document. An editor may transmit a release signal in response to various inputs. For example, the editor may include a button, toggle, switch, or other GUI element that releases all second edits made to an electronic collaborative document. In another embodiment, release signals may be transmitted that correspond to a portion of the electronic document. For example, a release signal may be transmitted that applies to one or more blocks in the electronic document. A user may indicate a desire to transmit a release signal by selecting a block and selecting a release icon. As an illustrative example, the editor may allow a user to right click on a block and select an option to release second edits in the block. In other embodiments, release signals may trigger automatically in accordance with various user settings. For example, user settings may cause release signals to be transmitted based on pre-determined intervals of time, based on certain users with superior administrative privileges viewing the document in another editor, or based on a predetermined action performed by the user, such as closing the editor. In some embodiments, enabling the at least one second editor to view the second edits may include displaying to the at least one second editor, in association with the second edits, an identity of the first editor. An identity of the first editor may be associated with the user operating the editor and may include any indicator (e.g., alphanumeric, graphical, or combination thereof). For example, a user operating a first editor may have a user account with personal identifying information, such as a name, username, photo, employee ID, or any other personal information. Displaying to the at least on second editor an identity of the first editor may include causing a presentation of an indication of the user account associated with the first editor. In some embodiments, the identity of the first editor may be displayed with an icon that is visible in the second editor. The icon may contain personally identifying information such as a name, initials, a photo, or other data. In some embodiments, the identity of the first editor may be displayed to the second editor in association with the second edits. Displaying an identity in association with second edits may include rendering a visual indicator of the identity of the first editor in or near the second edits in a co-presentation, or in response to an interaction (e.g., a cursor hover over the second edits). For example, the visual link may include an icon, a font, a highlight, a graphic, a color of text or any other data property identifying the identity of the first editor placed adjacent or in the edits in the display. In another example, the identity of the first editor may be displayed in response to an input in the second editor. For instance, the user operating the second editor may receive display information indicating second edits displayed in a color. Upon selecting the edits or placing a cursor near the edits, a popup may be displayed that identifies the identity of the first editor using a visual indicator as described herein.

In some embodiments, in response to receiving a release signal, at least one processor may compare second edits made in private mode to original text in an electronic collaborative document, identify differences based on the comparison, and present the differences in connection with text of the electronic collaborative document to thereby indicate changes originally made during private mode. Original text may include any or all text or data in an electronic collaborative document that the document contained prior to second edits made by the first editor. The processor may identify the second edits made in private mode by segregating the data associated with second edits as described herein. Comparing second edits to original text in an electronic collaborative document may include a calculation of differences and/or similarities between data contained in the second edits to the original text in an electronic document. Identifying differences between the original text and data in the electronic collaborative document and the second edits may include analyzing the differences in objects, text, and other data between the original version and the second edits after a comparison and associating a tag with the different data in the repository so that the processor may later locate the data that is different. Differences may include the addition, deletion, or modification of text, objects, tables, pictures, fonts, colors, object properties, graphics, visual or audio data, or any other manipulation of data in the electronic document made in private mode. Presenting the differences in connection with text of the electronic collaborative document to thereby indicate changes originally made during private mode may include rendering an indication that certain text, objects, or data have been changed as compared to the original version. In one embodiment, changes to text are presented by displaying additional or deleted text in a particular color, font, or format. For example, additional text may be displayed in red with underlines and deleted text may be indicated by a strikethrough. In other embodiments, changes to the document may be indicated by highlighting, font changes, imbedded objects or pop-up indicators, or any other method capable of visually distinguishing types of data in an electronic collaborative document. In some embodiments, the color associated with the changes to text or other objects corresponds with the identity of the user who made the second edits.

Some aspects of the present disclosure may include receiving from a first editor, in association with a text block, a retroactive privatization signal, and upon receipt of the retroactive privatization signal, withhold the text block from display to at least one second editor. A retroactive privatization signal may be a data signal that indicates a portion of text that should be withheld from display to a second editor or any additional editors. A retroactive privatization signal may function to transfer a portion or all of a document to private mode, thereby allowing the first editor to view and manipulate objects, text, or data in the portion of the document in private mode. Receiving a retroactive privatization signal may be associated with a text block which may involve obtaining instructions to retroactively mark a particular region of text as private. For example, a user running a first editor may wish to hide certain portions of a document containing confidential financial information from view of one or all other users. The user may select the block or blocks of text data containing the confidential information and transmit a privatization signal which causes the display signals being transmitted to the other users to not display the blocks containing confidential financial information. Any block or blocks of data may be designated associated with a retroactive privatization signal, which may transmit the objects, text, and data inside the block or blocks to private mode (e.g., causing a re-rendering of the displays of the users to omit the data designated to be retroactively private). Withholding the text block from display to a second editor may include causing a re-rendering of a display of the second editor to delete, omit, obscure, or reduce access to information marked as private. A retroactive privatization signal may be disabled by an editor sending a release signal.

Some aspects of the present disclosure may include receiving from a first editor operating in private mode an exemption signal for at least one particular editor, to thereby enable the at least one particular editor to view the second edits. Receiving an exemption signal may include obtaining an electronic transmittal of data or instructions from a computing device associated with a user interacting with an editor to enable a particular editor to receive display signals causing a display to show the changes made in private mode by the first editor. For example, a user operating the first editor may wish to make private edits in private mode and may wish to share the edits with a particular user without publishing the edits to all other users in the electronic collaborative document by sending a release signal. By sending an exemption signal, the first editor may designate one or more other editors to receive third display signals containing the second edits made in the first editor. Receiving an exemption signal for at least one particular editor to thereby enable the at least one particular editor to view the second edits may include receiving instructions in an exemption signal that may allow a user to share edits with some users and hide the edits from other users. For example, a large team of several dozen users may collaborate on a single electronic collaborative document. In this example, there may be a desire to include a section of the document that contains confidential information, such as salary information. A user may enable private mode editing to begin privately adding confidential data to the document that may be hidden from all other users. The user's editor may then transmit an exemption signal to another user's editor who can now view the confidential information and the confidential information will remain hidden from the other users working in the document. In some embodiments, an exemption signal may be applied to one or more blocks in an electronic document, thereby enabling particular editors to view the second edits associated with that block.

Figure 58:
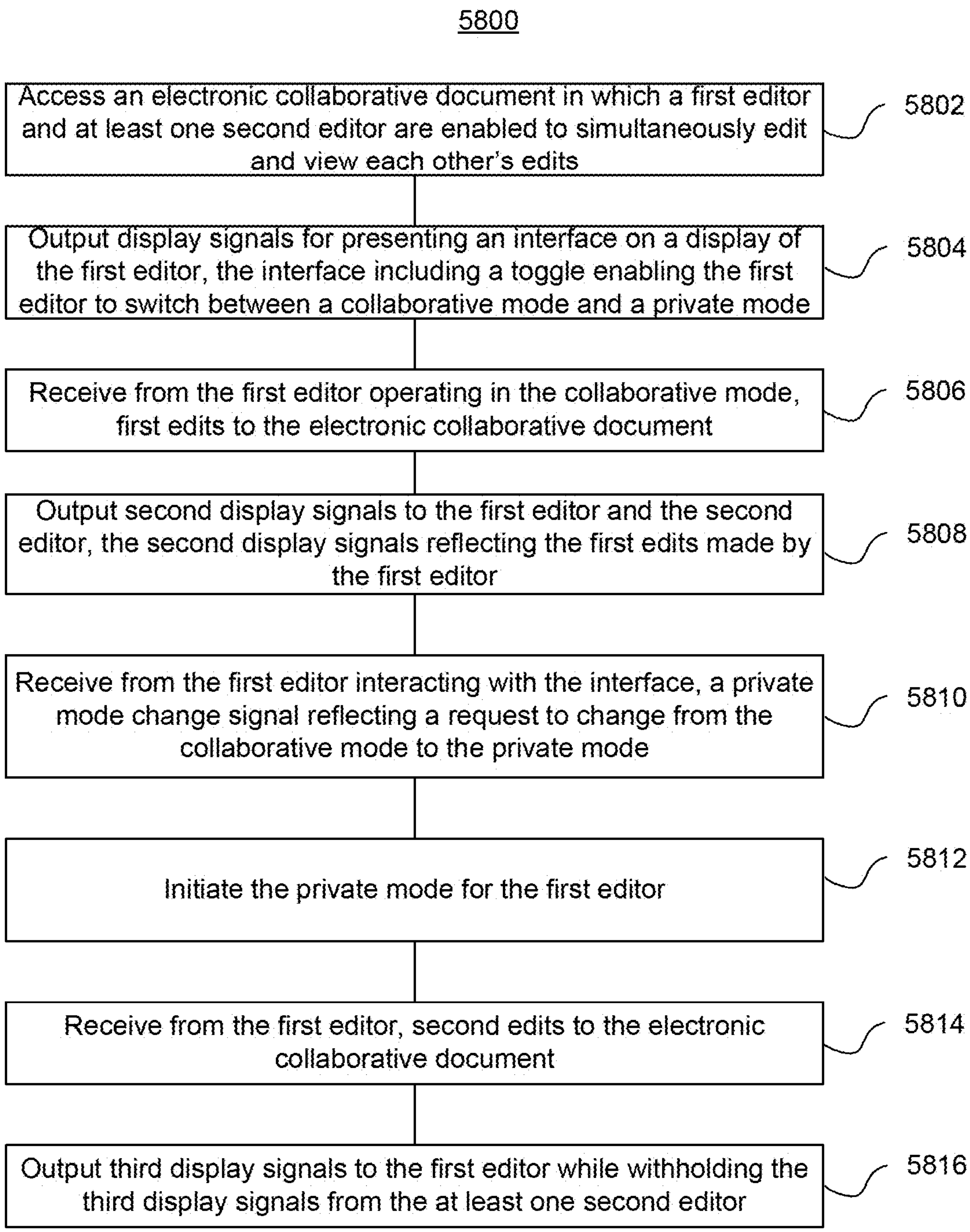
FIG. 58 illustrates a block diagram of an example process for enabling dual mode editing in collaborative documents to enable private changes.

FIG. 58 illustrates a block diagram of an example process 5800 for enabling dual mode editing in collaborative documents to enable private changes. While the block diagram may be described below in connection with certain implementation embodiments presented in other figures, those implementations are provided for illustrative purposes only, and are not intended to serve as a limitation on the block diagram. In some embodiments, the process 5800 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 56 to 57 by way of example. In some embodiments, some aspects of the process 5800 may be implemented as software (e.g., program codes or instructions) that are stored in a memory (e.g., the memory portion 122 in FIG. 1) or a non-transitory computer-readable medium. In some embodiments, some aspects of the process 5800 may be implemented as hardware (e.g., a specific-purpose circuit). In some embodiments, the process 5800 may be implemented as a combination of software and hardware.

FIG. 58 includes process blocks 5802 to 5816. At block 5802, a processing means may access an electronic collaborative document in which a first editor and at least one second editor are enabled to simultaneously edit and view each other's edits to the electronic collaborative document, as discussed previously in the disclosure above.

At block 5804, the processing means may output first display signals for presenting an interface on a display of the first editor, the interface including a toggle enabling the first editor to switch between a collaborative mode and a private mode, as discussed previously in the disclosure above.

At block 5806, the processing means may receive from the first editor operating in the collaborative mode, first edits to the electronic collaborative document, as discussed previously in the disclosure above.

At block 5808, the processing means may output second display signals to the first editor and the at least one second editor, the second display signals reflecting the first edits made by the first editor, as discussed previously in the disclosure above.

At block 5810, the processing means may receive from the first editor interacting with the interface, a private mode change signal reflecting a request to change from the collaborative mode to the private mode, as discussed previously in the disclosure above.

At block 5812, the processing means may, in response to the first mode change signal, initiate in connection with the electronic collaborative document the private mode for the first editor, as discussed previously in the disclosure above.

At block 5814, the processing means may, in the private mode, receive from the first editor, second edits to the electronic collaborative document, as discussed previously in the disclosure above.

At block 5816, the processing means may in response to the second edits, output third display signals to the first editor while withholding the third display signals from the at least one second editor, such that the second edits are enabled to appear on a display of the first editor and are prevented from appearing on at least one display of the at least one second editor, as discussed previously in the disclosure above.

Some aspects of this disclosure may relate to a granular permissions system for shared electronic documents, including methods, systems, devices, and computer readable media. For ease of discussion, a system is described below, with the understanding that aspects of the system apply equally to non-transitory computer readable media, methods, and devices. Shared electronic documents, as used herein, are not limited to only digital files for word processing but may include any other processing document such as presentation slides, tables, databases, graphics, sound files, video files or any other digital document or file. Shared electronic documents may include any digital file that may provide for input, editing, formatting, display, and output of text, graphics, widgets, objects, tables, links, animations, dynamically updated elements, or any other data object that may be used in conjunction with the digital file. Shared electronic documents may be collaborative documents or non-collaborative documents. A collaborative document, as used herein, may refer to any document that may enable simultaneous viewing and editing by multiple entities. A collaborative document may, for example, be generated in or uploaded to a common online platform (e.g., a website) to enable multiple members of a team to contribute to preparing and editing the document. A non-collaborative document, as used herein, may refer to any document that only a single entity may modify, prepare, and edit at a time. The single entity may share the non-collaborative document with other entities (e.g., an end-user or audience) to enable the other entities to view or edit the same document.

Granular permissions, as used herein, may refer to any attribute or setting that may define how an entity or entities may interact with any amount of content associated with a section or portion of a shared electronic document. Content, as used herein, may refer to any information displayed in a section or portion of a shared electronic document or any other information that may be associated with a section or portion of a shared electronic document. For example, content may include data objects, alphanumerics, metadata, or any other data associated with a section or portion of a shared electronic document. Such interactions may involve viewing, editing, navigating, executing, or any other user task involving the content associated with the document. The sections or portions of the shared electronic document may include one or more data objects. Non-limiting examples of granular permissions may involve attributes or settings that authorize an entity or entities to view or edit a single character of text, a line of text, several lines of text, a table, a portion of a video, a portion of an audio file associated with the document, or any other selectable portion of the document. Permissions may be said to be configurable on a granular level because permissions may be configured for any selected segment of information (e.g., a block, as discussed in detail later) contained in a document, and not just a general permission setting for the entire document. Other non-limiting examples of granular permissions may involve attributes or settings that authorize an entity or entities to view or edit a sentence, paragraph, an image, or a chart associated with the document. In some embodiments, the granular permission settings may be reconfigured after a particular setting has been applied. For example, a single electronic document may contain a first portion of text with a first permission setting and a second portion of text with a second permission setting. The first permission setting may be configured to enable only the document author to view and access the first portion of text while the second permission setting may be configured to enable any user to view and access the second portion of text. As a result, the document author would be able to view and access both the first and second portions of text in the document, while a secondary user would only be able to view and access the second portion of text. The document author may then reconfigure the permission setting to access the first portion of text to authorize any secondary user to view that first portion of text at a later time. Similarly, the permission settings to access the second portion of text may be reconfigured to restrict access to certain users by predetermined users such as the document author.

Figure 59A:
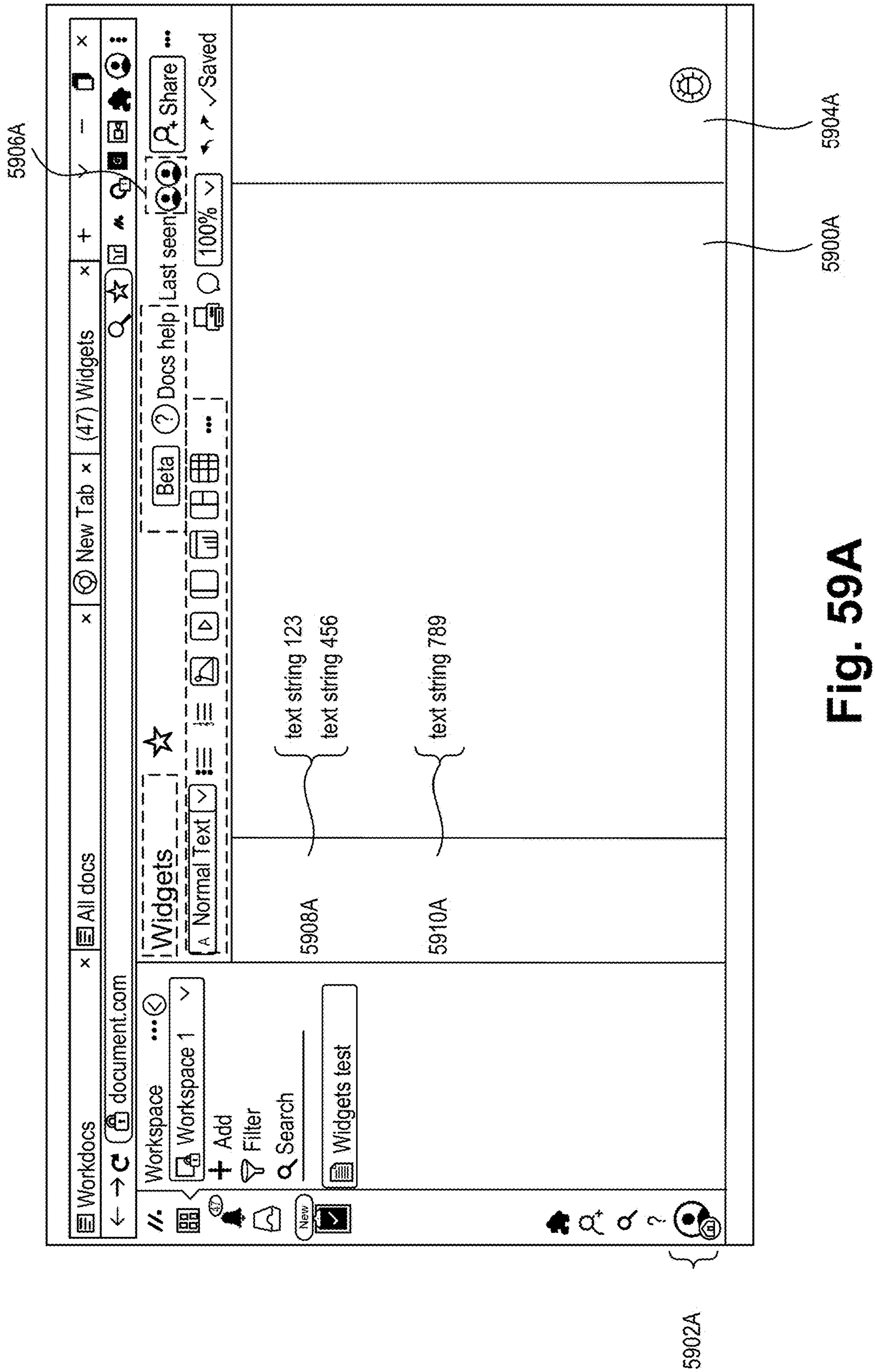
FIG. 59A illustrates an example of a shared electronic document with defined granular permissions, consistent with some embodiments of the present disclosure.
Figure 59B:
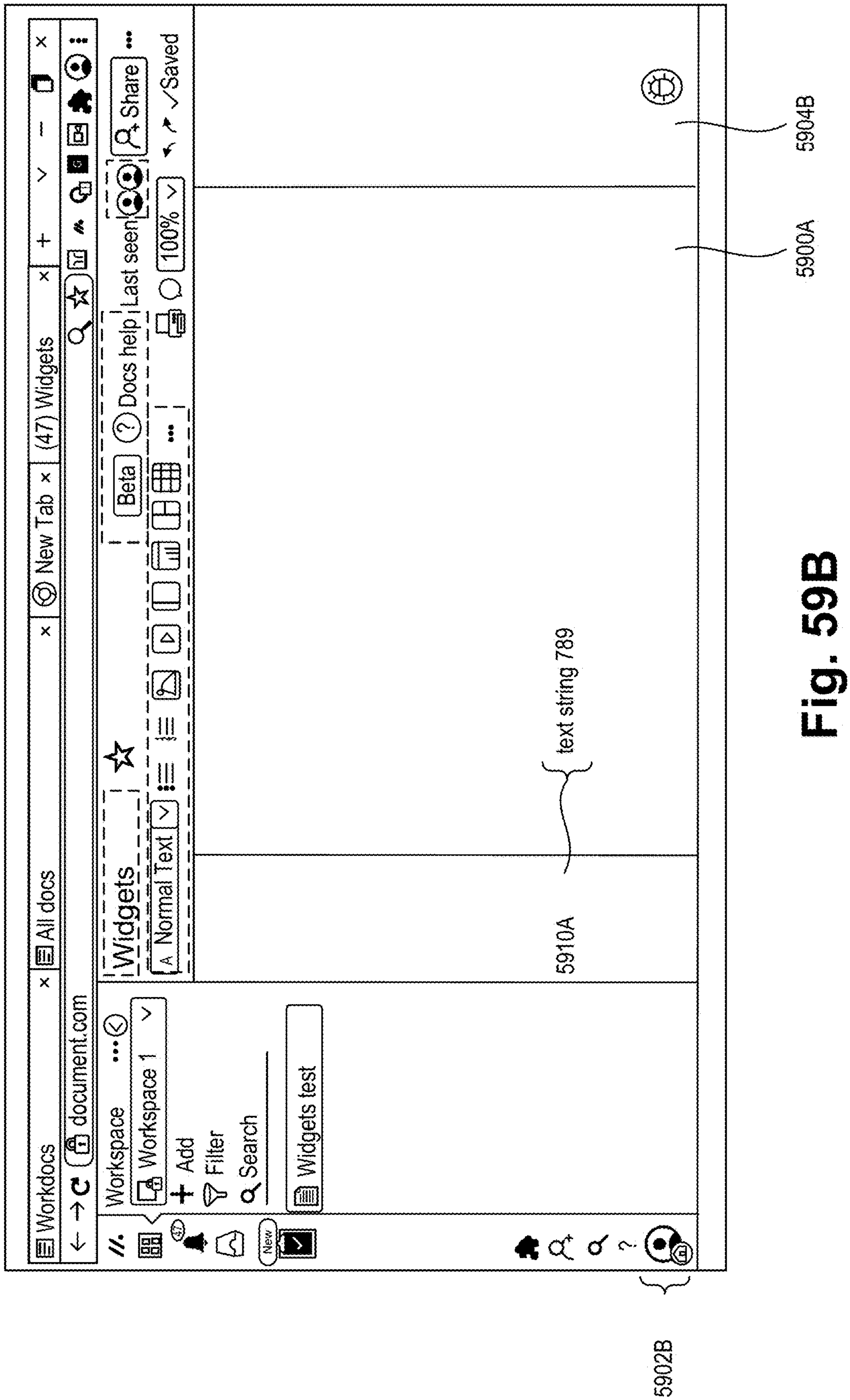
FIG. 59B illustrates another example of a shared electronic document with defined granular permissions, consistent with some embodiments of the present disclosure.

By way of example, FIGS. 59A and 59B illustrate examples of a shared electronic document with granular permissions. Referring to FIG. 59A, the shared electronic document 5900A may be a collaborative electronic word processing document. The document 5900A may include an indication of an entity 5902A accessing the document via an editing interface 5904A. The indicator 5906A may indicate to an accessing entity, such as entity 5902A, all of the entities accessing the shared electronic document at that time, or at any other time (e.g., the indicator may display a last accessed time stamp for a particular entity). The document 5900A may further include a first section 5908A (e.g., a first block) and a second section 5910A (e.g., a second block), each of which may include information such as a single string or multiple strings of text. The first section 5908A and the second section 5910A may, by way of example, have associated granular permissions authorizing entity 5902A to view, or view and edit, the content associated with both the first and second sections.

Referring now to FIG. 59B, the shared electronic document 5900A may be accessed by a second entity 5902B via an editing interface 5904B. The first section 5908A (shown in FIG. 59A) and the second section 5910A may, for example, have associated granular permissions that do not authorize entity 5902B to view or otherwise access the content associated with the first section 5908A, but do authorize entity 5902B to view, or view and edit, the content associated with the section 5910A. As a result, the second entity 5902B may be presented with an alternative display of electronic document 5900A with less information than in a display of the same electronic document 5900A to entity 5902A in FIG. 59A.

Some aspects of this disclosure may include enabling access to an electronic word processing document including blocks of text. An electronic word processing document may include any digital file that may provide for input, editing, formatting, display, and output of text (e.g., alphanumerics) and other content, such as graphics, widgets, objects, tables, links, animations, dynamically updated elements, or any other data object that may be used in conjunction with the digital file. An electronic word processing document may be a collaborative document or a non-collaborative document, as previously described with reference to shared electronic documents. Enabling access to the electronic work processing document, as used herein, may refer to one or more of providing authorization for retrieving information contained in the electronic work processing document that may be stored in a repository so that the information may be transmitted, manipulated, and/or displayed on a hardware device. The system may, for example, be configured to enable access to an electronic word processing document when an entity requests permission to retrieve information in the electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

As used herein, blocks of text may refer to any organizational unit of text or any other information that may be included in an electronic word processing document. For example, blocks of text may contain one or more of a single letter, number, or symbol; a combination of letters, numbers, or symbols; a sentence; multiple sentences; a paragraph; multiple paragraphs; or any other combination of characters grouped together. Blocks of text may include static or dynamic text and may be linked to other sources of data for dynamic updates. Blocks of text may be manually defined by an entity according to preference or may be automatically defined by the system. The entity may, for example, select any text and assign it as a single block of text. Alternatively, the system may, for example, define block of text as text separated by a carriage return, text separated by a space, text in a text box, text in a column, or text grouped together in any other manner. Blocks of text may further be configured to enable an entity to alter the order in which the blocks of text appear on a document. As used herein, an associated address of a block of text may refer to any identifier associated with a specific block of text that identifies a specific memory location, such as in a repository. In some exemplary embodiments, the associated address may be, for example, a fixed-length sequence of digits displayed and manipulated as unsigned integers that enables the system to store information associated with a block of text at a particular location designated by the associated address. In some embodiments, each address may include at least one of a block-associated tag, block-associated metadata, or a block-associated location. A block-associated tag, as used herein, may refer to a keyword, symbol, or term assigned to one or more blocks of text, or any other classification designation. For example, a block-associated tag may include words, images, or any other identifying marks. In some embodiments, a block-associated tag may be assigned manually by an entity or may be chosen from a controlled vocabulary. In other embodiments, a block-associated tag may be assigned by the system upon contextual determination of the information contained in a particular block. For example, if a block of text contains information regarding the name of a sports team, the system may automatically determine that the information in the block contains sports information and associate a block-associated tag with that block that indicates the block is related to sports information. Block-associated metadata, as used herein, may refer to any data providing information about one of more blocks of text. For example, block-associated metadata may include descriptive metadata, structural metadata, administrative metadata, reference metadata, statistical metadata, legal metadata, or a combination thereof. For example, a block may have associated metadata to indicate an author of the information in that block. As a result, that block may have block-associated metadata that is associated with that block to record an identification for that author. Block-associated location, as used herein, may refer to location based data associated with a particular block. The location based data may be based on data contained in the specific block itself (e.g., the block contains text indicating an address in Switzerland), or the block may store location information based on the location of the author of the block (e.g., a document author generates a block of text from their computing device based in Canada, resulting in a block-associated location of Canada with that block). Each address may include any combination of the block-associated tags, metadata, and locations such that when a computing device accessing information in a block at a particular address, the computing device may also access the associated tags, metadata, and location associated data with that block.

Figure 60:
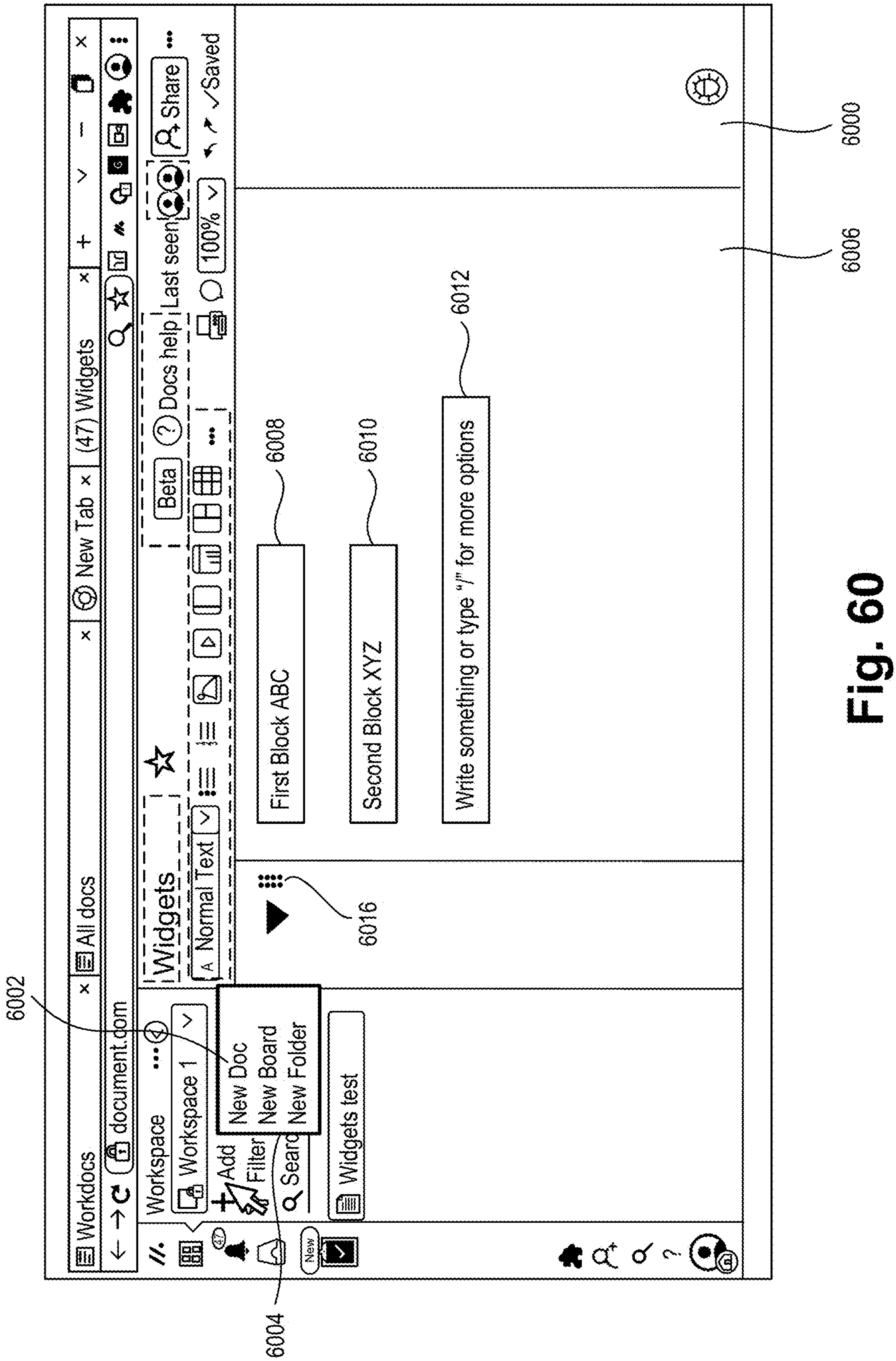
FIG. 60 illustrates an example of an electronic word processing document including blocks of text, consistent with some embodiments of the present disclosure.

By way of example, FIG. 60 illustrates an example of an electronic word processing document including blocks of text. The system may, for example, enable access to an electronic word processing document by generating the document in response to an entity selecting, via the editing interface 6000, the "New Doc" button 6002 in pop-out menu 6004. The generation of the electronic word processing document may be achieved by an application running on a computing device (e.g., the computing device 100 in FIG. 1 and FIG. 2). The application may generate the document for rendering on a display of a user device (e.g., the user device 220-1, 220-2, or **220-*m* in FIG. 2**).

As shown in FIG. 60, the electronic word processing document 6006 may include blocks of text 6008 to 6012. The blocks 6008 and 6010 include the text "First Block ABC" and "Second Block XYZ," respectively. The new or input block 6012 has no text added yet and prompts an entity to "Write something or type "/" for more options." A new block of text may be generated, for example, in response to an entity selecting an unoccupied area of the document 6006; entering a line break by, for example, clicking "enter" on a computer keyboard; or combining existing blocks of text 6008 to 6012. An entity, with proper permissions, may edit the arrangement order in which the blocks of text appear on the document 6006 by, for example, clicking and dragging the drag button 6016, which may appear near a selected block of text.

Some disclosed embodiments may further include accessing at least one data structure containing block-based permissions for each block of text, and wherein the permissions include at least one permission to view an associated block of text. Block-based permissions, as used herein, may refer to any attribute or setting associated with one or more blocks of text that defines how an entity or entities may interact with the content of the block or blocks of text. Such interactions may involve viewing, editing, navigating, executing, or any other user task involving the content of the block or blocks of text. The content of a block may include, for example, one or more of text, audio, graphics, icons, tables, charts, widgets, links, or any other item, whether static or dynamic, contained in each block of text, or any other information that may be associated with each block of text (e.g., metadata).

Consistent with the present disclosure, a data structure may include any repository storing a collection of data values and relationships among them. For example, the data structure may store information on one or more of a server, local memory, or any other repository suitable for storing any of the data that may be associated with block-based permissions or any other data items. The data structure may contain permissions for each block of text or alternatively, may contain permissions associated with a range of blocks of text. For example, the first three blocks of text may have the same permissions and the next three blocks of text may have the same permissions. In addition, the data structure may contain one or more of the associated address, the block-associated tag, the block-associated metadata, the block-associated location, or any other information related to the block-based permissions for each block of text. Accessing the data structure may include receiving a request to retrieve information contained in the data structure, which may store the information relative to permission settings for each block of text in an electronic document. The data structure may contain information relating to permission settings for one or more blocks associated with an electronic document such that the system may only need to perform a single look-up for the permissions that a user has for accessing any of the blocks of information associated with one or more electronic documents. For example, information in a data structure may be stored in the form of a storage medium, such as a local storage medium or a remote storage medium, as discussed previously above. A local storage medium may be maintained, for example, on a local computing device, on a local network, or on a resource such as a server within or connected to a local network. A remote storage medium may be maintained in the cloud, or at any other location other than a local network. In some embodiments, accessing the data structure may include retrieving the data or information from a web browser cache. Additionally or alternatively, accessing the information may include accessing a live data stream of the data from a remote source. In some embodiments, accessing the data structure may include logging into an account having a permission to access information located in an electronic word processing document. For example, accessing the electronic word processing document in a data structure may be achieved by interacting with an indication associated with the electronic word processing document, such as an icon or file name, which may cause the system to retrieve (e.g., from a storage medium) a particular electronic word processing document associated with the indication.

Permission to view, as used herein, may refer to providing authority to one or more entities to retrieve or inspect the information in an associated block of text. A block of text may have one or more permission settings to view the information contained in the block according to different types of users, or specific users. In exemplary embodiments, the permission to view information may be a default permission for one or more blocks of text. A default permission may refer to a permission or permissions automatically assigned to one or more blocks of text by the system when it enables access to the document, such as in response to an entity requesting generation of a new document, as previously described. For example, a default permission may only allow document authors permission to view one or more blocks of text. In other exemplary embodiments, one or more entities, such as document authors or other entities, may define a block-based permission to provide one or more entities permission to view one or more blocks of text. For example, the system may receive, from the document author, a selection of one or more blocks and an instruction to associate or assign at least one permission with the selected blocks authorizing one or more entities to view the blocks of text. Each block may have multiple permission settings enabling different entities to access different amounts of information in each block.

Figure 61:
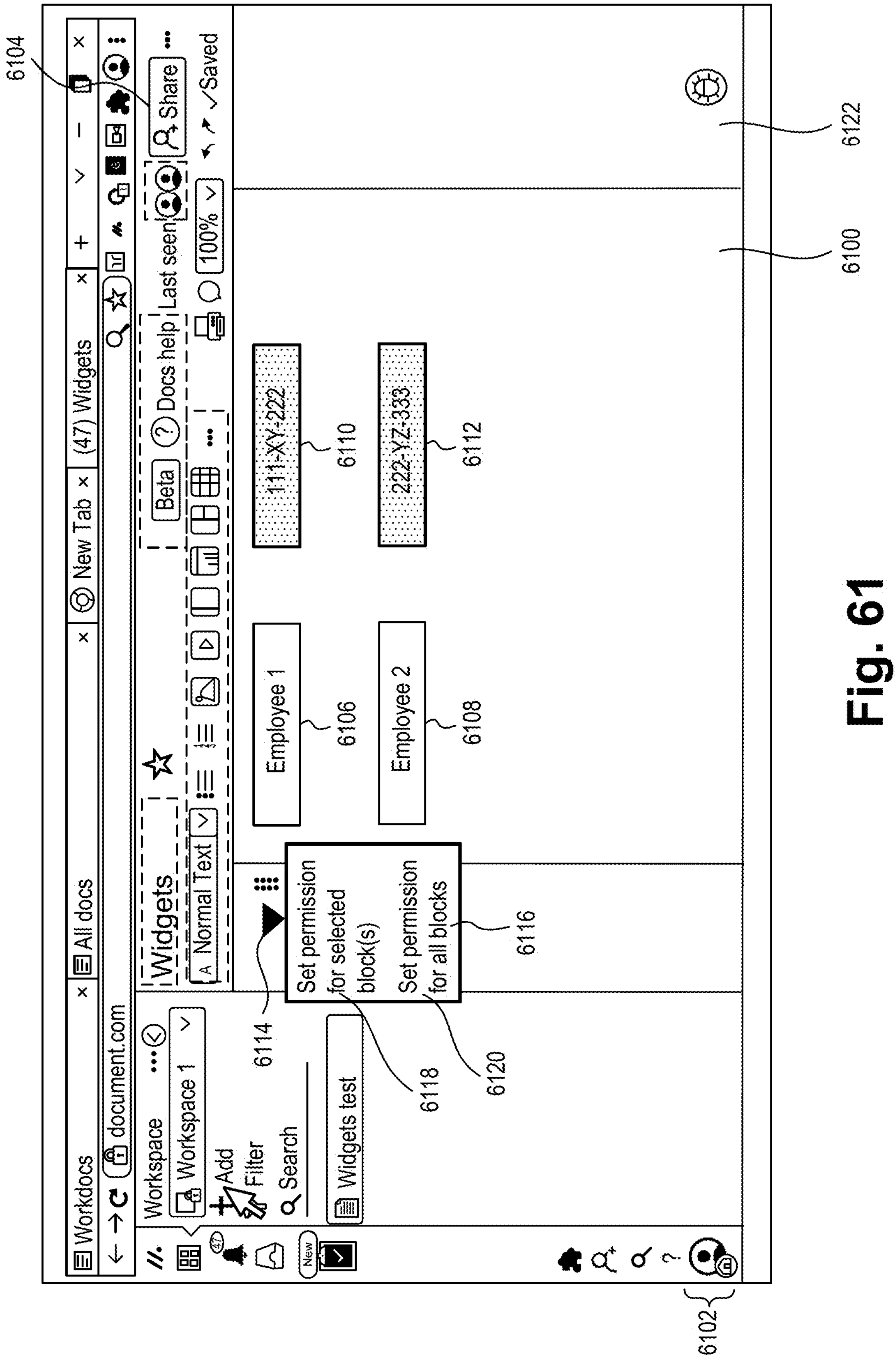
FIG. 61 illustrates one example of an electronic word processing document including blocks of text having associated block-based permissions, consistent with some embodiments of the present disclosure.

FIG. 61 illustrates one example of an electronic word processing document including blocks of text having associated block-based permissions. The electronic word processing document 6100 may be a non-collaborative document, such that entity 6102 may be the only entity that may edit the document contents. Entity 6102 may, however, share the non-collaborative document 6100 with other entities (e.g., end-users or an audience) view, edit, or otherwise access the document. For example, entity 6102 may select the "share" button 6104 and send an email or link to other entities inviting them to view, edit, or access the document.

Referring to FIG. 61, the electronic word processing document 6100 may further include blocks of text 6106 to 6112. Each block of text 6106 to 6112 may or may not have default block-based permissions. In some embodiments, default block-based permissions may allow any entity to whom the document 6100 is shared to view blocks of text 6106 to 6112. In other embodiments, default block-based permissions may, for example, prohibit or limit any entity to whom the document 6100 is shared to view blocks of text 6106 to 6112.

Referring again to FIG. 61, entity 6102 may select each block of text (or select multiple blocks at once) and define or alter the default block-based permissions associated with each block of text. For example, blocks of text 6110 and 6112 may include the social security numbers "111-XY-222" and "222-YZ-333" respectively. Entity 6102 may set block-based permissions associated with these blocks to allow only team members in a human resources department to view these blocks, whereas all team members may have permission to view blocks 6106 and 6108. The block-based permissions for each block of text 6106 to 6112 may be contained in at least one data structure (e.g., in storage 130, repository 230-1, repository **230-*n* of FIGS. 1 and 2) associated with the electronic word processing document 6100. Entity 6102 may subsequently share the electronic word processing document with several team members, some of which may be team members in the human resources department. If a team member is not in the human resources department, blocks of text 6110 and 6112 may not be rendered on the display (e.g., omitted from display or redacted) associated with the team member. However, if the team member is in the human resources department, each block of text, including blocks 6110 and 6112** may be rendered on the display associated with the team member.

In some embodiments, at least one data structure may be configured to maintain identities of document authors, and the document authors may be enabled to define block permissions. As used herein, document authors may refer to any originator or owner of an electronic word processing document. If the document is a non-collaborative document, the document author may refer to a single entity who generates, drafts, writes, produces, revises, or edits the document in any other manner. Alternatively, if the document is a collaborative document, document authors may refer to the entity or entities responsible for initially creating the document or the entity or entities who maintain ownership of the document. As used herein, maintain identities of document authors may refer to storing information related with the document authors in a data structure associated with the document. The stored information may include any unique identifier capable of distinguishing among document authors and other entities with access to the document. For example, the unique identifier may be an author token, a session ID, a username, an IP address associated with a document authors device, or any other information capable of distinguishing among document authors and other entities with access to the document. Enabled to define block permissions, as used herein, may refer to authorizing document authors to set, describe, establish, designate, alter, or otherwise give meaning to block-based permissions associated with each block of text. Defining block permissions may involve, for example, selecting one or more blocks of text and then selecting among various permissions or describing the permission or permissions to apply to one or more entities. In some embodiments, the at least one processor may perform a lookup in the data structure containing the identities of document authors to determine whether an entity seeking to define a block-based permission is a document author, and based on the lookup, either allow or prohibit the entity to define the block-based permission.

For example, referring again to the electronic word processing document 6100 illustrated in FIG. 61, the entity 6102 accessing the document 6100 via an editing interface 6122 may or may not be a document author. The at least one processor may perform a lookup in a data structure (e.g., in storage 130, repository 230-1, repository **230-*n* of FIGS. 1 and 2) containing unique identifiers for all document authors of the electronic word processing document 6100. If the at least one processor determines that the entity 6102 accessing the document via the editing interface 6122 is not a document author, the drop-down menu 6116 may display disabled (i.e., greyed out) menu items "Set Permission(s) for Selected Block(s)" 6118 and "Set Permissions for All Blocks" 6120 or may omit both menu items from the drop-down menu 6116. Alternatively, if the at least one processor determines that the entity 6102 accessing the document via the editing interface 6122 is a document author, the editing interface 6122 may display an interface component enabling the entity 6102 to define block permissions. For example, the entity 6102 may select the menu arrow 6114 to open drop-down menu 6116, which may contain the menu items "Set Permission(s) for Selected Block(s)" 6118 and "Set Permissions for All Blocks" 6120. Selecting block 6106, block 6108, and menu item 6118 may, for example, open a new interface, enabling the document author to configure the permissions associated with blocks 6106 and 6108** for one or more entities.

Figure 62:
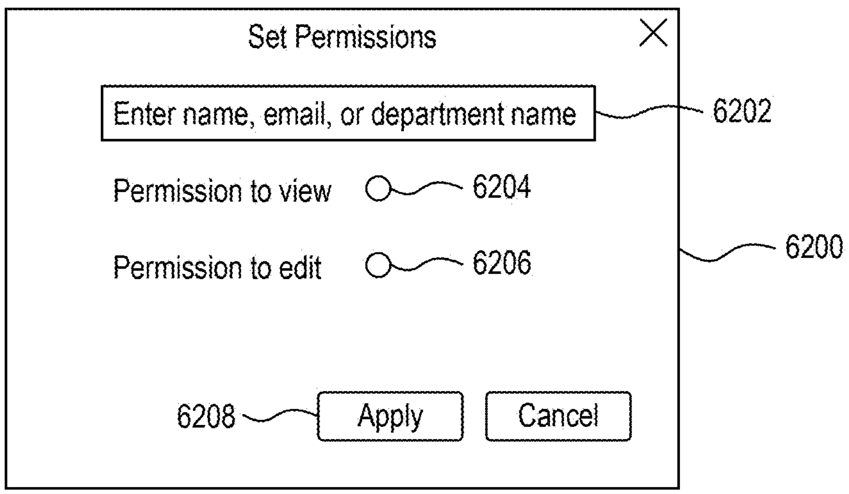
FIG. 62 illustrates one example of an interface for defining block-based permissions for an electronic word processing document, consistent with some embodiments of the present disclosure.

By way of example, FIG. 62 illustrates one example of an interface 6200 for defining block-based permissions for block 6106 in FIG. 61. The interface 6200 may include an input box 6202 in which entity 6102 (from FIG. 61) may input, for example, a name, email, or department name. For example, entity 6102 may input "Entity XYZ" into input box 6202. In response to the system receiving a valid entry, the interface 6200 may display radio buttons 6204 and 6206, corresponding to a permission to view and a permission to edit, respectively. Entity 6102 may select or deselect either radio button 6204 and 6206 (in this exemplary embodiment, the entity cannot select both because permission to edit implicitly includes permission to view) and select an apply button 6208 to activate the defined permission associated with blocks 6106 and 6108 (in FIG. 61) for "Entity XYZ."

In some embodiments, an electronic word processing document may be a collaborative document and at least one processor may be configured to receive an added block from an editing entity and to enable the editing entity to set block permissions for an added block. An editing entity, as used herein, may refer to any account or computing device associated with one or more users with permission to select, revise, organize, arrange, rearrange, change, add, or otherwise modify the content of one or more blocks. An entity may refer to an individual, a device, a team, an organization, a group, a department, a division, a subsidiary, a company, a contractor, an agent or representative, or any other thing with independent and distinct existence. An editing entity may include one or more document authors of a collaborative document or one or more entities with permission to simultaneously edit one or more blocks of a collaborative document. An added block, as used herein, may refer to any addition of information in a segment or block newly generated by an editing entity. In some embodiments, an editing entity may insert an added block by selecting an unoccupied area of the collaborative document or by selecting a user interface item to input a new block (e.g., new block icon). In other exemplary embodiments, the editing entity may insert an added block by generating a line break by, for example, clicking "enter" on a computer keyboard coupled to the entity's user device; by pasting copied content from other documents in the collaborative document; or by dragging and dropping content from other documents into the collaborative document. permitting the editing entity to set block permissions for the added block, as used herein, may refer to authorizing any editing entity beyond the document author to configure, assign, describe, establish, designate, alter, or otherwise give meaning to the block permissions associated with the added block in an electronic document owned by the document author. Setting block permissions for the added block may involve selecting the added block of text and then selecting among various permissions or describing the permission or permissions to apply to one or more entities. In some embodiments, the at least one processor may be configured to permit the editing entity to set a permission blocking an author of the document from viewing the added block. Blocking an author of the document from viewing the added block, as used herein, may refer to prohibiting or limiting a document author from examining, observing, reading, looking, inspecting, or otherwise accessing any information contained in a block added by an editing entity. For example, a document author may be collaborating with a second entity on an electronic document (e.g., a collaborating entity who is not an author of the electronic document). While a document author may typically be able to access all information inserted by the second entity to the electronic document, the second entity may have the option to prevent or limit the document author's ability to view information in a block added by the second entity for any number of reasons (e.g., the second entity is still inserting a draft of the information in the block and may not wish to make it available to all collaborators on the document).

Figure 63:
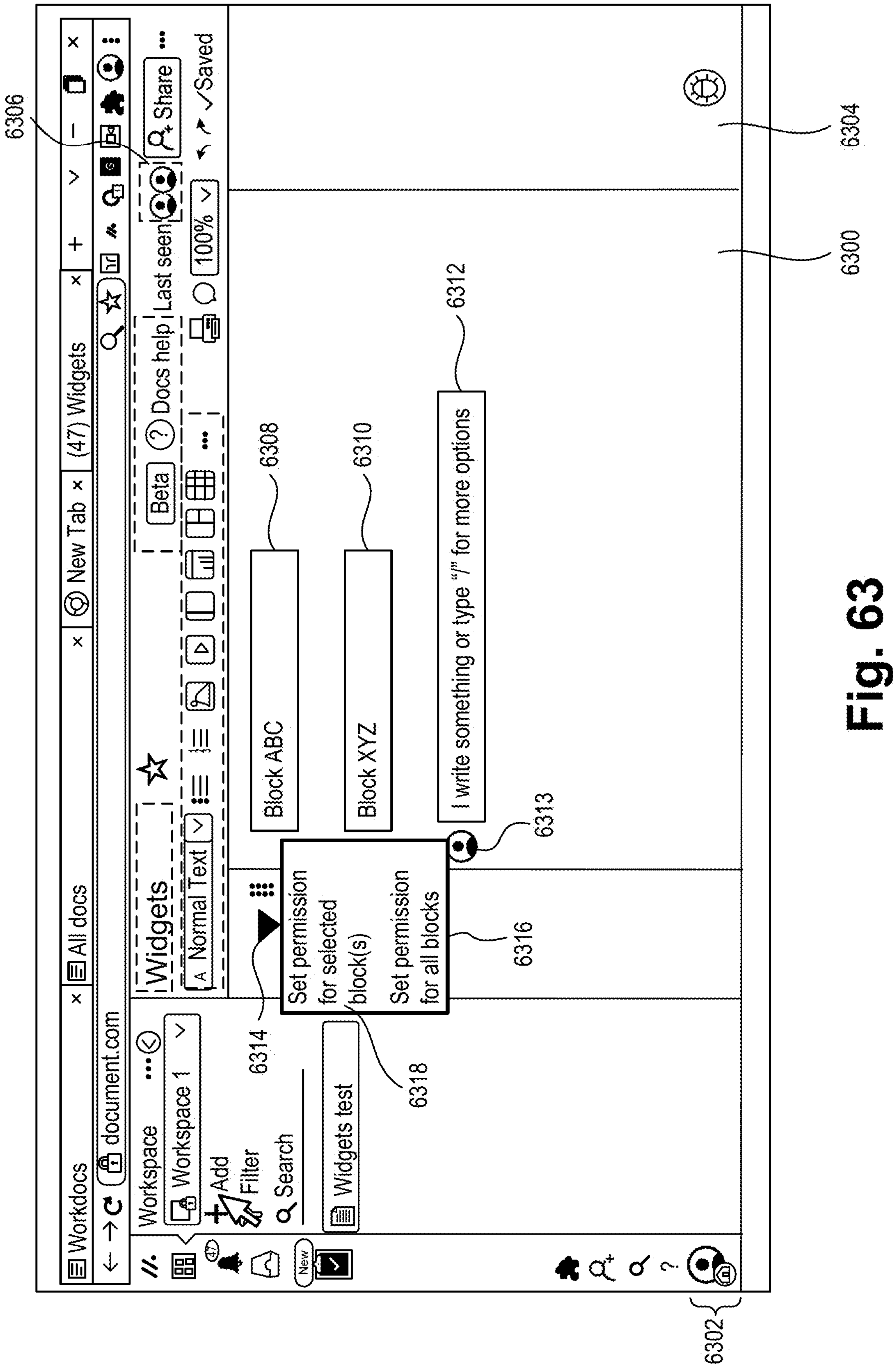
FIG. 63 illustrates one example of an electronic word processing document containing blocks and configured as a collaborative document, consistent with some embodiments of the present disclosure.

By way of example, FIG. 63 illustrates an exemplary electronic word processing document that may be configured as a collaborative document containing blocks. The collaborative document 6300 may include an indication of an editing entity 6302 accessing the document via an editing interface 6304. The editing entity 6302 may or may not be a document author. The indicator 6306 may indicate to the entity 6302 that other entities are currently accessing the document, some of which may be document authors or other entities that have permission to simultaneously edit the blocks, create additional blocks, or both. The collaborative document 6300 may further include blocks 6308 to 6312. Blocks 6308 and 6310 may be previously entered blocks. Editing entity 6302 may have recently created added block 6312 by, for example, selecting the area of the document now occupied by added block 6312. The editing entity 6312 may enter any organizational unit of information, such as a symbol, letter, word, sentence, paragraph, page, graphic, or any combination thereof, in the added block 6312. As editing entity 6312 inputs or alters the content of added block 6312, the system may render an indicator 6313 (e.g., a graphical indicator, alphanumeric text, or a combination thereof) next to the block to indicate to other entities currently accessing the collaborative document 6300 that editing entity 6302 is responsible for inputting or altering the content. The editing entity 6312 may select the added block 6312 and select the menu arrow 6314 to open a drop-down menu 6316, which may contain menu item "Set Permission(s) for Selected Block(s)" 6318. Selecting menu item 6318 may, for example, open an interface enabling the editing entity to configure the permissions for one or more entities, which may or may not include document authors. For example, the interface may be the interface 6200 for defining block-based permissions in FIG. 62, as discussed previously above.

In some embodiments, an electronic word processing document may include graphical objects, and block-based permissions may include restrictions on viewing the graphical objects. As used herein, graphical objects may refer to a rendering of one more visual representations of information that may or may not include alphanumerics. For example, graphical objects may include charts, graphs, shapes, images, photographs, pictures, symbols, icons, or any other representation that may be displayed, or a combination thereof. Graphical objects may be two-dimensional or three-dimensional and may be static or dynamic. Restrictions on viewing, as used herein, may refer to prohibiting or limiting one or more entities from examining, observing, reading, looking, inspecting, or accessing graphical objects contained in one or more blocks. In some exemplary embodiments, the restrictions on viewing may be a default permission for one or more blocks containing graphical objects. In other exemplary embodiments, one or more entities may define a block-based permission to restrict one or more entities from viewing graphical objects in one or more blocks of text.

Figure 64:
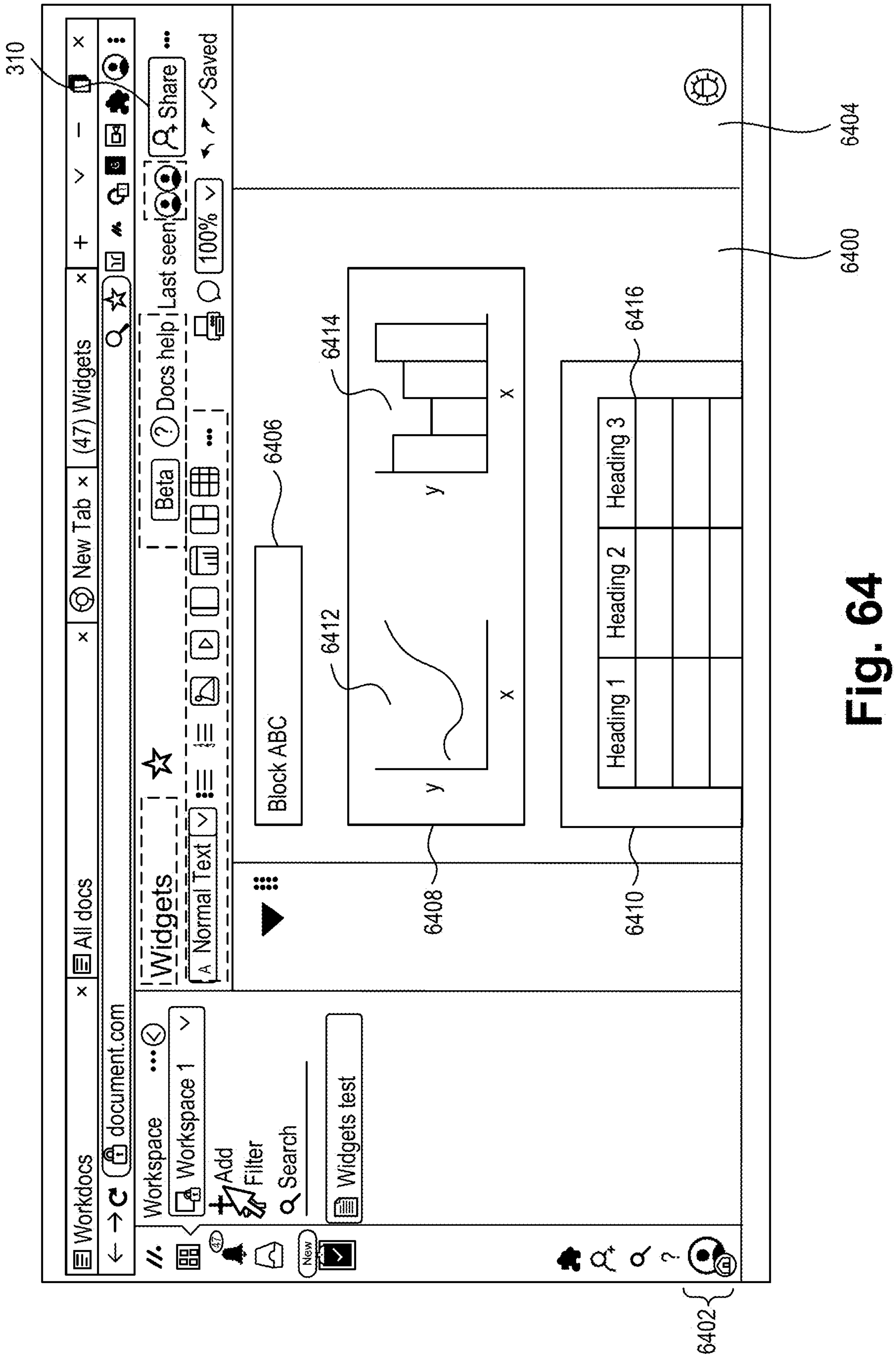
FIG. 64 illustrates one example of an electronic word processing document including graphical objects, consistent with some embodiments of the present disclosure.

By way of example, FIG. 64 illustrates an electronic word processing document including graphical objects. The electronic word processing document 6400 may include an indication of an entity 6402 accessing the document via an editing interface 6404. Entity 6402 may or may not be a document author of the document 6400. The document 6400 may include blocks 6406 to 6410. Block 6406 may include text, such as "Block ABC." Blocks 6408 and 6410 may include one or more graphical objects. For example, block 6408 may include line graph 6412 and bar chart 6414, and block 6410 may include table 6416. The block-based permissions for blocks 6406 to 6410 may restrict specific entities from viewing one or more blocks. For example, the permissions may restrict all entities other than the document author, entity 6402, from viewing block 6410, which includes the table 6416. The block-based permissions may apply to entities based on the type of block (e.g., restrictions may be applied only to blocks containing only graphical objects or only text objects), or based on any particular selection of blocks.

Aspects of the disclosure may include receiving from an entity a request to access an electronic word processing document. As used herein, an entity may refer to an individual, a device, a team, an organization, a group, a department, a division, a subsidiary, a company, a contractor, an agent or representative, or any other thing with independent and distinct existence, as discussed above. A request to access, as used herein, may refer to a signal containing instructions to a gain authorization or entry to download, upload, copy, extract, update, edit, view, or otherwise receive or manipulate data or information associated with the electronic word processing document. The request to access may be in one or more digital, electronic, or photonic signals that may be generated in the form of a voice command, gesture, touch, tap, swipe, cursor selection, cursor scrolling, or a combination thereof from a computing device associated with an entity (e.g., a document author or a collaborating editor). For example, the entity may request to access the electronic word processing document by attempting to open an instance of the document via a web application. Alternatively, the entity may request to access the electronic word processing document by entering authentication or credential information, such as a username and password. In another exemplary embodiment, the entity may request to access the word processing document by accessing a link associated with the document.

For example, referring again to the electronic word processing document illustrated in FIG. 61, the entity 6102 accessing the document 6100 via an editing interface 6122 may share the document 6100 with a second entity. For example, entity 6102 may select the "Share" button 6104, which may cause a new interface to be displayed enabling entity 6102 to enter the second entity's email address to which an email with a link to access the document 6100 will be delivered to the second entity. The system may receive a request to access the document 6100 when, for example, the second entity selects the link.

Some disclosed embodiments may include performing a lookup in at least one data structure to determine that an entity lacks permission to view at least one specific block within an electronic word processing document. Performing a lookup, as used herein, may refer to an action, process, or instance of retrieving or searching in the at least on data structure containing block-based permissions. In some embodiments, the at least one processor may automatically perform a lookup in a remote repository in response to receiving a request from an entity to access an electronic word processing document. For example, performing a lookup may involve retrieving an address associated with a specific block in an electronic word processing document, where the address may include an access point for a data structure containing data and information relating to the specific block and the electronic word processing document. The system may then compare an entity identification (e.g., an account name, an IP address, or any other identifier) to a list of pre-authorized entities in the data structure to determine whether there is a match. The system may perform the lookup and determine a match between an entity identification with one of the pre-authorized entities in the data structure and determine that the entity has partial or full authorization to retrieve, view, and/or access the information associated with the specific block. In other embodiments, the data structure may contain a list of unauthorized entities such that when the system performs a lookup and determines that an accessing entity matches one of the unauthorized entities in the list, the system may reduce or completely restrict access to the information associated with the specific block. An entity lacking permission to view, as used herein, may refer to an entity without authority to retrieve or inspect the information in an associated block of text. For example, the at least one data structure may contain a list of usernames corresponding to entities, including the document author or authors, that may be authorized to view information in a specific block. The system may perform a lookup in the at least one data structure to determine whether the username associated with entity accessing the electronic word processing document is included in the list of usernames. If the system determines, based on the lookup, that that the username associated with the accessing entity is not included in the list of authorized entities, the system may determine that the accessing entity lacks authority to view the specific block. In some embodiments, an absence of a recorded permission in the at least one data structure for a particular block may constitute an unrestricted permission for the particular block. Absence of a recorded permission, as used herein, may refer to the nonexistence or lack of a permission setting in the at least one data structure for a particular block. A recorded permission for a particular block may be absent for one or more entities. For example, the at least one data structure may have a recorded permission for one entity to view or edit a particular block of text but lack a recorded permission associated with the particular block for other entities. Alternatively, the at least one data structure may, for example, lack a recorded permission for all entities. Unrestricted permission for the particular block, as used herein, may refer to authorization to interact with and access the content of the block in any manner without any limitations. For example, unrestricted permission for the particular block may allow any entity accessing a document to view, edit, navigate, execute, or perform any other task involving the content of the particular block.

Some disclosed embodiments may further include causing to be rendered on a display associated with an entity, an electronic word processing document with the at least one specific block omitted from the display. Causing to be rendered on a display associated with the entity, as used herein, may include providing the electronic word processing document to the entity by outputting one or more signals configured to result in the presentation of the electronic word processing document on a screen, other surface, through a projection, or in a virtual space associated with the entity. This may occur, for example, on one or more of a touchscreen, a monitor, AR or VR display, or any other means previously discussed and discussed further below. The electronic word processing document may be presented, for example, via a display screen associated with the entity's computing device, such as a PC, laptop, tablet, projector, cell phone, or personal wearable device. The electronic word processing document may also be presented virtually through AR or VR glasses, or through a holographic display. Other mechanisms of presenting may also be used to enable the entity to visually comprehend the presented information. The electronic word processing document may appear as a new window, as a pop-up, or in other manner for presenting the document on a display associated with the entity. Omitting from the display, as used herein, may refer to leaving out, excluding, redacting, obscuring, or reducing information in at least one block from the display of the electronic word processing document. For example, the at least one processor may omit a block from the display if the at least one data structure contains a block-based permission not authorizing the entity to view one or more blocks of the electronic word processing document. In some embodiments, one or more display signals for the omitted block will not be transmitted to the display associated with the user. In other instances, the one or more display signals may be altered to redact or blur the omitted block.

Figure 65A:
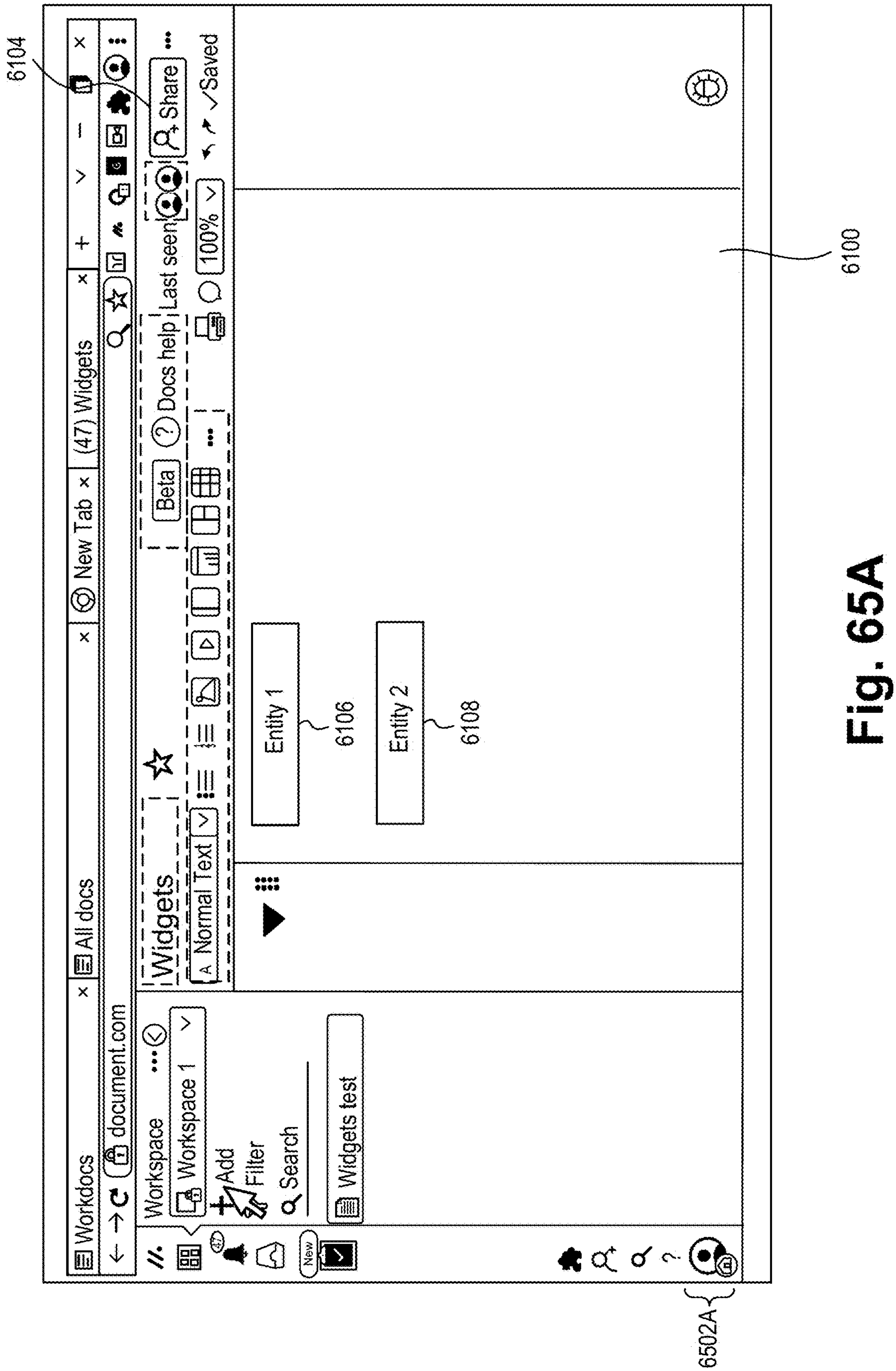
FIG. 65A illustrates an example of an electronic word processing document with one or more blocks of text omitted from the display associated with an entity, consistent with some embodiments of the present disclosure.
Figure 65B:
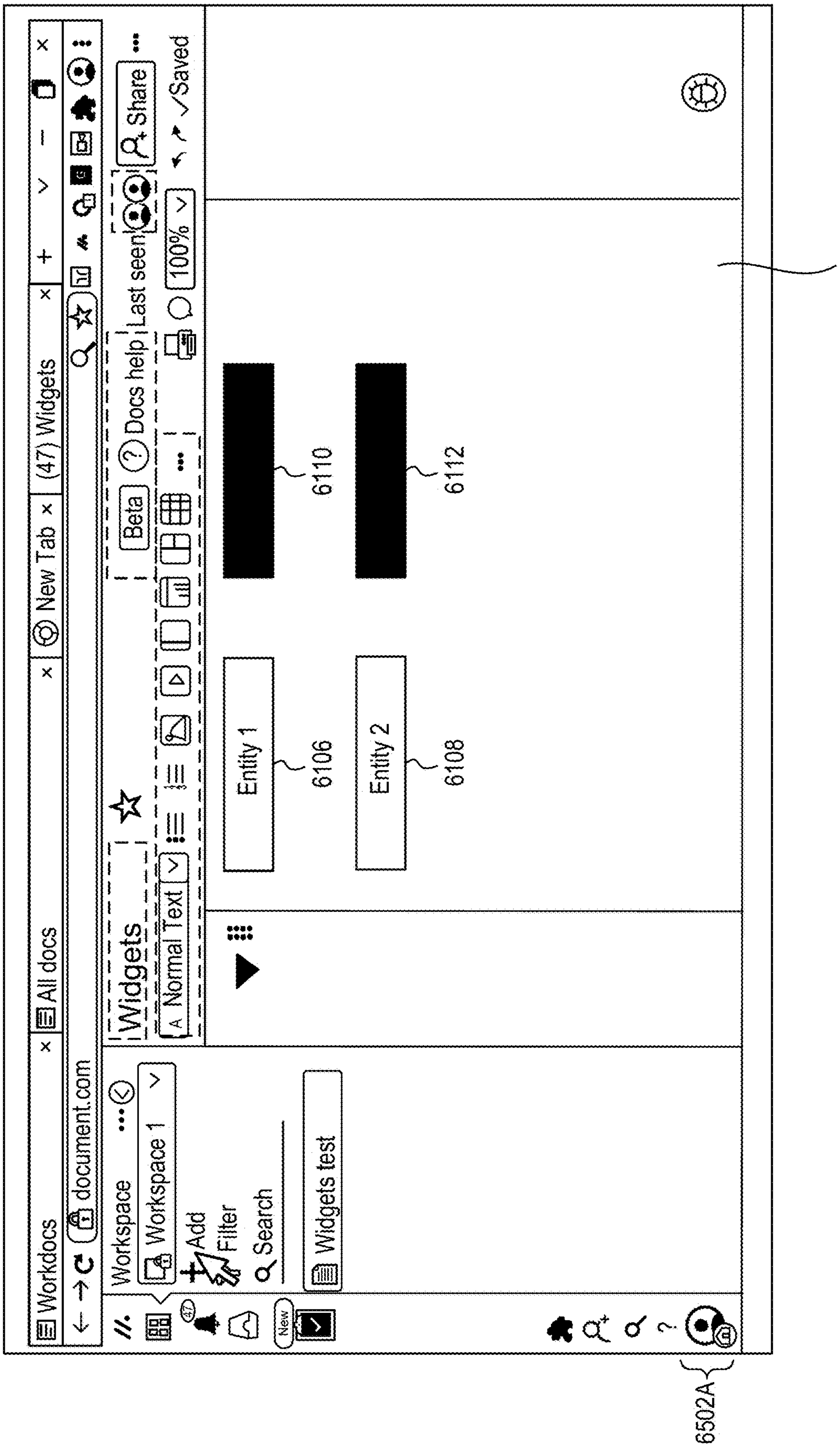
FIG. 65B illustrates another example of an electronic word processing document with one or more blocks of text omitted from the display associated with an entity, consistent with some embodiments of the present disclosure.
Figure 65C:
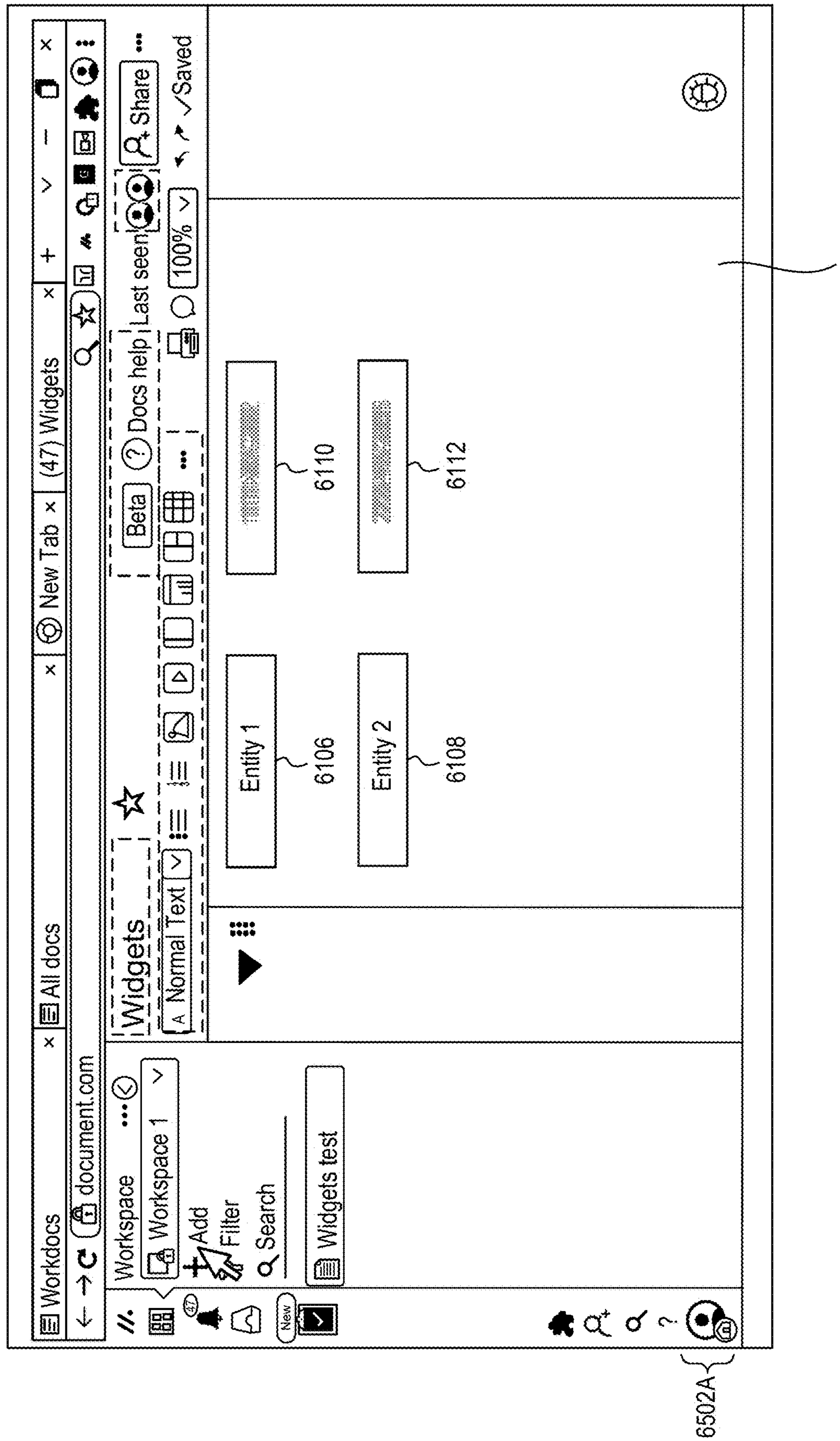
FIG. 65C illustrates another example of an electronic word processing document with one or more blocks of text omitted from the display associated with an entity, consistent with some embodiments of the present disclosure.

For example, referring again to the electronic word processing document illustrated in FIG. 61, the entity 6102 may define block-based permissions for blocks of text 6110 and 6112. The block-based permissions may, for example, allow only team members in a human resources department to view blocks 6110 and 6112. Entity 6102 may subsequently share the electronic word processing document with several team members, which may or may not be in the human resources department. By way of example, FIGS. 65A to 65C illustrate examples of the electronic word processing document 6100 illustrated in FIG. 61 with one or more blocks of text omitted from the display associated with team member 6502A not in the human resources department. Referring to FIG. 65A, blocks 6110 and 6112 (shown in FIG. 61) may be absent from the display associated with entity 6502A. Alternatively, as shown in FIG. 65B, the blocks 6110 and 6112 may be redacted from the display associated with entity 6502A. In another example, as shown in FIG. 65C, the blocks 6110 and 6112 may be blurred from the display associated with entity 6502A.

In some embodiments, a data structure may include separate permissions for viewing and editing. Separate permissions, as used herein, may refer to distinct attributes or settings that define how an entity or entities may interact with the content of the block or blocks of text. Such interactions may involve viewing and editing content in an electronic document. Permissions for viewing may refer to any attribute or setting associated with a block of text that authorizes one or more entities to examine, observe, read, look, inspect, or otherwise see the content of the associated block of text. Permissions for editing, as used herein, may refer to any attribute or setting associated with a block of text that authorizes one or more entities to select, revise, organize, arrange, rearrange, change, add, or otherwise modify in any way the contents of the associated block. In some exemplary embodiments, the separate permissions may be associated with a single block of text. For example, a block of text may have associated permissions authorizing a first entity to view and a second entity to edit. In other exemplary embodiments, the separate permissions may be associated with different blocks of text. For example, a first block of text may have an associated permission authorizing an entity to view, and a second block of text may have an associated permission authorizing the entity to edit. In some embodiments, the at least one processor may be configured to perform a look up of viewing and editing permissions associated with a particular collaborative user who, for a particular block, has viewing permissions and lacks editing permissions. Performing a lookup of viewing and editing permissions may be carried out consistent with the disclosure above to determine viewing and editing permissions for a particular user. A collaborative user, as used herein, may refer to any entity able to access the electronic word processing document. For example, a collaborative user may be an entity with permission to view one or more blocks, edit one or more blocks, or a combination thereof. Consistent with embodiments discussed above, the collaborative user may be associated with separate permissions for viewing and editing a particular block such that the collaborative user may have permission to view information associated with the particular block, but lack a permission to edit the information associated with the same particular block. Some aspects of the disclosure may involve the at least one processor configured to render the particular block on a display associated with the collaborative user in a manner permitting viewing of the particular block while preventing editing of the particular block. Rendering a particular block on a display associated with a collaborative user, as used herein, may include providing the particular block to the collaborative user by outputting one or more signals configured to result in the presentation of the particular block on a screen, other surface, through a projection, or in a virtual space. This may occur, for example, on one or more of a touchscreen, a monitor, AR or VR display, or any other means previously discussed. The particular block may appear as a new window, as a pop-up, in an existing document, or in other manner for presenting the specific block on a display associated with the collaborative user. Rendering the particular block in a manner permitting viewing while preventing editing may be accomplished in any manner such that the collaborative user may examine, observe, read, look, or inspect information in a particular block, but may not modify, add, or rearrange the contents of the particular block. In some exemplary embodiments, the particular block may have an associated read-only attribute permitting the collaborative user to view, as well as tab onto, highlight, and copy the contents of the particular block. In other exemplary embodiments, the particular block may have an associated disabled attribute, permitting the collaborative user to view but not edit, click, or otherwise use the contents of the particular block. A particular block with a disabled attribute may, for example, be rendered grey to indicate that a collaborative user has limited access to that particular block. This indication may be applied to the content contained in the particular block, to the background or border of the block, or a combination thereof.

Figure 66:
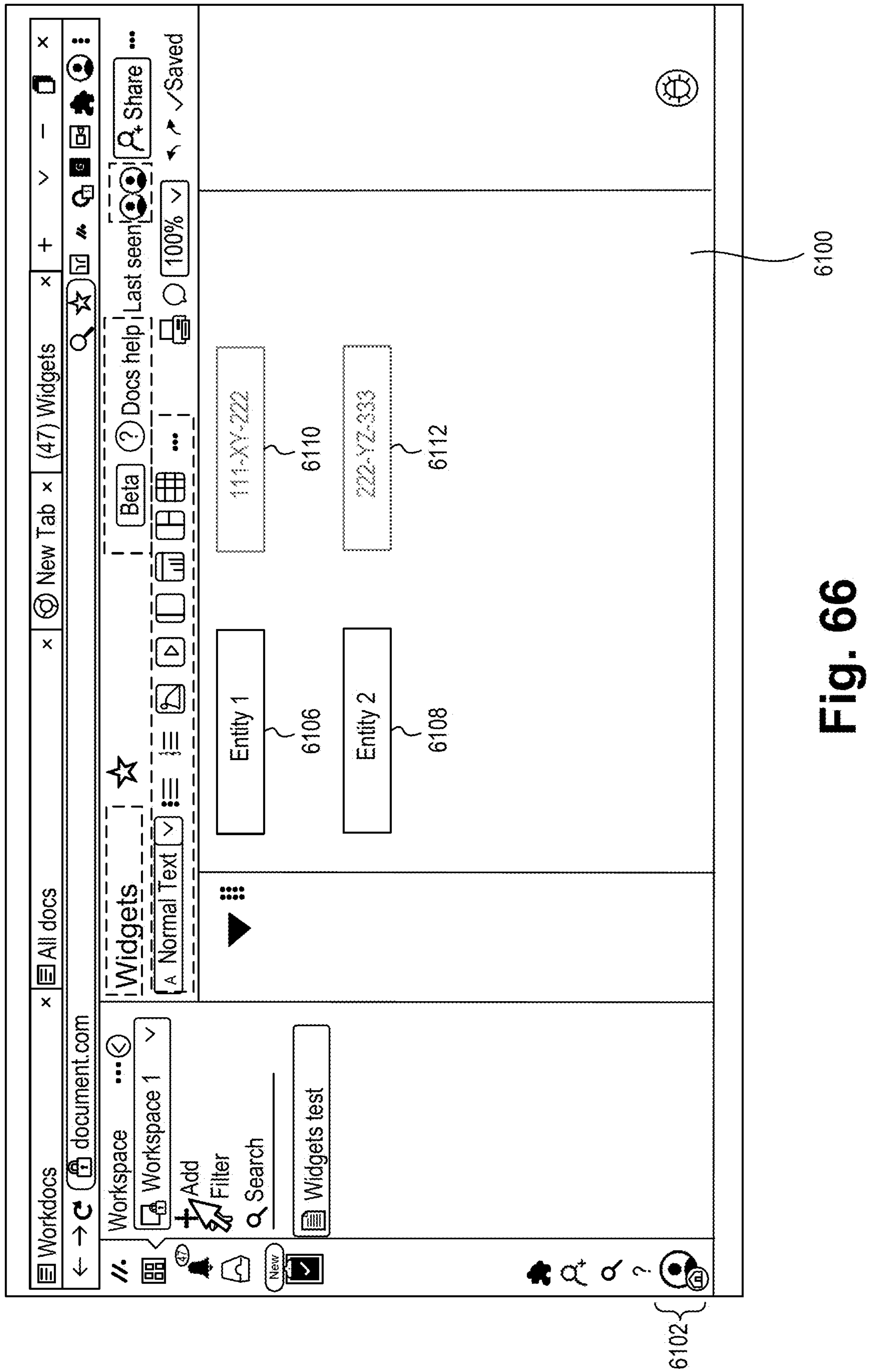
FIG. 66 illustrates one example of an electronic word processing document containing blocks having associated block-based permissions permitting viewing but preventing editing, consistent with some embodiments of the present disclosure.

For example, referring again to the electronic word processing document 6100 illustrated in FIG. 61, the entity or document author 6102 may define block-based permissions for blocks of text 6110 and 6112 that allow only team members in a human resources department to view these blocks 6110 and 6112. The document author 6102 may further define these permissions to prevent even team members in the human resources department from editing the blocks of text 6110 and 6112. If document author 6102 shares the document 6100 with a team member in the human resources department and the team member accesses the document 6100, the blocks of text 6110 and 6112 may be disabled and rendered grey as shown, for example, in FIG. 66, such that the team member may neither edit nor select the text in the blocks 6110 and 6112.

Figure 67:
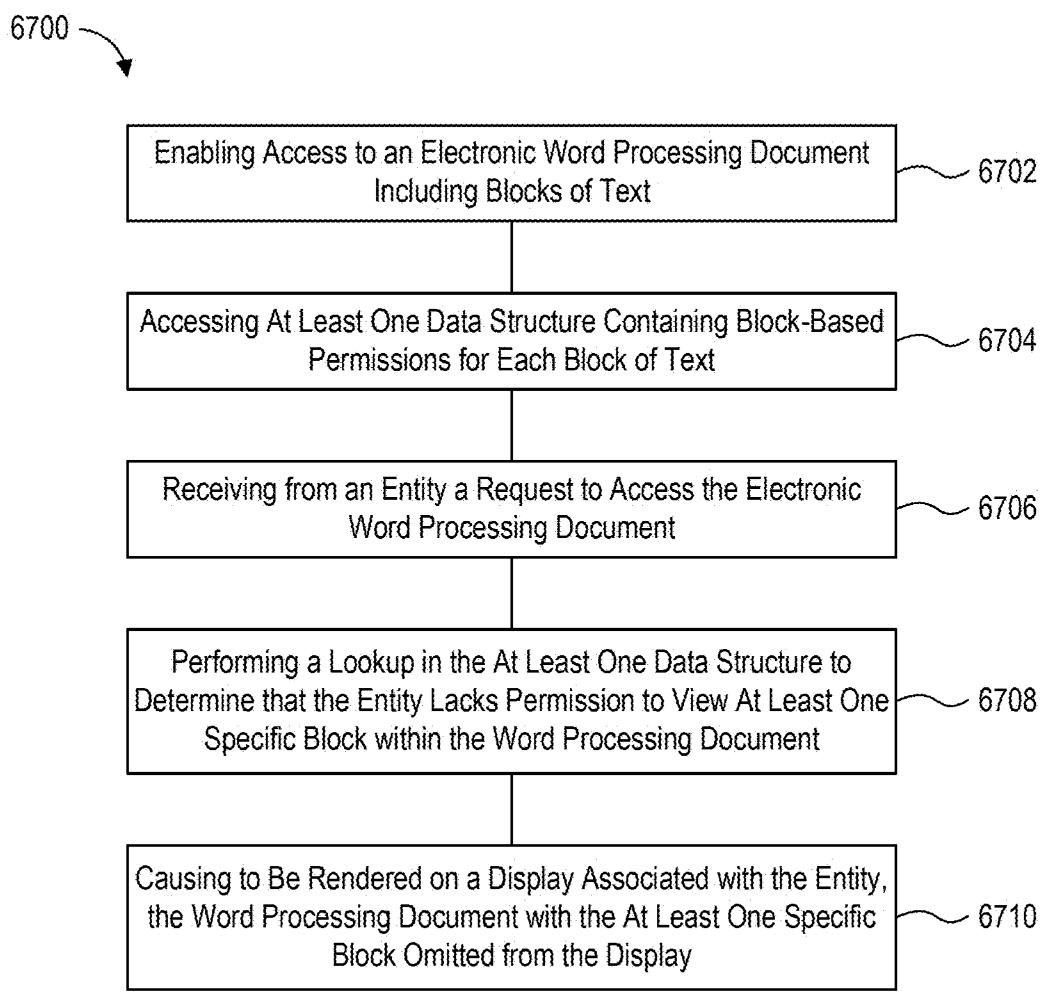
FIG. 67 illustrates a block diagram of an exemplary method performed by a processor of a computer readable medium containing instructions, consistent with some embodiments of the present disclosure, consistent with some embodiments of the present disclosure.

FIG. 67 illustrates a block diagram for an exemplary method for setting granular permissions for shared electronic documents, consistent with some embodiments of the present disclosure. Method 6700 may begin with process block 6702 by enabling access to an electronic word processing document including blocks of text, wherein each block of text has an associated address, as previously discussed. At block 6704, method 6700 may include accessing at least one data structure containing block-based permissions for each block of text, and wherein the permissions include at least one permission to view an associated block of text, as previously discussed. At block 6706, method 6700 may include receiving from an entity a request to access the electronic word processing document, consistent with the disclosure discussed above. At block 6708, method 6700 may include performing a lookup in the at least one data structure to determine that the entity lacks permission to view at least one specific block within the word processing document, as previously discussed. At block 6710, method 6700 may include causing to be rendered on a display associated with the entity, the word processing document with the at least one specific block omitted from the display, consistent with the disclosure above.

Aspects of this disclosure may relate to a system for tagging, extracting, and consolidating information from electronically stored files. For ease of discussion, a system is described below, with the understanding that aspects of the system apply equally to non-transitory computer readable media, methods, and devices. As used herein, electronically stored files may refer to collections of data stored as units in memory, such as a local memory on a user device, a local network repository, a remote repository, or any other data storage device or system. Electronically stored files may be configured to store text data, image data, video data, audio data, metadata, a combination thereof, or any other data type. Non-limiting examples of electronically stored files may include document files, spreadsheet files, database files, presentation files, image files, audio files, video files, or any other collection of data stored as a unit in memory. Information, as used herein, may refer to any data associated with one or more electronically stored files. Information may include alphanumerics, words, text strings, sentences, paragraphs, graphics, audio, video, widgets, objects, tables, charts, links, animations, dynamically updated elements, a combination thereof, or any other data object in an electronically stored file. Information may also include metadata associated with a data object or an electronically stored file, the position of a data object, a heading associated with a data object, or any other characteristic that may be associated with a data object or an electronically stored file. In some embodiments, information may be organized in document portions, as described in detail below.

As used herein, tagging may include associating one or more characteristics (also referred to herein as "tags") with information in an electronically stored file. Characteristics, as used herein, may refer to any text (e.g., alphanumerics), codes, colors, shapes, audio, graphics, or any other data object or metadata that may identify or describe some or all of the information in an electronically stored file. For example, characteristics may identify or describe the information, an author or authors of the information, a status associated with the information (e.g., urgency and/or due date of a project), a date or time at which the information was generated, a location of a computing device when an author associated with the computing device generated the information, or any other feature, attribute, property, or quality of the information associated with an electronic word processing document. The characteristics may be stored as data and/or metadata in a data structure associated with the electronically stored file. A data structure, as used herein, may include any collection of data values and relationships among them. The data structure may be maintained on one or more of a server, in local memory, or any other repository suitable for storing any of the data that may be associated with information from the electronically stored file. Furthermore, tagging may occur manually by a user or may occur automatically by the system. For example, an electronically stored file may include one or more text strings related to brand awareness, and the system may enable a user to select the text strings and tag them with a characteristic, such as the text "marketing," which may be stored as metadata in a data structure associated with the electronically stored file. In another example, a user may generate a table in a collaborative electronic word processing document, and the system may automatically tag the table with a characteristic, such as the user's name, which may be stored as metadata and text data viewable in the document.

Extracting may refer to a process of obtaining or retrieving information from one or more information sources, such as any storage medium associated with electronically stored files, portions of a single electronically stored file, platforms, applications, live data feeds, or a combination thereof. Extracting may occur automatically, such as at a predetermined interval, or may occur in response to a user request. The system may extract information sharing one or more common characteristics. For example, an electronically stored file may contain information in the form of several data objects each having an associated characteristic. Some data objects may share a common characteristic, "soccer," and other data objects share a common characteristic, "basketball." The system may, for example, receive a request to extract the data objects sharing the common characteristic "soccer," from one or more data structures associated with the electronically stored file. In some embodiments, once information is extracted, the system may be configured to further process and/or store the extracted information.

As used herein, consolidating may refer to the process of combining and storing, or other aggregating information in a common location, such as in a common file. Consolidating may occur automatically, such as in response to an extracting step, or may occur in response to a user request with consolidation instructions. The common file may be any file type, as discussed above with reference to electronically stored files. A common file may include information extracted from one or more information sources, as well as other information. In some embodiments, the common file containing consolidated information may be configured to display or present at least some of the extracted information, which may be identical to the extracted information or may be shortened, abbreviated, modified, expressed in a synonymous or related manner, or otherwise differing manner while maintaining a related meaning to the extracted information. For example, the system may extract data objects with a common tag "soccer" and data objects with a common tag "basketball" from an electronically stored file and consolidate these data objects in a common file. The system may then associate document segments sharing the common tag "soccer" and document segments sharing the common tag "basketball." In response to receiving a request to open the common file, the system may display the file contents such that the associated document segments are grouped together.

Figure 68:
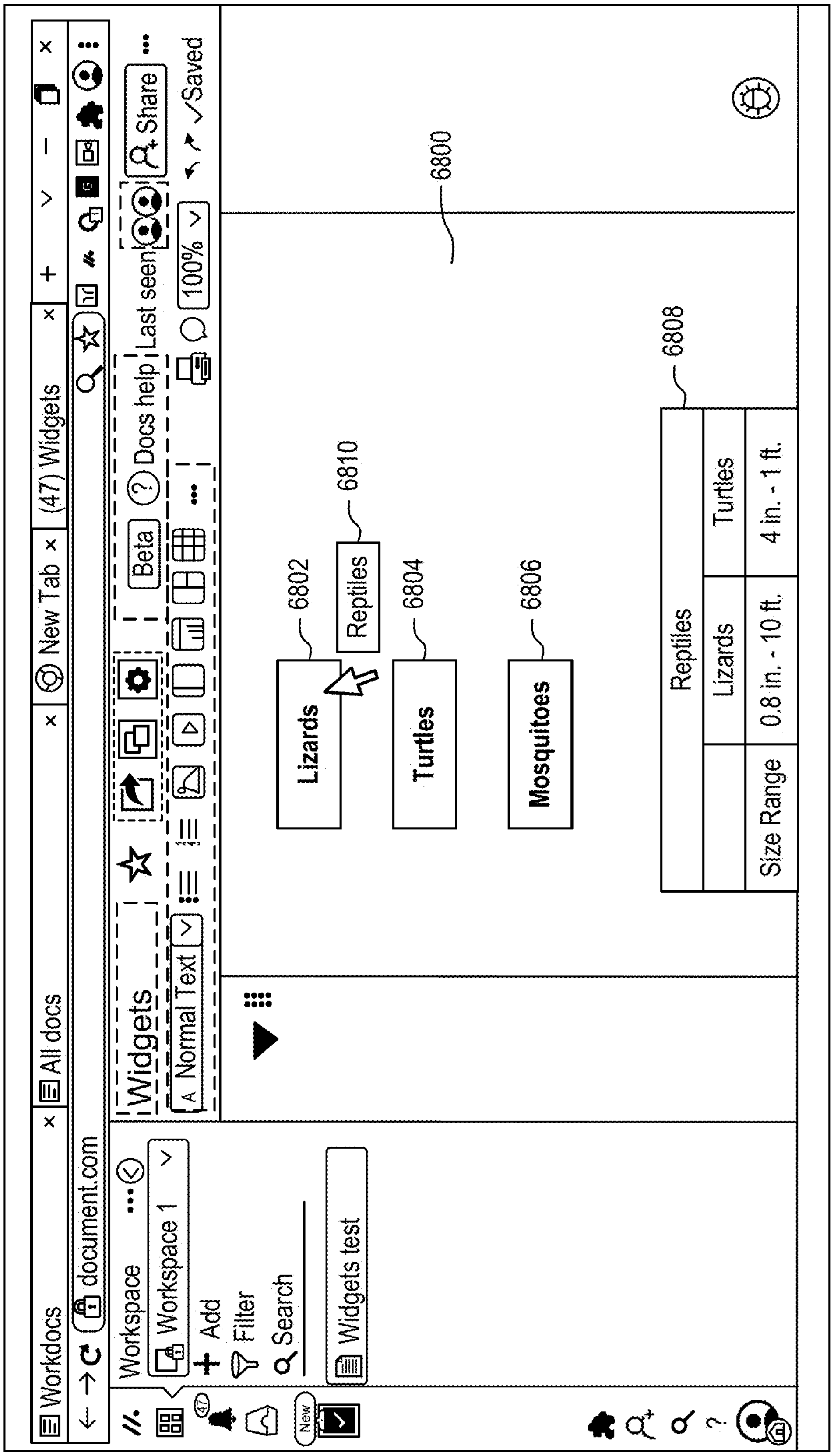
FIG. 68 illustrates one example of an electronically stored file containing tagged information, consistent with some embodiments of the present disclosure.
Figure 69:
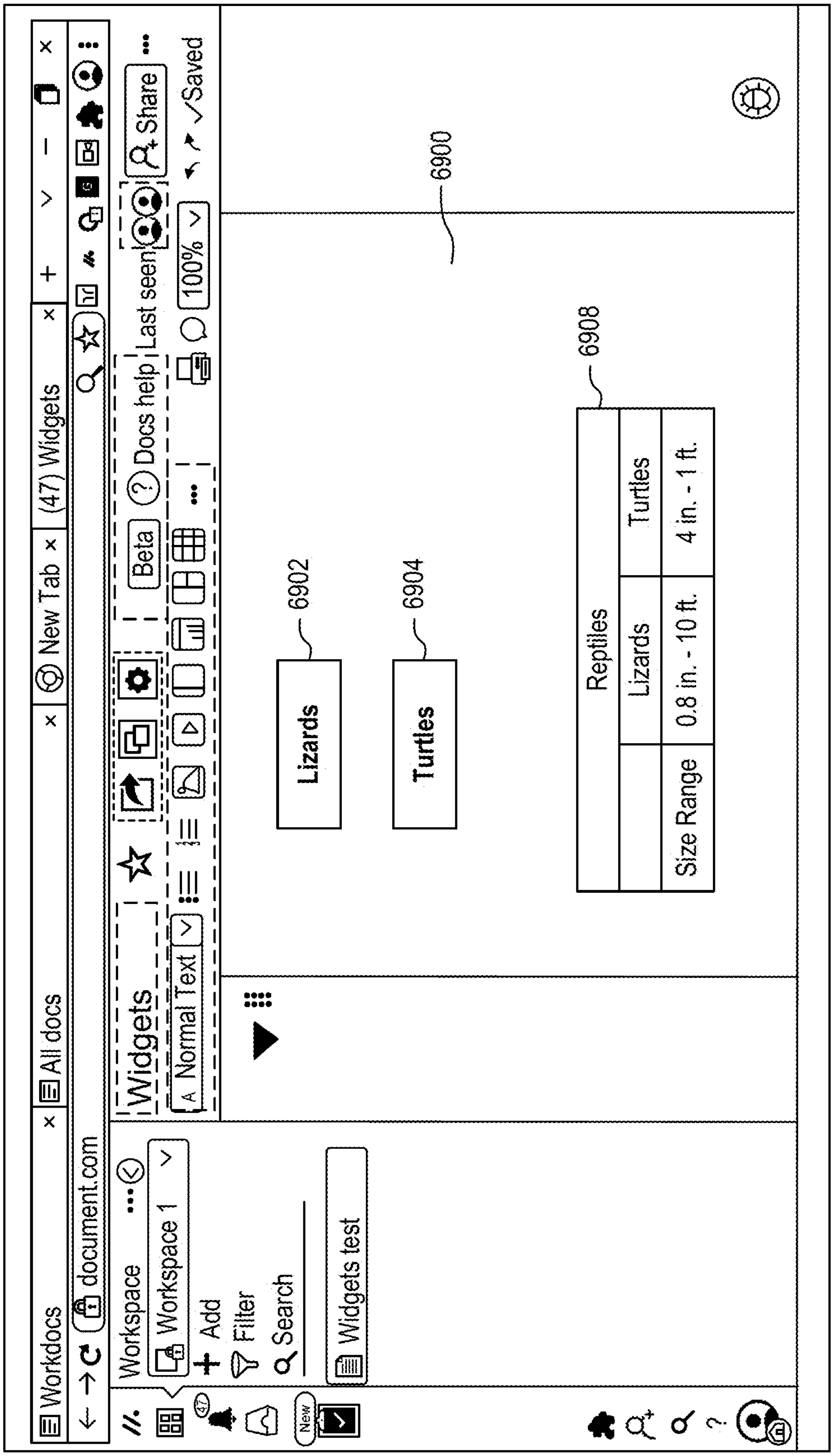
FIG. 69 illustrates one example of an electronically stored file containing information extracted from an electronically stored file, consistent with some embodiments of the present disclosure.

By way of example, FIG. 68 illustrates an example of an electronically stored file containing tagged information. The electronically stored file may be rendered on a display presenting an electronic word processing document 6800. The document 6800 may display information, such as objects 6802 to 6808. Objects 6802 to 6806 may be text strings including the words "Lizards," "Turtles," and "Mosquitoes," respectively, and object 6808 may be a table titled "Reptiles." The system may conclude based on a contextual determination that objects 6802, 6804, and 6808 include information related to reptiles and associate a common tag "reptiles" with those objects. Similarly, the system may conclude based on a contextual determination that object 6806 includes information related to insects and associate a tag "insects" with this object. The system may store each tag as metadata in memory, such as in one or more repositories (e.g., 230-1 through **230-*n* in FIG. 2). Alternatively, or additionally, each tag may be displayed in the document 6800, such as, for example, a mouseover text 6810, which may be rendered in response to a cursor hover or any other interaction with object 6802 containing the word "Lizards." The system may then extract and consolidate information sharing one or more common tags. For example, FIG. 69** illustrates an example of an electronically stored file containing information sharing the common tag "reptiles" extracted and consolidated from the electronic word processing document 6800 illustrated in FIG. 68. The electronically stored file may be an electronic word processing document 6900 or any other type of electronically stored filed, as discussed above. The document 6900 may include objects 6902, 6904, and 6908, each of which were tagged with the common characteristic "reptiles."

Some disclosed embodiments may include presenting to an entity viewing at least one source document a tag interface for enabling selection and tagging of document segments with at least one characteristic associated with each document segment. As used herein, an entity may refer to an individual, a device, a team, an organization, a group, a department, a division, a subsidiary, a company, a contractor, an agent or representative, or any other thing with independent and distinct existence. A source document, as used herein, may refer to any digital file in which information may be stored with and retrieved from. The information associated with a source document may include text, graphics, widgets, objects, tables, links, animations, dynamically updated elements, a combination thereof, or any other data object that may be used in conjunction with the digital file. The source document may further provide for input, editing, formatting, display, and output of information. Source documents are not limited to only digital files for word processing but may include any other processing document such as presentation slides, tables, databases, graphics, sound files, video files or any other digital document or file. Source documents may be collaborative documents or non-collaborative documents. A collaborative document, as used herein, may refer to any source document that may enable simultaneous viewing and editing by multiple entities. A collaborative document may, for example, be generated in or uploaded to a common online platform (e.g., a website) to enable multiple members of a team to contribute to preparing and editing the document. A non-collaborative document, as used herein, may refer to any source document that only a single entity may modify, prepare, and edit at a time. An entity viewing at least one source document, as used herein, may refer to any entity examining, observing, reading, looking at, inspecting, or otherwise accessing a source document from an associated computing device with a display configured to present information from the source document. An entity may view a source document display screen associated with the entity's computing device, such as a PC, laptop, tablet, projector, cell phone, or personal wearable device. An entity may also view a source document through a projection, an AR or VR display, or any other means enabling the entity to visually comprehend the information displayed in the source document.

Document segments, as used herein, may include at least some of the parts or sections into which a source document may be divided. Each document segment may include a visual display of information, such as text (e.g., alphanumerics), graphics, widgets, icons, tables, links, animations, dynamic elements, a combination thereof, or any other item or object that may be displayed in a segment of a source document. Moreover, each document segment may have associated metadata, such as descriptive metadata, structural metadata, administrative metadata, reference metadata, statistical metadata, legal metadata, or a combination thereof. Furthermore, each document segment may have an associated address that may identify a specific memory location, such as in a repository. In some exemplary embodiments, an associated address may be, for example, a fixed-length sequence of digits displayed and manipulated as unsigned integers that enables the system to store information associated with a document segment at a particular location designated by the associated address. Document segments may be manually defined by an entity according to preference or may be automatically defined by the system. For example, an entity may select any information and assign it as a document segment. Alternatively, the system may, for example, define document segments as information separated by a carriage return, information in separate columns, information in separate pages of a source document, similar data objects grouped together, or information grouped together in any other manner. Document segments may further be configured to enable an entity to alter the order or layout in which the segments appear in a source document.

A tag interface, as used herein, may refer to interactive features of a web page, a mobile application, a software interface, or any graphical user interface (GUI) that may enable interactions between an entity and information presented on a display of an associated computing device, for the purpose of enabling selection and tagging of document segments with at least one characteristic associated with each document segment. In some embodiments, a tag interface may be integrated in a software application presenting a source document, such as by embedding the tag interface in the application presenting a source document (e.g., as an add-on or add-in, or any other extension). In other embodiments, a tag interface may part of a stand-alone application that may be accessed from, for example, a link in the interface presenting a source document. The interactive features of a tag interface may include, for example, checkboxes, radio buttons, dropdown lists, windows, buttons, drop-down buttons, pop-up windows, text fields, a combination thereof, or any other elements with which an entity can interact. An entity may interact with the interactive elements of a tag interface by using any input device, such as a mouse, keyboard, touchscreen, microphone, camera, touchpad, scanner, switch, joystick, or any other appropriate input device. Presenting to an entity viewing at least one source document a tag interface, as used herein, may refer to displaying a tag interface on a display (physical or virtual) of a computing device associated with an entity. This may occur, for example, by outputting one or more signals configured to result in the display of a tag interface. A tag interface may be displayed, for example, on a computing device, such as a PC, laptop, tablet, projector, cell phone, or personal wearable device. A tag interface may also be displayed virtually through AR or VR glasses, as described herein. Other mechanisms of displaying may also be used to enable an entity to visually comprehend information associated with a tag interface. Presenting a tag interface and at least one source document to an entity may involve rendering this information in a display in response to the processor receiving instructions for accessing the at least one source document. Accessing the at least one source document may include retrieving the at least one source document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the at least one source document may include retrieving the at least one source document from a web browser cache. Additionally or alternatively, accessing the at least one source document may include accessing a live data stream of the at least one source document from a remote source. In some embodiments, accessing the at least one source document may include logging into an account having a permission to access the document. For example, accessing the at least one source document may be achieved by interacting with an indication associated the at least one source document, such as an icon or file name, which may cause the system to retrieve (e.g., from a storage medium) a particular electronic word processing document associated with the indication.

Enabling selection, as used herein, may refer to allowing an entity to choose one or more document segments of information rendered on a display. In exemplary embodiments, an interface presenting the source document may enable selecting one or more document segments by highlighting, clicking, or touching the information in the one or more document segments with an input device, such as a mouse or touchscreen. In some other exemplary embodiments, an interface presenting the source document may enable selecting one or more document segments by typing, dragging, dropping, or using any mechanism to show a selection. The selection may involve any amount of information displayed in an electronic document such as a single character, a sentence, a paragraph, a page, or any combination thereof. Further, the selection may involve multiple selections from different portions of the same electronic document.

As used herein, enabling tagging of document segments with at least one characteristic associated with each document segment may refer to the processor providing the capability of associating one or more characteristics with each document segment, consistent with the disclosure above regarding tagging information from an electronically stored file. Tagging may occur manually by an entity or may occur automatically by the system. A characteristic (or tag) may include text, (e.g., alphanumerics), a color, a shape, audio, a graphic, or any other data object or metadata or any combination thereof that may identify or describe a document segment. For example, a characteristic may identify or describe the information in a document segment, an author or authors of the information in a document segment, a status associated with the information in a document segment (e.g., urgency and/or due date of a project), a date or time at which the information in a document segment was generated, a location of a computing device when an author associated with the computing device generated the information in a document segment, or any other feature, attribute, property, or quality of the information associated with a document segment. A characteristic (or tag) may be stored as data and/or metadata in a data structure associated with the tagged document segment. An electronic document may include any number of document segments, where each segment may be associated with one or more tags that may differ from the tags with other document segments in the same electronic document.

In an exemplary embodiment, an entity accessing a source document via a software application may be presented with information contained in the source document with an embedded tag interface may select one or more document segments, as explained above. A selected document segment may, for example, include information related to a specific project. The entity may tag the selected document segment with a characteristic associated with the document segment by using an input device to interact with interactive features of the tag interface. For example, the entity may select a due date from a date picker to tag the selected document segment with selected due date. The due date may be stored in a data structure (e.g., a repository) associated with the document segment and may be maintained as metadata and/or displayed as text, graphic, or other data object in the source document. In addition, the entity may, for example, tag a selected document segment with a color selected from a color palate, such that text displayed in the selected document segment is highlighted with the selected color.

In another exemplary embodiment, the processor may automatically tag selected document segments with at least one characteristic associated with each document segment according to user preferences. For example, an entity may interact with interactive features of the tag interface to instruct the processor to tag all document segments, and/or all document segments generated at a subsequent time, with at least one characteristic, such as a description of the information in a document segment based on contextual determination, or a date and/or time at which an entity generated or lasted edited the information in a document segment.

In some embodiments, an at least one characteristic may include a plurality of characteristics chosen from the group consisting of entities associated with document segments, descriptions associated with the document segments, time frames associated with the document segments, and locations associated with the document segments. As used herein, entities associated with the document segments may refer to entities (as described earlier) connected to document segments or otherwise having some relation to the document segments. An entity may be connected to a document segment, for example, if the document segment includes information identifying the entity, such as a name, an address, or an image. Furthermore, an entity may be connected to a document segment, for example, if the entity generated, edited, or accessed the information in the document segment, or otherwise has ownership of the information in the document segment or permissions to access the document or segments thereof. As used herein, descriptions associated with the document segments may refer to a type, kind, or class of information in connection with the document segments. For example, a description associated with a document segment may be the type of information in the document segment, such as text, a table, a chart, or any other data object. A description associated with a document segment may also, for example, be a summary or overview of the information in the document segment, such as “sports,” “engineering projects,” or “finances.” Time frames associated with the document segments, as used herein, may refer to dates, times, or a periods of time associated with the document segments. For example, a time frame associated with a document segment may be a date on and/or time at which the information in the document segment was generated or last edited. A time frame associated with a document segment may also, for example, be a period of time that represents when a project associated with the information in the document segment must be completed and/or the time spent generating, inputting, and/or editing the information in the document segment. Locations associated with the document segments, as used herein, may refer to a particular place or position (e.g., geographical or digital/electronic) identified by information contained in document segments or a particular place or position of entities associated with in the document segments. For example, a location associated with a document segment may be Switzerland if the document segment contains text of an address in Switzerland. A location associated with a document segment may also, for example, be a location of a computing device (e.g., an IP address or a geographical location) when an entity associated with the computing device first or last generated, edited, or accessed the information in document segments.

Figure 70:
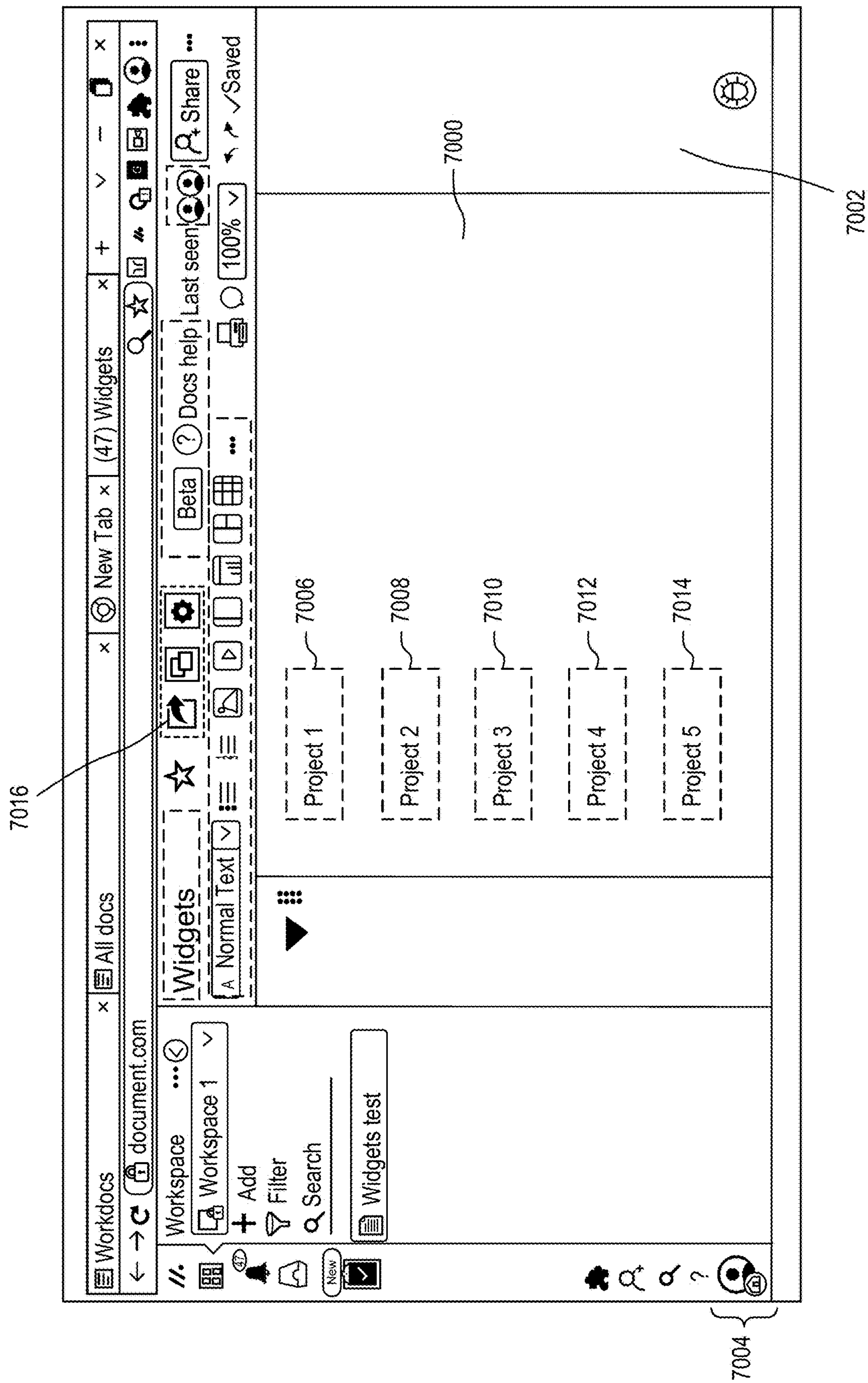
FIG. 70 illustrates one example of a source document presented by editing interface, which includes an embedded tag interface for enabling selection and tagging of document segments with characteristics associated with each document segment, consistent with some embodiments of the present disclosure.

By way of example, FIG. 70 illustrates one example of a source document 7000 presented by editing interface 7002, which includes an embedded tag interface for enabling selection and tagging of document segments with characteristics associated with each document segment. The document 7000 may include an indication of an entity 7004 accessing the document 7000 via an editing interface 7002, which may include an embedded tag interface. The document 7000 may include document segments 7006 to 7014, each related to a distinct project. The entity 7004 may select, for example, document segment 7006 containing the text "Project 1" by clicking any portion of document 7006 (or any other interaction such as a cursor hover) with an input device. The entity may then select icon 7016, which is an interactive feature of the tag interface embedded into the editing interface 7002, to open a pop-up window enabling the entity 7004 to tag the selected document segment 7006 with one or more characteristics associated with the selected document segment 7006.

Figure 71:
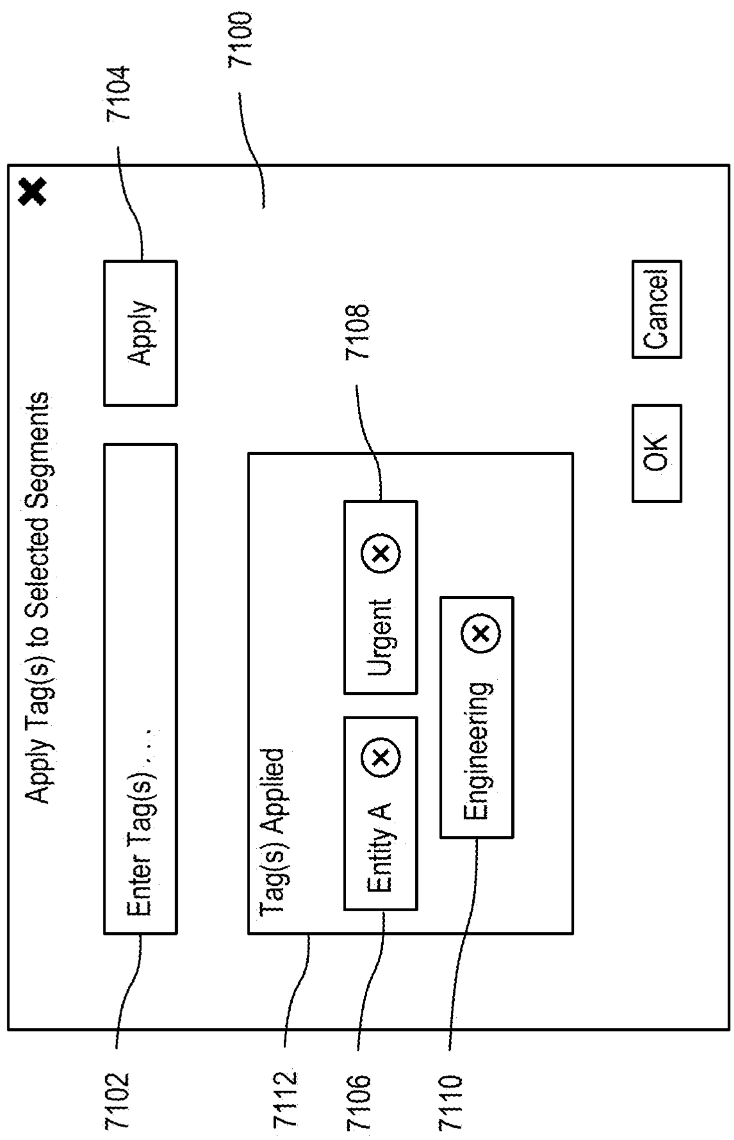
FIG. 71 illustrates one example of a tag interface feature for enabling tagging of document segments with one or more characteristics associated with each document segment, consistent with some embodiments of the present disclosure.

By way of example, FIG. 71 illustrates one example of a tag interface feature, such as pop-up window 7100, for enabling tagging document segment 7006 of FIG. 70 with one or more characteristics associated with each document segments. The pop-up window 7100 may include an input box 7102 in which entity 7004 (from FIG. 70) may input, text. For example, the entity 7004 may input "Entity A," which may be an entity associated with the document segment 7006 (e.g., Entity A may be responsible for completing "Project 1" from document segment 7006). The entity 7004 may then select an "Apply" button 7104 to tag the document segment 7006 with the characteristic "Entity A." The entity 7004 may similarly a tag document segment 7006 with additional characteristics, such as "Urgent," which may indicate the priority associated the document segment 7006, and "Engineering," which may be a description associated with document segment 7006 (e.g., "Project 1" from document segment 7006 is an engineering project). The tags 7106 to 7110 associated with document segment 7006 may be presented in a rendering of a display box 7106 of the pop-up window 7100. The entity 7004 may similarly tag the other document segments 7008 to 7014 (from FIG. 70) with at least one characteristic associated with each document segment. In response to receiving the applied tags, the system may store each tag in a data structure (e.g., in storage 130, repository 230-1, repository **230-*n* of FIGS. 1 and 2**) associated with each respective document segment. In addition, each applied tag may be metadata associated with its corresponding document segment and/or may be a data object displayed in the source document.

Figure 72:
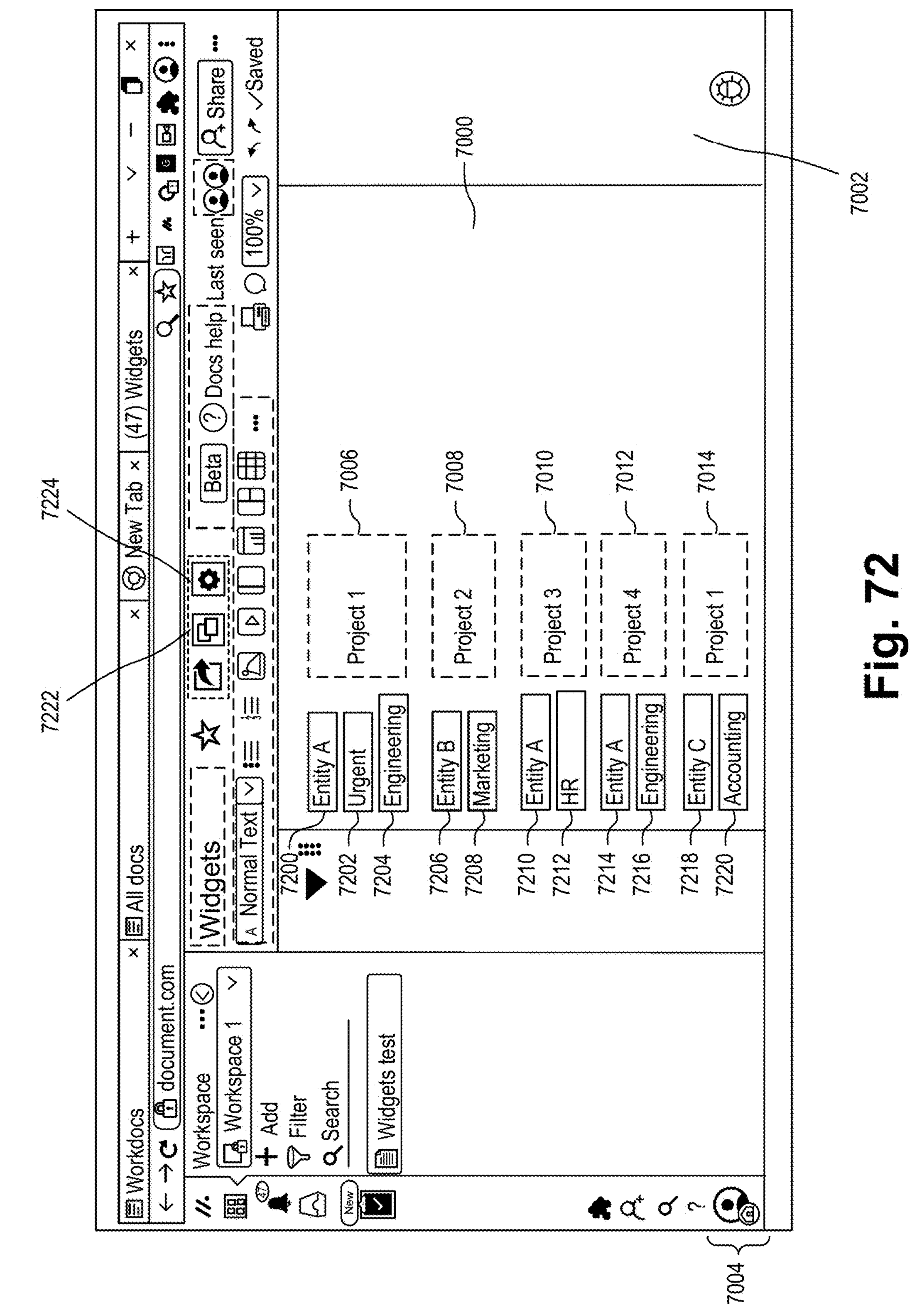
FIG. 72 illustrates one example of a source document with displayed tags associated with document segments, consistent with some embodiments of the present disclosure.

FIG. 72 illustrates one example of a source document 7000 (from FIG. 70) with tags 7200 to 7220 associated with document segments 7006 to 7014. The tags 7200 to 7220 may be displayed in a margin of the source document 7000 next to their associated document segment (e.g., a co-presentation). For example, tags 7200 to 7204 may be associated with document segment document segment 7006, and tags 7206 to 7208 may be associated with document segment 7008. The tags 7200 to 7220 may be rendered continuously, or may be rendered in response to an interaction with an activatable element, such as a setting (e.g., toggling on and off) or a visual indication of a document segment (e.g., document segment 7006). The tags 7200 to 7220 may become hidden in response to an instruction to remove their renderings from the display, which may be received by an input from a user, or from a lack of instruction over a period of time (e.g., a time out threshold).

Some disclosed embodiments may further include identifying tagged segments within an at least one source document. Tagged segments, as used herein, may refer to document segments of a source document that have at least one characteristic (or tag) associated with the document segments. If a document segment does not have at least one characteristic associated with it, the processor may assign a characteristic or tag to that document segment with information to indicate that the document segment lacks at least one characteristic, which as a result may also be considered a tagged segment. Identifying tagged segments within the at least one source document, may refer to an action, process, or instance of retrieving or searching in a data structure associated with document segments of one or more source documents to determine which document segments of a source document have at least one associated tag. For example, identifying tagged segments within the at least one source document may involve retrieving an address associated with a specific document segment in a source document, where the associated address may include an access point for a data structure containing information relating to the specific document segment and the source document. The system may then perform a lookup in the data structure to determine whether the specific document segment has at least one associated tag. Identifying tagged segments in one or more source documents may occur based on a predetermined interval, in response to a trigger activating a consolidation rule (discussed in detail below), in response to receiving an instruction from an entity (e.g., an entity interacting with a tag interface feature), in response to receiving an indication of a new tag associated with one or more document segments, and/or in response to receiving an indication of a modification to or deletion of an existing tag associated with one or more document segments.

Referring again to FIG. 72, the at least one processor may identify the tagged segments 7006 to 7014 by retrieving an associated address for each document segment 7006 to 7014 in the source document 7000. The at least one processor may then perform a lookup in a data structure (e.g., in storage 130, repository 230-1, repository **230-*n* of FIGS. 1 and 2) at access points determined by each address associated with the document segments 7006 to 7014 to determine that that each document segment 7006 to 7014** is a tagged segment.

Aspects of this disclosure may further include accessing a consolidation rule containing instructions for combining tagged segments. A consolidation rule, as used herein, may refer to an automation or logical rule for combining and storing at least some or all of the tagged segments, such as in a common document file (e.g., a tagged-based consolidation document, as discussed in detail below). The storing may occur at a common location, or some or all aspects of the tagged segments may be stored in a disbursed manner for later consolidation. In some embodiments, a consolidation rule may involve combining and storing all tagged segments. In other embodiments, a consolidation rule may involve combining and storing document segments tagged with one or more specific characteristics (e.g., document segments tagged with "urgent," with "urgent" and "engineering," or with "urgent" or "engineering"). In other embodiments, a consolidation rule may involve combining and storing all tagged segments. Additionally, a consolidation rule may associate document segments sharing common tags, as discussed in detail below. A consolidation rule may include default set of instructions that may be automatically associated with a source document or may be defined by an entity via a logical sentence structure, logical template, or any other manner of defining a process that responds to a trigger or condition. In some embodiments, an entity may access a consolidation interface to define a consolidation rule, as described in further detail below. As used herein, instructions for combining the tagged segments may refer to code in source code format, binary code format, executable code format, or any other suitable format of code that is associated with a logical rule that when executed by one or more processors, may cause the system to join, unite, associate at least some tagged segments in a common location, such as a common document file. As used herein, accessing a consolidation rule may refer to the processor performing a lookup and retrieving a consolidation rule from a data structure over a network connection or local connection. For example, a consolidation rule may be in a data structure stored in the form of a storage medium, such as a local storage medium or a remote storage medium, as discussed previously above. A local storage medium may be maintained, for example, on a local computing device, on a local network, or on a resource such as a server within or connected to a local network. A remote storage medium may be maintained in the cloud, or at any other location other than a local network. By way of example, the system may access the consolidation rule from a data structure (e.g., in storage 130, repository 230-1, repository 230-*n* of FIGS. 1 and 2) containing instructions for combining at least some tagged segments.

Some disclosed embodiments may further include implementing a consolidation rule to associate document segments sharing common tags. Implementing the consolidation rule, as used herein, may refer to executing the consolidation rule, as described above, containing instructions to combine and store at least some tagged segments in a common location, such as information in a common document file (e.g., a tagged-based consolidation document, as discussed in detail below), and associate document segments sharing common tags. Implementing the consolidation rule may occur in response to one or more triggering events (i.e., when a condition satisfies a threshold such as when a status is marked "complete"). For example, a consolidation rule may monitor one or more source documents for certain conditions to trigger the execution of the consolidation rule. In some embodiments, a tag interface may include an interactive icon feature that when interacted with (e.g., by an entity clicking or hovering over the icon with a cursor) may trigger the execution of a consolidation rule. In other embodiments, tagging a document segment with a characteristic, and/or a modifying or deleting an existing tagged segment, may trigger the execution of a consolidation rule. In further embodiments, identifying tagged segments within one or more source documents, as explained above, may trigger the execution of a consolidation rule. Document segments sharing common tags, as used herein, may refer to document segments associated with identical, similar, or related tags. For example, a consolidation rule may include instructions to combine and store document segments that share a tag "soccer." In another example, a consolidation rule may include instructions to combine and store document segments that share either a tag "soccer" or a tag "basketball." In yet another example, a consolidation rule may include instructions to combine and store document segments that share both a tag "soccer" and a tag "basketball" The processor may also have a consolidation rule that may include instructions to combine document segments that share "soccer" and "basketball" tags because the processor may automatically recognize the information in each tag to be associated with sports. Associating document segments sharing common tags may refer to linking, connecting, joining, or coupling information or data associated with document segments sharing common tags. In one example, a consolidation rule may include instructions to combine and store document segments sharing a common "urgent" tag, and the document segments sharing the common "urgent" tag may be associated by linking the document segments, or by assigning a common code, address, or other designation to the document segments in a non-transitory computer-readable medium. In another example, a consolidation rule may include instructions to combine and store document segments sharing both common tags "soccer" and "basketball," and document segments sharing both common tags "baseball" and "rugby" because each of these tags relate to sports. The document segments sharing the common tags "soccer" and "basketball" may be associated by linking the document segments, or by assigning a common code, address, or other designation to the document segments in a non-transitory computer-readable medium; and the document segment sharing the common tags "baseball" and "rugby" may be similarly associated.

Returning again to FIG. 72, a consolidation rule associated with the source document 7000 may include a set of instructions that, when executed, combine and store all tagged segments 7006 to 7014, and associate the document segments 7006 to 7014 sharing common tags. In response to the entity 7004 selecting an icon 7222 of the tag interface, the system may execute the consolidation rule. The system may access the consolidation rule from a data structure (e.g., in storage 130, repository 230-1, repository 230-*n* of FIGS. 1 and 2) associated with the source document 7000 to carry out specific consolidation actions according to the consolidation rule. For example, the consolidation rule may include a logical rule to associate the document segments for "project 1" 7006, "project 2" 7010, and "project 3" 7012 based on a logical rule that each of these document segments are tagged with an "Entity A" tag 7200, 7210, and 7214.

Aspects of this disclosure may further include outputting for display at least one tagged-based consolidation document grouping together commonly tagged document segments. A tagged-based consolidation document, as used herein, may refer to a file that is configurable to store information and data from the document segments sharing common tags. A tagged-based consolidation document may further provide for input, editing, formatting, display, and output of information, including information associated with the commonly tagged document segments from the one or more source documents. A tagged-based consolidation document is not limited to only digital files for word processing but may include any other processing document such as presentation slides, tables, databases, graphics, sound files, video files or any other digital document or file. In some embodiments, the at least one tagged-based source document may be a new document generated by the at least one processor when a consolidation rule is implemented. In other embodiments, the at least one tagged-based source document may be an existing document, which may be one or more source documents. For example, a consolidation rule may include migrating information associated with the document segments sharing common tags from one file location (e.g., a source document file) to another file location (e.g., an existing document file). Outputting for display at least one tagged-based consolidation document, as used herein, may refer to producing, delivering, or otherwise transmitting one or more signals configured to result in the presentation of at least one tagged-based consolidation document on a screen, other surface, through a projection, or in a virtual space. Outputting for display at least one tagged-based consolidation document may occur in response to implementing the consolidation rule or may occur in response to receiving a request to open a tagged-based consolidation document. Furthermore, outputting for display at least one tagged-based consolidation document may occur, for example, on one or more of a touchscreen, a monitor, AR or VR display, or any other means previously discussed and discussed further below. The at least one tagged-based consolidation document may be presented, for example, via a display screen associated with an entity's computing device, such as a PC, laptop, tablet, projector, cell phone, or personal wearable device. The at least one tagged-based consolidation document may also be presented virtually through AR or VR glasses, or through a holographic display. Other mechanisms of presenting may also be used to enable the entity to visually comprehend the presented information. The at least one tagged-based consolidation document may appear as a new window, as a pop-up, or in other manner for presenting the document on a display associated with an entity. As used herein, grouping together commonly tagged document segments may refer to the process of assembling, arranging, aggregating, or organizing document segments in a manner in which commonly tagged segments may be displayed as a collection of document segments. In one example, grouping together commonly tagged document segments may involve displaying one group of commonly tagged segments in a first list and a second group of commonly tagged segments in a second list. In another example, grouping together commonly tagged document segments may include displaying one group of commonly tagged segments on a first presentation slide and a second group of commonly tagged segments on a second presentation slide. In yet another example, grouping together commonly tagged document segments may include displaying one group of commonly tagged segments in cells of a first table column and displaying a second group of commonly tagged segments in cells of a second table column.

Figure 73:
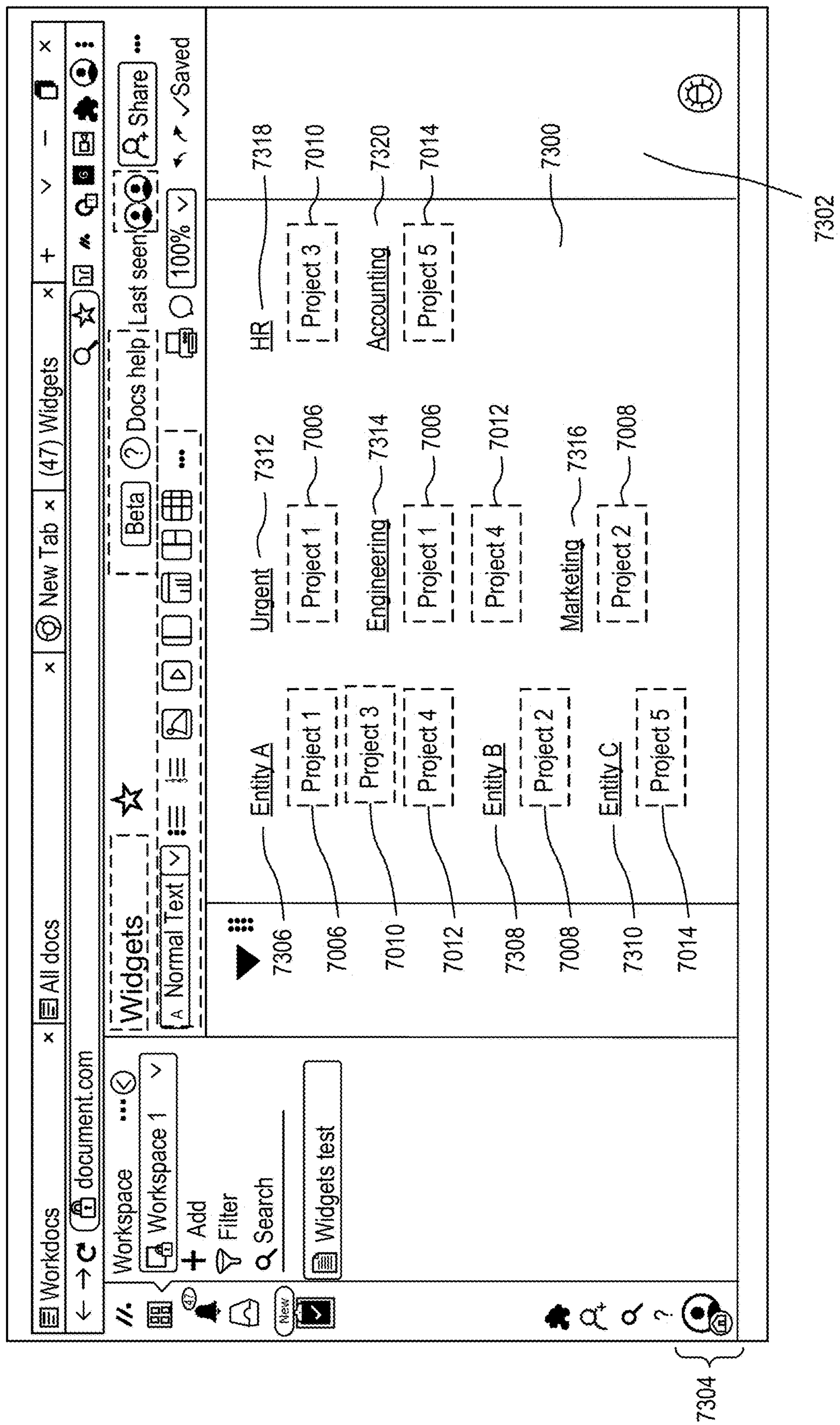
FIG. 73 illustrates one example of a tagged-based consolidation document grouping together commonly tagged documents segments from a source document, consistent with some embodiments of the present disclosure.

By way of example, FIG. 73 illustrates an example of a tagged-based consolidation document 7300 grouping together commonly tagged documents segments 7006 to 7014 from the source document 7000 illustrated in FIGS. 70 and 72. The tagged-based consolidation document may include headings 7306 to 7320 representing each of the tags associated with document segments 7006 to 7014 from the source document 7000 illustrated in FIGS. 70 and 72. The tagged-based consolidation document may further include document segments sharing common tags below each heading 7306 to 7320. For example, tagged segments 7006, 7010, and 7012 each share a common tag "Entity A" and therefore are grouped together below the "Entity A" heading 7306. Similarly, for example, tagged segments 7006 and 7012 each share a common tag "Engineering" and therefore are grouped together below the "Engineering" heading 7314. The processor may group document segments based on one or more tags according to any consolidation rule and may re-render a display to consolidate and group the document segments into other organizations in response to receiving a new consolidation rule.

In some embodiments, an at least one source document may include a plurality of source documents, and a tagged-based consolidation document may include document segments from a plurality of source documents. A plurality of source documents, as used herein, may refer to at least two distinct source documents. Document segments from the plurality of source documents, as used herein, may refer to at least one document segment from each of the plurality of source documents. For example, each of the plurality of source documents may include one or more tagged segments, and a consolidation rule hosted by a platform may combine and store at least some of the tagged segments and associate the combined and stored document segments sharing common tags, consistent with the above disclosure. In some embodiments, the processor may map the plurality of source documents to a consolidation rule either automatically (e.g., by detecting the plurality of source documents available in a repository or workspace), or manually (e.g., a user selects the particular plurality of source documents that the consolidation rule may apply to). Similarly, the consolidation rule may be mapped to a single source document that may be associated with other source documents, to thereby map the other source documents automatically to the consolidation rule.

Returning again to FIG. 72, source document 7000 may be an example of one source document. By way of example, FIG. 74 may be an example of a second source document 7400. The second source document 74 may include document segments 7402 and 7404. Document segment 7402 may include a graph and a chart and may have been tagged with characteristics "urgent" and "finance." Document segment 7404 may include a table and may have been tagged with a characteristic "marketing." In response to receiving the applied tags, the system may store each tag as metadata in a data structure (e.g., in storage 130, repository 230-1, repository **230-*n* of FIGS. 1 and 2) associated with each respective document segment. An entity may access a consolidation interface (not pictured but discussed in detail below) to define a consolidation rule associated with the source documents 7000 and 7400 that may include a set of instructions that, when executed, combine and store document segments tagged with both characteristics "engineering" and "urgent" in a new document (e.g., the tagged-based consolidation document in FIG. 75, discussed below). The consolidation rule may be implemented in response to a trigger, such as in response to an entity selecting an icon 7222 (from FIG. 72) or an icon 7406 (from FIG. 74**) of the tag interface.

Figure 74:
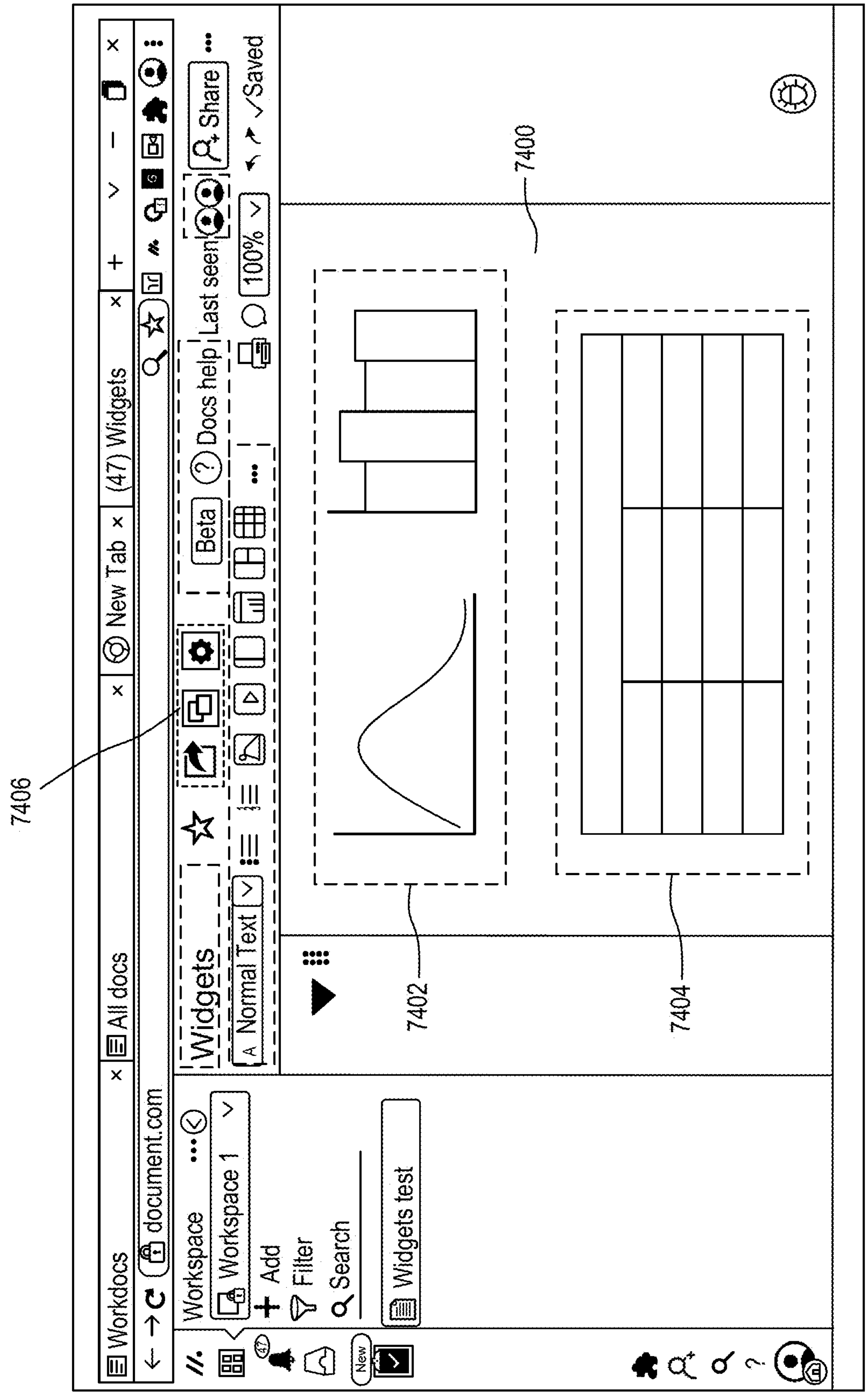
FIG. 74 illustrates one example of a second source document with tags maintained as metadata, consistent with some embodiments of the present disclosure.
Figure 75:
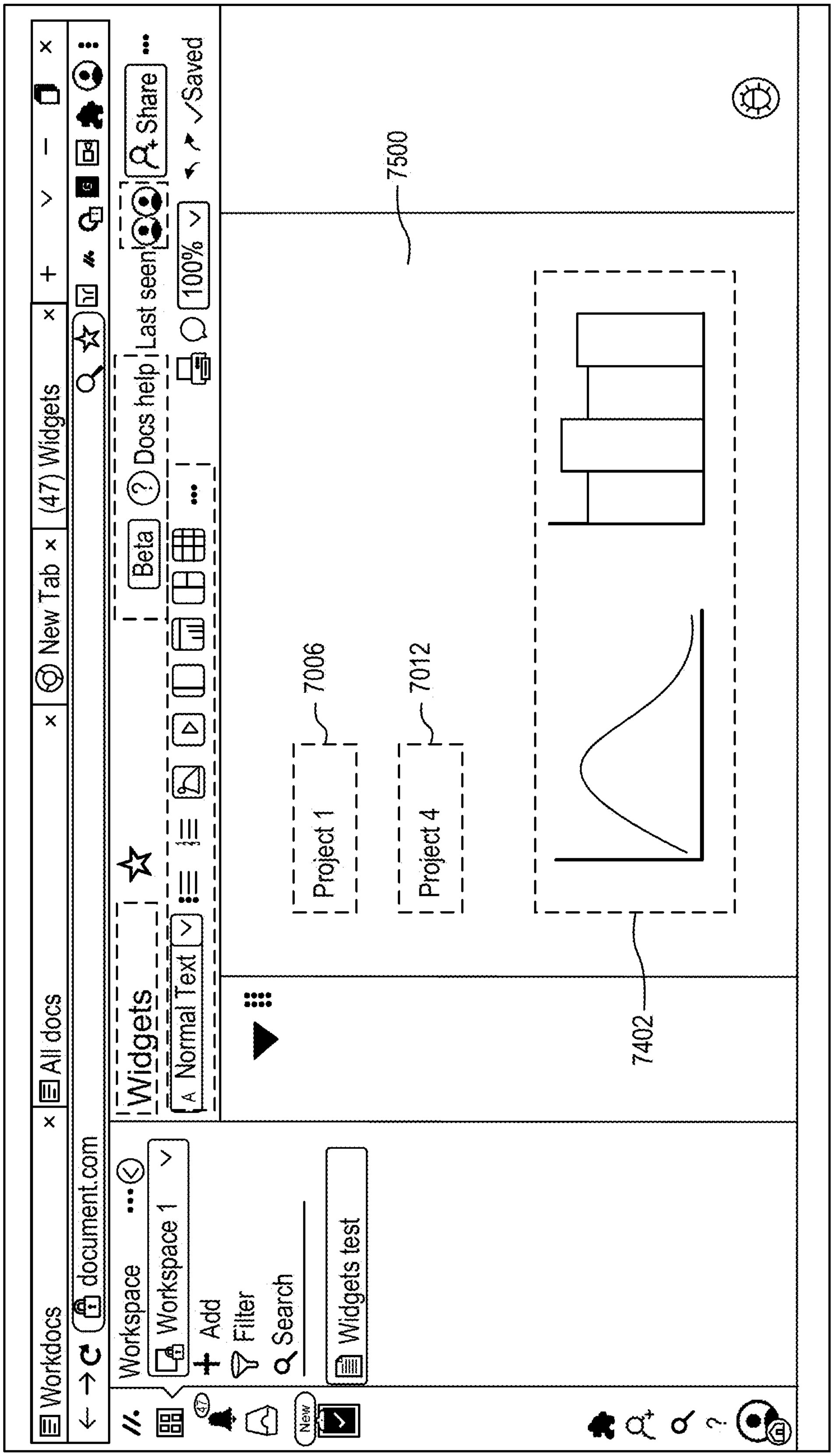
FIG. 75 illustrates one example of a tagged-based consolidation document including document segments from a plurality of source documents, consistent with some embodiments of the present disclosure.

By way of example, FIG. 75 illustrates one example of a tagged-based consolidation document 7500 including document segments from a plurality of source documents 7000 (from FIGS. 70 and 72) and 7400 (from FIG. 74). The tagged-based consolidation document 7500 includes document segments sharing the common tags "engineering" and "urgent," namely document segments "Project 1" 7006 and "Project 4" 7012 from the source document 7000 (from FIGS. 70 and 72) and document segment 7402 from the source document 7400 (from FIG. 74).

In additional embodiments, the at least one tagged-based consolidation document may include at least one heading of an associated tag, and associated tag segments beneath the at least one heading. A heading of an associated tag, as used herein, may refer to a label referencing the information contained in a tag that document segments may share in common with each other. In some embodiments, a heading of an associated tag may be the exact tag shared by document segments. For example, one or more document segments may share the common tag "Germany," and a heading of an associated tag may be "Germany." In another example, one or more document segments may share the common tags "Germany" and a shape, such as a square, and a heading of an associated tag may be "Germany" and a square. In other embodiments, a heading of an associated tag may differ from the tag shared by document segments. For example, a common code may link them. One or more document segments may share common "Urgent" tags, with text in the document segments highlighted in yellow, and a heading of an associated "Urgent" tag highlighted in yellow. In another example, one or more document segments may share common tags "Urgent" or "Engineering," with a heading of an associated tag labeled "Engineering Projects and Urgent Projects." As used herein, associated tag segments beneath the at least one heading may refer to displaying document segments sharing common tags below, beside, or otherwise surrounding a heading of an associated tag. For example, a heading of an associated tag may be displayed at the top of a vertical list, and document segments sharing a tag associated with the heading may be displayed below the heading. In another example, a heading of an associated tag may be displayed in a cell of a table, and document segments sharing a tag associated with the heading may be displayed in cells of a column or row containing the heading. In yet another example, a heading of an associated tag may be displayed as a title of a presentation slide, and document segments sharing a tag associated with the heading may be displayed in the body of the presentation slide.

Returning again to FIG. 73, the tagged-based consolidation document 7300 may include headings of an associated tag 7306 to 7320. For example, document segments "Project 1" 7006, "Project 3" 7010, and "Project 4" 7012 (from FIGS. 70 and 72) were tagged with a common characteristic "Entity A," and are displayed beneath a heading of an associated tag "Entity A" 7306.

In some exemplary embodiments, the consolidation rule may include a transmissions component for transmitting the tagged-based consolidation document to at least one designated entity. A transmissions component, as used herein, may refer to an instruction, associated with the consolidation rule, to send or transfer information from one device to another device. For example, a transmissions component associated with a consolidation rule may involve sending an email to at least one designated entity with the tagged-based consolidation document as an attachment to the email. In other embodiments, the transmissions component may involve sending a notification to indicate that the tagged-based consolidation document has been generated, but store the tagged based consolidation document in a repository for later retrieval by at least one designated entity. At least one designated entity, as used herein, may refer to any entity that is assigned to receive transmitted information. A designated entity may automatically selected by the system or may be manually selected by another entity. For example, the system may configure the consolidation rule to transmit information to other workflow participants (i.e., other members of a team cooperating via a common online platform), or an entity may, for example, input an external address associated with a designed entity to which information may be transmitted. As used herein, transmitting the tagged-based consolidation document may refer to sending or transferring the tagged-based consolidation document from one device to another device (e.g., a computer, smartphone, or tablet) associated with at least one designated entity. Transmitting the tagged-based consolidation document may involve transmitting the document itself or transmitting a link to access the document, for example, via a web application. Furthermore, transmitting the tagged-based consolidation document may be carried out through a local or remote network and/or through wired or wireless connections. Transmitting the tagged-based consolidation document may also occur within the platform that hosts the consolidation rule. Such transmitting may occur directly or indirectly. Direct transmission may occur if the transmission mechanism is incorporated into the consolidation rule itself. Indirect transmission may occur if the consolidation rule links to a proprietary or third-party communications platform (e.g., email, SMS, or other communications application), and through the link relays information to the communications platform for transmission.

In some exemplary embodiments, the at least one processor may be further configured to present a consolidation interface for enabling definition of the consolidation rule. A consolidation interface, as used herein, may refer to interactive features of a web page, a mobile application, a software interface, or any graphical user interface (GUI) that enable interactions between an entity and a device, for the purpose of enabling definition of the consolidation rule. In some embodiments, a consolidation interface may be integrated in the tag interface, which may be embedded in a software application presenting a source document, a previously discussed. In other embodiments, a consolidation interface may part of a stand-alone application that may be accessed from, for example, a link in the interface presenting a source document. As used herein, presenting a consolidation interface may refer to displaying a consolidation interface on a screen of a computing device associated with an entity. This may occur, for example, by outputting one or more signals configured to result in the display of a consolidation interface. A consolidation interface may be displayed, for example, on a computing device, such as a PC, laptop, tablet, projector, cell phone, or personal wearable device. A consolidation interface may also be displayed virtually through AR or VR glasses. Other mechanisms of displaying may also be used to enable an entity to visually comprehend information associated with a consolidation interface. As used herein, enabling definition of the consolidation rule may refer to permitting an entity to generate and customize a consolidation rule by interacting with interactive features of the consolidation interface. In some embodiments, a consolidation interface may present a logical sentence structure or logical template (e.g., automations) and/or other interactive features, such as radio buttons, checkboxes, input boxes, and/or drop-down menus.

Returning again to FIG. 72, the source document 7000 may be presented by editing interface 7002, which includes an embedded tag interface. The embedded tag interface may include an incorporated consolidation interface. For example, an entity 7004 accessing the source document 7000 may select icon 7224 to open a pop-up window enabling the entity 7004 to access tagging preferences and consolidation preferences and define consolidation rules.

Figure 76:
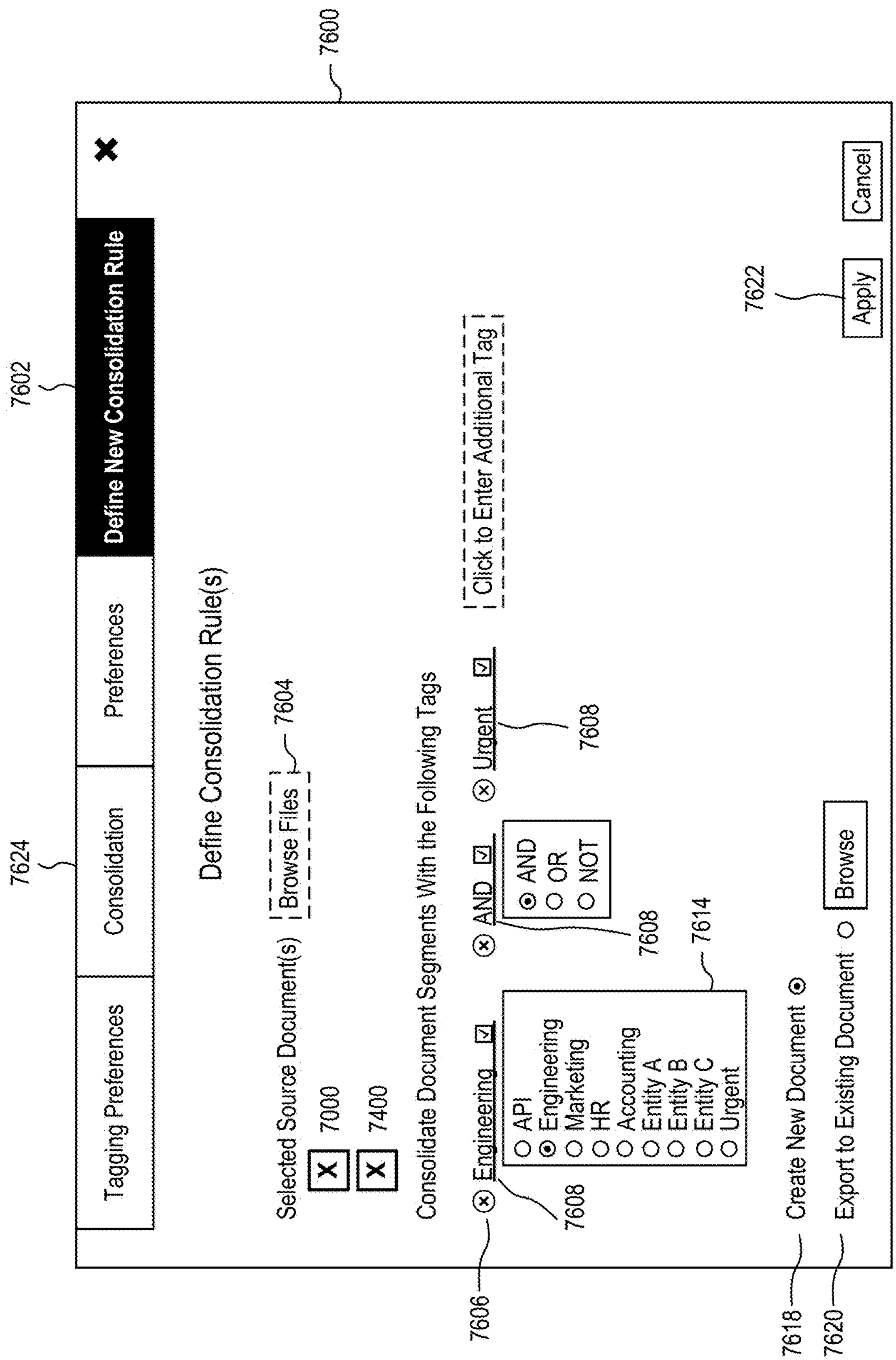
FIG. 76 illustrates one example of a consolidation interface for enabling definition of a consolidation rule, consistent with some embodiments of the present disclosure.

By way of example, FIG. 76 illustrates one example of such a pop-up window 7600 containing a consolidation interface for enabling definition of a consolidation rule. In this example, the entity 7004 may select the "Define New Consolidation Rule" tab 7602. The pop-up window 7600 may include a "Browse Files" button enabling the entity 7004 to select one or more source documents to include in a consolidation rule. In this example, the entity 7004 has selected source document 7000 (from FIGS. 70 and 72) and source document 7400 (from FIG. 74). The pop-up window 7600 may also include logical template 7606 that may enable the entity 7004 to define which tags to include in the consolidation rule. The logical template 7606 may include fill-in-the-blank components 7608 to 7612 that include drop-down menus. For example, fill-in-the-bank component 7608 may include a drop-down menu 7614 that may contain each of the tags assigned to document segments in the selected source documents 7000 and 7400 (e.g., by performing a lookup of all tagged detected in the source document and presenting the tags in the drop down menu); whereas fill-in-the-blank component 7610 may include a drop-down menu 7616 that may include Boolean commands. In this example, the entity 7004 used the logical template 7606 to consolidate document segments from the source documents 7000 and 7400 that share the common tags "Engineering" and "Urgent." Furthermore, the pop-up window 7600 may include radio buttons 7618 and 7620 that enable the entity 7004 to consolidate these documents segments in a new document or in an existing document. In this example, the entity 7004 has selected ratio button 7618 corresponding to "Create New Document." The entity 7004 may then selected an "Apply" button 7622 to apply the consolidation rule. In response to receiving the consolidation rule, the system may display this consolidation rule and previously defined consolidation rules in a window displayed when the "Consolidation Preferences" tab 7624 is selected.

Returning to FIG. 75, the tagged-based consolidation document 7500 may be one example of a tagged-based consolidation document generated by implementation of the consolidation rule defined via the consolidation interface in FIG. 76. The tagged-based consolidation document 7500 includes document segments sharing the common tags "engineering" and "urgent," namely document segments 7006 and 7012 from the source document 7000 (from FIGS. 70 and 72) and document segment 7402 from the source document 7400 (from FIG. 74).

In further exemplary embodiments, a consolidation interface may permit generation of the consolidation rule in a manner permitting consolidation of document segments based on more than one of the plurality of the characteristics. As used herein, permitting generation of the consolidation rule may be carried out consistent with the disclosure above for enabling definition of the consolidation rule. As used herein, permitting consolidation of document segments based on more than one of the plurality of the characteristics may refer to combining and storing document segments tagged with more than one characteristic, as previously discussed. For example, a consolidation interface may enable an entity to select document segments tagged with both "soccer" and "basketball," or documents segments tagged with "soccer" or "basketball." In another example, a consolidation interface may enable an entity to select document segments tagged with both "soccer" and "basketball," and document segments tagged with "baseball" and "rugby." In this example, the consolidation rule may associate document segments sharing the common tags "soccer" and "basketball" and associate the document segments sharing the common tags "baseball" and "rugby." A tagged-based consolidation document may then group together the document segments sharing the common tags "soccer" and "basketball" and the document segments sharing the common tags "baseball" and "rugby."

Returning again to FIG. 76, the consolidation interface illustrated in pop-up window 7600 may enable consolidation of document segments based on more than one of the plurality of characteristics. For example, the pop-up window 7600 may include a logical template 7606 that may enable selection of more than one characteristic, such as "Engineering" and "Urgent," as illustrated.

Figure 77:
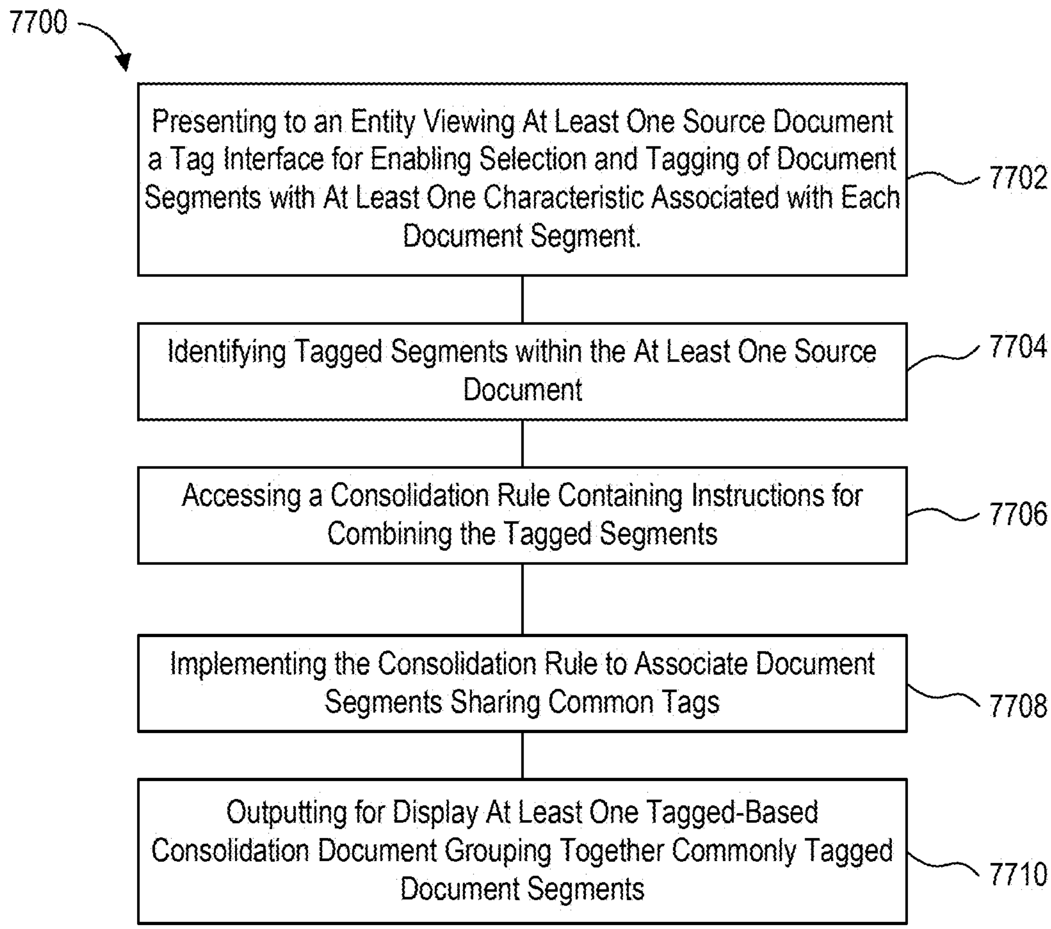
FIG. 77 illustrates a block diagram of an exemplary method performed by a processor of a computer readable medium containing instructions, consistent with some embodiments of the present disclosure.

By way of example, FIG. 77 illustrates a block diagram for an exemplary method for tagging, extracting, and consolidating information from electronically stored files, consistent with some embodiments of the present disclosure. Method 7700 may begin with process block 7702 by presenting to an entity viewing at least once source document a tag interface for enabling selection and tagging of document segments with at least one characteristic associated with each document segment, as previously discussed. At block 7704, method 7700 may include identifying tagged segments within the at least one source document, consistent with the disclosure discussed above. At block 7706, method 7700 may include accessing a consolidation rule containing instructions for combining the tagged segments, consistent with the disclosure above. At block 7708, method 7700 may include implementing the consolidation rule to associate document segments sharing common tags, as previously discussed. At block 7710, method 7700 may include outputting for display at least one tagged-based consolidation document grouping together commonly tagged document segments, consistent with the disclosure above.

Aspects of this disclosure may involve enabling a plurality of mobile communications devices to be used in parallel to comment on presentation slides within a deck. For ease of discussion, a system is described below, with the understanding that aspects of the system apply equally to non-transitory computer readable media, methods, and devices. A presentation, as used herein, may refer to any circumstance or scenario where one or more presenters and audience members transmit and display information on one or more display devices. For example, a presentation may occur when a presenter causes a display of information relating to an electronic file on a screen in a room, or on multiple screens associated with audience members over a network. In another example, a presentation may occur during a video conference or broadcast presentation (e.g., over a network and displayed in a web browser) where at least one presenter may be able to communicate with a group of audience members located in a common space or dispersed and communicatively coupled over one or more networks. A network may refer to any type of wired or wireless electronic networking arrangement used to exchange data, such as the Internet, a private data network, a virtual private network using a public network, a Wi-Fi network, a LAN, or WAN network, and/or other suitable connections, as described above. Furthermore, a presentation may include information associated with presentation slides within a deck, which, as used herein, may refer to a single page of information that may be part of a collection of pages (i.e., a deck) shared by at least one presenter. Presentation slides (also referred to herein as "slides") within a deck may be stored as one or more digital presentation files that provide for input, editing, formatting, display, and output of text, graphics, widgets, objects, tables, links, animations, dynamically updated elements, or any other data object that may be used in conjunction with the digital file. Such presentation files may be generated with any presentation program, such as ClearSlide™, Presi™, LibreOffice Impress™, Powtoon™, GoAnimate™, Camtasia™, Slideshare™, or any other software capable of producing presentation slides. Furthermore, presentation slides within a deck may be configurable to be displayed or presented in a visual form, such as on a screen or other surface, through a projection, or in a virtual space. This may occur, for example, via a display screen of a computing device, such as a PC, laptop, tablet, projector, cell phone, or personal wearable device. Presentation slides within a deck may also be displayed or presented virtually though AR or VR glasses, or through a holographic display. Other mechanisms of presenting or displaying the presentation slides within a deck may also be used to enable the audience to visually comprehend the presented information.

A plurality of mobile communications devices, as used herein, may refer to at least two portable devices capable of transmitting, capturing, or receiving voice, video, data, and/or any other information or combination thereof. For example, mobile communications devices may include mobile phones, smartphones, handheld PCs, tablets, personal digital assistants (PDAs), laptops, smartwatches, virtual reality or extended reality glasses, a combination thereof, or any other electronic device that can transmit and/or receive voice, video, data, and/or other information. In some embodiments, a plurality of mobile communications devices may include a digital camera or an optical scanner for capturing graphical codes from presentation slides within a deck. In other embodiments, mobile communications devices may include an interface enabling user input of comments on presentation slides within a deck. The plurality of mobile communication devices may also include display screens, touchscreens, keyboards, buttons, microphones, touchpads, a combination thereof, or any other hardware or software component that may receive user inputs. Enabling a plurality of mobile communications devices to be used in parallel to comment on presentation slides within a deck, as used herein, may refer to at least two mobile communications devices (e.g., associated with audience members) that may operate simultaneously and add information regarding specific pages of an electronic file, such as adding a comment on presentation slides within a deck. A comment, as used herein, may refer to a response, an observation, a remark, an opinion, or any other form of feedback that may be transmitted and associated with a particular presentation slide within a deck. Comments may include text (e.g., alphanumerics), symbols, icons, emojis, images, or any other digital data object. For example, a mobile communications device associated with an audience member may transmit a comment (e.g., the data underlying the comment) that text within a presentation slide contains a typo. In another example, a mobile communications device associated with another audience member may transmit a comment with a thumbs-up icon for a particular presentation slide. As explained in further detail below, comments on a presentation slide within a deck may be associated with a link (e.g., a graphical indicator).

By way of example, FIG. 2 illustrates a block diagram of an exemplary computing architecture, consistent with some embodiments of the present disclosure. A computing device 100 may be associated with a presenter who is presenting presentation slides within a deck to audience members. User devices 220-1 to 220-*m* may be mobile communications devices associated with the audience members. The audience members may use their respective user devices 220-1 to 220-*m* to transmit comments over a network 210 to the computing device 100 associated with the presenter.

Some disclosed embodiments may include receiving from a first of a plurality of mobile communications devices, a first instance of a first graphical code captured from a first slide during a presentation, or a decryption of the first instance of the first graphical code, and an associated first comment on the first slide. A first graphical code, as used herein, may refer to a visible representation of a link that may be activatable to locate, access, and/or retrieve information from a specific location in memory (e.g., a repository). A first graphical code may be a machine-scannable image or code. An electronic document may include one or more graphical codes that may be associated with particular locations within the electronic document. For example, an electronic document may include a first graphical code on a first page and a second graphical code on a second page. Each graphical code may correspond to each respective page such that activating a graphical code may access a particular location in a repository storing data associated with the particular location within the electronic document. In some embodiments, the first graphical code may include at least one of a bar code or a QR code. A bar code, as used herein, may refer to a machine-readable code in the form of a pattern of parallel lines of varying widths. The bar code may also include numbers. A bar code may be a one-dimensional or linear bar code or a two-dimensional bar code, such as a data matrix or Aztec code. A QR code, as used herein, may refer to a machine-readable code consisting of an array of black and white squares. A QR code may be static or dynamic (e.g., updating over time). Furthermore, a first graphical code may be associated with a first slide. For example, a first graphical code may be embedded in a first slide or may be displayed in any other location of a window of a presentation program when the first slide within a deck is displayed.

A first instance of a first graphical code captured from a first slide, as used herein, may refer to a single presentation of the first graphical code associated with the first slide, which may then be scanned by any computing device (e.g., a mobile communications device) with a digital camera, QR code reader, bar code reader, or any other suitable optical scanning device. Scanning may involve capturing and either storing or reading information contained in a first graphical code. In an exemplary embodiment, a first of the plurality of mobile communications devices may be a smartphone associated with an audience member who uses the smartphone's digital camera to scan the first graphical code, such as a QR code, that may be embedded in a first slide. The smartphone device may then be operated to receive an input indicative of a first comment (discussed in detail below) and receive a pairing with the first graphical code captured from the first slide which may then transmit the data of the first comment over a network to the at least one processor.

A decryption of the first instance of the first graphical code, as used herein, may refer to a conversion of data associated with the first graphical code (e.g., a picture of the graphical code) captured by a computing device (e.g., a first of the plurality of mobile communications devices) into its original format (e.g., a link or file path). The original format of the first graphical code may be a plain text memory location, such as a repository. For example, a first of the plurality of mobile communications devices may be a mobile phone associated with an audience member who uses the mobile phone's digital camera to scan the first graphical code, such as a bar code, that may be embedded in a first slide. The mobile phone may then decrypt the first graphical code to transform the first graphical code into a plain text memory location (e.g., a repository or other storage location) associated with the first slide. The decryption of the first instance of the first graphical code and an associated first comment (discussed in detail below) may then be transmitted over a network to the at least one processor.

An associated first comment, as used herein, may refer to a comment linked, connected, joined, or coupled to either a first graphical code (corresponding to the first slide) captured from a first slide or a decryption of the first graphical code. As previously discussed, a comment may include text (e.g., alphanumerics), symbols, icons, emojis, images, or any other digital data object. In an exemplary embodiment, a first of the plurality of mobile communications devices may be a tablet associated with an audience member who uses the tablet's digital camera to scan the first graphical code, such as a QR code, that may be embedded in a first slide. The tablet may or may not then decrypt the first graphical code to transform the first graphical code into a plain text memory location (e.g., a repository or other storage location) associated with the first slide. The tablet may receive a first comment on the first slide from the audience member interacting with any of the tablet's interface components, such as a touchscreen or keyboard, and associate the first comment with the first graphical code or the decryption of the first graphical code. Associating the first comment with the first graphical code or the decryption of the first graphical code may be carried out by the at least one processor or a processor on the client device (e.g., the tablet). In the former scenario, the tablet may scan and subsequently decrypt the QR code, which may, for example, cause an interface (e.g., a new window) to be rendered on the tablet's display screen that may receive input (e.g., a first comment) and automatically store the received input with the underlying data associated with the QR code. In the latter scenario, the tablet may scan but not decrypt the QR code (e.g., capture an image of the QR code), and the client device may then associate an input (e.g., a first comment) with an image of the QR code. The tablet may transmit the image of the QR code (e.g., the first graphical code) captured from the first slide or the decryption of the first graphical code and the associated first comment over a network to the at least one processor. The at least one processor may then decrypt the image of the QR (e.g., to determine a repository location or to activate a link) to locate where to store the associated comment in a repository.

As used herein, receiving from a first of the plurality of mobile communications devices, a first instance of a first graphical code captured from a first slide during a presentation and an associated first comment on the first slide may refer to the at least one processor receiving a transmission of data and/or information, including an image of the first graphical code captured from a first slide (e.g., without decryption) and an associated first comment, over a network (e.g., a wired network or wireless network) from a first of the plurality of communications devices. In some embodiments, receiving may involve accepting instructions from other computing devices on a shared network (e.g., a presenter's device and an audience member's device on the same network in the same room) or across a remote network (e.g., audience member devices sending instructions remotely from home to a presenter's device during a conference call presentation). The at least one processor may then decrypt the image of the first graphical code received from a first of the plurality of mobile communications devices to determine a particular location in memory (e.g., a repository) to store the associated first comment. In some embodiments, after receiving an associated first comment on the first slide and decrypting the received first graphical code, the at least one processor may store the associated first comment in a first repository associated with the first slide of the presentation. This may occur as an additional step carried out by the at least one processor or alternatively, may be included in the instructions executed by the at least one processor when it receives a first instance of a first graphical code captured from a first slide during a presentation and an associated first comment on the first slide. Furthermore, in some embodiments, the at least one processor may assign descriptive metadata to an associated first comment to indicate that the associated first comment is comment-based data, which may facilitate the at least one processor in locating the associated second comment when performing a lookup and/or aggregating associated comments, as discussed in detail below.

As used herein, receiving from a first of the plurality of mobile communications devices, a decryption of the first instance of the first graphical code and an associated first comment on the first slide may refer to the at least one processor receiving a transmission of data and/or information, including a decryption of the first instance of the first graphical code (e.g., in the form of data or a link to access a data source location) and an associated first comment, over a network (e.g., a wired network or wireless network) from a first of the plurality of communications devices. In some embodiments, after receiving a decryption of the first instance of the first graphical code and an associated first comment on the first slide, the at least one processor may store the associated first comment in a first repository associated with the first slide of the presentation as a result of interpreting the decrypted first graphical code to locate and access the first repository. This may occur as an additional step carried out by the at least one processor or alternatively, may be included in the instructions executed by the at least one processor when it receives a first instance of a first graphical code captured from a first slide during a presentation and an associated first comment on the first slide. In addition, in some embodiments, the at least one processor may assign descriptive metadata to an associated first comment to indicate that the associated first comment is comment-based data, which may facilitate the at least one processor in locating the associated first comment when performing a lookup and/or aggregating associated comments, as discussed in detail below.

Figure 78:
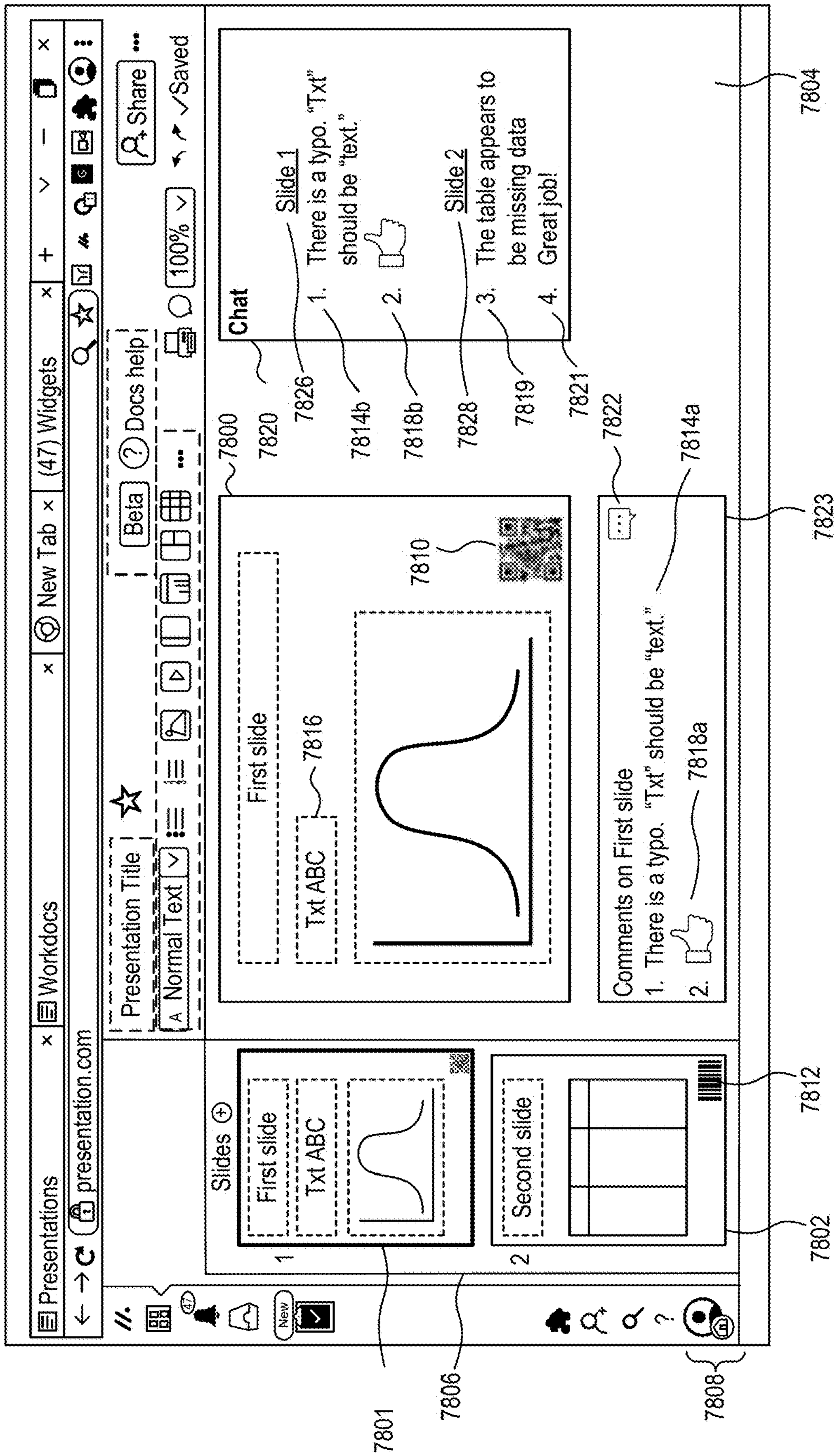
FIG. 78 illustrates an example of presentation slides, each containing a graphical code, consistent with some embodiments of the present disclosure.

By way of example, FIG. 78 illustrates an example of presentation slides, each containing a graphical code, consistent with some embodiments of the present disclosure. A first slide 7801 and a second slide 7802 may together be part of a deck 7806, which may be presented in a presentation interface 7804. The presentation interface 7804 may include an area 7806 that displays each of the slides in a deck as thumbnails for the first slide 7801 and for the second slide 7802. Additionally, the presentation interface 7804 may include an indication of a presenter 7808. The presenter 7808 may be presenting the first slide 7801 and second slide 7802 via the presentation interface 7804 on a computing device (e.g., computing device 100 of FIGS. 1 and 2). In this example, the presenter 7808 is currently presenting the first slide 7800 (on a main presenting window pane corresponding to thumbnail of first slide 7801). The first slide 7800 may include a graphical code 7810, which in this example is a QR code. During the presentation of the first slide 7800, a first of the plurality of mobile communications devices (e.g., user device 220-1 of FIG. 2), which may be a smartphone associated with an audience member who may scan the first graphical code 7810 on the first slide 7800 with the smartphone's digital camera. Once scanned, the smartphone may or may not decrypt the first graphical code 7810. The smartphone may receive a first comment from the audience member who may generate the comment by interacting with any of the smartphone's interface components, such as a touchscreen, keyboard, or microphone. The first comment may be associated with the first graphical code 7810 or a decryption of the first graphical code 7810. The smartphone may then transmit the image of the first graphical code 7810 or a decryption of the first graphical code 7810 (or otherwise activate a link or any other address decrypted from the first graphical code) and the associated first comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 7810 is decrypted (either by the first of the plurality of communication devices or by the at least one processor) to indicate a specific memory location, the associated first comment may be stored in the specific memory location—a first repository (e.g., repository 230-1 or in a repository located in the computing device 100 of FIG. 2) associated with the first slide 7800.

Aspects of this disclosure may further include receiving from a second of the plurality of mobile communications devices, a second instance of the first graphical code captured from the first slide during the presentation or a decryption of the second instance of the first graphical code, and an associated second comment on the first slide. Receiving from a second of the plurality of mobile communications devices, a second instance of a first graphical code captured from a first slide during a presentation and an associated second comment on the first slide may involve capturing an image of the first graphical code as discussed in detail above, which may be carried out similarly to the discussion above for the first of the plurality of mobile communications devices. Likewise, receiving from a second of the plurality of mobile communications devices, a decryption of the second instance of the first graphical code and an associated second comment on the first slide may involve decrypting and interpreting data associated with the first graphical code, which may be carried out similarly to the discussion above for the first of the plurality of mobile communications devices.

Referring again to FIG. 78, a first slide 7800 may include a graphical code 7810, which again in this example is a QR code. During a presentation of the first slide 7800, a second of the plurality of mobile communications devices (e.g., user device 220-2 of FIG. 2), which may be a tablet associated with an audience member who may scan the first graphical code 7810 on the first slide 7800 with the tablet's digital camera. Once scanned, the tablet may or may not decrypt the first graphical code 7810. The smartphone may receive a second comment from the audience member who may generate the comment by interacting with any of the tablet's interface components, such as a touchscreen or keyboard. The second comment may be associated with the first graphical code 7810 or a decryption of the first graphical code. The tablet may then transmit the first graphical code 7810 or a decryption of the first graphical code 7810 (or otherwise activate a link or any other address decrypted from the first graphical code) and the associated second comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 7810 is decrypted (either by the second of the plurality of communication devices or by the at least one processor) to indicate a specific memory location, the associated second comment may be stored in the specific memory location—a first repository (e.g., repository 230-1 or in a repository located in the computing device 100 of FIG. 2) associated with the first slide 7800.

Aspects of this disclosure may further include receiving from a third of the plurality of mobile communications devices, a first instance of a second graphical code captured from a second slide during the presentation or a decryption of the first instance of the second graphical code, and an associated third comment on the second slide. The term "third" (and later "fourth") as used herein is simply meant to distinguish one or more mobile communications devices from other devices, such as the first and second devices and is not meant to imply a particular fraction. Receiving from a third of the plurality of mobile communications devices, a first instance of a second graphical code captured from a second slide during a presentation and an associated third comment on the second slide may involve capturing an image of the second graphical code similar to capturing an image of the first graphical code as discussed in detail above, which may be carried out similarly to the discussion above for the first of the plurality of mobile communications devices. Likewise, receiving from a third of the plurality of mobile communications devices, a decryption of the first instance of the second graphical code and an associated third comment on the second slide may involve decrypting and interpreting data associated with the second graphical code, which may be carried out similarly to the discussion above for the first of the plurality of mobile communications devices.

Referring again to FIG. 78, a second slide 7802 may include a graphical code 7812, which in this example is a linear bar code. During a presentation of the second slide 7902 (shown in FIG. 78 as a thumbnail in area 7806), a third of the plurality of mobile communications devices (e.g., user device 220-3 of FIG. 2 (shown as **220-*n* as any number of additional user devices)), which may be a laptop that may be associated with an audience member and that may be coupled to a code scanner via a USB or BLUETOOTH™ connection. The audience member may scan the second graphical code 7812 on the second slide 7802 (when second slide 7802 is presented in the main window pane or as a thumbnail) with the code scanner. Once scanned and transmitted to the laptop, the laptop may or may not decrypt the second graphical code 7812. The laptop may receive a third comment from the audience member who may generate the comment by interacting with any of the laptop's interface components, such as a keyboard or mouse. The third comment may be associated with the second graphical code 7812 or a decryption of the second graphical code 7812. The laptop may then transmit the second graphical code 7812 or a decryption of the second graphical code 7812 (or otherwise activate a link or any other address decrypted from the second graphical code) and the associated third comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 7812 is decrypted (either by the third of the plurality of communication devices or by the at least one processor) to indicate a specific memory location, the associated third comment may be stored in the specific memory location—a second repository (e.g., repository 230-1 or in a repository located in the computing device 100 of FIG. 2) associated with the second slide 7802**.

Some disclosed embodiments may further include receiving from a fourth of the plurality of mobile communications devices, a second instance of the second graphical code captured from the second slide during the presentation or a decryption of the second instance of the second graphical code, and an associated fourth comment on the second slide. Receiving from a fourth of the plurality of mobile communications devices, a second instance of a second graphical code captured from a second slide during a presentation and an associated fourth comment on the second slide may involve capturing an image of the second graphical code similar to capturing an image of the first graphical code as discussed in detail above, which may be carried out similarly to the discussion above for the first of the plurality of mobile communications devices. Likewise, receiving from a fourth of the plurality of mobile communications devices, a decryption of the second instance of the second graphical code and an associated fourth comment on the second slide may involve decrypting and interpreting data associated with the second graphical code, which may be carried out similarly to the discussion above for the first of the plurality of mobile communications devices.

Receiving instances of graphical codes or decryptions of graphical codes from the plurality of mobile communications devices may occur simultaneously and at any time. For example, any number of devices may capture the first graphical code and associate a comment, as discussed earlier, when the first slide is actively being presented or at a later time after the first slide is presented (e.g., when the presenter moves on to presenting the second slide or even after the presentation is concluded). Even while some devices are receiving inputs for comments for the first slide, other devices during the same presentation may receive inputs at the same time for comments for the second slide. By associating comments with either an instance of a graphical code or a decryption of a graphical code, the processor may quickly receive and store all of the comments to the respective locations in the repository for each particular slide in a deck of slides in a presentation.

Referring again to FIG. 78, a second slide 7802 may include a graphical code 7812, which again in this example is a linear bar code. During a presentation of the second slide 7902 (shown in FIG. 78 as a thumbnail in area 7806), a fourth of the plurality of mobile communications devices (e.g., user device 220-4 of FIG. 2 (shown as **220-*n* as any number of additional user devices)), which may be a smartwatch that may be associated with an audience member who may scan the second graphical code 7812 on the second slide 7802 with the smartwatch's digital camera. Once scanned, the smartwatch may or may not decrypt the second graphical code 7812. The smartwatch may receive a fourth comment from the audience member who may generate the comment by interacting with any of the smartwatch's interface components, such as buttons or a touchscreen. The fourth comment may be associated with the second graphical code 7812 or a decryption of the second graphical code 7812. The smartwatch may then transmit the second graphical code 7812 or a decryption of the second graphical code 7812 (or otherwise activate a link or any other address decrypted from the second graphical code) and the associated fourth comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 7812 is decrypted (either by the fourth of the plurality of communication devices or by the at least one processor) to indicate a specific memory location, the associated fourth comment may be stored in the specific memory location—a second repository (e.g., repository 230-1 or in a repository located in the computing device 100 of FIG. 2) associated with the second slide 7802**.

Aspects of this disclosure may further include performing a lookup associated with the first graphical code, to identify a first repository associated with the first slide of the presentation. Performing a lookup associated with the first graphical code, as used herein, may refer to an action, process, or instance of retrieving, accessing, and/or searching for data and/or information in a memory location identified by the decrypted first graphical code. The lookup may locate (i.e., identify) a first repository storing data associated with the first slide of the presentation. As used herein, a first repository associated with the first slide of the presentation may refer to a storage medium or specific location in a storage medium where data and/or information associated with the first slide of the presentation is stored. Data and/or information associated with the first slide of the presentation may include objects, text, comments, charts, graphs, graphical user interfaces, videos, animations, iframes, and/or any other representations of data or information associated with the first slide. A first repository may be a relational database, a data warehouse, a data mart, an operational data store, shared data store, cloud storage, or any other central location in which data and/or information associated with the first slide is stored and managed. Furthermore, a first repository may be a remote repository accessible through a network or may be a local repository hosted by a computing device associated with one or more presenters. In some exemplary embodiments, the at least one processor may automatically perform a lookup in response to the at least one processor receiving a first and/or second instance of the first graphical code (or a decryption of the first and/or second instance of the first graphical code) and an associated first and/or second comment on the first slide from the first or second of the plurality of mobile communications devices, respectively, as discussed above. In other exemplary embodiments, one or more presenters may manually instruct the at least one processor to perform the lookup. For example, a presenter may select with an input device (such as a mouse) an interactive component of the presentation interface to initiate the performing a lookup step. The at least one processor may perform an additional lookup, for example, in a data structure containing permissions, to determine whether the presenter has permission to initiate the performing a lookup step.

By way of example, FIG. 2 illustrates a block diagram of an exemplary computing architecture, consistent with some embodiments of the present disclosure. The at least one processor may interpret a decrypted first graphical code (such as the first graphical code 7810 of FIG. 78) to identify a first repository (remote repository 230-1 or in a repository located in the computing device 100) associated with a first slide of the presentation to retrieve, access, and/or search for data and/or information contained in the first repository.

Aspects of this disclosure may further include aggregating the first comment and the second comment in the first repository. Aggregating the first comment and the second comment in the first repository may involve locating, gathering, compiling, collecting, combining, associating, and/or organizing the first comment and second comment and storing the data associated with both in memory in the same location or in associated locations (e.g., in the first repository). Associated locations may be disbursed within a server, a collection of collocated servers, or distributed servers. Thus, a repository, as used herein, does not necessarily mean that all related data is stored in the same location.

For example, the at least one processor may perform a lookup within the first repository to search and locate the first and second comments and then associate the first comment with the second comment, as discussed in below. The at least one processor may locate the first comment and second comment, for example, based on descriptive metadata assigned to each comment indicating that the comments are comment-based data and both associated with the first slide. In some embodiments, after locating the first comment and second comment in the first repository, the at least one processor may associate or link the first and second comments by, for example, assigning a common code, address, or other designation to the first comment and the second comment to indicate that both comments are associated with data from the first slide. In other embodiments, the at least one processor may sort or organize the first comment and second comment within the first repository in a manner that will enable efficient retrieval for displaying or further processing of the first and second comments when the processor receives instructions to transmit all data regarding the first slide (e.g., instructions from a presenter requesting to access and view all of the comments associated with the first slide).

Some disclosed embodiments may further include performing a lookup associated with a second graphical code, to identify a second repository associated with a second slide of a presentation. Performing a lookup associated with the second graphical code, to identify a second repository associated with the second slide of the presentation may be carried out similarly to the discussion above for performing a lookup associated with the first graphical code, but to identify a second repository associated with the second slide of the presentation. In some embodiments, the first repository and the second repository may be distinct repositories, and in other embodiments, the first repository and second repository may be separate dedicated memory spaces in the same repository (e.g., the same repository location or a common file, as discussed in detail below). Furthermore, in some embodiments, performing the lookup associated with the second graphical code may be carried out following performing the lookup associated with the first graphical code in response to a single instruction (e.g., the presenter sends instructions to view all comments associated with the first and second slides to cause the processor to perform a lookup of both the first and second graphical code). In other embodiments, performing the lookup associated with the second graphical code may be carried out only after the processor receives a second set of instructions to perform the lookup associated with the second graphical code, independently from the instructions to perform the lookup associated with the first graphical code, as described above.

By way of example, FIG. 2 illustrates a block diagram of an exemplary computing architecture, consistent with some embodiments of the present disclosure. The at least one processor may read a decrypted second graphical code (such as the second graphical code 7812 of FIG. 78) to identify a second repository (remote repository 230-1 or in a repository located in the computing device 100) associated with a second slide of the presentation to retrieve, access, and/or search for data and/or information contained in the second repository.

Some disclosed embodiments may further include aggregating the third comment and the fourth comment in the second repository. Aggregating the third comment and the fourth comment in the second repository may be carried out similarly to the discussion above for aggregating the first comment and the second comment in the first repository.

In some embodiments, a first repository and a second repository may constitute separate portions of a common file. A common file, as used herein, may refer to a single collection of digital data associated with presentation slides within a deck, stored as a unit in a local or remote repository. A common file may also be stored in a disbursed manner, across servers in one or more locations. Separate portions of a common file may refer to subsections of a local or remote repository associated with the common file. For example, a single local or remote repository associated with a common file may be divided into two or more subsections. One subsection within the local or remote repository may store data and/or information associated with the first slide of the presentation, and another subsection within the local or remote repository may data and/or information associated with the second slide of the presentation.

By way of example, FIG. 2 illustrates a block diagram of an exemplary computing architecture, consistent with some embodiments of the present disclosure. A common file may, for example, be stored in a remote repository 230-1 or in a repository located in the computing device 100. If the common file is stored in a remote repository 230-1 for example, the repository 230-1 may include separate areas or subsections, such that data and/or information associated with a first slide of the presentation is stored separately from data and/or information associated with a second slide of the presentation.

Aspects of this disclosure may further include displaying to a presenter of a deck, a first comment and a second comment in association with a first slide. A presenter of the deck, as used herein, may refer to an entity who may be an author or owner of a presentation file or any other electronic document that may be presented. An entity may refer to an individual, a device, a team, an organization, a group, a department, a division, a subsidiary, a company, a contractor, an agent or representative, or any other thing with independent and distinct existence. A presenter of the deck may be an entity that was given access to the deck through permission settings or an activatable link. Displaying to a presenter of the deck, the first comment and the second comment, as used herein, may include retrieving the first and second comments from at least one repository, and causing the information in the first and second comments to be rendered on a display associated with a presenter, such as on a screen, other surface, through a projection, or in a virtual space associated with the presenter of a deck. This may occur via a display screen associated with the presenter's computing device (e.g., PC, laptop, tablet, projector, cell phone, or personal wearable device), which may or may not be the same computing device used to present the deck. The first comment and the second comment may also be presented virtually through AR or VR glasses, or through a holographic display. Other mechanisms of presenting may also be used to enable the presenter of the deck to visually comprehend the first comment and the second comment. Furthermore, displaying to a presenter of the deck, the first comment and the second comment may occur in real-time during the presentation, at the conclusion of the presentation, or in response to the presenter requesting a display of the first comment and the second comment. The first comment and the second comment may be arranged on a display associated with a presenter according to timestamps, which may be stored as metadata, associated with each comment. The timestamps may or may not be displayed in conjunction with their respective comment. Additionally, the first and second comment may only be viewable to a presenter of the deck or may also be viewable to one or more of the audience members.

Displaying to a presenter of the deck, the first comment and the second comment in association with the first slide may refer to displaying the first comment and the second comment in connection with or together with the first slide via any methods previously discussed. In some embodiments, the first comment and the second comment may be displayed on the first slide in a rendered display, or next to each other in a co-presentation. In other embodiments, the first comment and the second comment may be displayed in any other area of a presentation program interface (e.g., a comment box displayed below the first slide, a new window, or a pop-up) when the first slide within a deck is displayed. In further embodiments, the first comment and the second comment may be displayed on a device distinct from the device used to present the first slide via a presentation program. For example, the first and second comment may be displayed on a first computing device (e.g., a tablet) or VR/AR glasses associated with the presenter when the presenter accesses or selects the first slide via a presentation program on a second computing device (e.g., a PC). Displaying to a presenter of the deck, the first comment and the second comment in association with the first slide may further involve a presenter accessing the deck by retrieving the deck from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the deck may retrieving the deck from a web browser cache. Additionally, or alternatively, accessing the deck may include accessing a live data stream of the deck from a remote source. In some embodiments, accessing the deck may include logging into an account having a permission to access the deck. For example, accessing the deck may be achieved by interacting with an indication associated with the deck, such as an icon or file name, which may cause the system to retrieve (e.g., from a storage medium) a particular deck associated with the indication.

Referring again to FIG. 78, a presenter 7808 may be presenting a deck via a presentation interface 7804 on a computing device (e.g., computing device 100 of FIGS. 1 and 2). The deck may include a first slide 7800, which the presenter 7808 may be presenting. The first slide 7800 may include a graphical code 7810, which in this example is a QR code.

A first of the plurality of mobile communications devices (e.g., user device 220-1 of FIG. 2) may be a smartphone associated with an audience member who may scan the first graphical code 7810 on the first slide 7800 with the smartphone's digital camera. Once scanned, the smartphone may or may not decrypt the first graphical code 7810. The smartphone may receive a first comment 7814*a* from the audience member. The first comment 7814*a* may be text reading "There is a typo. 'Txt' should be 'Text,'" referring to the text string 7816 on the first slide 7800. The smartphone may then transmit the first graphical code 7810 (or a decryption of the first graphical code 7810) and the associated first comment 7814*a* to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 7810 is decrypted (either by the first of the plurality of communication devices or by the at least one processor) to indicate a specific memory location, the associated first comment 7814*a* may be stored in the specific memory location—a first repository (e.g., repository 230-1 or in a repository located in the computing device 100 of FIG. 2) associated with the first slide 7800.

A second of the plurality of mobile communications devices (e.g., user device 220-2 of FIG. 2), which may be a tablet associated with an audience member who may scan the first graphical code 7810 on the first slide 7800 with the tablet's digital camera. Once scanned, the tablet may or may not decrypt the first graphical code 7810. The tablet may receive a second comment 7818*a* from the audience member. The second comment 7818*a* may be a thumbs up icon (e.g., an emoji). The tablet may then transmit the first graphical code 7810 (or a decryption of the first graphical code 7810) and the associated second comment 7818*a* to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 7810 is decrypted (either by the second of the plurality of communication devices or by the at least one processor) to indicate a specific memory location, the associated second comment 7818*a* may be stored in the specific memory location—a first repository (e.g., repository 230-1 or in a repository located in the computing device 100 of FIG. 2) associated with the first slide 7800.

The presenter 7808 may select an icon 7822 in the presentation interface 7804 to instruct the at least one processor (e.g., processing circuitry 110 of computing device 110 of FIG. 1) to collect all of the comments received regarding the first slide 7800, which may cause the at least one processor to perform a lookup and aggregate the first comment 7814*a* and second comment 7818*a*. In response to performing a lookup and aggregating the first comment 7814*a* and the second comment 7818*a*, the at least one processor may then display to the presenter of the deck the first comment 7814*a* and the second comment 7818*a* in comment box 7823, which may or may not also be visible to one or more audience members.

Aspects of this disclosure may further include displaying to the presenter of the deck, the third comment and the fourth comment in association with the second slide. Displaying to the presenter of the deck, the third and the fourth comment in association with the second slide may be carried out similarly to the discussion above for displaying to the presenter of the deck, the first and the second comment in association with the first slide.

Referring again to FIG. 78, a presenter 7808 may be presenting a deck via a presentation interface 7804 on a computing device (e.g., computing device 100 of FIGS. 1 and 2). The deck may include a second slide 7802 (shown in FIG. 78 as a thumbnail in area 7806). The second slide 7802 may include a graphical code 7812, which in this example is a linear bar code.

A third of the plurality of mobile communications devices (e.g., user device 220-3 of FIG. 2 (shown as 220-*n* as any number of additional user devices)), which may be a mobile phone associated with an audience member who may scan the second graphical code 7812 on the second slide 7802 (when presented by the presenter 7808) with the mobile phone's digital camera. Once scanned, the mobile phone may or may not decrypt the second graphical code 7812. The mobile phone may receive a third comment 7819 (shown here in a chat box 7820, which is explained in detail below and may or may not be included in the presentation interface 7804) from the audience member. The third comment 7819 may be text reading "The table appears to be missing data." The mobile phone may then transmit an image of the second graphical code 7812 (or a decryption of the second graphical code 7812) and the associated third comment 7819 to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 7812 is decrypted (either by the third of the plurality of communication devices or by the at least one processor) to indicate a specific memory location, the associated third comment 7819 may be stored in the specific memory location—a second repository (e.g., repository 230-1 or in a repository located in the computing device 100 of FIG. 2) associated with the second slide 7802.

A fourth of the plurality of mobile communications devices (e.g., user device 220-4 of FIG. 2 (shown as **220-*n* as any number of additional user devices)) may be a smartwatch (or any other device) associated with an audience member who may scan the second graphical code 7812 on the second slide 7802 (when presented by the presenter 7808) with the smartwatch's digital camera. Once scanned, the smartwatch may or may not decrypt the second graphical code 7812. The smartwatch may receive a fourth comment 7821 (shown here in a chat box 7820, which is explained in detail below and may or may not be included in the presentation interface 7804) from the audience member. The fourth comment 7821 may be text reading "Great job!" The smartwatch may then transmit an image of the second graphical code 7812 (or a decryption of the second graphical code 7812) and the associated fourth comment 7821 to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 7812 is decrypted (either by the second of the plurality of communication devices or by the at least one processor) to indicate a specific memory location, the associated fourth comment 7821 may be stored in the specific memory location—a second repository (e.g., repository 230-1 or in a repository located in the computing device 100 of FIG. 2) associated with the second slide 7802**.

When the presenter 7808 presents the second slide 7802, the presenter 7808 may select an icon similar to activatable icon 7822 in the presentation interface 7804 to instruct the at least one processor (e.g., processing circuitry 110 of computing device 110 of FIG. 1) to perform a lookup and aggregate the third comment 7819 and fourth comment 7821. In response to performing a lookup and aggregating the third comment and the fourth comment, the at least one processor may then display to the presenter of the deck the third comment 7819 and the fourth comment 7821 in a comment box similar to comment box 7823, which may or may not also be visible to one or more audience members.

In some embodiments, the at least one processor may be configured to display in real time to a presenter during a presentation at least one of a first comment, a second comment, a third comment, and a fourth comment. Displaying comments to a presenter in real time during a presentation may include the at least one processor rendering (via any methods previously discussed for displaying to a presenter of the deck the first comment and second comment) at least one of the first comment, the second comment, the third comment, or the fourth comment at the same time while the presenter is transmitting information from an electronic file (e.g., a presentation slide deck to an audience member in the same room, or via an associated computing device of at least one audience member that is on a remote network). This may occur within milliseconds, seconds, or another predetermined interval of the at least one processor receiving from one of the plurality of mobile communications devices a graphical code and an associated comment, or a decryption of a graphical code and an associated comment. For example, the at least one processor may receive from a second of the plurality of mobile communications devices, a second instance of a first graphical code captured from a first slide during a presentation and an associated second comment. The at least one processor may then perform additional processing operations, such as any of the processing operations previously discussed and discussed further below. The at least one processor, in this example, may then display to the presenter the associated second comment while the presenter is presenting the first slide (or a subsequent slide if the at least one processor receives from the second of the plurality of the mobile communications devices, the first graphical code and the associated second comment after the presenter has advanced the deck to a subsequent slide). The associated second comment may be displayed in association with the first slide, as previously discussed, or may be displayed in a chat, as discussed in detail below.

Referring again to FIG. 78, a presenter 7808 may be presenting a deck via a presentation interface 7804 on a computing device (e.g., computing device 100 of FIGS. 1 and 2). The deck may include a first slide 7800, which the presenter 7808 is currently presenting. The first slide 7800 may include a graphical code 7810, which in this example is a QR code. A first of the plurality of mobile communications devices (e.g., user device 220-1 of FIG. 2), which may be a smartphone associated with an audience member who may scan the first graphical code 7810 on the first slide 7800 with the smartphone's digital camera. Once scanned, the smartphone may or may not decrypt the first graphical code 7810. The smartphone may receive a first comment **7814*a* from the audience member. The first comment 7814*a* may be text reading "There is a typo. 'Txt' should be 'Text,'" referring to the text string 7816 on the first slide 7800. The smartphone may then transmit the first graphical code 7810 (or a decryption of the first graphical code 7810) and the associated first comment 7814*a* to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 7810 is decrypted (either by the first of the plurality of communication devices or by the at least one processor) to indicate a specific memory location, the associated first comment 7814*a* may be stored in the specific memory location—a first repository (e.g., repository 230-1 or in a repository located in the computing device 100 of FIG. 2) associated with the first slide 7800. The at least one processor may then retrieve from memory and output signals to cause a display to render information to the presenter 7808, such as information from the associated first comment 7814*a*, either in a comment box 7823 or a chat box 7820 or any other visual rendering of this information. In this example, other comments (e.g., a second comment 7818*a*) would not be displayed in the comment box 7823 or in the chat box 7820, as the system has not yet received other comments. The at least one processor may perform the operations described in this example in milliseconds, seconds, or based on a predetermined interval, such that the first comment 7814***a* is displayed to the presenter 7808 in real-time or near real-time.

In some other embodiments, at least one processor may be further configured to aggregate a first comment, a second comment, a third comment, and a fourth comment into a common electronic word processing document. A common electronic word processing document may refer to any digital file that may provide for input, editing, formatting, display, and output of text (e.g., alphanumerics) and other content, such as graphics, widgets, objects, tables, links, animations, dynamically updated elements, or any other data object that may be used in conjunction with the digital file. A common electronic word processing document may not be limited to only digital files for word processing but may include any other processing document such as presentation slides, tables, databases, graphics, sound files, video files or any other digital document or file. Furthermore, an electronic word processing document may be a collaborative document or a non-collaborative document. A collaborative electronic word processing document may, for example, be generated in or uploaded to a common online platform (e.g., a website) to enable multiple members of a team to simultaneously view and edit the document. A non-collaborative electronic word processing document, as used herein, may refer to any document that only a single entity may modify, prepare, and edit at a time. The single entity may share the non-collaborative document with other entities (e.g., an end-user or audience) to enable the other entities to view or edit the same document. Aggregating the first comment, the second comment, the third comment and the fourth comment into a common electronic word processing document, as used herein, may refer to locating and retrieving the underlying data of the first comment, the second comment, the third comment, and the fourth comment, and storing these comments in a common electronic word processing document. The at least one processor may execute instructions, such as code in source code format, binary code format, executable code format, or any other suitable format of code, to locate, retrieve, and store the first comment the second comment, the third comment, and the fourth comment in a common electronic word processing document. This may involve the at least one processor accessing the first repository associated with the first slide of the presentation to locate and retrieve the first comment and the second comment and accessing the second repository associated with the first slide of the presentation to locate and retrieve the third comment and the fourth comment. In some embodiments, the at least one processor may locate the first comment, the second comment, the third comment, and the fourth comment based on descriptive metadata assigned to each comment indicating that the comments are comment-based data. The at least one processor may then store the retrieved first comment, second comment, third comment, and fourth comment in the common electronic word processing document. In some embodiments, common electronic word processing document may be a new document generated by the at least one processor. In other embodiments, the common electronic word processing document may be an existing document. For example, the at least one processor may migrate the first comment, the second comment, the third comment, and the fourth document from one file location (e.g., the presentation file) to another file location (e.g., an existing common electronic word processing document file). Furthermore, the common electronic word processing document may display the identical first, second, third, and fourth comments, may display a summary or altered version of these comments, or may display the identical comment for some comments and a summary or altered version for others. Additionally, the common electronic word processing document may or may not include additional information, such as, for example, headings identifying the slide from which the first, second, third, or fourth comment is associated with and/or timestamps referencing the time at which the at least one processor received the respective comment. Furthermore, the first comment, the second comment, the third comment, and the fourth comment may be organized within the common electronic word processing document in any manner. For example, the first and second comment may be displayed in one column of a table, while the third and fourth comment may be displayed in a second column of the same table. In another example, the first and second comment may be included in a first page of the common electronic word processing document, while the third and fourth comment may be displayed in a second page of the common electronic word processing document. In yet another example, the comments may be arranged in chronological order according to timestamps, which may be stored as metadata associated with each comment.

Figure 79:
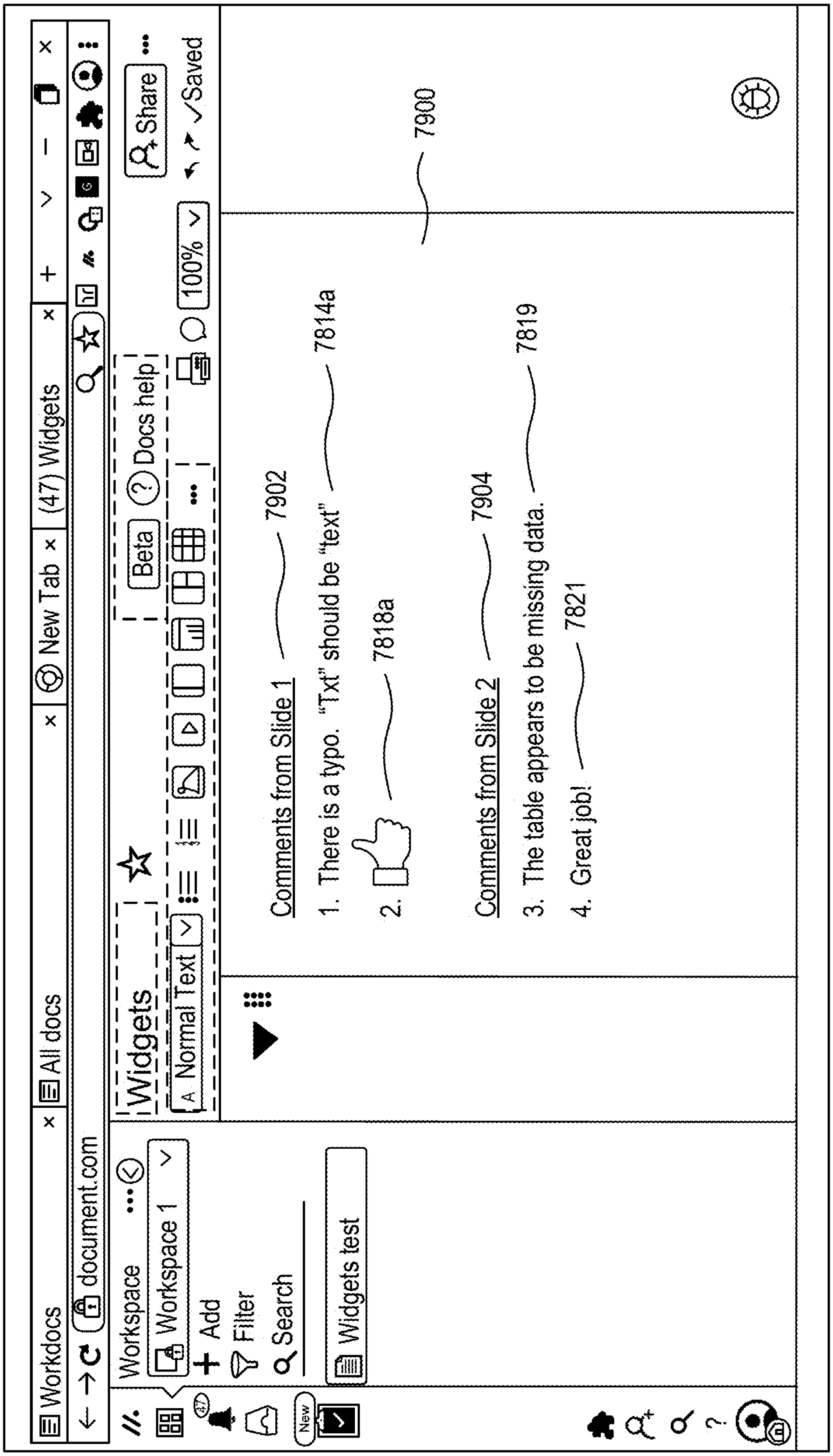
FIG. 79 illustrates an example of an electronic word processing document presenting comments on presentation slides within a deck, consistent with some embodiments of the present disclosure.

By way of example, FIG. 79 illustrates an example of an electronic word processing document 7900 presenting comments 7814*a*, 7818*a*, 7819, and 7821 on presentation slides 7800 and 7802 (from FIG. 78), consistent with some embodiments of the present disclosure. The electronic word processing document 7900 may display comments first comment 7814*a*, the second comment 7818*a*, the third comment 7819, and the fourth comment 7821, corresponding to comments on slides 7800 and 7802 that the at least one processor received from a respective one of the plurality of mobile communications devices. The electronic word processing document may include heading 7902, "Comments from Slide 1," and heading 7904, "Comments from Slide 2." The first comment 7814*a* and the second comment 7818*a* from the first slide 7800 may be displayed under heading 7902, and the third comment 7819 and the fourth comment 7821 may be displayed under heading 7904.

In other embodiments, at least one processor may be further configured to present a first comment, a second comment, a third comment, and a fourth comment in a chat during a presentation. A chat during a presentation, as used herein, may refer to a dedicated portal for exchanges of messages between one or more entities during the presentation in real-time or real-near time, which may be rendered in at least a portion of a screen to present the messages exchanged during a time frame. The messages may include the first comment, the second comment, the third comment, and the fourth comment received by the at least one processor from the respective mobile communications devices. The messages may further include other comments, such as comments from one or more presenters of the presentation slides within a deck and/or further comments received by the at least one processor from one or more audience members over a network (e.g., a wired network or wireless network). Presenting the first comment, the second comment, the third comment and the fourth comment in a chat during the presentation may involve the at least one processor displaying (via any method previously discussed for displaying to a presenter of the deck the first comment and second comment) a chat interface containing the information associated with each comment during the presentation. The chat interface may be visible to one or more presenters, one or more audience members, a combination thereof, or all presenters and all audience members. In some embodiments, the chat interface may be a chat box embedded in a presentation interface presenting the slides within a deck. In other embodiments, the chat interface may be a pop-up, a new window, or any other presentation of messages that include at least the first comment, the second comment, the third comment, and the fourth comment. Furthermore, presenting the first comment, the second comment, the third comment, and the fourth comment in a chat during the presentation may occur in real or near-real time. For example, the at least one processor may display in a chat interface a first comment within milliseconds, seconds, or another predetermined interval of receiving the first of the plurality of mobile communications devices. In some embodiments, the first comment, the second comment, third comment, and fourth comment (and any other messages) may be arranged in the chat interface in chronological order according to a timestamp associated with the respective comment or message. The timestamp may be metadata representing the time at which the at least one processor received the respective comment or message. The timestamps may or may not also be displayed with their respective comment or message in the chat interface. In further embodiments, the chat interface may include headings identifying the slide from which the first, second, third, or fourth comments are associated with. Furthermore, in some embodiments, the at least one processor may be configured to display each of the first comment, second comment, third comment, and fourth comment (and any other messages) in the chat interface for a predetermined time. For example, at least one processor may display a comment or message for ten seconds, at which point the comment or message may disappear from the chat interface. In other embodiments, the at least one processor may continually display a comment or message in a chat interface until receiving an instruction, via an interaction from an entity, to close the presentation file, or to clear or delete one or more comments or messages from the chat interface. In yet further embodiments, the at least one processor may store the chat in a repository for later retrieval by an entity, such as a presenter.

Referring again to FIG. 78, the presentation interface 7804 may include a chat box 7820 rendered on a display. In this example, the presenter 7808 may be presenting the first slide 7800. As previously discussed, the at least one processor (e.g., processing circuitry 110 of computing device 110 of FIG. 1) may receive from a first of a plurality of mobile communications devices a first instance of a first graphical code 7810 (or a decryption of the first graphical code 7810) and an associated first comment 7814*b*. Once the at least one processor receives the first comment 7814*b*, it may display this comment 7814*b* in the comment box 7820 under the heading 7826, "Slide 1." Similarly, while the presenter 7808 is presenting the first slide 7800, the at least one processor may subsequently receive and display a second comment 7818*b* in the comment box 7820 under the heading 7826, "Slide 1." When the presenter 7808 advances slides within the deck to present the second slide 7802, the chat box 7820 may still be displayed in the presentation interface 7804. The at least one processor may then receive from a third of a plurality of mobile communications devices a first instance of a second graphical code 7812 (or a decryption of the second graphical code 7812) and an associated third comment 7819. Once the at least one processor receives the third comment 7819, it may display this comment 7819 in the comment box 7820 under the heading 7828, "Slide 2." Similarly, while the presenter 7808 is presenting the second slide 7802, the at least one processor may subsequently receive and display a fourth comment 7821 in the comment box 7820 under the heading 7828, "Slide 2."

In some further embodiments, at least one processor may be configured to cause a first portion of a chat containing a first comment and a second comment to be co-presented in association with a first slide and to cause a second portion of the chat containing a third comment and a fourth comment to be co-presented in association with a second slide. Causing a first portion of the chat containing the first comment and the second comment to be co-presented in association with the first slide may involve displaying (via any method previously discussed for displaying to a presenter of the deck the first comment and second comment) the first comment and second comment in a chat interface when the first slide within the deck is displayed at the same time. This may occur during the presentation (i.e., while the presenter is presenting information from the first slide) or may occur after the presentation when the presenter or other entity access a deck containing the first slide and selects the first slide for display. When another slide (e.g., the second slide) within a deck is displayed, the co-presentation of the first comment and the second comment may or may not disappear from the chat interface, such as to only display comments associated with the other slide (e.g., the second slide). Causing a second portion of the chat containing the third comment and the fourth comment to be co-presented in association with the second slide may be carried out similarly to the discussion above for the first portion of the chat.

Referring again to FIG. 78, a presenter 7808 may present a first slide 7800 via a presentation interface 7804. The presentation interface 7804 may include a chat box 7820. The at least one processor (e.g., processing circuitry 110 of computing device 110 of FIG. 1) may display a first portion of the chat interface 7820 containing a co-presentation of a first comment 7814*b* and a second comment 7818*b*, received from a first and second of the mobile communications devices respectively, under a heading 7826, "Slide 1." In this example, a third comment 7819 and a fourth comment 7821 under a heading 7828, "Slide 2," may not be visible as the at least one processor may have not yet received these comments. When the presenter 7808 advances slides within the deck to present a second slide 7802, the at least one processor may display a second portion of the chat interface 7820 containing a co-presentation of a third comment 7819 and a fourth comment 7821, received from a third and fourth of the mobile communications devices respectively, under a heading 7828, "Slide 2." While the second slide 7802 is displayed, the co-presentation of the first comment 7814*b* and the second comment 7818*b* under the heading 7826, "Slide 1," may or may not be displayed with the co-presentation of the third comment 7819 and the fourth comment 7821, under the heading 7828, "Slide 2," in the chat box 7820.

Figure 80:
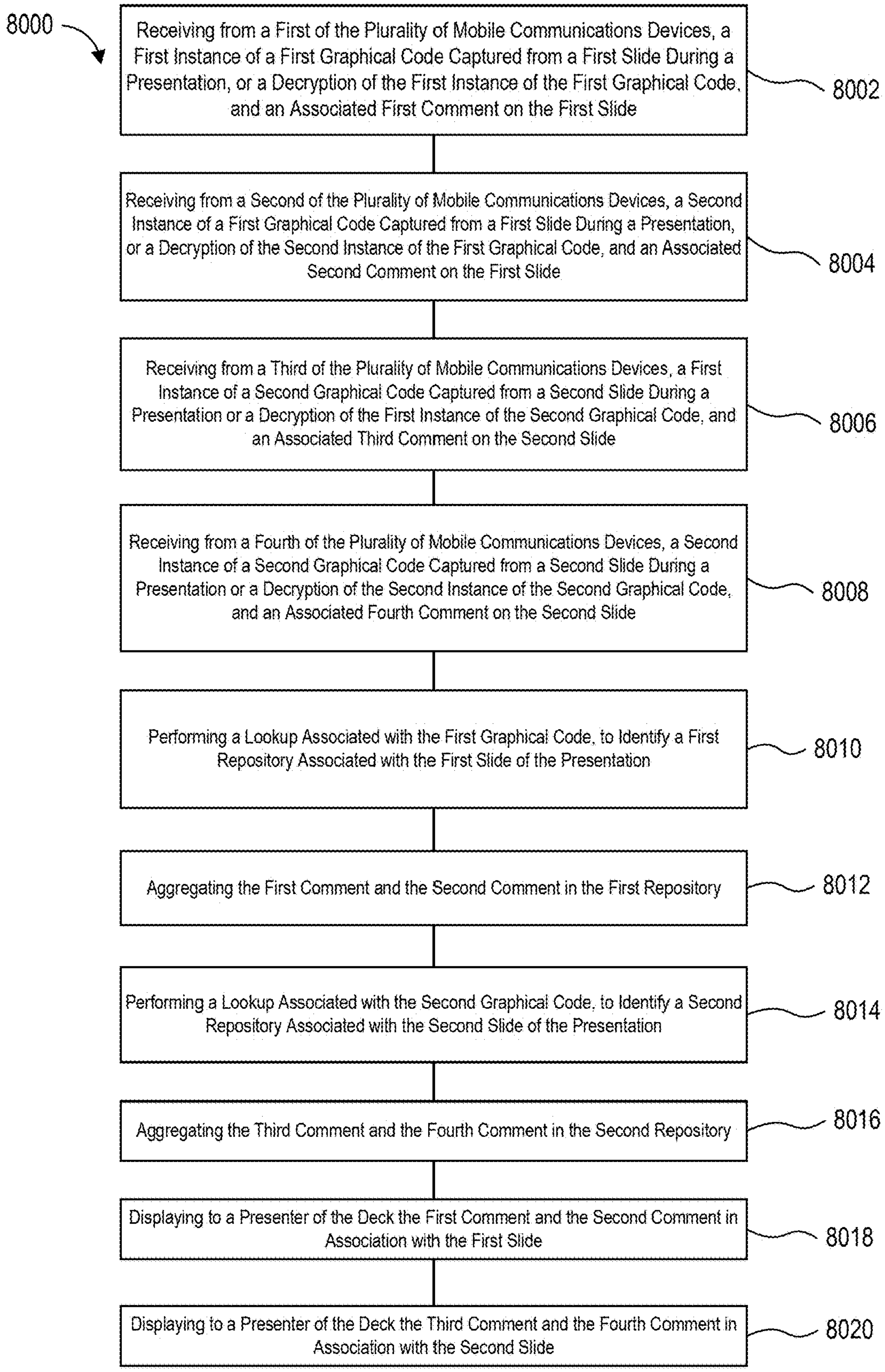
FIG. 80 illustrates a block diagram of an exemplary method performed by a processor of a computer readable medium containing instructions, consistent with some embodiments of the present disclosure.

FIG. 80 illustrates a block diagram for an exemplary method for enabling a plurality of mobile communications devices to be used in parallel to comment on presentation slides within a deck. Method 8000 may begin with process block 8002 by receiving from a first of the plurality of mobile communications devices, a first instance of a first graphical code captured from a first slide during a presentation, or a decryption of the first instance of the first graphical code, and an associated first comment on the first slide, as previously discussed. At block 8004, method 8000 may include receiving from a second of the plurality of mobile communications devices, a second instance of a first graphical code captured from a first slide during a presentation, or a decryption of the second instance of the first graphical code, and an associated second comment on the first slide, consistent with the disclosure above. At block 8006, method 8000 may include receiving from a third of the plurality of mobile communications devices, a first instance of a second graphical code captured from a second slide during a presentation or a decryption of the first instance of the second graphical code, and an associated third comment on the second slide, as previously discussed. At block 8008, method 8000 may include receiving from a fourth of the plurality of mobile communication devices, a second instance of a second graphical code captured from a second slide during a presentation or a decryption of the second instance of the second graphical code, and an associated fourth comment on the second slide, consistent with the disclosure above. At block 8010, method 8000 may include performing a lookup associated with the first graphical code, to identify a first repository associated with the first slide of the presentation, consistent with the disclosure above. At block 8012, method 8000 may include aggregating the first comment and the second comment in the first repository, as previously discussed. At block 8014, method 8000 may include performing a lookup associated with the second graphical code, to identify a second repository associated with the second slide of the presentation, consistent with the disclosure above. At block 8016, method 8000 may include aggregating the third comment and the fourth comment in the second repository, consistent with the disclosure above. At block 8018, method 8000 may include displaying to a presenter of the deck the first comment and the second comment in association with the first slide, consistent with the disclosure above. At block 8020, method 8000 may include displaying to a presenter of the deck the third comment and the fourth comment in association with the second slide, as discussed above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

accessing the electronic word processing document;

opening the electronic word processing document within an electronic word processing application;

accessing the electronic non-word processing application, the electronic non-word processing application including at least one of a communications interface, a graphics presentation editor, a graphing application, or a portal to a third-party application;

wherein the electronic non-word processing application is configured to perform functionality in response to inputs;

embedding the electronic non-word processing application within the electronic word processing application in a manner enabling non-word processing functionality to occur from within the electronic word processing application;

while the electronic non-word processing application is displayed within the electronic word processing application, receiving at least one of the inputs;

in response to receiving at least one of the inputs, causing functionality of the non-word processing application to be displayed within the electronic word processing document presented by the electronic word processing application;

storing the electronic word processing document with the electronic non-word processing application embedded therein to thereby enable multiple entities accessing the electronic word processing document to achieve the functionality of the electronic non-word processing application from within the electronic word processing document;

wherein the electronic non-word processing functionality that occurs within the electronic word processing document includes at least one of sending or receiving data over a network;

wherein embedding the electronic non-word processing application includes displaying a functional instance of the electronic non-word processing application interlineated between text of the electronic word processing document;

in response to a scrolling command, scrolling within the electronic word processing document such that a functional instance of the electronic non-word processing application scrolls together with text within the electronic word processing document;

wherein embedding the electronic non-word processing application includes presenting the electronic non-word processing application in a module window;

wherein the module window is linked to a location within the electronic word processing document, such that during scrolling through the electronic word processing document, the module window scrolls with text of the electronic word processing document;

wherein the electronic word processing document is divided into a plurality of blocks, each block having at least one separately adjustable permission setting;

wherein, when the electronic non-word processing application is embedded within a particular block, access to the electronic non-word processing application is restricted to entities possessing permission for access to the particular block;

accessing an electronic word processing document;

displaying an interface presenting at least one tool for enabling an author of the electronic word processing document to define an electronic rule triggered by an external network-based occurrence;

receiving, in association with the electronic rule, a conditional instruction to edit the electronic word processing document in response to the external network-based occurrence;

detecting the external network-based occurrence;

in response to the detection of the external network-based occurrence, implementing the conditional instruction and thereby automatically edit the electronic word processing document;

accessing an internet communications interface;

wherein the external network-based occurrence includes a change to an internet web page;

pulling data from the internet web page and inserting the pulled data into the electronic word processing document;

wherein in displaying the at least one interface, presenting a logical template for constructing the electronic rule, the logical template including at least one field for designating the external source;

wherein the instruction to edit includes at least one of adding text, modifying text, deleting text, rearranging text, adding a graphic within text, inserting video within text, inserting an image within text, or inserting audio information within text;

accessing an internal network communications interface;

wherein the external network-based occurrence includes a change to a locally-stored or a cloud-stored file;

wherein the electronic word processing document is divided into a plurality of blocks, each block having at least one separately adjustable permission setting;

wherein, when the electronic rule is embedded within a particular block, information related to the electronic rule is restricted to entities possessing permission for access to the particular block;

accessing the electronic word processing document;

wherein the electronic word processing document contains text;

detecting an in-line object inserted into the text at a particular location, the in-line object including a URL-based rule linked to a portion of the text;

executing the URL-based rule to retrieve internet located data corresponding to the URL-based rule;

inserting the retrieved internet located data into the text at the particular location;

triggering the URL-based rule each time the electronic word processing document is launched;

wherein the URL-based rule includes a frequency-based update component;

wherein the URL-based rule is triggered when a threshold of the frequency-based update component is met;

wherein the in-line object includes an alphanumeric character string;

replacing the alphanumeric character string with the retrieved internet located data;

wherein the URL-based rule includes information about a structure of data at an address associated with a URL in the URL-based rule;

presenting a user interface for constructing the URL-based rule;

wherein the URL-based rule is configured to select the internet located data based on context, through semantic interpretation of the portion of the text and semantic interpretation of information on a web page associated with the URL-based rule;

accessing an electronic word processing document;

presenting an interface enabling selection of a live application, outside the electronic word processing document, for embedding in the electronic word processing document;

embedding, in-line with text of the electronic word processing document, a live active icon representative of the live application;

presenting, in a first viewing mode, the live active icon wherein during the first viewing mode, the live active icon is displayed embedded in-line with the text, and the live active icon dynamically changes based on occurrences outside the electronic word processing document;

receiving a selection of the live active icon;

in response to the selection, presenting in a second viewing mode, an expanded view of the live application;

receiving a collapse instruction;

in response to the collapse instruction, reverting from the second viewing mode to the first viewing mode;

embedding, in-line with text by sizing the live active icon to correspond to an in-line text font size;

wherein in the first viewing mode the live active icon has an appearance corresponding to imagery present in the expanded view;

presenting the second viewing mode in an iframe;

wherein the interface is configured to enable selection of abridged information for presentation in the first viewing mode;

wherein the interface includes a permission tool for enabling selective access restriction to at least one of the live active icon or the expanded view;

wherein the live active icon includes an animation that plays in-line with the text during the first viewing mode;

accessing the electronic word processing document;

identifying in the electronic word processing document a variable data element;

wherein the variable data element includes current data presented in the electronic word processing document and a link to a file external to the electronic word processing document;

accessing the external file identified in the link;

pulling, from the external file, first replacement data corresponding to the current data;

replacing the current data in the electronic word processing document with the first replacement data;

identifying a change to the variable data element in the electronic word processing document;

upon identification of the change, accessing the external file via the link;

updating the external file to reflect the change to the variable data element in the electronic word processing document;

wherein the current data includes text of the electronic word processing document and the link includes metadata associated with the text;

presenting an interface in the electronic word processing document for enabling designation of document text as the variable data element and for enabling designation of a file as a source of the replacement data;

displaying an interface for enabling permissions to be set on the variable data element and to thereby restrict modifications thereto;

wherein the external file is an additional electronic word processing document;

transmitting a message to a designated entity when the variable data element is changed;

receiving a selection of the variable data element and to present in an iframe information from the external file;

accessing a collaborative electronic document;

linking a first entity and a second entity to form a first collaborative group;

linking a third entity and a fourth entity to form a second collaborative group;

receiving a first alteration by the first entity to the collaborative electronic document;

tagging the first alteration by the first entity with a first collaborative group indicator;

receiving a second alteration to the collaborative electronic document by the second entity;

tagging the second alteration by the second entity with the first collaborative group indicator;

receiving a third alteration to the collaborative electronic document by the third entity;

tagging the third alteration by the third entity with a second collaborative group indicator;

receiving a fourth alteration from the fourth entity to the collaborative electronic document;

tagging the fourth alteration by the fourth entity with the second collaborative group indicator;

rendering a display of the collaborative electronic document;

wherein the rendered display includes presenting the first collaborative group indicator in association with the first alteration and the second alteration;

wherein the rendered display includes the second collaborative group indicator displayed in association with the third alteration and the fourth alteration;

wherein the first collaborative group includes a plurality of first additional entities linked to the first and second entities;

wherein the second collaborative group includes a plurality of second additional entities linked to the third and fourth entities;

wherein the displayed first collaborative group indicator in association with the first alteration and the second alteration includes a first instance of the first collaborative group indicator displayed in association with the first alteration and a second instance of the first collaborative group indicator displayed in association with the second alteration;

wherein the third alteration and the fourth alteration includes a first instance of the second collaborative group indicator displayed in association with the third alteration and a second instance of the second collaborative group indicator displayed in association with the fourth alteration;

preventing the second collaborative group from making edits to the first alteration and the second alteration;

receiving an attempt by a fifth entity to change the first alteration, accessing permissions settings, determining whether the fifth entity possesses a permission enabling change of the first alteration, and upon determination of a change-enabling permission, applying the change to the first alteration;

wherein the determination that the fifth entity possesses the permission is based on a determination that the fifth entity is associated with the first collaborative group;

recognizing the fifth entity as a member of a third collaborative group with permission to change alterations of the first collaborative group, permitting the change to the first alteration, and tagging the change with a third collaborative group indicator;

receiving an attempt by a sixth entity to change the first alteration, accessing permissions settings, determining whether that the six entity lacks permission enabling change of the first alteration, and generating a duplicate version of the collaborative electronic document in which the sixth entity is permitted to change the first alteration;

accessing the electronic document, having an original form;

recording at a first time, first edits to a specific portion of the electronic document;

recording at a second time, second edits to the specific portion of the electronic document;

recording at a third time, third edits to the specific portion of the electronic document;

receiving at a fourth time, a selection of the specific portion;

in response to the selection, rendering a historical interface enabling viewing of an original form of the selection, the first edits, the second edits, and the third edits;

receiving an election of one of the original form of the electronic document, the first edits, the second edits, and the third edits;

upon receipt of the election, presenting a rolled-back display reflecting edits made to the specific portion of the electronic document, the rolled-back display corresponding to a past time associated with the election;

wherein the historical interface includes an interactive timeline enabling rollback of edits to markers on the timeline denotating the original form of the selection, the first edits, the second edits, and the third edits;

wherein the first edits were made by a first entity, the second edits were made by a second entity and the third edits were made by a third entity;

wherein the markers enable identification of a particular entity associated with a particular edit;

wherein the markers indicate an identity of an associated entity responsible for an associated edit;

wherein the first edits, the second and the third edits are each associated with a common entity;

applying a time interval to document edits;

wherein selection of a particular marker causes presentation of changes that occurred during the time interval;

wherein the time interval is user-definable;

wherein the historical interface is configured to simultaneously display the first edit, the second edit, and the third edit;

co-displaying the timeline in a vicinity of the specific portion of the electronic document;

presenting a first window defining a slide pane for displaying a slide subject to editing;

presenting in a second window a current graphical slide sequence pane, for graphically displaying a current sequence of slides in the deck;

presenting in a third window a historical graphical slide sequence pane for graphically presenting a former sequence of slides in the deck;

accessing a stored deck of presentation slides;

populating the first window, the second window, and the third window with slides of the deck;

receiving a selection of a particular slide having a current version displayed in the second window and a former version displayed in the third window;

receiving a first selection of the particular slide in the second window;

upon receipt of the first selection, causing a rendition of the particular slide to appear in the first window;

receiving a second selection of the particular slide in the third window;

upon receipt of the second selection, causing a rendition of the particular slide to appear in the first window;

receiving a drag of the particular slide from the third window into the second window, to thereby reincorporate an earlier version of the particular slide from the former version into the current sequence of slides in the second window;

storing in a timeline repository, a first record of the drag;

wherein upon dragging, moving an associated slide from the second window to the third window and storing in the timeline repository a second record of the moving;

displaying a timeline slider in association with the particular slide, the timeline slider enabling viewing of a sequence of changes that occurred over time to the particular slide;

receiving an input via the timeline slider to cause a display of an editing rollback of the particular slide;

wherein during display of an editing rollback, a display characteristic differs from a display characteristic that occurs during a current slide display;

presenting a slider extending between the second window and the third window, to enable sequential sets of changes to be displayed as the slider is dragged from a location proximate the third window representing an earliest slide version to a location proximate the second window representing a latest slide version;

receiving a selection of a slide portion from an earlier version for incorporation into a current version;

accessing the electronic collaborative word processing document;

presenting a first instance of the electronic collaborative word processing document via a first hardware device running a first editor;

presenting a second instance of the electronic collaborative word processing document via a second hardware device running a second editor;

receiving from the first editor during a common editing period, first edits to the electronic collaborative word processing document;

wherein the first edits occur on a first earlier page of the electronic collaborative word processing document and result in a pagination change;

receiving from the second editor during the common editing period, second edits to the electronic collaborative word processing document;

wherein the second edits occur on a second page of the electronic collaborative word processing document later than the first page;

during the common editing period, locking a display associated with the second hardware device to suppress the pagination change caused by the first edits received by the second hardware device;

upon receipt of a scroll-up command via the second editor during the common editing period, causing the display associated with the second hardware device to reflect the pagination change caused by the first edits;

recognizing an active work location of the second editor and to lock display scrolling associated with the second display based on the recognized active work location so as not to interrupt viewing of the active work location;

wherein the recognition of the active work location is based on a cursor location in the second instance of the collaborative electronic word processing document;

wherein the recognition of the active work location is based on a scrolling location in the second instance of the collaborative electronic word processing document;

wherein the lock remains in place until the active work location is changed in the second editor;

wherein the scroll-up command that causes the second hardware device to reflect the pagination change includes a scroll to a page other than a page currently displayed on the second display;

wherein the second edits are associated with a block in the electronic collaborative word processing document;

wherein the recognition of the active work location is based on a block location in the second instance of the collaborative electronic word processing document;

accessing an electronic collaborative document in which a first editor and at least one second editor are enabled to simultaneously edit and view each other's edits to the electronic collaborative document;

outputting first display signals for presenting an interface on a display of the first editor, the interface including a toggle enabling the first editor to switch between a collaborative mode and a private mode;

receiving from the first editor operating in the collaborative mode, first edits to the electronic collaborative document;

outputting second display signals to the first editor and the at least one second editor, the second display signals reflecting the first edits made by the first editor;

receiving from the first editor interacting with the interface, a private mode change signal reflecting a request to change from the collaborative mode to the private mode;

in response to the first mode change signal, initiating in connection with the electronic collaborative document the private mode for the first editor;

in the private mode, receiving from the first editor, second edits to the electronic collaborative document;

in response to the second edits, outputting third display signals to the first editor while withholding the third display signals from the at least one second editor, such that the second edits are enabled to appear on a display of the first editor and are prevented from appearing on at least one display of the at least one second editor;

receiving from the first editor interacting with the interface, a collaborative mode change signal reflecting a request to change from the private mode to the collaborative mode, and in response to receipt of the collaborative mode change signal, enable subsequent edits made by the first editor to be viewed by the at least one second editor;

segregating the second edits made in private mode, such that upon return to the collaborative mode, viewing of the second edits are withheld from the at least one second editor;

receiving from the first editor a release signal, and in response thereto, enabling the at least one second editor to view the second edits;

wherein enabling the at least one second editor to view the second edits includes displaying to the at least one second editor, in association with the second edits, an identity of the first editor;

in response to receiving the release signal, comparing the second edits made in private mode to original text in the electronic collaborative document, identifying differences based on the comparison, and presenting the differences in connection with text of the electronic collaborative document to thereby indicate changes originally made during private mode;

receiving from the first editor, in association with a text block, a retroactive privatization signal, and upon receipt of the retroactive privatization signal, withholding the text block from display to the at least one second editor;

receiving from the first editor operating in private mode an exemption signal for at least one particular editor, to thereby enable the at least one particular editor to view the second edits;

enabling access to an electronic word processing document including blocks of text;

wherein each block of text has an associated address;

accessing at least one data structure containing block-based permissions for each block of text;

wherein the permissions include at least one permission to view an associated block of text;

receiving from an entity a request to access the electronic word processing document;

performing a lookup in the at least one data structure to determine that the entity lacks permission to view at least one specific block within the electronic word processing document;

causing to be rendered on a display associated with the entity, the electronic word processing document with the at least one specific block omitted from the display;

wherein the electronic word processing document includes graphical objects;

wherein the block-based permissions include restrictions on viewing the graphical objects;

wherein the at least one data structure is configured to maintain identities of document authors;

wherein the document authors are enabled to define the block permissions;

wherein the electronic word processing document is a collaborative document;

receiving an added block from an editing entity;

enabling the editing entity to set block permissions for the added block;

permitting the editing entity to set a permission blocking an author of the document from viewing the added block;

wherein the data structure includes separate permissions for viewing and editing;

performing a look up of viewing and editing permissions associated with a particular collaborative user who, for a particular block, has viewing permissions and lacks editing permissions;

rendering the particular block on a display associated with the collaborative user in a manner permitting viewing of the particular block while preventing editing of the particular block;

wherein each address includes at least one of a block-associated tag, block-associated metadata, or a block-associated location;

wherein an absence of a recorded permission in the at least one data structure for a particular block constitutes an unrestricted permission for the particular block;

presenting to an entity viewing at least one source document a tag interface for enabling selection and tagging of document segments with at least one characteristic associated with each document segment;

identifying tagged segments within the at least one source document;

accessing a consolidation rule containing instructions for combining the tagged segments;

implementing the consolidation rule to associate document segments sharing common tags;

outputting for display at least one tagged-based consolidation document grouping together commonly tagged document segments;

presenting a consolidation interface for enabling definition of the consolidation rule;

wherein the at least one characteristic includes a plurality of characteristics chosen from the group consisting of entities associated with the document segments, descriptions associated with the document segments, time frames associated with the document segments, and locations associated with the document segments;

wherein the consolidation interface permits generation of the consolidation rule in a manner permitting consolidation of document segments based on more than one of the plurality of the characteristics;

wherein the at least one tagged-based consolidation document includes at least one heading of an associated tag, and associated tagged segments beneath the at least one heading;

wherein the at least one source document includes a plurality of source documents;

wherein the tagged-based consolidation document includes document segments from the plurality of source documents;

wherein the consolidation rule includes a transmissions component for transmitting the tagged-based consolidation document to at least one designated entity;

receiving from a first of the plurality of mobile communications devices, a first instance of a first graphical code captured from a first slide during a presentation, or a decryption of the first instance of the first graphical code, and an associated first comment on the first slide;

receiving from a second of the plurality of mobile communications devices, a second instance of the first graphical code captured from the first slide during the presentation or a decryption of the second instance of the first graphical code, and an associated second comment on the first slide;

receiving from a third of the plurality of mobile communications devices, a first instance of a second graphical code captured from a second slide during the presentation or a decryption of the first instance of the second graphical code, and an associated third comment on the second slide;

receiving from a fourth of the plurality of mobile communications devices, a second instance of the second graphical code captured from the second slide during the presentation or a decryption of the second instance of the second graphical code, and an associated fourth comment on the second slide;

performing a lookup associated with the first graphical code, to identify a first repository associated with the first slide of the presentation;

aggregating the first comment and the second comment in the first repository;

performing a lookup associated with the second graphical code, to identify a second repository associated with the second slide of the presentation;

aggregating the third comment and the fourth comment in the second repository;

displaying to a presenter of the deck the first comment and the second comment in association with the first slide;

displaying to the presenter of the deck, the third comment and the fourth comment in association with the second slide;

wherein the first graphical code includes at least one of a bar code and a QR code;

wherein the first repository and the second repository constitute separate portions of a common file;

displaying in real time to the presenter during the presentation at least one of the first comment, the second comment, the third comment, and the fourth comment;

aggregating the first comment, the second comment, the third comment, and the fourth comment into a common electronic word processing document;

presenting the first comment, the second comment, the third comment, and the fourth comment in a chat during the presentation;

causing a first portion of the chat containing the first comment and the second comment to be co-presented in association with the first slide and causing a second portion of the chat containing the third comment and the fourth comment to be co-presented in association with the second slide.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for automatically altering information within an electronic document based on an externally detected occurrence, the system comprising:

at least one processor configured to:

access an electronic word processing document divided into a plurality of distinct blocks;

display an interface presenting at least one tool for enabling an author of the electronic word processing document to define an electronic rule triggered by an external network-based occurrence, the electronic rule including an automation associated with an underlying logic rule, and wherein defining the electronic rule includes selecting one or more conditions and selecting one of the distinct blocks of the electronic word processing document;

embed the electronic rule into the selected distinct block, wherein at least one parameter of the embedded electronic rule is restricted to entities possessing permission for access to the embedded electronic rule;

receive, in association with the electronic rule, a conditional instruction to edit the selected distinct block in response to the external network-based occurrence corresponding to at least one of the selected conditions;

detect that the external network-based occurrence corresponds to the at least one of the selected conditions; and in response to detecting that the external network-based occurrence corresponds to the at least one of the selected conditions, implement the conditional instruction and thereby automatically edit the selected distinct block.

2. The system of claim 1, wherein the at least one processor is further configured to access an internet communications interface, and wherein the external network-based occurrence includes a change to an internet web page.

3. The system of claim 2, wherein the at least one processor is further configured to pull data from the internet web page and insert the pulled data into the electronic word processing document.

4. The system of claim 2, wherein in displaying the interface, the at least one processor is configured to present a logical template for constructing the electronic rule, the logical template including at least one field for designating an external source associated with the external network-based occurrence.

5. The system of claim 1, wherein the conditional instruction to edit the electronic word processing document includes at least one of adding text, modifying text, deleting text, rearranging text, adding a graphic within text, inserting video within text, inserting an image within text, or inserting audio information within text.

6. The system of claim 1, wherein the at least on processor is further configured to access an internal network communications interface, and wherein the external network-based occurrence includes a change to a locally-stored or a cloud-stored file.

7. The system of claim 1, wherein each distinct block has at least one separately adjustable permission setting.

8. A non-transitory computer readable medium containing instructions that when executed by at least one processor, perform operations for automatically altering information within an electronic document based on an externally detected occurrence, the operations comprising:

accessing an electronic word processing document divided into a plurality of distinct blocks;

displaying an interface presenting at least one tool for enabling an author of the electronic word processing document to define an electronic rule triggered by an external network-based occurrence, the electronic rule including an automation associated with an underlying logic rule, and wherein defining the electronic rule includes selecting one or more conditions and selecting one of the distinct blocks of the electronic word processing document;

embedding the electronic rule into the selected distinct block, wherein at least one parameter of the embedded electronic rule is restricted to entities possessing permission for access to the embedded electronic rule;

receiving, in association with the electronic rule, a conditional instruction to edit the selected distinct block in response to the external network-based occurrence corresponding to at least one of the selected conditions;

detecting that the external network-based occurrence corresponds to the at least one of the selected conditions; and in response to detecting that the external network-based occurrence corresponds to the at least one of the selected conditions, implementing the conditional instruction and thereby automatically edit the selected distinct block.

9. The non-transitory computer readable medium of claim 8, wherein the operations further comprise accessing an internet communications interface, and wherein the external network-based occurrence includes a change to an internet web page.

10. The non-transitory computer readable medium of claim 9, wherein the operations further comprise pulling data from the internet web page and inserting the pulled data into the electronic word processing document.

11. The non-transitory computer readable medium of claim 9, wherein in displaying the interface, the operations comprise presenting a logical template for constructing the electronic rule, the logical template including at least one field for designating an external source associated with the external network-based occurrence.

12. The non-transitory computer readable medium of claim 8, wherein the conditional instruction to edit the electronic word processing document includes at least one of adding text, modifying text, deleting text, rearranging text, adding a graphic within text; inserting video within text, inserting an image within text, or inserting audio information within text.

13. The non-transitory computer readable medium of claim 8, wherein the operations further comprise accessing an internal network communications interface, and wherein the external network-based occurrence includes a change to a locally-stored or a cloud-stored file.

14. The non-transitory computer readable medium of claim 8, wherein each distinct block has at least one separately adjustable permission setting.

15. The system of claim 1, wherein the external network-based occurrence includes a change to data made through a third-party application.

16. The system of claim 15, wherein the third-party application is communicably connected to an electronic word processing application associated with the electronic word processing document.

17. The system of claim 15, wherein the external network-based occurrence includes an addition of a particular string of text to the electronic word processing document.

18. The system of claim 15, wherein the external network-based occurrence includes a change made to a particular subset of the electronic word processing document.

19. The system of claim 15, wherein the instruction to edit the electronic word processing document includes at least one of adding a data structure to the electronic word processing document, removing a data structure from the electronic word processing document, or modifying a data structure in the electronic word processing document.

20. The system of claim 15, wherein the electronic rule includes multiple alternate condition sets, and wherein the at least one processor is configured such that satisfaction of one of the alternate condition sets prompts implementation of the conditional instruction.

21. The system of claim 15, wherein detecting that the external network-based occurrence corresponds to the at least one of the selected conditions includes using an event listener to detect a change to data.

22. The system of claim 15, wherein the instruction to edit the electronic word processing document includes inserting visual information between lines of text in the electronic word processing document.

23. The system of claim 15, wherein the instruction to edit the electronic word processing document includes at least one of adding a distinct block within the electronic word processing document, removing a distinct block within the electronic word processing document, or changing a distinct block within the electronic word processing document.

24. The system of claim 15, wherein accessing an electronic word processing document includes accessing a live data stream of the electronic word processing document from a remote source.

25. The system of claim 15, wherein the electronic rule includes an if-then statement.

26. The system of claim 15, wherein at least one processor is further configured to send information associated with the selected distinct block to one or more devices when the selected distinct block is edited.

27. The system of claim 26, wherein the one or more devices are associated with users having a permission associated with the electronic word processing document.

28. The system of claim 1, wherein:

each distinct block includes one or more distinct fields of metadata; and embedding the electronic rule into the selected distinct block includes at least one of editing metadata associated with the selected distinct block, adding the electronic rule or an identifier of the electronic rule to metadata associated with the selected distinct block, storing the electronic rule in a same storage medium as an electronic word processing document including the selected distinct block, or creating a data mapping between the electronic rule and the selected distinct block.

29. The system of claim 1, wherein an electronic word processing application associated with the electronic word processing document is configured to transmit an application programming interface (API) call to an API and to receive data from the API for use in automatically editing the selected distinct block.

30. The system of claim 1, wherein the electronic rule includes event listener initialization information.

31. The system of claim 1, wherein the external network-based occurrence occurs at a database management service.

32. The system of claim 1, wherein the at least one parameter of the embedded electronic rule includes at least one of: the one or more conditions, the conditional instruction, a name of the electronic rule, and an identifier of the electronic rule.

33. The system of claim 1, wherein the embedded electronic rule is configured to remain embedded within the selected distinct block when the selected distinct block is moved to a different position within the electronic word processing document.

34. The system of claim 1, wherein the restriction includes preventing an unauthorized entity from viewing the at least one parameter of the embedded electronic rule.

35. The system of claim 1, wherein the electronic word processing document includes a board.

36. A method for automatically altering information within an electronic document based on an externally detected occurrence, the method comprising:

accessing an electronic word processing document divided into a plurality of distinct blocks;

displaying an interface presenting at least one tool for enabling an author of the electronic word processing document to define an electronic rule triggered by an external network-based occurrence, the electronic rule including an automation associated with an underlying logic rule, and wherein defining the electronic rule includes selecting one or more conditions and selecting one of the distinct blocks of the electronic word processing document;

embedding the electronic rule into the selected distinct block, wherein at least one parameter of the embedded electronic rule is restricted to entities possessing permission for access to the embedded electronic rule;

receiving, in association with the electronic rule, a conditional instruction to edit the selected distinct block in response to the external network-based occurrence corresponding to at least one of the selected conditions;

detecting that the external network-based occurrence corresponds to the at least one of the selected conditions; and in response to detecting that the external network-based occurrence corresponds to the at least one of the selected conditions, implementing the conditional instruction and thereby automatically edit the selected distinct block.

37. The method of claim 36, the method further comprising accessing an internet communications interface, and wherein the external network-based occurrence includes a change to an internet web page.

38. The method of claim 37, the method further comprising pulling data from the internet web page and inserting the pulled data into the electronic word processing document.

39. The method of claim 36, wherein the conditional instruction to edit the electronic word processing document includes at least one of adding text, modifying text, deleting text, rearranging text, adding a graphic within text; inserting video within text, inserting an image within text, or inserting audio information within text.

40. The method of claim 36, the method further comprising accessing an internal network communications interface, and wherein the external network-based occurrence includes a change to a locally-stored or a cloud-stored file.

41. The method of claim 36, wherein each distinct block has at least one separately adjustable permission setting.

* * * * *